US011515567B2

(12) United States Patent
Matsuoka et al.

(10) Patent No.: US 11,515,567 B2
(45) Date of Patent: Nov. 29, 2022

(54) NON-AQUEOUS ELECTROLYTE SOLUTION, NON-AQUEOUS SECONDARY BATTERY, CELL PACK, AND HYBRID POWER SYSTEM

(71) Applicant: Asahi Kasei Kabushiki Kaisha, Tokyo (JP)

(72) Inventors: Naoki Matsuoka, Tokyo (JP); Hirokazu Kamine, Tokyo (JP); Masaki Takahashi, Tokyo (JP); Kazuyuki Fujiwara, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 97 days.

(21) Appl. No.: 16/489,554

(22) PCT Filed: Mar. 16, 2018

(86) PCT No.: PCT/JP2018/010380
§ 371 (c)(1),
(2) Date: Aug. 28, 2019

(87) PCT Pub. No.: WO2018/169028
PCT Pub. Date: Sep. 20, 2018

(65) Prior Publication Data
US 2019/0393556 A1    Dec. 26, 2019

(30) Foreign Application Priority Data

Mar. 17, 2017   (JP) .............................. JP2017-052085
Mar. 17, 2017   (JP) .............................. JP2017-052086

(Continued)

(51) Int. Cl.
H01M 10/0569    (2010.01)
H01M 4/525    (2010.01)
(Continued)

(52) U.S. Cl.
CPC ....... *H01M 10/0569* (2013.01); *H01M 4/525* (2013.01); *H01M 10/052* (2013.01);
(Continued)

(58) Field of Classification Search
None
See application file for complete search history.

(56) References Cited

U.S. PATENT DOCUMENTS 5,731,106 A    3/1998   Tsutsumi et al.
5,759,714 A    6/1998   Matsufuji et al.
(Continued)

FOREIGN PATENT DOCUMENTS

CN    101548425 A    9/2009
CN    103190027 A    7/2013
(Continued)

OTHER PUBLICATIONS

International Search Report issued in corresponding International Patent Application No. PCT/JP2018/010380 dated Jun. 19, 2018.
(Continued)

*Primary Examiner* — Eli S Mekhlin
(74) *Attorney, Agent, or Firm* — Morgan, Lewis & Bockius LLP

(57) ABSTRACT

To provide a non-aqueous electrolyte solution, a non-aqueous secondary battery, a cell pack, and a hybrid power system, capable of improving desired battery performance using acetonitrile, the non-aqueous electrolyte solution contains acetonitrile, lithium salt, and cyclic acid anhydride.

10 Claims, 6 Drawing Sheets

(30) Foreign Application Priority Data

| Mar. 17, 2017 | (JP) | JP2017-052088 |
|---|---|---|
| Mar. 17, 2017 | (JP) | JP2017-052254 |
| Mar. 17, 2017 | (JP) | JP2017-052255 |
| Mar. 17, 2017 | (JP) | JP2017-052256 |
| Mar. 17, 2017 | (JP) | JP2017-052257 |
| Mar. 17, 2017 | (JP) | JP2017-052258 |
| Mar. 17, 2017 | (JP) | JP2017-052259 |
| Mar. 17, 2017 | (JP) | JP2017-052260 |
| Mar. 17, 2017 | (JP) | JP2017-052396 |
| Mar. 17, 2017 | (JP) | JP2017-052397 |
| Mar. 17, 2017 | (JP) | JP2017-052398 |
| Mar. 17, 2017 | (JP) | JP2017-052399 |
| Mar. 17, 2017 | (JP) | JP2017-052400 |

(51) Int. Cl.
*H01M 10/052* (2010.01)
*H01M 10/0567* (2010.01)
*H01M 10/0568* (2010.01)
*H01M 4/02* (2006.01)

(52) U.S. Cl.
CPC ... *H01M 10/0567* (2013.01); *H01M 10/0568* (2013.01); *H01M 2004/028* (2013.01); *H01M 2300/0028* (2013.01)

(56) References Cited

U.S. PATENT DOCUMENTS

| 6,878,491 | B1 | 4/2005 | Miura et al. | |
| 9,825,302 | B1* | 11/2017 | Shin | H01G 11/66 |
| 2002/0106560 | A1 | 8/2002 | Kolb et al. | |
| 2005/0084765 | A1* | 4/2005 | Lee | H01M 4/366 |
| | | | | 429/329 |
| 2006/0194118 | A1 | 8/2006 | Yew et al. | |
| 2008/0102376 | A1 | 5/2008 | Kato et al. | |
| 2009/0226821 | A1 | 9/2009 | Inhara et al. | |
| 2010/0035146 | A1 | 2/2010 | Fujii et al. | |
| 2010/0119956 | A1 | 5/2010 | Tokuda et al. | |
| 2011/0229769 | A1 | 9/2011 | Ihara et al. | |
| 2011/0311886 | A1 | 12/2011 | Funada et al. | |
| 2012/0308890 | A1* | 12/2012 | Okuda | H01M 10/4235 |
| | | | | 429/218.2 |
| 2013/0052543 | A1 | 2/2013 | Ihara et al. | |
| 2013/0078533 | A1 | 3/2013 | Kang et al. | |
| 2013/0224535 | A1 | 8/2013 | Matsuoka et al. | |
| 2013/0337344 | A1* | 12/2013 | Mizuno | H01M 10/0568 |
| | | | | 429/332 |
| 2014/0184159 | A1* | 7/2014 | Kachi | H01M 16/00 |
| | | | | 320/109 |
| 2014/0255796 | A1 | 9/2014 | Matsuoka et al. | |
| 2015/0024265 | A1 | 1/2015 | Jun et al. | |
| 2016/0036026 | A1 | 2/2016 | Kano et al. | |
| 2016/0036038 | A1* | 2/2016 | Kuriyama | H01M 10/0525 |
| | | | | 429/223 |
| 2016/0141720 | A1 | 5/2016 | Onozaki et al. | |
| 2016/0172707 | A1 | 6/2016 | Oh et al. | |
| 2017/0033402 | A1 | 2/2017 | Kubota et al. | |
| 2017/0077547 | A1 | 3/2017 | Takami et al. | |
| 2017/0077549 | A1 | 3/2017 | Park et al. | |
| 2017/0229736 | A1 | 8/2017 | Shimanuki et al. | |
| 2017/0317385 | A1* | 11/2017 | Zhang | H01M 10/0525 |
| 2018/0062207 | A1 | 3/2018 | Matsuoka et al. | |
| 2018/0062213 | A1 | 3/2018 | Matsuoka et al. | |
| 2018/0212277 | A1* | 7/2018 | Park | H01M 10/0585 |

FOREIGN PATENT DOCUMENTS

| CN | 104253283 A | 12/2014 |
| CN | 105580193 A | 5/2016 |
| EP | 0785586 A1 | 7/1997 |
| EP | 1905739 A1 | 4/2008 |
| EP | 2573853 A1 | 3/2013 |
| JP | H04-206167 A | 7/1992 |
| JP | H07-085888 A | 3/1995 |
| JP | H10-208742 A | 8/1998 |
| JP | 2000-012079 A | 1/2000 |
| JP | 2000-123632 A | 4/2000 |
| JP | 2001-057214 A | 2/2001 |
| JP | 2001-148257 A | 5/2001 |
| JP | 2003-157719 A | 5/2003 |
| JP | 2004-259681 A | 9/2004 |
| JP | 2005-050585 A | 2/2005 |
| JP | 2005-072003 A | 3/2005 |
| JP | 2006-245001 A | 9/2006 |
| JP | 2008-305771 A | 12/2008 |
| JP | 2009-218056 A | 9/2009 |
| JP | 2011-154987 A | 8/2011 |
| JP | 2012-025764 A | 2/2012 |
| JP | 2013-197061 A | 9/2013 |
| JP | 2013-232326 A | 11/2013 |
| JP | 2014-007052 A | 1/2014 |
| JP | 2014-194930 A | 10/2014 |
| JP | 2015-065050 A | 4/2015 |
| JP | 2015-090859 A | 5/2015 |
| JP | 2015-133255 A | 7/2015 |
| JP | 2015-164126 A | 9/2015 |
| JP | 2015-531738 A | 11/2015 |
| JP | 2016-035901 A | 3/2016 |
| JP | 2016-085838 A | 5/2016 |
| JP | 2016-134283 A | 7/2016 |
| JP | 2016-143536 A | 8/2016 |
| JP | 2016-178125 A | 10/2016 |
| JP | 2016-531388 A | 10/2016 |
| JP | 2017-054822 A | 3/2017 |
| KR | 2013-0047801 A | 5/2013 |
| TW | 200845464 A | 11/2008 |
| WO | 2013/054795 A1 | 4/2013 |
| WO | 2013/062056 A1 | 5/2013 |
| WO | 2015/163139 A1 | 10/2015 |
| WO | 2016/021596 A1 | 2/2016 |
| WO | 2016/159108 A1 | 10/2016 |
| WO | 2016/159117 A1 | 10/2016 |

OTHER PUBLICATIONS

Partial European Search Report issued in corresponding European Patent Application No. 18767214.2 dated Apr. 29, 2021.

Extended European Search Report issued in corresponding European Patent Application No. 21190745.6 dated Dec. 1, 2021.

Moumouzias et al., "Comparative study of LiBF4, LiAsF6, LiPF6, and LicClo4 as electrolytes in propylene carbonate-diethyl carbonate solutions for Li/LiMn2O4 cells," Journal of Power Sources, 122: 57-66 (2003).

Wang et al., "Effects of acetonitrile and 1,2-dimethoxyethane on the conductivity of electrolyte in Li-ion battery," Chinese Battery Industry, vol. 16, No. 6, pp. 354-358 (Dec. 2011) (see English abstract).

* cited by examiner

FIG. 3
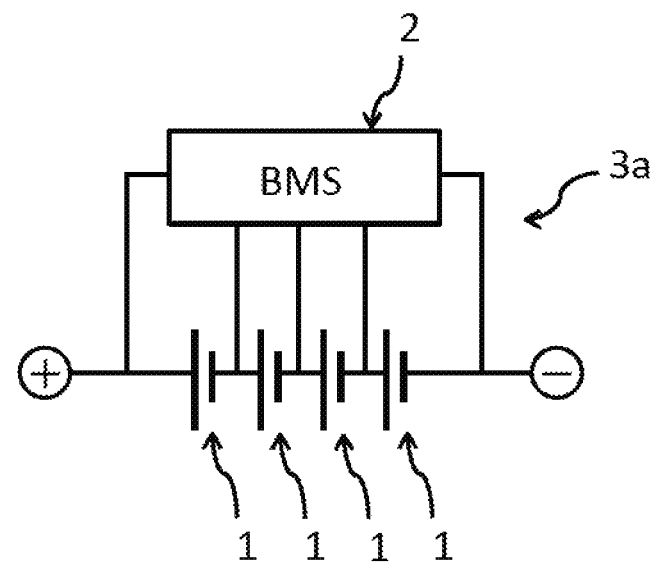
FIG. 3(a)
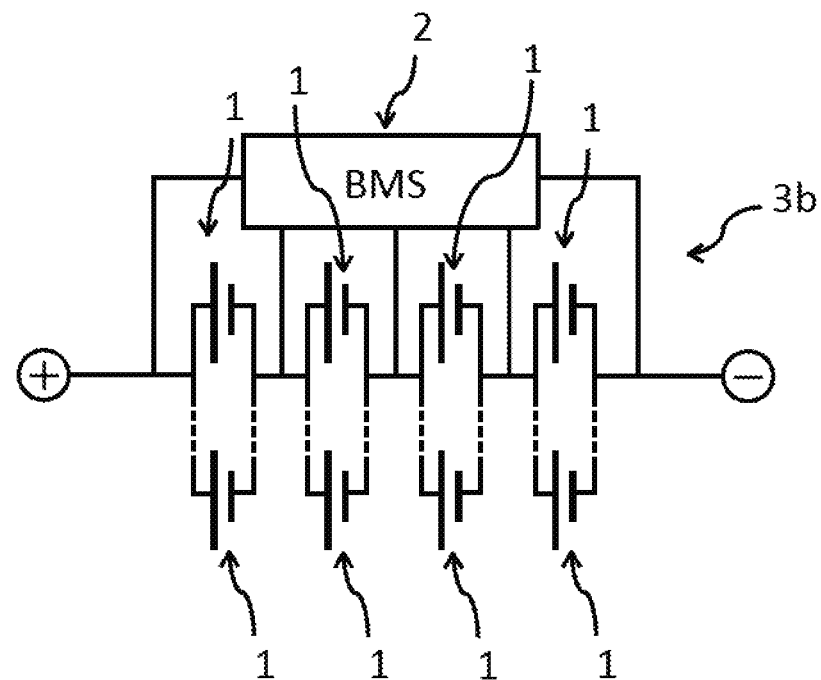
FIG. 3(b)

NON-AQUEOUS ELECTROLYTE SOLUTION, NON-AQUEOUS SECONDARY BATTERY, CELL PACK, AND HYBRID POWER SYSTEM

FIELD OF THE INVENTION

The present invention relates to a non-aqueous electrolyte solution, a non-aqueous secondary battery, a cell pack, and a hybrid power system.

BACKGROUND OF THE INVENTION

A non-aqueous secondary battery such as a lithium ion battery (LIB) is characterized in a light weight, high energy, and a long service life, and is widely used as a power source of various portable electronic devices. In recent years, applications of the non-aqueous secondary batteries are widened to an industrial field represented by a power tool such as an electric tool, an in-vehicle device in an electric bicycle, or the like. Furthermore, attention is also focused in the field of a power storage field such as a home energy storage system.

In the technique of Patent Document 1, a non-aqueous electrolyte applied to a non-aqueous secondary battery such as a lithium ion battery is discussed. Patent Document 1 discusses a non-aqueous electrolyte produced by adding bismaleimide and other additives.

Patent Document 2 provides a non-aqueous electrolyte battery capable of exhibiting a sufficiently low open circuit voltage (OCV) and providing an excellent service life characteristic.

Patent Document 3 discusses an electrolyte solution of a lithium ion battery. In the technique of Patent Document 3, a capacity after a predetermined number of cycles is measured through a high-temperature cycle test or the like to evaluate durability.

In the technique of Patent Document 4, compared to the existing carbonate-based electrolyte solution, a storage characteristic and a swelling characteristic may be improved at a high temperature. A lithium ion battery using this electrolyte solution may implement performance equal to or higher than those of the batteries of the prior art in characteristics such as capacity, efficiency, low temperature, and service life.

Patent Document 5 discusses a technique of vinylene carbonate useful as a solvent and an additive of a lithium ion battery electrolyte solution.

Patent Document 6 discusses a technique of a non-aqueous secondary battery using an electrolyte solution containing lithium salt and a non-aqueous solvent.

Patent Document 7 discusses a non-aqueous electrolyte solution secondary battery obtained by adding hydrofluoric acid or organic acid to a non-aqueous electrolyte solution.

In the technique of Patent Document 8, a charging/discharging characteristic and a cycle characteristic can be improved.

Patent Document 9 discusses a lithium ion battery electrolyte containing a non-aqueous organic solvent, lithium salt, and a complexation additive chelated with a transition metal. In the technique of Patent Document 9, a lithium ion battery having excellent battery safety such as an overcharge characteristic can be provided.

Patent Document 10 discusses non-aqueous electrolyte capable of suppressing degradation of battery properties caused by an antioxidant agent under a high-temperature environment.

Patent Document 11 discusses a non-aqueous electrolyte solution for a lithium ion battery capable of improving an initial capacity and an output power characteristic under the room temperature and a low temperature. In the technique of Patent Document 11, the non-aqueous electrolyte solution contains an organic solvent, lithium salt, and a phosphorus compound.

Patent Document 12 discusses a battery technique capable of improving a service life and a rate characteristic by modifying a positive electrode material of the secondary battery.

CITATION LIST

Patent Documents

Patent Document 1: Japanese Unexamined Patent Application Publication No. 2016-143536
Patent Document 2: Japanese Unexamined Patent Application Publication No. 2016-35901
Patent Document 3: Japanese Unexamined Patent Application Publication No. 2014-194930
Patent Document 4: Japanese Unexamined Patent Application Publication No. 2005-72003
Patent Document 5: Japanese Unexamined Patent Application Publication No. 2012-25764
Patent Document 6: PCT Publication No. WO2013/062056
Patent Document 7: Japanese Unexamined Patent Application Publication No. 2000-12079
Patent Document 8: Japanese Unexamined Patent Application Publication No. 2009-218056
Patent Document 9: Japanese Unexamined Patent Application Publication No. 2006-245001
Patent Document 10: Japanese Unexamined Patent Application Publication No. 2011-154987
Patent Document 11: Japanese Translation of PCT International Application Publication No. 2016-531388
Patent Document 12: Japanese Unexamined Patent Application Publication No. 10-208742

SUMMARY OF THE INVENTION

However, it is known that an acetonitrile-based electrolyte solution is required to form a film on a surface of a negative electrode in order to suppress reductive electrolysis, and a film formation agent used in the prior art is insufficient.

From the discussion described above, it is known that, if a film that can withstand the acetonitrile electrolyte solution is not sufficiently formed, reductive decomposition proceeds at the time of initial charging or each test under a high-temperature environment to cause gas generation, capacity reduction, or the like.

Meanwhile, if a highly durable film is formed, insertion or dissociation of lithium ions to or from the negative electrode is inhibited, so that it is difficult to exhibit high ion conductivity which is the characteristic of the acetonitrile.

In this regard, in order to address the problems of the prior art, the present invention provides a non-aqueous electrolyte solution, a non-aqueous secondary battery, a cell pack, and a hybrid power system, capable of improving desired battery performance in the acetonitrile electrolyte solution.

According to the present invention, there is provided a non-aqueous electrolyte solution containing acetonitrile, lithium salt, and cyclic acid anhydride.

In the present invention, it is preferable that the non-aqueous electrolyte solution further contains $PF_6$ anions.

In the present invention, it is preferable that the $PF_6$ anions are obtained by dissociating $LiPF_6$.

In the present invention, it is preferable that the cyclic acid anhydride includes at least one selected from a group consisting of succinic anhydride, maleic anhydride, and phthalic anhydride.

In the present invention, it is preferable that a content of the cyclic acid anhydride is 0.01 mass % or more and 1 mass % or less with respect to the non-aqueous electrolyte solution.

In the present invention, it is preferable that the non-aqueous electrolyte solution further contains linear carbonate.

In the present invention, it is preferable that the linear carbonate includes at least one selected from a group consisting of diethyl carbonate, ethyl methyl carbonate, and dimethyl carbonate.

In the present invention, it is preferable that a molar mixing ratio of the linear carbonate relative to acetonitrile is 0.15 or higher and 2 or lower.

In the present invention, it is preferable that a molar mixing ratio of the linear carbonate relative to acetonitrile is 0.25 or higher and 2 or lower.

In the present invention, it is preferable that a molar mixing ratio of the linear carbonate relative to acetonitrile is 0.4 or higher and 2 or lower.

In the present invention, the non-aqueous electrolyte solution further contains water.

In the present invention, it is preferable that a content of the water is 1 ppm or more and 200 ppm or less with respect to the non-aqueous electrolyte solution.

In the present invention, it is preferable that the non-aqueous electrolyte solution further contains imide salt.

In the present invention, it is preferable that the imide salt includes at least one selected from a group consisting of $LiN(SO_2F)_2$ and $LiN(SO_2CF_3)_2$.

In the present invention, it is preferable that the non-aqueous electrolyte solution further contains cyclic carbonate without saturated secondary carbon.

In the present invention, it is preferable that the cyclic carbonate without saturated secondary carbon includes at least one selected from a group consisting of ethylene carbonate and vinylene carbonate.

In the present invention, it is preferable that the cyclic carbonate without saturated secondary carbon is vinylene carbonate, and vinylene carbonate of 0.5 volume % or more and 4 volume % or less is contained in the non-aqueous electrolyte solution.

In the present invention, it is preferable that the non-aqueous electrolyte solution further contains an organic chlorine compound as a chloride adduct of the cyclic carbonate.

In the present invention, it is preferable that a −30° C. ionic conductivity of the non-aqueous electrolyte solution is 3 mS/cm or higher.

In the present invention, it is preferable that a −10° C. ionic conductivity of the non-aqueous electrolyte solution is 10 mS/cm or higher.

In the present invention, it is preferable that a 20° C. ionic conductivity of the non-aqueous electrolyte solution is 15 mS/cm or higher.

In the present invention, it is preferable that the non-aqueous electrolyte solution further contains acetic acid.

In the present invention, it is preferable that the non-aqueous electrolyte solution further contains propionitrile.

In the present invention, it is preferable that the non-aqueous electrolyte solution further contains acetaldehyde.

In the present invention, it is preferable that the non-aqueous electrolyte solution further contains 2,6-di-tert-butyl-p-cresol.

In the present invention, it is preferable that the non-aqueous electrolyte solution further contains a compound expressed as the following Formula (1):

[Chemical Formula 1]

$$-N= \qquad \text{Formula (1)}$$

In the present invention, it is preferable that the compound is a nitrogen-containing cyclic compound.

In the present invention, it is preferable that a main component of the lithium salt is the imide salt, or the imide salt and lithium salt other than the imide salt are contained with the same amount as the main component.

In the present invention, it is preferable that the imide salt is contained in a molarity relationship of "$LiPF_6 \leq$ imide salt".

In the present invention, it is preferable that a content of the imide salt is 0.5 mol or more and 3.0 mol or less with respect to a non-aqueous solvent of 1 L.

In the present invention, it is preferable that a molar mixing ratio of $PF_6$ anions relative to acetonitrile is 0.01 or higher and lower than 0.08.

In the present invention, it is preferable that the lithium salt contains $PO_2F_2$ anions.

In the present invention, it is preferable that a content of the $PO_2F_2$ anions is 0.001 mass % or more and 1 mass % or less with respect to the non-aqueous electrolyte solution.

In the present invention, it is preferable that activation energy in ion conduction of the non-aqueous electrolyte solution is 15 kJ/mol or lower at a temperature of −20 to 0° C.

According to the present invention, there is provided a non-aqueous secondary battery including: a positive electrode having a positive-electrode active material layer formed on one surface or both surfaces of a current collector; a negative-electrode having a negative-electrode active material layer formed on one surface or both surfaces of a current collector; and a non-aqueous electrolyte solution, wherein the non-aqueous secondary battery contains a compound having at least one functional group selected from a group consisting of —N=, —$NH_4$, —N=O, —NH—NH—, and —($NO_3$)—, and the non-aqueous secondary battery has a capacity retention rate of 70% or higher, the capacity retention rate being calculated by dividing a 5 C discharge capacity by a 1 C discharge capacity after a storage test for 4 hours at 85° C.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and a non-aqueous electrolyte solution, wherein the non-aqueous secondary battery contains at least one compound selected from a group consisting of organic acid, salt thereof, acid anhydride, and $Li_2O$, the organic acid includes at least one selected from a group consisting of acetic acid, oxalic acid, and formic acid, and the non-aqueous secondary battery has a capacity retention rate of 70% or higher, the capacity retention rate being calculated by dividing a 5 C discharge capacity by a 1 C discharge capacity after a storage test for 4 hours at 85° C.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and a non-aqueous electrolyte solution, wherein the non-aqueous secondary battery contains a compound having at least one functional group selected from a group consisting of —N=, —NH$_4$, —N=O, —NH—NH—, and (NO$_3$)—, and the non-aqueous secondary battery has a 0° C. ionic conductivity of 10 mS/cm or higher after a storage test for 4 hours at 85° C.

According to the present invention, there is provided a non-aqueous secondary battery including: a positive electrode having a positive-electrode active material layer formed on one surface or both surfaces of a current collector; a negative electrode having a negative-electrode active material layer formed on one surface or both surfaces of a current collector; and a non-aqueous electrolyte solution, wherein the non-aqueous secondary battery contains at least one compound selected from a group consisting of organic acid, salt thereof, acid anhydride, and Li$_2$O, the organic acid includes at least one selected from a group consisting of acetic acid, oxalic acid, and formic acid, and the non-aqueous secondary battery has a 0° C. ionic conductivity of 10 mS/cm or higher after a storage test for 4 hours at 85° C.

In the present invention, it is preferable that the positive-electrode active material is a lithium-containing composite metal oxide expressed as "Li$_z$MO$_2$" (where "M" contains Ni and one or more metal elements selected from a group consisting of Mn, Co, Al, and Mg, a content of the Ni element is more than 50%, and "z" denotes a number greater than 0.9 and smaller than 1.2).

In the present invention, it is preferable that a difference of the negative electrode electric potential around injection of the non-aqueous electrolyte solution is 0.3 V or higher.

In the present invention, it is preferable that a gas generation amount in a storage test at 60° C. for 200 hours is 0.008 ml or less per 1 mAh.

In the present invention, it is preferable that a resistance increase rate in a full-charge storage test at 60° C. for 720 hours is 400% or lower.

According to the present invention, there is provided a cell pack including the non-aqueous secondary battery described above, wherein the positive-electrode active material layer contains a lithium-containing compound including Fe, the negative-electrode active material layer contains graphite or at least one or more elements selected from a group consisting of Ti, V, Sn, Cr, Mn, Fe, Co, Ni, Zn, Al, Si, and B, the non-aqueous electrolyte solution contains cyclic carbonate without saturated secondary carbon, the cyclic carbonate without saturated secondary carbon includes at least one selected from a group consisting of ethylene carbonate and vinylene carbonate, the non-aqueous secondary battery is configured by connecting one module or two or more modules, in which the module is obtained by connecting four cells in series, in parallel or the non-aqueous secondary battery is configured by connecting four modules, in which the module is obtained by connecting two or more cells in parallel, in series, an operation voltage range per cell is within a range of 1.8 to 3.7 V, an average operation voltage is 2.5 to 3.5 V, and the module is mounted with a battery management system (BMS).

According to the present invention, there is provided a hybrid power system obtained by combining the cell pack described above, and a module or cell pack having a secondary battery other than a lithium ion battery.

According to the present invention, there is provided a cell pack including the non-aqueous secondary battery described above, wherein the positive-electrode active material layer contains a lithium-containing compound including Fe, the negative-electrode active material layer contains graphite or at least one or more elements selected from a group consisting of Ti, V, Sn, Cr, Mn, Fe, Co, Ni, Zn, Al, Si, and B, the non-aqueous electrolyte solution contains cyclic carbonate without saturated secondary carbon, the cyclic carbonate without saturated secondary carbon is at least one selected from a group consisting of ethylene carbonate and vinylene carbonate, the cell pack is configured by connecting one or two or more cell packs in parallel on the basis of Formula (2), in which the number of cells and the number of modules of the non-aqueous secondary battery are defined, or the non-aqueous secondary battery is configured by connecting modules on the basis of Formula (2) and Formula (3), the module being obtained by connecting two or more cells in parallel, an operation voltage range per cell is within a range of 1.8 to 3.7 V, an average operation voltage is 2.5 to 3.5 V, and the module is mounted with a battery management system (BMS), Number of cells connected in series per module ($X$):
$X$=2,4,8, or 16,   Formula (2): and Number of modules connected in series per cell pack ($Y$): $Y$=16/$X$.   Formula (3):

According to the present invention, there is provided a hybrid power system including the cell pack described above, and a module or cell pack having a secondary battery other than a lithium ion battery in combination.

Using the non-aqueous electrolyte solution according to the present invention, it is possible to delay generation of gas in the event of high-temperature operation and overcharging, reinforce the negative electrode SEI, and obtain excellent low-temperature characteristics or output power characteristics and excellent high-temperature characteristics.

As described above, using the non-aqueous electrolyte solution and the non-aqueous secondary battery using the same according to the present invention, it is possible to provide an acetonitrile electrolyte solution capable of improving desired battery performance.

BRIEF DESCRIPTION OF DRAWINGS

FIGS. 3(a) and (b) are a schematic explanatory diagram illustrating a cell pack according to a forty third embodiment;

DESCRIPTION OF EMBODIMENTS

Figure 1:
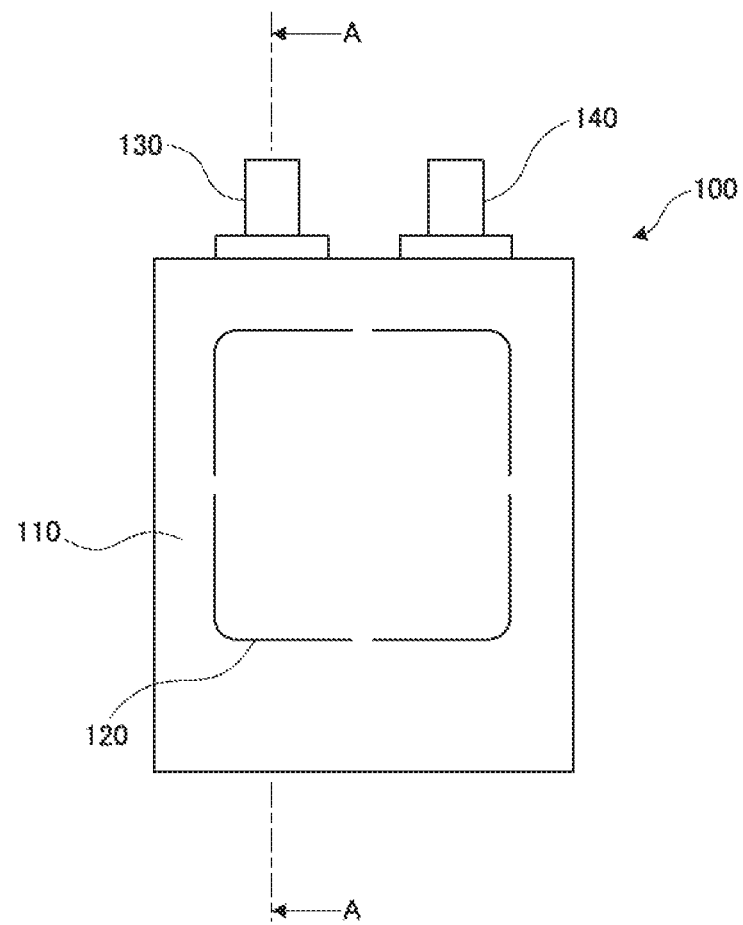
FIG. 1 is a plan view schematically illustrating an exemplary non-aqueous secondary battery according to an embodiment of the invention.

Embodiments of the invention (hereinafter, simply referred to as "embodiment") will now be described in detail.

First Embodiment: Non-Aqueous Electrolyte Solution

A non-aqueous electrolyte solution according to a first embodiment contains acetonitrile, lithium salt, and cyclic acid anhydride.

According to the first embodiment, the non-aqueous electrolyte solution containing acetonitrile, lithium salt, and cyclic acid anhydride can be formed by reinforcing a negative-electrode solid electrolyte interface (SEI) formed of cyclic acid anhydride before reductive decomposition of acetonitrile. As a result, it is possible to effectively suppress an increase of internal resistance over time caused by a thermal history.

While the non-aqueous secondary battery using the non-aqueous electrolyte solution according to the first embodiment can function as a battery through initial charging, it is stabilized because a part of the electrolyte solution is decomposed during the initial charging. In this case, the cyclic acid anhydride is originally contained in a small amount in the electrolyte solution and is incorporated into the negative electrode SEI or the like. Therefore, it may be difficult to detect its composition after the initial charging in some cases.

For this reason, it may be possible to infer that the non-aqueous secondary battery using the acetonitrile electrolyte solution has a composition of the non-aqueous electrolyte solution according to this embodiment if it has the following characteristics after the initial charging.

According to the first embodiment, the aforementioned electrolyte solution is preferably applied to a non-aqueous secondary battery having a negative electrode to or from which lithium ions are inserted or detached at an electric potential lower than "0.4V vs. Li/Li$^+$". In the non-aqueous secondary battery using the non-aqueous electrolyte solution according to the first embodiment, since a reaction of the cyclic acid anhydride decomposed at 1.0 V to 0.4 V is promoted, it is works to strengthen the negative electrode SEI even when acetonitrile susceptible to reductive decomposition is contained.

In this case, the negative electrode preferably contains a material that absorbs lithium ions as a negative-electrode active material at an electric potential lower than "0.4V vs. Li/Li$^+$".

Meanwhile, there is no particular limitation in a positive electrode, a separator, and a battery casing.

For example, according to the first embodiment, determination may be performed on the basis of a capacity retention rate obtained by dividing a 5 C discharge capacity by a 1 C discharge capacity after a storage test for 4 hours at 85° C. Specifically, the capacity retention rate is preferably 70% or higher.

Second Embodiment: Non-Aqueous Electrolyte Solution

According to a second embodiment, the non-aqueous electrolyte solution of the first embodiment preferably contains PF$_6$ anions. The PF$_6$ anions may be obtained by dissociating LiPF$_6$ of lithium salt in the electrolyte solution.

In this manner, since PF$_6$ anions are contained, hydrogen is removed from an α-position of acetonitrile, and generation of HF is promoted, so that LiF as an element of the negative electrode SEI is effectively formed. In addition, a suitable amount of water more effectively promotes a reaction of forming the negative electrode SEI of the cyclic acid anhydride. Therefore, since PF$_6$ anions are contained, organic/inorganic complexation of the negative electrode SEI efficiently proceeds. The specific composition and application of the second embodiment are similar to, for example, those of the first embodiment.

Third Embodiment: Non-Aqueous Electrolyte Solution

According to a third embodiment, preferably, the non-aqueous electrolyte solution of the second embodiment contains PF$_6$ anions, and the PF$_6$ anions are obtained by dissociating LiPF$_6$ of the lithium salt in the electrolyte solution.

In this manner, since PF$_6$ anions are contained, hydrogen is removed from an α-position of acetonitrile, and generation of HF is promoted, so that LiF as an element of the negative electrode SEI is effectively formed. Therefore, since PF$_6$ anions are contained, organic/inorganic complexation of the negative electrode SEI efficiently proceeds. The specific composition and application of the third embodiment are similar to, for example, those of the first embodiment.

Fourth Embodiment: Non-Aqueous Electrolyte Solution

According to a fourth embodiment, in any one of the non-aqueous electrolyte solutions of the first to third embodiments, the cyclic acid anhydride preferably contains at least one selected from a group consisting of succinic anhydride, maleic anhydride, and phthalic anhydride.

Only one of these cyclic acid anhydrides or a plurality of cyclic acid anhydrides may be contained. Alternatively, any cyclic acid anhydride other than the aforementioned cyclic acid anhydrides may also be contained.

The content of the cyclic acid anhydride preferably is 0.01 mass % or more and 1 mass % or less with respect to the non-aqueous electrolyte solution. In addition, the content of the cyclic acid anhydride is preferably 0.1 mass % or more and 0.5 mass % or less with respect to the non-aqueous electrolyte solution.

Using the non-aqueous electrolyte solution containing at least one selected from a group consisting of succinic anhydride, maleic anhydride, and phthalic anhydride, it is possible to form the robust SEI in the negative electrode and effectively suppress an increase of resistance during high-temperature heating. In particular, it is preferable that at least succinic anhydride is contained. As a result, it is possible to more effectively form the robust SEI in the negative electrode.

Fifth Embodiment: Non-Aqueous Electrolyte Solution

According to a fifth embodiment, in any one of the non-aqueous electrolyte solutions of the first to fourth embodiments, the content of the cyclic acid anhydride is 0.01 mass % or more and 1 mass % or less with respect to the non-aqueous electrolyte solution.

The content of the cyclic acid anhydride is calculated on a mass percentage basis relative to a total mass of all components contained in the non-aqueous electrolyte solution. More preferably, the content of the cyclic acid anhydride is 0.1 mass % or more and 0.7 mass % or less with respect to the non-aqueous electrolyte solution.

As a result, it is possible to more effectively promote reinforcement of the negative electrode SEI.

The specific composition and application of the fifth embodiment are similar to, for example, those of the first embodiment.

<Non-Aqueous Solvent>

Here, the non-aqueous solvent will be described. The "non-aqueous solvent" as used in this embodiment refers to an element of the electrolyte solution other than the lithium salt and the additive.

According to this embodiment, while acetonitrile is contained as an essential component, any non-aqueous solvent other than the acetonitrile may also be contained. The non-aqueous solvent other than the acetonitrile may include, for example, alcohols such as methanol or ethanol, an aprotic solvent, or the like. Among them, the aprotic polar solvent is preferable.

Specifically, among the non-aqueous solvents, the aprotic solvent may include, for example, cyclic carbonate such as ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, vinylene carbonate, 4,5-dimethyl vinylene carbonate, and vinyl ethylene carbonate; fluoroethylene carbonate such as 4-fluoro-1,3-dioxolan-2-one, 4,4-difluoro-1,3-dioxolan-2-one, cis-4,5-difluoro-1,3-dioxolan-2-one, trans-4,5-difluoro-1,3-dioxolan-2-one, 4,4,5-trifluoro-1,3-dioxolan-2-one, 4,4,5,5-tetrafluoro-1,3-dioxolan-2-one, and 4,4,5-trifluoro-5-methyl-1,3-dioxolan-2-one; lactone such as γ-butyrolactone, γ-valerolactone, γ-caprolactone, δ-valerolactone, δ-caprolactone, and ε-caprolactone; a sulfur compound such as ethylene sulfite, propylene sulfite, butylene sulfite, pentene sulfite, sulfolane, 3-sulfolane, 3-methyl sulfolane, 1,3-propane sultone, 1,4-butane sultone, 1-propene 1,3-sultone, dimethyl sulfoxide, tetramethylene sulfoxide, and ethyleneglycol sulfite; cyclic ethers such as tetrahydrofuran, 2-methyl tetrahydrofuran, 1,4-dioxane, and 1,3-dioxane; linear carbonates such as ethyl methyl carbonate, dimethyl carbonate, diethyl carbonate, methylpropyl carbonate, methyl isopropyl carbonate, dipropyl carbonate, methyl butyl carbonate, dibutyl carbonate, ethyl propylene carbonate, and methyl trifluoroethyl carbonate; linear fluorinated carbonate such as trifluorodimethyl carbonate, trifluorodiethyl carbonate, and trifluoroethyl methyl carbonate; mononitriles such as propionitrile, butyronitrile, valeronitrile, benzonitrile, and acrylonitrile; alkoxy-substituted nitrile such as methoxyacetonitrile and 3-methoxypropionitrile; dinitrile such as malononitrile, succinonitrile, glutaronitrile, adiponitrile, 1,4-dicyanoheptane, 1,5-dicyanopentane, 1,6-dicyanohexane, 1,7-dicyanoheptane, 2,6-dicyanoheptane, 1,8-dicyanooctane, 2,7-dicyanooctane, 1,9-dicyanononane, 2,8-dicyanononane, 1,10-dicyanodecane, 1,6-dicyanodecane, and 2,4-dimethylglutaronitrile; cyclic nitrile such as benzonitrile; linear ester such as methyl propionate; linear ether such as dimethoxyethane, diethyl ether, 1,3-dioxolane, diglyme, triglyme, and tetraglyme; fluorinated ether such as $Rf^4$—$OR^5$ (where "$Rf^4$" is a fluorine atom-containing alkyl group and "$R^5$" is an organic group that may contain a fluorine atom); ketone such as acetone, methyl ethyl ketone, and methyl isobutyl ketone; halide such as fluoride thereof, or the like. These materials are used solely or in combination of two or more materials.

Among these and other non-aqueous solvents, at least one selected from a group consisting of cyclic carbonate and linear carbonate is preferably employed. Here, although the cyclic carbonate and the linear carbonate have been exemplified in the aforementioned description, only one of them may be employed, or two or more of them may be employed (for example, two or more of the cyclic carbonates described above, two or more of the linear carbonates described above, or a combination of two or more carbonates selected from one or more cyclic carbonates described above and one or more linear carbonates described above). Among them, the cyclic carbonate more preferably includes ethylene carbonate, propylene carbonate, vinylene carbonate, or fluoroethylene carbonate, and the linear carbonate more preferably includes ethyl methyl carbonate, dimethyl carbonate, or diethyl carbonate.

The acetonitrile is electrochemically susceptible to reductive decomposition. For this reason, it is preferable to perform at least one of a process of mixing the acetonitrile with another solvent or a process of adding an electrode protection additive for forming a protection film on the electrode.

In order to improve an ionization degree of the lithium salt contributing to charging/discharging of the non-aqueous secondary battery, the non-aqueous solvent preferably contains one or more cyclic aprotic polar solvents and more preferably contains one or more cyclic carbonates.

Preferable examples of the non-aqueous solvent will now be described in details.

Sixth Embodiment: Non-Aqueous Electrolyte Solution

According to the sixth embodiment, it is preferable that the non-aqueous electrolyte solution of any one of the first to fifth embodiments further includes the linear carbonates described above.

The combined use of acetonitrile and linear carbonate advantageously acts to suppress association between acetonitrile and $LiPF_6$.

According to the sixth embodiment, the non-aqueous electrolyte solution contains, for example, acetonitrile (AcN), diethyl carbonate (DEC), lithium salt, or succinic anhydride (SAH).

In this case, the negative electrode contains a material that absorbs lithium ions as the negative-electrode active material at an electric potential lower than "0.4 V vs. $Li/L^+$".

Meanwhile, there is no particular limitation in the positive electrode, the separator, and the battery casing.

Using the configuration described above, a remarkable effect appears on the high-temperature durability of the non-aqueous secondary battery, so that it is possible to obtain a long service life even under a high-temperature environment.

Seventh Embodiment: Non-Aqueous Electrolyte Solution

According to the seventh embodiment, the linear carbonate of the non-aqueous electrolyte solution of the sixth embodiment includes, for example, at least one selected from a group consisting of diethyl carbonate, ethyl methyl carbonate, and dimethyl carbonate.

A specific composition according to the seventh embodiment is a non-aqueous electrolyte solution containing $LiPF_6$, acetonitrile (AcN), and diethyl carbonate (DEC). In addition, the lithium salt may include $LiPF_6$, $LiN(SO_2F)_2$ (LiFSI), $LiN(SO_2CF_3)_2$(LiTFSI), or $LiB(C_2O_4)_2$(LiBOB). In addition, the cyclic acid anhydride preferably includes succinic anhydride (SAH), maleic anhydride (MAH), or phthalic anhydride (PAH).

The non-aqueous secondary battery using the non-aqueous electrolyte solution according to the seventh embodiment may be used for a cold region.

Eighth Embodiment: Non-Aqueous Electrolyte Solution

According to the eighth embodiment, in the non-aqueous electrolyte solution of the sixth or seventh embodiment, the molar mixing ratio of the linear carbonate relative to acetonitrile is preferably set to 0.15 or higher and 2 or lower.

The combined use of the acetonitrile and the linear carbonate advantageously acts to suppress association between acetonitrile and $LiPF_6$. However, the linear carbonate has low polarity. In this regard, the molar mixing ratio of the linear carbonate relative to acetonitrile is adjusted in order to appropriately suppress a decrease of ionic conductivity in a low temperature range even when the linear carbonate is contained.

That is, according to the eighth embodiment, the molar mixing ratio of the linear carbonate relative to the acetonitrile that affects solubility is adjusted to a particular range. The molar mixing ratio of the linear carbonate relative to acetonitrile is expressed as "C/A", where "A" denotes the number of moles of the acetonitrile and "C" denote the number of moles of the linear carbonate.

That is, according to the eighth embodiment, the molar mixing ratio (C/A) of the linear carbonate relative to acetonitrile is adjusted to 0.15 or higher and 2 or lower.

According to this embodiment, it is preferable that the following conditions are satisfied: (1) the non-aqueous electrolyte solution contains $LiPF_6$ and a non-aqueous solvent, and the non-aqueous solvent contains acetonitrile and linear carbonate; (2) the content of $LiPF_6$ is 1.5 mol or less with respect to a non-aqueous solvent of 1 L; (3) the molar mixing ratio of $LiPF_6$ relative to acetonitrile is 0.08 or higher and 0.16 or lower; and (4) the molar mixing ratio of the linear carbonate relative to acetonitrile is set to 0.15 or higher and 2 or lower.

As a result, it is possible to more effectively address a tradeoff problem between prevention of association of $LiPF_6$ and suppression of a decrease of the ionic conductivity.

The specific composition and application of the eighth embodiment are similar to, for example, those of the seventh embodiment.

Ninth Embodiment: Non-Aqueous Electrolyte Solution

According to the ninth embodiment, in the non-aqueous electrolyte solution of the sixth or seventh embodiment, the molar mixing ratio of linear carbonate relative to acetonitrile is set to 0.25 or higher and 2 or lower.

According to the ninth embodiment, a limitation is further added to the eighth embodiment. As a result, even when the linear carbonate is contained, it is possible to more effectively and appropriately suppress a decrease of the ionic conductivity in a low temperature range.

Tenth Embodiment: Non-Aqueous Electrolyte Solution

According to the tenth embodiment, in the non-aqueous electrolyte solution of the sixth or seventh embodiment, the molar mixing ratio of linear carbonate relative to acetonitrile is preferably 0.4 or higher and 2 or lower.

According to the tenth embodiment, a limitation is further added to the ninth embodiment. As a result, even when the linear carbonate is contained, it is possible to more effectively and appropriately suppress a decrease of the ionic conductivity in a low-temperature range. Specifically, it is possible to obtain an ionic conductivity of 3 mS/cm or higher at a temperature of −30° C. without observing precipitation of white sediments as aggregate. According to this embodiment, preferably, it is possible to obtain an ionic conductivity of 3.5 mS/Cm or higher at a temperature of −30° C. without inhibiting ion conduction caused by the aggregate. More preferably, it is possible to obtain an ionic conductivity of 4 mS/Cm or higher without inhibiting ion conduction caused by the aggregate. Further preferably, it is possible to obtain an ionic conductivity of 4.5 mS/Cm or higher without forming ion conduction caused by the aggregate.

Eleventh Embodiment: Non-Aqueous Electrolyte Solution

According to the eleventh embodiment, any one of the non-aqueous electrolyte solutions of the first to tenth embodiments preferably contains water. By adding a small amount of water, it is possible to promote a reaction of forming the negative electrode SEI of the cyclic acid anhydride and delay generation of gas in the event of overcharge, compared to the prior art.

As described above, the cyclic acid anhydride contributes to formation of the negative electrode solid electrolyte interface (SEI). In addition, using the water, it is possible to promote a reaction of forming the negative electrode SEI of the cyclic acid anhydride and delay generation of blister gas in the event of overcharge.

The non-aqueous secondary battery using the non-aqueous electrolyte solution according to the eleventh embodiment may have a positive electrode having a positive-electrode active material layer formed on one surface or both surfaces of a current collector, a negative electrode having a negative-electrode active material layer formed on one surface or both surfaces of the current collector, and a non-aqueous electrolyte solution, and a time to reach a temperature of 60° C. in a 2 C overcharge test may be set to 20 minutes or longer.

The non-aqueous secondary battery using the non-aqueous electrolyte solution according to the eleventh embodiment is preferably applied to a pouch type cell, but not limited thereto. Note that the non-aqueous secondary battery according to this embodiment is also called a "laminate type". That is, using the non-aqueous secondary battery according to this embodiment, it is possible to prevent swelling in the event of overcharge and improve safety in the pouch type battery, compared to the prior art.

The non-aqueous secondary battery using the non-aqueous electrolyte solution according to the eleventh embodiment is preferably applicable to a pouch type cell battery in a smart phone or a mobile IT device that is fully charged.

In the aforementioned configuration, it is possible to suppress swelling of the non-aqueous secondary battery in the event of overcharge and obtain excellent safety.

Twelfth Embodiment: Non-Aqueous Electrolyte Solution

According to the twelfth embodiment, the water content of the non-aqueous electrolyte solution of the eleventh embodiment is preferably 1 ppm or more and 200 ppm or less with respect to the non-aqueous electrolyte solution.

A technical change at the time of development of the eleventh and twelfth embodiments will be described. In the acetonitrile-based electrolyte solution, the battery swells in the event of overcharge faster than the carbonate electrolyte solution of the prior art. This is caused by a fact that gas is easily generated in the acetonitrile electrolyte solution in the event of overcharge. In this regard, the inventors developed a non-aqueous electrolyte solution and a non-aqueous secondary battery using the same, capable of delaying generation of gas in the event of overcharge, compared to the prior art, by appropriately selecting an additive added to the acetonitrile electrolyte solution and further appropriately adjusting the content of the additive.

That is, the non-aqueous electrolyte solution according to this embodiment contains acetonitrile, lithium salt, water of 1 ppm or more and 200 ppm or less, and cyclic acid anhydride.

In this manner, according to this embodiment, the non-aqueous electrolyte solution contains water of 1 ppm or more and 200 ppm or less and cyclic acid anhydride in addition to acetonitrile and lithium salt. The amount of water is preferably set to 1 ppm or more and 150 ppm or less, and preferably, 10 ppm or more and 100 ppm or less.

The cyclic acid anhydride contributes to formation of negative electrode SEI. According to this embodiment, by adding a small amount of water, it is possible to promote a reaction of forming the negative electrode SEI of the cyclic acid anhydride and delay generation of gas in the event of overcharge, compared to the prior art. Note that water is preferably consumed through the SEI formation reaction. If the amount of the added water is excessive, water remains in the electrolyte solution even after the SEI formation reaction. This may generate electrolysis in a normal use stage other than the overcharge.

The non-aqueous electrolyte solution according to this embodiment was evaluated on the basis of an arrival time to a temperature of 60° C. in a 2 C overcharge test. Since water of 1 ppm or more and 200 ppm or less and cyclic acid anhydride are contained according to this embodiment, it is possible to delay an arrival time to a temperature of 60° C., compared to a non-aqueous electrolyte solution not having at least one of water and cyclic acid anhydride, and suppress generation of gas, compared to the comparative examples.

According to this embodiment, the arrival time to a temperature of 60° C. in the 2 C overcharge test may be set to 20 minutes or longer, and preferably, 22 minutes or longer, but not particularly limited thereto.

A specific composition of the non-aqueous electrolyte solution according to the twelfth embodiment may include, for example, acetonitrile (AcN), lithium salt, water of 1 to 200 ppm, and succinic anhydride (SAH) as the cyclic acid anhydride.

Thirteenth Embodiment: Non-Aqueous Electrolyte Solution

According to the thirteenth embodiment, the non-aqueous electrolyte solution of any one of the first to twelfth embodiments preferably contains imide salt.

A technical change at the time of development of the thirteenth embodiment will be described. In the existing electrolyte solution, imide salt such as lithium bis (fluorosulfonyl) imide (LiFSI) is employed in order to improve the ionic conductivity and the cycle characteristics of the battery, or the like. Here, the imide salt is lithium salt expressed as "$LiN(SO_2C_mF_{2m+1})_2$", where "m" denotes an integer of 0 to 8. However, in the non-aqueous electrolyte solution containing imide salt, corrosion proceeds so as to form a soluble complex with aluminum used as a positive electrode current collector of the lithium ion battery through charging/discharging, so that elution is generated in the electrolyte solution disadvantageously. In this regard, the inventors achieved the present invention to provide an electrolyte solution capable of suppressing aluminum elution through charging/discharging even when imide salt is contained.

According to the thirteenth embodiment, the non-aqueous electrolyte solution contains acetonitrile, lithium salt, and cyclic acid anhydride, and the lithium salt includes imide salt.

Here, according to the thirteenth embodiment, the non-aqueous electrolyte solution preferably contains the $PF_6$ anions of the second embodiment. The $PF_6$ anions react with water to produce hydrogen fluoride (hereinafter, referred to as "HF") and $PF_5$. The fluorine ion derived from HF reacts with aluminum as the positive electrode current collector to generate a passive film on a surface. As a result, it is possible to suppress corrosion of the positive electrode containing aluminum and elution of aluminum in the electrolyte solution.

If the acetonitrile is heated in presence of $PF_5$, hydrogen is released from the α-position so as to promote generation of HF from the $PF_6$ anion. As a result, even under a high-temperature environment where corrosion of aluminum proceeds, restoration of the passive film is promoted, so that it is possible to further suppress elution of aluminum. That is, it is possible to suppress elution of aluminum even in charging/discharging.

According to the thirteenth embodiment, the non-aqueous electrolyte solution preferably contains water of 1 ppm or more and 200 ppm or less, and more preferably, 1 ppm or more and 30 ppm or less. This is because an appropriate amount of water contributes to passivation of aluminum in the non-aqueous electrolyte solution.

A specific composition of the non-aqueous electrolyte solution according to the thirteenth embodiment includes acetonitrile (AcN) as a non-aqueous solvent, imide salt such as $LiPF_6$, $LiN(SO_2F)_2$ (LiFSI), or $LiN(SO_2CF_3)_2$ (LiTFSI) as lithium salt, and water. In addition, the non-aqueous electrolyte solution may contain maleic anhydride, succinic anhydride, or phthalic anhydride as the cyclic acid anhydride.

In this case, there is no particular limitation in the negative electrode. Meanwhile, the positive-electrode active material preferably includes a lithium-containing compound having layered rock salt type crystals, but not limited thereto. In addition, there is no particular limitation to the separator and the battery casing.

Fourteenth Embodiment: Non-Aqueous Electrolyte Solution

According to the fourteenth embodiment, the imide salt of the non-aqueous electrolyte solution of the thirteenth embodiment preferably includes at least one selected from a group consisting of $LiN(SO_2F)_2$ and $LiN(SO_2CF_3)_2$. Any one of these imide salts or both of them may be included. Alternatively, any imide salt other than such imide salts may also be included.

According to the fourteenth embodiment, similar to the thirteenth embodiment, since hydrogen is released from the α-position of acetonitrile, generation of HF from the $PF_6$ anions is promoted. Therefore, it is possible to promote passivation of aluminum even when the imide salt is used.

Note that, according to the fourteenth embodiment, $LiPO_2F_2$, cyclic acid anhydride, and imide salt are preferably added to the $LiPF_6$-based acetonitrile electrolyte solution. As a result, it is possible to suppress an increase of resistance during high-temperature heating and obtain low-temperature characteristics.

According to the fourteenth embodiment, it is preferable that the imide salt is added to the $LiPF_6$-based acetonitrile electrolyte solution such that the molarity is set to "$LiPO_2F_2$ of 0.01 to 1 mass %, cyclic acid anhydride of 0.01 to 1 mass %, and $LiPF_6 \leq$ imide salt". As a result, the $LiPO_2F_2$ and the cyclic acid anhydride reinforce the negative electrode SEI and suppress an increase of resistance during high-temperature heating. In addition, excellent low-temperature characteristics are exhibited due to the imide salt.

According to the fourteenth embodiment, it is preferable that $LiPO_2F_2$ of 0.1 to 0.5 mass % with respect to the acetonitrile electrolyte solution is added, and cyclic acid anhydride of 0.01 to 0.5 mass % with respect to the electrolyte solution is added. In addition, the content of the imide salt (particularly, LiFSI) is set to 0.5 to 3 mol with respect to the non-aqueous solvent of 1 L. As a result, $LiPO_2F_2$ and the cyclic acid anhydride reinforce the negative electrode SEI, so that it is possible to suppress an increase of resistance during high-temperature heating.

Fifteenth Embodiment: Non-Aqueous Electrolyte Solution

According to the fifteenth embodiment, the non-aqueous electrolyte solution of any one of the first to fourteenth embodiments preferably further contains cyclic carbonate without saturated secondary carbon.

A technical change at the time of development of the fifteenth embodiment will be described. For example, if the battery using the existing acetonitrile electrolyte solution is used or placed at a temperature of 50° C. to 60° C. (50° C. or higher and 60° C. or lower), the battery performance is significantly degraded, so that an operation limitation may be reached in some cases. This is because, if acetonitrile is heated in presence of $PF_5$, hydrogen is released from the α-position, and generation of HF is promoted, so that the battery performance is abruptly degraded. In this regard, the inventors developed the present invention in order to reduce the amount of HF generated at a temperature of 50° C. to 60° C. That is, according to the fifteenth embodiment, the non-aqueous electrolyte solution does not contain a non-aqueous solvent having saturated secondary carbon.

The inventors have found that, if the non-aqueous solvent contains saturated secondary carbon, protons are easily released, and this tends to promote generation of HF at a temperature of 50° C. to 60° C. That is, since the non-aqueous electrolyte solution according to this embodiment does not contain the non-aqueous solvent having saturated secondary carbon, it is possible to reduce the amount of HF generated at a temperature of 50° C. to 60° C.

Here, the "saturated secondary carbon" refers to a case where the number of adjacent carbon atoms bonded to a carbon atom is two. In addition, "saturation" means that there is no double or triple bond.

Specific examples of the non-aqueous solvent having the saturated secondary carbon include, for example, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, γ-valerolactone, γ-carprolacone, δ-carprolacone, 2-methyl tetrahydrofuran, and methyl isopropyl carbonate, but not limited thereto.

It was found that generation of HF is suppressed at a temperature of 50° C. to 60° C. by using the carbonate solvent without saturated secondary carbon as a non-aqueous solvent.

It was found that promote of generation of HF at a temperature of 50° C. to 60° C. caused by acetonitrile is further suppressed by adding the cyclic carbonate without saturated secondary carbon at a volume ratio higher than that of acetonitrile.

According to another mode of the fifteenth embodiment, the non-aqueous electrolyte solution contains a non-aqueous solvent containing acetonitrile and $LiPF_6$, and an increase rate of the generation amount of the hydraulic fluid at 60° C. relative to the generation amount of hydraulic fluid at 25° C. is equal to or lower than 165% In this manner, since it is possible to reduce an increase rate of the generation amount of hydraulic fluid at 60° C. relative to the generation amount of hydraulic fluid at 25° C., it is possible to obtain a non-aqueous secondary battery suitable for outdoor applications in summer or a tropical area (described below) without significantly degrading battery performance even when the battery is used or placed outdoor in summer or in the tropical area.

According to the fifteenth embodiment, it is preferable that the $LiPF_6$-based acetonitrile electrolyte solution is diluted with a non-aqueous solvent without saturated tertiary carbon. Since protons are easily released from the carbonate having saturated secondary carbon (for example, propylene carbonate), generation of HF tends to be promoted at a temperature of 50 to 60° C. However, if the acetonitrile electrolyte solution is diluted with a non-aqueous solvent without saturated tertiary carbon, it is possible to effectively suppress generation of HF.

A more specific composition according to the fifteenth embodiment is a non-aqueous electrolyte solution containing lithium hexafluorophosphate ($LiPF_6$), acetonitrile (AcN), ethylene carbonate (EC) and/or vinylene carbonate (VC), and diethyl carbonate (DEC). In addition, the non-aqueous electrolyte solution may contain lithium salt such as $LiN(SO_2F)_2$(LiFSI), $LiN(SO_2CF_3)_2$(LiTFSI), and LiB$(C_2O_4)_2$(LiBOB).

In this case, there is no particular limitation in the negative electrode. Meanwhile, the positive-electrode active material preferably includes a lithium-containing compound having layered rock salt type crystals, but not limited thereto.

There is no particular limitation in the separator and the battery casing.

As described above, using the non-aqueous electrolyte solution according to the fifteenth embodiment, it is possible to suppress generation of HF at a temperature of 50° C. to 60° C.

The non-aqueous secondary battery using the non-aqueous electrolyte solution according to the fifteenth embodiment is applicable to general-purpose products, automobiles, and the like. However, in any case, the non-aqueous secondary battery according to the fifteenth embodiment is also suitably used for outdoor applications in summer or so-called tropical areas such as the tropical zone or the dry zone. For example, according to this embodiment, the configuration of the prior art may be applicable to the battery casing. That is, even when the battery casing has a configuration similar to that of the prior art, it is possible to obtain a non-aqueous secondary battery suitable for outdoor applications in summer or tropical areas. Therefore, it is possible to appropriately suppress an increase of the manufacturing cost without complicating a manufacturing process.

Sixteenth Embodiment: Non-Aqueous Electrolyte Solution

According to the sixteenth embodiment, the cyclic carbonate without saturated secondary carbon in the non-aqueous electrolyte solution of the fifteenth embodiment may include, for example, ethylene carbonate, vinylene carbonate, 4,5-dimethyl vinylene carbonate, and fluoroethylene carbonate.

Among them, the cyclic carbonate without saturated secondary carbon is at least one selected from a group consisting of ethylene carbonate and vinylene carbonate.

The specific composition and application of the sixteenth embodiment are similar to those of the fifteenth embodiment.

Seventeenth Embodiment: Non-Aqueous Electrolyte Solution

According to the seventeenth embodiment, the non-aqueous electrolyte solution of the sixteenth embodiment contains vinylene carbonate as the cyclic carbonate without saturated secondary carbon, and the amount of vinylene carbonate contained in the non-aqueous electrolyte solution is 0.5 volume % or more and 4 volume % or less.

The additive is indispensable in order to suppress a reductive decomposition reaction of acetonitrile on the surface of the negative electrode. If the additive is insufficient, battery performance is abruptly degraded. Meanwhile, if the film is excessively formed, this degrades low-temperature performance.

In this regard, according to the seventeenth embodiment, by adjusting a dosage of vinylene carbonate as an additive to the aforementioned range, it is possible to suppress an interface (film) resistance to be low and suppress cycle degradation at a low temperature.

According to the seventeenth embodiment, the amount of vinylene carbonate is preferably less than 3 volume/%. As a result, it is possible to more effectively improve the low temperature durability and provide a secondary battery having excellent low-temperature performance.

A more specific composition according to the seventeenth embodiment includes acetonitrile, imide salt such as $LiPF_6$, $LiN(SO_2F)_2$(LiFSI), or $LiN(SO_2CF_3)_2$(LiTFSI), vinylene carbonate, and succinic anhydride (SAH). The vinylene carbonate is contained in the non-aqueous electrolyte solution by 0.1 volume % or more and 4 volume % or less, more preferably, 0.2 volume % or more and less than 3 volume %, and further more preferably, 0.5 volume % or more and less than 2.5 volume/%. The non-aqueous electrolyte solution contains succinic anhydride less than 1 mass/%.

Eighteenth Embodiment: Non-Aqueous Electrolyte Solution

According to the eighteenth embodiment, the non-aqueous electrolyte solution according to any one of the fifteenth to seventeenth embodiments preferably contains an organic chlorine compound which is a chloride adduct of the cyclic carbonate.

Here, according to this embodiment, the cyclic carbonate preferably includes vinylene carbonate (VC), but not limited thereto. In the following embodiments, the chloride adducts of vinylene carbonate will be described in details.

According to the eighteenth embodiment, an organic chlorine compound (chloride derived from a VC material) and cyclic acid anhydride are added to the acetonitrile electrolyte solution. As a result, it is possible to reinforce the negative electrode SEI.

According to the eighteenth embodiment, it is preferable that an organic chlorine compound of 0.1 to 500 ppm with respect to the acetonitrile electrolyte solution is added, and cyclic acid anhydride of 0.01 to 1 mass % with respect to the electrolyte solution is added. By reinforcing the negative electrode SEI, it is possible to improve high-temperature durability of the battery using the acetonitrile electrolyte solution.

According to the eighteenth embodiment, it is preferable that an organic chlorine compound of 0.5 to 10 ppm with respect to the acetonitrile electrolyte solution is added, and cyclic acid anhydride of 0.01 to 0.5 mass % with respect to the electrolyte solution is added. The organic chlorine compound decomposed at a low electric potential promotes a negative electrode SEI formation reaction of the cyclic acid anhydride so as to reinforce the SEI. As a result, it is possible to improve the high-temperature durability of the battery using the acetonitrile electrolyte solution.

According to this embodiment, the organic chlorine compound preferably includes at least one selected from a group consisting of compounds expressed in the following formulas (4) to (7).

[Chemical Formula 2]

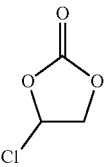

(4)

[Chemical Formula 3]

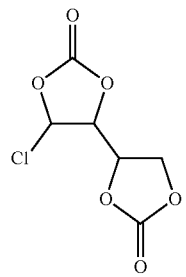

(5)

[Chemical Formula 4]

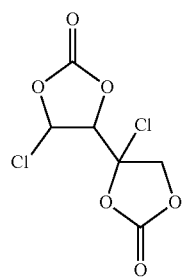

(6)

[Chemical Formula 5]

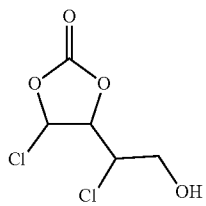

(7)

The organic chlorine compounds expressed in Formulas (4) to (7) may be used alone, or two or more different types of organic chlorine compounds may be used in combination.

Using the chloride adduct derived from vinylene carbonate belonging to a group that is easily reduced among the non-aqueous solvents, the SEI formation reaction reliably proceeds before reductive decomposition of acetonitrile. Therefore, it is possible to further promote reinforcement of the negative electrode SEI and more effectively improve the high-temperature durability of the non-aqueous secondary battery.

Among these and other non-aqueous solvents, it is preferable to use at least one selected from a group consisting of cyclic carbonates and linear carbonates. Here, as the cyclic carbonate and the linear carbonate, only one of those described above may be selected, or two or more of them may be employed in combination (for example, two or more cyclic carbonates described above, two or more linear carbonates described above, or a combination of two or more carbonates selected from one or more cyclic carbonates described above and one or more linear carbonates described above). Among them, the cyclic carbonate more preferably includes ethylene carbonate, propylene carbonate, vinylene carbonate, or fluoroethylene carbonate, and the linear carbonate more preferably includes ethyl methyl carbonate, dimethyl carbonate, or diethyl carbonate.

It is assumed that the eighteenth embodiment is applied to a non-aqueous electrolyte solution containing acetonitrile, lithium salt, an organic chlorine compound, and cyclic acid anhydride.

In this manner, according to the eighteenth embodiment, the non-aqueous electrolyte solution preferably contains acetonitrile, lithium salt, an organic chlorine compound, and cyclic acid anhydride. The organic chlorine compound is, for example, chlorine compound derived from a vinylene carbonate (VC) material. Since the organic chlorine compound and the cyclic acid anhydride are contained, it is possible to reinforce the negative electrode SEI. The organic chlorine compound has lowest unoccupied orbital (LUMO) energy which decreases due to electron withdrawing effect of chlorine. Since electrons enter the LUMO in a reduction reaction, the LUMO energy has a relationship with reducibility of the additive. As the LUMO energy decreases, the reduction electric potential increases. That is, this means that reduction is easily generated. This means that the organic chlorine compound according to this embodiment is a compound more sufficiently easily reducible than acetonitrile, and the electrochemical reaction proceeds earlier than the reductive decomposition of acetonitrile. However, in a case where the organic chlorine compound is used alone, it does not contribute as an effective SEI. In comparison, using the organic chlorine compound and the cyclic acid anhydride at the same time is effective in forming the negative electrode SEI, and a non-electrochemical side reaction caused by excessively high reducibility is suppressed by the synergistic effect. Therefore, it is possible to suppress an increase of internal resistance when the charging/discharging cycle is repeated. In this manner, since the negative electrode SEI can be reinforced, it is possible to improve the high-temperature durability using the non-aqueous secondary battery based on the non-aqueous electrolyte solution according to this embodiment.

According to this embodiment, the high-temperature durability was evaluated on the basis of a capacity retention rate in a cycle test (100 cycles) at a temperature of 50° C. In this case, as the capacity retention rate increases, an increase of internal resistance caused by repeating the charging/discharging cycle is suppressed. Therefore, it can be concluded that the negative electrode SEI is reinforced, and the high-temperature durability is improved.

According to the eighteenth embodiment, the organic chlorine compound described above is preferably a chloride adduct of cyclic carbonate.

The content of the organic chlorine compound is preferably 0.1 ppm or more and 500 ppm or less with respect to the non-aqueous electrolyte solution. The content of the organic chlorine compound is calculated as a mass ppm with respect to a total weight of all components of the non-aqueous electrolyte solution. The content of the organic chlorine compound is preferably 0.1 ppm or more and 300 ppm or less with respect to the non-aqueous electrolyte solution.

According to the eighteenth embodiment, the content of the cyclic acid anhydride is preferably 0.01 mass % or more and 1 mass % or less with respect to the non-aqueous electrolyte solution. The content of the cyclic acid anhydride is calculated as a mass percentage with respect to a total weight of all components of the non-aqueous electrolyte solution. The content of the cyclic acid anhydride is preferably 0.05 mass % or more and 1 mass % or less with respect to the non-aqueous electrolyte solution.

As a result, it is possible to further promote reinforcement of the negative electrode SEI and more effectively improve the high-temperature durability of the non-aqueous secondary battery using the acetonitrile electrolyte solution.

According to this embodiment, the content of the organic chlorine compound is more preferably 0.5 ppm or more and 10 ppm or less with respect to the non-aqueous electrolyte solution. In addition, the content of the cyclic acid anhydride is more preferably 0.1 mass % or more and 0.5 mass % or less with respect to the non-aqueous electrolyte solution. In addition, the content of the cyclic acid anhydride is furthermore preferably 0.1 mass % or more and 0.3 mass % or less with respect to the non-aqueous electrolyte solution. By defining the contents in this manner, the organic chlorine compound decomposed at a low electric potential can promote the negative electrode SEI formation reaction of the cyclic acid anhydride and can further reinforce the negative electrode SEI. As a result, it is possible to more reliably improve the high-temperature durability of the non-aqueous secondary battery using acetonitrile electrolyte solution.

According to this embodiment, the capacity retention rate obtained by performing the cycle test one hundred times at a temperature of 50° C. can be 60% or higher, preferably 70% or higher, and more preferably 80% or higher, but not limited thereto.

In the method of cycle test at a temperature of 50° C., the charging/discharging was performed by one hundred cycles, and the capacity retention rate was obtained on the basis of a discharge capacity of the hundredth cycle by assuming that the discharge capacity of the first cycle is set to 100%, as will be described below.

Nineteenth Embodiment: Non-Aqueous Electrolyte Solution

According to the nineteenth embodiment, the non-aqueous electrolyte solution according to any one of the thirteenth and fourteenth embodiments has an ionic conductivity of 3 mS/cm or higher at a temperature of −30° C.

A technical change at the time of development of the nineteenth embodiment will be described. For example, in the battery using the existing electrolyte solution, an operation limitation is reached at a temperature of approximately −20° C. This is because, using the existing electrolyte solution, the ionic conductivity at a temperature of −20° C. is excessively lowered, and it is difficult to obtain an output power necessary for the operation. In this regard, the inventors developed the present invention in order to obtain at least an ionic conductivity corresponding to that of the existing electrolyte solution at a temperature of −20° C. even at a temperature lower than −20° C. (specifically, −30° C.).

The non-aqueous electrolyte solution according to the nineteenth embodiment preferably contains a non-aqueous solvent and $LiPF_6$ (lithium salt). In addition, the non-aqueous electrolyte solution according to the nineteenth embodiment is characterized in that the ionic conductivity at a temperature of −30° C. is equal to or higher than 3 mS/cm.

The existing electrolyte solution containing cyclic carbonate, linear carbonate, and $LiPF_6$ has an ionic conductivity of approximately 2.7 mS/cm at a temperature of −20° C. Therefore, the non-aqueous electrolyte solution according to the nineteenth embodiment has a −30° C. ionic conductivity equal to or higher than the −20° C. ionic conductivity of the existing electrolyte solution. As a result, even when the non-aqueous secondary battery using the non-aqueous electrolyte solution according to the nineteenth embodiment is used at a low temperature of −30° C., it is possible to obtain output power equal to or higher than that of the battery using the existing electrolyte solution at a temperature of −20° C. Note that the temperature of −20° C. is a lower limitation of the operation range of the existing LIB. Therefore, it is possible to shift the operation limitation to the lower temperature range, compared to the prior art.

According to this embodiment, the ionic conductivity at a temperature of −30° C. is preferably 3.5 or higher. More preferably, the ionic conductivity at a temperature of −30° C. is 4.0 or higher. In addition, further preferably, the ionic conductivity at a temperature of −30° C. is 4.5 or higher. As a result, it is possible to shift the operation limitation to the lower temperature range, compared to the prior art. Therefore, it is possible to obtain more stable low-temperature characteristics.

According to the nineteenth embodiment, the non-aqueous electrolyte solution preferably contains acetonitrile as a non-aqueous solvent. That is, the non-aqueous solvent contains acetonitrile as an indispensable component, and may contain acetonitrile alone or any other type of non-aqueous solvents in addition to acetonitrile.

However, in the non-aqueous solvent containing acetonitrile and $LiPF_6$, there is a tradeoff relationship between prevention of association between acetonitrile and $LiPF_6$ and suppression of reduction of the ionic conductivity. That is, if prevention of association between acetonitrile and $LiPF_6$ is promoted, the ionic conductivity decreases. Meanwhile, if suppression of reduction of the ionic conductivity is promoted, an aggregate is easily formed.

In this regard, according to the nineteenth embodiment, a molar mixing ratio of $LiPF_6$ relative to acetonitrile is adjusted. The molar mixing ratio of $LiPF_6$ relative to acetonitrile is expressed as "B/A" where "A" denotes the number of moles of acetonitrile, and "B" denotes the number of moles of $LiPF_6$.

The molar mixing ratio of $LiPF_6$ relative to acetonitrile predominantly affects the amount of the aggregate. In the nineteenth embodiment, it is preferable that the content of $LiPF_6$ is 1.5 mol or less relative to the non-aqueous solvent of 1 L, and the molar mixing ratio of $LiPF_6$ relative to acetonitrile is 0.08 or higher and 0.16 or lower. As a result, it is possible to implement a high ionic conductivity.

The non-aqueous solvent preferably contains linear carbonate in addition to acetonitrile. That is, the non-aqueous electrolyte solution contains $LiPF_6$, and acetonitrile and linear carbonate as a non-aqueous solvent. Although there is no limitation in the type of the linear carbonate, for example, the linear carbonate may include diethyl carbonate, ethyl methyl carbonate, dimethyl carbonate, or the like.

A specific composition of the non-aqueous electrolyte solution according to the nineteenth embodiment includes at least one selected from a group consisting of lithium hexafluorophosphate ($LiPF_6$), acetonitrile (AcN), and diethyl carbonate (DEC), ethylene carbonate (EC), and vinylene carbonate (VC). In addition, the lithium salt may include $LiN(SO_2F)_2$(LiFSI), $LiN(SO_2CF_3)_2$(LiTFSI), or $LiB(C_2O_4)_2$(LiBOB).

According to the nineteenth embodiment, it is preferable that the non-aqueous electrolyte solution contains $LiPF_6$ and a non-aqueous solvent, the content of $LiPF_6$ is equal to or smaller than 1.5 mol relative to a non-aqueous solvent of 1 L, the non-aqueous solvent contains acetonitrile and linear carbonate, the molar mixing ratio of $LiPF_6$ relative to acetonitrile is 0.08 or higher and 0.4 or lower, and the molar mixing ratio of linear carbonate relative to acetonitrile is 0.3 or higher and 2 or lower. In such a composition range, it is possible to address a tradeoff problem between prevention of association between acetonitrile and $LiPF_6$ (by increasing linear carbonate) and suppression of reduction of the ionic conductivity in a low-temperature range (by increasing acetonitrile).

Using the non-aqueous electrolyte solution according to the nineteenth embodiment, it is possible to improve the ionic conductivity in a low temperature range, compared to the prior art. Specifically, the non-aqueous electrolyte solution according to the nineteenth embodiment has a −30° C. ionic conductivity equal to or higher than the −20° C. ionic conductivity of the existing electrolyte solution. According to the nineteenth embodiment, it is possible to reduce the amount of the aggregate of $PF_6$ anions coordinated with two or more $Li^+$ atoms appearing at a temperature of −10° C. or lower to be smaller than a particular amount.

The non-aqueous secondary battery using the non-aqueous electrolyte solution according to the nineteenth embodiment is applicable to general-purpose products, automobiles, or the like, suitable for a cold region. For example, according to this embodiment, a configuration of the prior art is applicable to the battery casing. That is, it is possible to obtain a non-aqueous secondary battery suitable for a cold region even when the battery casing has a configuration of the prior art. Therefore, it is possible to appropriately suppress an increase of the manufacturing cost without complicating a manufacturing process.

Twentieth Embodiment: Non-Aqueous Electrolyte Solution

According to the twentieth embodiment, the non-aqueous electrolyte solution according to any one of the first to eighteenth embodiments preferably has an ionic conductivity of 10 mS/cm or higher at a temperature of −10° C.

A technical change at the time of development of the twentieth embodiment will be described. In the electrolyte solution containing acetonitrile and cyclic carbonate used in the solvent, and $LiPF_6$ as lithium salt, association between acetonitrile and $LiPF_6$ is suppressed by cyclic carbonate, so that ion dissociation of $LiPF_6$ is maintained. As a result, this electrolyte solution exhibits a high ionic conductivity at the room temperature. However, since the cyclic carbonate has high viscosity, dispersion of Li ions is inhibited at a low temperature, so that the ionic conductivity is degraded disadvantageously. The inventors found that the ionic conductivity of the electrolyte solution abruptly decreases in the vicinity of a temperature of −10° C., and this generates a decrease of the output power of the battery based on the electrolyte solution. In this regard, the inventors developed the present invention in order to obtain the ionic conductivity corresponding to that of the room temperature even at a temperature of −10° C.

The existing electrolyte solution containing cyclic carbonate, linear carbonate, and $LiPF_6$ has an ionic conductivity of 8 mS/cm or higher and 9 mS/cm or lower at a temperature of 25° C. Therefore, the non-aqueous electrolyte solution according to this embodiment has a −10° C. ionic conductivity equal to or higher than a 25° C. ionic conductivity of the existing electrolyte solution. As a result, it is possible to obtain output power equal to or higher than that of the battery containing the existing electrolyte solution used at a temperature of 25° C. even when the non-aqueous secondary battery using the non-aqueous electrolyte solution according to this embodiment is used at a low temperature of −10° C. Therefore, it is possible to shift the operation limitation to the lower temperature range, compared to the prior art.

According to this embodiment, the −10° C. ionic conductivity is preferably 10.5 mS/cm or higher. The ionic conductivity at a temperature of −10° C. is preferably 11.0 mS/cm or higher. In addition, the ionic conductivity at a temperature of −10° C. is more preferably 11.5 mS/cm or higher. Furthermore, the ionic conductivity at a temperature of −10° C. is preferably 12.0 mS/cm or higher. As a result, it is possible to shift the operation limitation to the lower temperature range, compared to the prior art. Therefore, it is possible to obtain stable low-temperature characteristics.

According to this embodiment, the non-aqueous electrolyte solution preferably contains acetonitrile, but not particularly limited to the non-aqueous solvent. That is, the non-aqueous electrolyte solution may contain acetonitrile as an indispensable component of the non-aqueous solvent. The non-aqueous electrolyte solution may contain acetonitrile alone or a non-aqueous solvent other than acetonitrile.

Similar to the nineteenth embodiment, in the non-aqueous solvent containing acetonitrile and $LiPF_6$, there is a tradeoff relationship between prevention of association between acetonitrile and $LiPF_6$ and suppression of reduction of the ionic conductivity. That is, if prevention of association is promoted, the ionic conductivity decreases at a low temperature. Meanwhile, if suppression of reduction of the ionic conductivity at a low temperature is promoted, an aggregate may be easily formed.

In this regard, similarly, the molar mixing ratio of $LiPF_6$ relative to acetonitrile is adjusted according to the twentieth embodiment. The molar mixing ratio of $LiPF_6$ relative to acetonitrile is expressed as "B/A" where "A" denotes the number of moles of acetonitrile, and "B" denotes the number of moles of $LiPF_6$.

The molar mixing ratio of $LiPF_6$ relative to acetonitrile predominantly affects the amount of the aggregate. According to the twentieth embodiment, it is preferable that the content of $LiPF_6$ is equal to or smaller than 1.5 mol relative to the non-aqueous solvent of 1 L, and the molar mixing ratio of $LiPF_6$ relative to acetonitrile is 0.01 or higher and lower than 0.08. As a result, it is possible to effectively suppress formation of the aggregate.

The non-aqueous solvent preferably contains cyclic carbonate in addition to acetonitrile. That is, the non-aqueous electrolyte solution contains $LiPF_6$, and the non-aqueous solvent contains acetonitrile and cyclic carbonate. For example, the cyclic carbonate may include at least one selected from a group consisting of ethylene carbonate, propylene carbonate, vinylene carbonate, and fluoroethylene carbonate.

The combined use of acetonitrile and cyclic carbonate advantageously acts to suppress association between acetonitrile and $LiPF_6$. However, cyclic carbonate inhibits dispersion of Li ions at a low temperature. For this reason, in the electrolyte solution containing cyclic carbonate, the ionic conductivity abruptly decreases in the vicinity of a temperature of −10° C. In this regard, the molar mixing ratio of cyclic carbonate relative to acetonitrile is adjusted in order to appropriately suppress reduction of the ionic conductivity at a temperature of −10° C. even when the electrolyte solution contains cyclic carbonate.

That is, the molar mixing ratio of $LiPF_6$ relative to acetonitrile that predominantly affects the amount of the aggregate and the molar mixing ratio of cyclic carbonate relative to acetonitrile that affects solubility are adjusted to particular ranges. The molar mixing ratio of cyclic carbonate relative to acetonitrile is expressed as "C/A", where "A" denotes the number of moles of acetonitrile, and "C" denotes the number of moles of cyclic carbonate.

Specifically, it is preferable that the molar mixing ratio (B/A) of $LiPF_6$ relative to acetonitrile is higher than 0 and equal to or lower than 0.13, and the molar mixing ratio (C/A) of cyclic carbonate relative to acetonitrile is 0.05 or higher and 3.1 or lower. As a result, in the electrolyte solution containing acetonitrile, it is possible to reduce the amount of the aggregate of $PF_6$ anions coordinated with two or more $Li^+$ atoms appearing at a temperature of −10° C. or lower to be smaller than a particular amount. The "particular amount or smaller" means that precipitation of white sediments does not appear in the electrolyte solution.

It is preferable that all of the following conditions are satisfied: (1) the non-aqueous electrolyte solution contains $LiPF_6$ and a non-aqueous solvent, and the non-aqueous solvent contains acetonitrile and cyclic carbonate; (2) the content of $LiPF_6$ is 1.5 mol or less relative to the non-aqueous solvent of 1 L; (3) the molar mixing ratio of $LiPF_6$ relative to acetonitrile is 0.01 or higher and lower than 0.08; and (4) the molar mixing ratio of cyclic carbonate relative to acetonitrile is 0.05 or higher and 3 or lower.

As a result, even an electrolyte solution containing cyclic carbonate, which is disadvantageous at a low temperature, can exhibit a high ion conductivity in a low-temperature range and can prevent association between acetonitrile and $LiPF_6$. Specifically, precipitation of white sediments as an aggregate is not observed, and an ionic conductivity of 10 mS/cm or higher at a temperature of −10° C. can be obtained. According to this embodiment, preferably, it is possible obtain an ionic conductivity of 10.5 mS/cm or higher at a temperature of −10° C. without inhibiting ion conduction. Preferably, it is possible to obtain an ionic conductivity of 11.0 mS/cm or higher without inhibiting ion conduction. More preferably, it is possible to obtain an ionic conductivity of 11.5 mS/cm or higher without inhibiting ion conduction. Furthermore preferably, it is possible to obtain an ionic conductivity of 12.0 mS/cm or higher without inhibiting ion conduction.

Using the non-aqueous electrolyte solution according to the twentieth embodiment, it is possible to improve the ionic conductivity in a low temperature range, compared to the prior art. Specifically, it is possible to obtain a −10° C. ionic conductivity equal to or higher than the 25° C. ionic conductivity of the existing electrolyte solution.

The non-aqueous secondary battery using the non-aqueous electrolyte solution according to the twentieth embodiment is applicable to general-purpose products, automobiles, or the like, suitable for a cold region. For example, according to this embodiment, a configuration of the prior art is applicable to the battery casing. That is, it is possible to obtain a non-aqueous secondary battery suitable for a cold region even when the battery casing has a configuration of the prior art. Therefore, it is possible to appropriately suppress an increase of the manufacturing cost without complicating a manufacturing process.

A specific composition of the non-aqueous electrolyte solution according to the twentieth embodiment includes at least one selected from a group consisting of lithium hexafluorophosphate ($LiPF_6$), acetonitrile (AcN), ethylene carbonate (EC), and vinylene carbonate (VC). In addition, the non-aqueous electrolyte solution according to this embodiment may include lithium salt such as $LiN(SO_2F)_2$ (LiFSI), $LiN(SO_2CF_3)_2$(LiTFSI), or $LiB(C_2O_4)_2$(LiBOB).

Twenty First Embodiment: Non-Aqueous Electrolyte Solution

According to the twenty first embodiment, any one of the non-aqueous electrolyte solutions of the first to eighteenth embodiments preferably has an ionic conductivity of 15 mS/cm or higher at a temperature of 20° C.

It is possible to exhibit high output power performance even when an electrode active material layer having a high volumetric energy density is designed. In addition, the ionic conductivity at a temperature of 20° C. is preferably 20 mS/cm or higher, and more preferably, 25 mS/cm or higher. If the ionic conductivity of the electrolyte solution at a temperature of 20° C. is equal to or higher than 15 mS/cm, lithium ion conduction in the electrode active material layer is sufficiently performed. Therefore, it is possible to perform charging/discharging at a large electric current. In addition, although there is no particular limitation in the upper limit of the ionic conductivity at a temperature of 20° C., the ionic conductivity is preferably 50 mS/cm or lower, more preferably 49 mS/cm or lower, and further more preferably 48 mS/cm or lower from the viewpoint of suppressing unexpected battery degradation such as elution or exfoliation of various battery members. Here, the ionic conductivity of the electrolyte solution can be controlled by adjusting, for example, viscosity and/or polarity of the non-aqueous solvent. More specifically, it is possible to control the ionic conductivity of the electrolyte solution to a high value by mixing a low viscosity non-aqueous solvent and a high polarity non-aqueous solvent. Furthermore, it may be possible to control the ionic conductivity of the electrolyte solution to a high value by using a non-aqueous solvent having low viscosity and high polarity.

Twenty Second Embodiment: Non-Aqueous Electrolyte Solution

According to the twenty second embodiment, the non-aqueous electrolyte solutions of the first to twenty first embodiments preferably further contain acetic acid. The acetic acid reacts fast in the event of overcharge.

Twenty Third Embodiment: Non-Aqueous Electrolyte Solution

According to the twenty third embodiment, the non-aqueous electrolyte solution of the twenty second embodiment further contains propionitrile.

A technical change at the time of development of the twenty second and twenty third embodiments will be described. In the case of an acetonitrile-based electrolyte solution, a harmful HF gas is generated with combustion caused by overcharge (hereinafter, referred to as "overcharge combustion"). For this reason, the inventors developed a non-aqueous electrolyte solution and a non-aqueous secondary battery using the same, capable of suppressing generation of a HF gas in the event of overcharge combustion by appropriately selecting an additive to the acetonitrile electrolyte solution and appropriately adjusting the content of the additive.

The non-aqueous electrolyte solution according to the twenty third embodiment contains both acetic acid and propionitrile.

The acetic acid reacts fast in the event of overcharge to contribute to releasing of α-hydrogen of propionitrile. This may expand and rupture the battery cell before combustion. As a result, it is possible to reduce the amount of the HF gas in the event of overcharge combustion, compared to the prior art. In addition, the gas generated before combustion includes $CO_2$ and $H_2$.

According to this embodiment, a gas analysis was performed in the event of overcharge combustion, and it was recognized that the generation amount of HF gas was smaller than that of the non-aqueous electrolyte solution that does not contain at least one of acetic acid and propionitrile.

The content of acetic acid is preferably 0.1 ppm or more and 10 ppm or less with respect to the non-aqueous electrolyte solution. In addition, the content of acetic acid is more preferably 0.1 ppm or more and 7 ppm or less with respect to the non-aqueous electrolyte solution.

The content of propionitrile is preferably 1 ppm or more and 300 ppm or less with respect to the non-aqueous electrolyte solution. In addition, the content of propionitrile is more preferably 1 ppm or more and 250 ppm or less with respect to the non-aqueous electrolyte solution.

In this manner, by adjusting the contents of acetic acid and propionitrile, it is possible to effectively reduce the generation amount of the HF gas in the event of overcharge combustion without degrading battery performance within a typical voltage range, compared to the prior art.

The content of the acetic acid is more preferably 0.1 ppm or more and 5 ppm or less with respect to the non-aqueous electrolyte solution.

The content of propionitrile is more preferably 1 ppm or more and 200 ppm or less with respect to the non-aqueous electrolyte solution.

In this manner, by adjusting the contents of acetic acid and propionitrile, it is possible to effectively reduce the generation amount of the HF gas in the event of overcharge combustion without degrading battery performance within a typical voltage range, compared to the prior art.

According to the twenty second and twenty third embodiments, the generation amount of the HF gas during an overcharge test is preferably set to 0.5 mg or less, and more preferably 0.1 mg or less, and further more preferably 0.05 mg or less per 1 Ah, but not limited thereto.

The non-aqueous secondary battery using the non-aqueous electrolyte solution according to this embodiment is preferably applicable to a pouch type cell, but not limited thereto. Note that this type of cell is also called a "laminated" type. That is, using the non-aqueous secondary battery according to this embodiment, it is possible to expand and rupture the pouch type battery cell before combustion. Therefore, it is possible to suppress the amount of the HF gas generated in the event of overcharge combustion, and improve safety, compared to the prior art.

The non-aqueous secondary battery according to this embodiment preferably includes a safety valve. Due to the safety valve, it is possible to discharge the gas generated in the overcharge state from the safety valve to the outside by appropriately operating the safety valve before ignition. Therefore, it is possible to reliably reduce the generation amount of the HF gas in the event of combustion. A cylindrical cell or an angled cell may also be employed as long as it has the safety valve. However, if the pouch type cell is employed, it is possible to suppress rupture before thermal runaway by discharging the gas from the safety valve.

The non-aqueous secondary battery using the non-aqueous electrolyte solution according to this embodiment is applicable to an in-vehicle rechargeable battery or a general-purpose rechargeable battery, but not particularly limited thereto. In particular, in the case of the in-vehicle rechargeable battery, it is possible to suppress generation of a harmful HF gas in the event of ignition. Therefore, it is possible to secure safety of a human body inside a vehicle.

This embodiment is preferably applicable to a pouch type cell or a non-aqueous secondary battery having a safety valve as described above. For example, this embodiment is applicable to a pouch type cell battery for a mobile IT device.

Specific compositions of the non-aqueous electrolyte solutions according to the twenty second and twenty third embodiments may include, for example, acetonitrile (AcN), lithium salt, acetic acid (AA), propionitrile (PrN), and cyclic acid anhydride. For example, lithium salt such as $LiPF_6$, $LiN(SO_2F)_2$(LiFSI), $LiN(SO_2CF_3)_2$(LiTFSI) may be added.

In this case, there is no particular limitation in the negative electrode, the positive electrode, the separator, and the battery casing. However, the battery casing is preferably a pouch type cell and preferably has a safety valve.

Using the aforementioned configuration, it is possible to effectively suppress the generation amount of the HF gas in the event of overcharge combustion of the non-aqueous secondary battery and obtain excellent safety.

Twenty Fourth Embodiment: Non-Aqueous Electrolyte Solution

According to the twenty fourth embodiment, any one of the non-aqueous electrolyte solutions according to any one of the first to twenty third embodiments preferably further contains acetaldehyde.

In this manner, according to the twenty fourth embodiment, the non-aqueous electrolyte solution further contains acetaldehyde in addition to acetonitrile, lithium salt, and cyclic acid anhydride. As a result, the acetaldehyde can promote the SEI formation reaction on the negative electrode using cyclic acid anhydride and suppress generation of gas before overcharge.

According to this embodiment, the non-aqueous electrolyte solution preferably further contains a nitrile complex containing at least one transition metal element selected from a group consisting of Ni, Mn, and Co.

In this manner, according to this embodiment, the non-aqueous electrolyte solution contains acetaldehyde and a nitrile complex containing at least one transition metal element selected from a group consisting of Ni, Mn, and Co, in addition to acetonitrile, lithium salt, and cyclic acid anhydride. Here, the nitrile complex includes a cation state. In the event of overcharge, since the nitrile complex containing at least one transition metal element selected from a group consisting of Ni, Mn, and Co promotes releasing of α-hydrogen of acetonitrile, the battery cell may be expanded and ruptured before combustion. As a result, it is possible to reduce the generation amount of the CO gas in the event of overcharge combustion, compared to the prior art. Note that the gas generated before combustion predominantly contains $CO_2$ and $H_2$.

In this embodiment, it was recognized that the generation amount of the CO gas in the event of overcharge combustion is smaller than that of the non-aqueous electrolyte solution of the comparative example that does not contain at least any one of acetaldehyde, cyclic acid anhydride, or a nitrile complex containing at least one transition metal element selected from Ni, Mn, and Co.

According to twenty fourth embodiment described above, the content of acetaldehyde is preferably 1 ppm or more and 3000 ppm or less with respect to non-aqueous electrolyte solution, but not particularly limited thereto. In addition, the content of acetaldehyde is more preferably 10 ppm or more and 2500 ppm or less with respect to non-aqueous electrolyte solution. The content of acetaldehyde is furthermore preferably 30 ppm or more and 2000 ppm or less with respect to non-aqueous electrolyte solution.

In this manner, by adjusting the content of acetaldehyde, it is possible to more effectively promote the SEI formation reaction on the negative electrode using cyclic acid anhydride and suppress generation of gas before overcharge.

According to the twenty fourth embodiment, the content of cyclic acid anhydride is preferably 0.01 mass % or more and 1 mass % or less with respect to the non-aqueous electrolyte solution, but not limited thereto.

The content of cyclic acid anhydride is more preferably 0.1 mass % or more and 1 mass % or less with respect to the non-aqueous electrolyte solution.

In this manner, by adjusting the content of cyclic acid anhydride, it is possible to more effectively promote the formation reaction of the negative electrode SEI of cyclic acid anhydride, and effective suppress generation of gas before overcharge.

According to this embodiment, the nitrile complex is preferably obtained by reaction between the non-aqueous electrolyte solution and the positive-electrode active material containing at least one transition metal element selected from a group consisting of Ni, Mn, and Co.

In a case where the transition metal element included in the positive-electrode active material is an element of the nitrile complex, the element can stably exist in the battery without oxidizing or deteriorating it in the positive electrode side before overcharge. Therefore, it is possible to reliably produce an electrolyte solution suitable for an overcharge countermeasure.

The content of the nitrile complex is preferably 0.01 ppm or more and 500 ppm or less as a transition metal with respect to the non-aqueous electrolyte solution. The content of the nitrile complex is more preferably 100 ppm or more and 500 ppm or less as a transition metal with respect to the non-aqueous electrolyte solution. In addition, the content of the nitrile complex is preferably 200 ppm or more and 500 ppm or less as a transition metal with respect to the non-aqueous electrolyte solution.

According to the twenty fourth embodiment, it is preferable to define the contents as follows. Specifically, (1) the content of acetaldehyde is 1 ppm or more and 3000 ppm or less with respect to the non-aqueous electrolyte solution; (2) the content of cyclic acid anhydride is 0.01 mass % or more and 1 mass % or less with respect to the non-aqueous electrolyte solution; and (3) the content of nitrile complex is 0.01 ppm or more and 500 ppm or less as a transition metal with respect to the non-aqueous electrolyte solution.

By satisfying the conditions (1) to (3) described above, it is possible to more effectively promote the SEI formation reaction of the negative electrode of cyclic acid anhydride caused by acetaldehyde and promote releasing of α-hydrogen of acetonitrile of the nitrile complex in the event of overcharge. Therefore, it is possible to reliably reduce the generation amount of the CO gas in the event of overcharge combustion.

According to this embodiment, the CO gas generation amount in the overcharge test may be 1 g or less, and preferably 0.7 g or less per 1 Ah, but not particularly limited thereto.

The non-aqueous secondary battery using the non-aqueous electrolyte solution according to the twenty fourth embodiment is preferably applicable to a pouch type cell, but not particularly limited thereto. Note that this type of cell is also called a "laminated" type. That is, using the non-aqueous secondary battery according to this embodiment, it is possible to expand and rupture the pouch type battery cell before combustion. Therefore, it is possible to suppress the generation amount of the CO gas in the event of overcharge combustion, and improve safety, compared to the prior art.

The non-aqueous secondary battery according to this embodiment preferably includes a safety valve. Due to the safety valve, it is possible to discharge the gas generated in the overcharge state from the safety valve to the outside by appropriately operating the safety valve before ignition. Therefore, it is possible to reliably reduce the generation amount of the CO gas in the event of combustion. A cylindrical cell or an angled cell may also be employed as long as it has the safety valve. However, if the pouch type cell is employed, it is possible to suppress rupture before thermal runaway by discharging the gas from the safety valve.

The non-aqueous secondary battery using the non-aqueous electrolyte solution according to the twenty fourth embodiment is applicable to an in-vehicle rechargeable battery or a general-purpose rechargeable battery, but not particularly limited thereto. In particular, in the case of the in-vehicle rechargeable battery, it is possible to suppress generation of a harmful HF gas in the event of ignition. Therefore, it is possible to secure safety of a human body inside a vehicle.

The twenty fourth embodiment is preferably applicable to a pouch type cell or a non-aqueous secondary battery having a safety valve as described above. For example, this embodiment is applicable to a pouch type cell battery for a mobile IT device.

The non-aqueous electrolyte solution according to the twenty fourth embodiment may contain acetonitrile, lithium salt, acetaldehyde, cyclic acid anhydride, and nitrile complex containing at least one transition metal element selected from a group consisting of Ni, Mn, and Co. In addition, succinic anhydride (SAH) may be added to the cyclic acid anhydride.

In this case, there is no particular limitation in the negative electrode, the positive electrode, the separator, and the battery casing. However, the battery casing is preferably a pouch type cell and preferably has a safety valve.

Using the aforementioned configuration, it is possible to effectively suppress the generation amount of the CO gas in the event of overcharge combustion and obtain excellent safety.

Twenty Fifth Embodiment: Non-Aqueous Electrolyte Solution

According to the twenty fifth embodiment, any one of the non-aqueous electrolyte solutions according to any one of the first to twenty fourth embodiments preferably further contains 2,6-di-tert-butyl-p-cresol.

A technical change at the time of development of the present invention will be described. In the case of an acetonitrile-based electrolyte solution, the durability of the negative electrode SEI is degraded, and an increase of internal resistance caused by repeated charging/discharging was problematic, but means for appropriately addressing such a problem was not established. In this regard, the inventors developed a non-aqueous electrolyte solution and a non-aqueous secondary battery using the same, capable of suppressing an increase of internal resistance and improving cycle performance, compared to the prior art, by appropriately selecting an additive to the acetonitrile electrolyte solution and appropriately adjusting the content of the additive. That is, the non-aqueous electrolyte solution according to this embodiment has the following characteristic parts.

The non-aqueous electrolyte solution according to the twenty fifth embodiment is characterized in that acetonitrile, 2,6-di-tert-butyl-p-cresol, cyclic acid anhydride, and lithium salt are contained.

In this manner, according to the twenty fifth embodiment, the non-aqueous electrolyte solution contains acetonitrile, 2,6-di-tert-butyl-p-cresol, lithium salt, and cyclic acid anhydride. The 2,6-di-tert-butyl-p-cresol is expressed in the following formula (8).

[Chemical Formula 6]

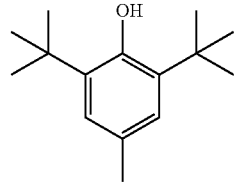

(8)

According to the twenty fifth embodiment, since the non-aqueous electrolyte solution contains 2,6-di-tert-butyl-p-cresol and cyclic acid anhydride, it is possible to reinforce the negative electrode SEI and suppress an increase of internal resistance. In general, the SEI is formed as the additive is reductively decomposed in the negative electrode. However, a deposit on the negative electrode that does not serve as the SEI, that is, a resistance component is also generated at the same time. In particular, in a case where cyclic acid anhydride is used as the additive, the negative electrode SEI capable of withstanding high solubility of acetonitrile is obtained, and this also excessively generates unnecessary deposits due to high reactivity with other organic compounds. However, coexistence of 2,6-di-tert-butyl-p-cresol can suppress generation of unnecessary deposits without inhibiting formation of effective SEI. Since an increase of internal resistance can be suppressed in this manner, it is possible to effectively improve the cycle performance of the non-aqueous secondary battery using the non-aqueous electrolyte solution according to this embodiment.

In the twenty fifth embodiment, the non-aqueous electrolyte solution was evaluated through a cycle test at a temperature of 25° C. and an electrochemical impedance spectroscopy test. Due to the components of the non-aqueous electrolyte solution according to the twenty fifth embodiment, it is possible to obtain a high capacity retention rate in a charging/discharging cycle test and suppress an increase of impedance, compared to a non-aqueous electrolyte solution that does not contain at least one of 2,6-di-tert-butyl-p-cresol and cyclic acid anhydride. Therefore, it is possible to obtain excellent cycle performance.

According to the twenty fifth embodiment, the contents of 2,6-di-tert-butyl-p-cresol and cyclic acid anhydride are not particularly limited, but the content of 2,6-di-tert-butyl-p-cresol is preferably 0.1 ppm or more and 100 ppm or less with respect to the non-aqueous electrolyte solution. The content of 2,6-di-tert-butyl-p-cresol is calculated as a mass percentage with respect to a total mass of all components contained in the non-aqueous electrolyte solution. The content of 2,6-di-tert-butyl-p-cresol is preferably 0.1 ppm or more and 50 ppm or less, and more preferably 30 ppm or less with respect to the non-aqueous electrolyte solution.

According to the twenty fifth embodiment, the content of cyclic acid anhydride is preferably 0.01 mass % or more and 1 mass % or less with respect to the non-aqueous electrolyte solution. The content of cyclic acid anhydride is calculated as a mass percentage with respect to a total mass of all components of the non-aqueous electrolyte solution. The content of cyclic acid anhydride is more preferably 0.05 mass % or more and 0.7 mass % or less with respect to the non-aqueous electrolyte solution.

As a result, it is possible to suppress an increase of the molecular weight of the negative electrode SEI formation agent and further suppress an increase of internal resistance caused by a decomposition reaction of 2,6-di-tert-butyl-p-cresol. As a result, it is possible to suppress an increase of internal resistance of the battery using the acetonitrile electrolyte solution and effectively improve the cycle performance.

The content of 2,6-di-tert-butyl-p-cresol is more preferably 0.5 ppm or more and 10 ppm or less with respect to the non-aqueous electrolyte solution. In addition, the content of cyclic acid anhydride is more preferably 0.1 mass % or more and 0.5 mass % or less with respect to the non-aqueous electrolyte solution.

In this manner, by further limiting the contents of 2,6-di-tert-butyl-p-cresol and cyclic acid anhydride and more effectively adding the negative electrode SEI formation agent such as vinylene carbonate (VC), it is possible to suppress homopolymerization of vinylene carbonate (VC). In addition, since the cyclic acid anhydride promotes the negative electrode SEI formation reaction, it is possible to reinforce the negative electrode SEI. As a result, it is possible to more reliably suppress an increase of internal resistance of the battery using the acetonitrile electrolyte solution and furthermore improve cycle performance.

According to the twenty fifth embodiment, as described above in the fourth embodiment, the cyclic acid anhydride preferably includes at least one selected from a group consisting of succinic anhydride, maleic anhydride, and phthalic anhydride. These cyclic acid anhydrides may be contained alone, or two or more of them may be mixed.

Using the non-aqueous electrolyte solution containing at least one selected from a group consisting of succinic anhydride, maleic anhydride, and phthalic anhydride, it is possible to more robustly form the negative electrode SEI and obtain a high capacity retention rate as recognized in the 25° C. cycle test.

According to the twenty fifth embodiment, the capacity retention rate obtained by performing the cycle test by one hundred cycles at a temperature of 25° C. can be 80% or higher, and preferably 85% or higher, but not limited thereto.

In the method of the 25° C. cycle test, the charging/discharging was performed by one hundred cycles, and the capacity retention rate was obtained on the basis of the discharge capacity of the hundredth cycle by assuming that the discharge capacity of the first cycle is set to 100%.

According to the twenty fifth embodiment, in the electrochemical impedance spectroscopy test, an A.C. impedance at a frequency of 1 kHz in the fiftieth cycle can be suppressed to 4 ohm or lower, and an A.C. impedance at a frequency of 1 kHz in the hundredth cycle can be suppressed to 5 ohm or lower, but not limited thereto. Preferably, the A.C. impedance at a frequency of 1 kHz in the fiftieth cycle can be suppressed to be lower than 3.4 ohm, and the A.C. impedance at a frequency of 1 kHz in the hundredth cycle can be suppressed to 3.8 ohm or lower.

The non-aqueous secondary battery using the non-aqueous electrolyte solution according to the twenty fifth embodiment can function as a battery in initial charging. However, in the initial charging, a part of the electrolyte solution is decomposed for stabilization. In this case, since the content of 2,6-di-tert-butyl-p-cresol or cyclic acid anhydride in the electrolyte solution is originally small, and they are incorporated into the negative electrode SEI, or due to other reasons, it was difficult to detect a component after the initial charging in some cases.

For this reason, in the non-aqueous secondary battery using the acetonitrile electrolyte solution, if the aforementioned properties are provided after the initial charging, it can be inferred that the components of the non-aqueous electrolyte solution according to this embodiment are contained.

The non-aqueous secondary battery using the non-aqueous electrolyte solution according to this embodiment may include a positive electrode having a positive-electrode active material layer formed on one surface or both surfaces of the current collector, a negative electrode having a negative-electrode active material layer formed on one surface or both surfaces of the current collector, and a non-aqueous electrolyte solution, and the non-aqueous electrolyte solution is the non-aqueous electrolyte solution of the twenty fifth embodiment.

In this case, the negative electrode preferably contains a material that absorbs lithium ions as a negative-electrode active material at an electric potential lower than "0.4V vs.

Li/Li+". In this manner, by using metal that absorbs lithium ions at an electric potential lower than 0.4 V, it is possible to increase a battery voltage, and this advantageously serves to reinforce the negative electrode SEI.

Alternatively, the non-aqueous secondary battery according to this embodiment may include a positive electrode having a positive-electrode active material layer formed on one surface or both surfaces of the current collector, a negative electrode having a negative-electrode active material layer formed on one surface or both surfaces of the current collector, and a non-aqueous electrolyte solution, and a capacity retention rate is equal to or higher than 80% in a cycle test of 100 cycles at a temperature of 25° C.

The non-aqueous secondary battery using the non-aqueous electrolyte solution according to the twenty fifth embodiment has an excellent cycle characteristic, so that it is possible to suppress degradation of the battery. The non-aqueous secondary battery according to this embodiment is applicable to general-purpose products, automobiles, and the like, and is preferably applicable to, for example, outdoor applications in summer.

A specific composition of the non-aqueous electrolyte solution according to the twenty fifth embodiment may include acetonitrile (AcN), 2,6-di-tert-butyl-p-cresol, and succinic anhydride (SAH). In addition, the non-aqueous electrolyte solution may contain vinylene carbonate (VC).

In this case, the negative electrode preferably contains a material that absorbs lithium ions as a negative-electrode active material at an electric potential lower than "0.4V vs. Li/Li+".

Meanwhile, there is no particular limitation in the positive electrode, the separator, and the battery casing.

Using the configuration described above, a remarkable effect appears on the cycle characteristic of the non-aqueous secondary battery, so that it is possible to suppress degradation of the battery and obtain a long service life.

Twenty Sixth Embodiment: Non-Aqueous Electrolyte Solution

According to the twenty sixth embodiment, the non-aqueous electrolyte solution according to any one of the first to twenty fifth embodiments preferably contains a compound expressed as the following formula (1).

[Chemical Formula 7]

—N=     formula (1)

The Formula (1) expressed in the twenty sixth embodiment corresponds to a minimum unit of a nitrogen-containing cyclic compound expressed in the following twenty seventh embodiment. In addition, the twenty sixth embodiment can be used, for example, in combination with the aforementioned twenty fifth embodiment. As a result, it is possible to more effectively suppress battery degradation.

Twenty Seventh Embodiment: Non-Aqueous Electrolyte Solution

According to the twenty seventh embodiment, the compound of Formula (1) of the non-aqueous electrolyte solution of the twenty sixth embodiment is preferably a nitrogen-containing cyclic compound. Preferably, the nitrogen-containing cyclic compound is a bi-cyclic nitrogen-containing cyclic compound.

Specifically, the nitrogen-containing cyclic compound preferably has no steric hindrance around a noncovalent electron pair. As a specific example, for example, the nitrogen-containing cyclic compound may be expressed as the following Formula (9):

[Chemical Formula 8],

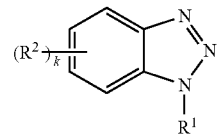

(9)

where "R$^1$" denotes an alkyl group having 1 to 4 carbon atoms, an aryl group, a propargyl group, a phenyl group, a benzyl group, a pyridyl group, an amino group, a pyrrolidylmethyl group, a trimethylsilyl group, a nitrile group, an acetyl group, a trifluoroacetyl group, a chloromethyl group, a methoxymethyl group, an isocyanomethyl group, a methylsulfonyl group, a phenylsulfonyl group, a sulfonyl azide group, a pyridylsulfonyl group, a 2-(trimethylsilyl)etoxycarbonyloxy group, a bis(N,N'-alkyl)aminomethyl group, or a bis(N,N'-alkyl)aminoethyl group, "R$^2$" denotes an alkyl group having 1 to 4 carbon atoms, a fluorine-substituted alkyl group having 1 to 4 carbon atoms, an alkoxy group having 1 to 4 carbon atoms, a fluorine-substituted alkoxy group having 1 to 4 carbon atoms, a nitrile group, a nitro group, an amino group, or halogen atoms, and "k" denotes an integer of 0 to 4.

In the nitrogen-containing cyclic compound expressed in the aforementioned Formula (9), it is particularly preferable that "R$^1$—CH$_3$, and k=0"

The content of the nitrogen-containing cyclic compound of the electrolyte solution according to the twenty seventh embodiment is preferably 0.01 to 10 mass %, more preferably 0.02 to 5 mass %, and further more preferably 0.03 to 3 mass %, but not limited thereto, with respect to a total amount of the electrolyte solution. According to this embodiment, the nitrogen-containing cyclic compound forms a robust SEI when it is used together with an organic lithium salt having an oxalic acid group.

In the twenty sixth and twenty seventh embodiments, a specific composition includes 1-methyl-1H-benzotriazole (MBTA). The non-aqueous secondary battery using the non-aqueous electrolyte solutions according to the twenty sixth and twenty seventh embodiments can be applied to the fields similar to those of the twenty fifth embodiment.

Twenty Eighth Embodiment: Non-Aqueous Electrolyte Solution

According to the twenty eighth embodiment, the non-aqueous electrolyte solution of the thirteenth or fourteenth embodiment contains imide salt as a main component of the lithium salt. Preferably, the non-aqueous electrolyte solution contains the imide salt and lithium salt other than the imide salt, as main components, by the same amount.

Here, the "main component" refers to lithium salt contained most in the electrolyte solution, and a percentage of the molar quantity of the imide salt relative to a total molar quantity of the lithium salt contained in the electrolyte solution is preferably 50% or higher, and more preferably 60% or higher.

Among the lithium salts, the imide salt may be contained most alone or lithium salt other than the imide salt may be contained most in combination.

The lithium salt of the non-aqueous electrolyte solution according to this embodiment may include $LiPF_6$, $LiN(SO_2F)_2$(LiFSI), or $LiN(SO_2CF_3)_2$(LiTFSI).

In the non-aqueous electrolyte solution according to this embodiment, elution of aluminum caused charging/discharging is negligible. In addition, since the imide salt is contained, it is possible to improve the ionic conductivity and the battery cycle characteristic.

Therefore, the non-aqueous secondary battery using the non-aqueous electrolyte solution according to this embodiment is applicable to general-purpose products, automobiles, and the like, and is advantageous in that a voltage drop caused by charging/discharging is negligible.

Twenty Ninth Embodiment: Non-Aqueous Electrolyte Solution

According to the twenty ninth embodiment, any one of the non-aqueous electrolyte solutions of the thirteenth, fourteenth, and twenty eighth embodiments preferably contains imide salt with a molarity relationship of "$LiPF_6 \leq$ imide salt".

According to the twenty ninth embodiment, the lithium salt contains $LiPO_2F_2$, and the content of $LiPO_2F_2$ preferably has a range of 0.001 mass % or more and 1 mass % or less with respect to the non-aqueous electrolyte solution. In addition, the content of the cyclic acid anhydride is preferably 0.01 mass % or more and 1 mass % or less with respect to the non-aqueous electrolyte solution. Furthermore, imide salt is preferably contained with a molarity relationship of "$LiPF_6 \leq$ imide salt". Here, the content of $LiPO_2F_2$ and the content of cyclic acid anhydride are expressed as a mass ratio by assuming that a sum of all components of the non-aqueous electrolyte solution, including acetonitrile, $LiPF_6$, $LiPO_2F_2$, cyclic acid anhydride, and imide salt, is set to 100 mass/%. In addition, the molarities of $LiPF_6$ and imide salt are measured with respect to the non-aqueous solvent of "1 L".

According to the twenty ninth embodiment, by defining the content and the molarity as described above, $LiPO_2F_2$ and cyclic acid anhydride form a robust SEI on the negative electrode. In this manner, since a passive film called SEI is formed on the negative electrode, it is possible to effectively suppress an increase of resistance during high-temperature heating.

Since imide salt is contained with a molarity relationship of "$LiPF_6 \leq$ imide salt", it is possible to suppress a decrease of the ionic conductivity at a low temperature and obtain excellent low-temperature characteristics.

According to this embodiment, the content of $LiPO_2F_2$ is more preferably 0.05 mass % or more and 1 mass % or less with respect to the non-aqueous electrolyte solution. In addition, the content of cyclic acid anhydride is more preferably 0.1 mass % or more and 0.5 mass % or less with respect to the non-aqueous electrolyte solution. Furthermore, the content of imide salt is preferably 0.5 mol or more and 3 mol or less with respect to the non-aqueous solvent of "1 L". In this manner, by limiting the content, it is possible to more effectively suppress an increase of resistance during high-temperature heating and obtain more excellent low-temperature characteristics.

According to the twenty ninth embodiment, similar to the fourteenth embodiment, the imide salt preferably includes at least one selected from a group consisting of $LiN(SO_2F)_2$ and $LiN(SO_2CF_3)_2$, but not limited thereto. Only one or both of these imide salts may be included. Alternatively, any other imide salt may also be contained. In this case, the imide salt is preferably contained with a molarity relationship of "$LiPF_6 \leq$ imide salt". In addition, the content of the imide salt is preferably 0.5 mol or more and 3 mol or less with respect to the non-aqueous solvent of "1 L".

Using the non-aqueous electrolyte solution containing at least one selected from a group consisting of $LiN(SO_2F)_2$ and $LiN(SO_2CF_3)_2$, it is possible to effectively suppress reduction of the ionic conductivity at a low temperature range of −10° C. or −30° C. and obtain excellent low-temperature characteristics.

The non-aqueous electrolyte solution according to the twenty ninth embodiment contains acetonitrile, $LiPF_6$, $LiPO_2F_2$, imide salt including at least one selected from a group consisting of $LiN(SO_2F)_2$ and $LiN(SO_2CF_3)_2$, and cyclic acid anhydride including at least on selected from a group consisting of succinic anhydride, maleic anhydride, and phthalic anhydride. The cyclic acid anhydride preferably includes succinic anhydride (SAH).

In this case, there is no particular limitation in the negative electrode. Meanwhile, the positive-electrode active material preferably includes a lithium-containing compound having layered rock salt type crystals, but not limited thereto.

There is no particular limitation in the separator and the battery casing.

The configuration described above has a remarkable effect of suppressing an increase of resistance during high-temperature heating and obtaining low-temperature characteristics.

The non-aqueous secondary battery using the non-aqueous electrolyte solution according to the twenty ninth embodiment may be used in the outdoor applications in summer.

Thirtieth Embodiment: Non-Aqueous Electrolyte Solution

According to the thirtieth embodiment, in the non-aqueous electrolyte solution according to any one of the thirteenth, fourteenth, twenty eighth, and twenty ninth embodiments, the content of imide salt is preferably 0.5 mol or more and 3 mol or less with respect to the non-aqueous solvent of "1 L".

According to the thirtieth embodiment, the lithium salt includes $LiPO_2F_2$, and the content of $LiPO_2F_2$ is preferably 0.05 mass % or more and 1 mass % or less with respect to the non-aqueous electrolyte solution. In addition, the content of cyclic acid anhydride is preferably 0.1 mass % or more and 0.5 mass % or less with respect to the non-aqueous electrolyte solution. In addition, the content of imide salt is preferably 0.5 mol or more and 3 mol or less with respect to the non-aqueous solvent of "1 L".

According to the thirtieth embodiment, similar to the fourteenth embodiment, the imide salt preferably includes at least one selected from a group consisting of $LiN(SO_2F)_2$ and $LiN(SO_2CF_3)_2$, but not limited thereto. Only one or both of these imide salts may be included. Alternatively, any imide salt other than these imide salts may be included. In this case, as described in the twenty ninth embodiment, the imide salt is preferably contained with a molarity relationship of "$LiPF_6 \leq$ imide salt". In addition, the content of the imide salt is preferably 0.5 mol or more and 3 mol or less with respect to the non-aqueous solvent of "1 L".

Using the non-aqueous electrolyte solution containing at least one selected from a group consisting of $LiN(SO_2F)_2$ and $LiN(SO_2CF_3)_2$, it is possible to effectively suppress reduction of the ionic conductivity at a low temperature range of −10° C. or −30° C. and obtain excellent low-temperature characteristics.

According to the thirtieth embodiment, a configuration of using $LiPF_6$ and LiFSI as the lithium salt and using succinic anhydride (SAH) as the cyclic acid anhydride may be proposed.

According to the thirtieth embodiment, it is possible to suppress an increase of resistance during high-temperature heating and obtain low-temperature characteristics.

According to the twenty ninth and thirtieth embodiments, it is possible to suppress a resistance increase rate to 400% or lower in a full-charge storage test for 720 hours at a temperature of 60° C. In addition, preferably, it is possible to suppress the resistance increase rate to 300% or lower. More preferably, it is possible to suppress the resistance increase rate to 250% or lower.

In measurement of the resistance increase rate, the resistance increase rate was calculated by obtaining a resistance value before the full-charged storage at a temperature of 60° C. and a resistance value after the full-charge storage test at a temperature of 60° C.

According to this embodiment, the ionic conductivity at a temperature of −10° C. is preferably 10 mS/cm or higher. More preferably, the ionic conductivity at a temperature of −10° C. is 12 mS/cm or higher, and furthermore preferably, the ionic conductivity at a temperature of −10° C. is 12.5 mS/cm or higher.

The specific composition and application of the thirtieth embodiment are similar to, for example, those of the twenty ninth embodiment.

Thirty First Embodiment: Non-Aqueous Electrolyte Solution

According to the thirty first embodiment, in any one of the non-aqueous electrolyte solutions of the thirteenth, fourteenth, twenty eighth, and thirtieth embodiments, the molar mixing ratio of $PF_6$ anions relative to acetonitrile is preferably 0.01 or higher and lower than 0.08.

As a result, it is possible to more effectively promote the formation reaction of the negative electrode SEI without generating an insoluble component, and more effectively delay generation of gas in the event of overcharge. That is, according to the thirty first embodiment, it is possible to promote the reaction of cyclic acid anhydride by water and delay generation of blister gas in the event of overcharge.

The specific compositions and applications of the thirty first embodiment are similar to, for example, those of the first embodiment.

Thirty Second Embodiment: Non-Aqueous Electrolyte Solution

According to the thirty second embodiment, in any one of the non-aqueous electrolyte solutions of the first to thirty first embodiments, the lithium salt preferably contains $PO_2F_2$ anions. The $PO_2F_2$ anions are obtained by dissociating $LiPO_2F_2$ in the electrolyte solution.

Thirty Third Embodiment: Non-Aqueous Electrolyte Solution

According to the thirty third embodiment, in the non-aqueous electrolyte solution of the thirty second embodiment, the content of $PO_2F_2$ anions preferably has a range of 0.001 mass % or more and 1 mass % or less with respect to the non-aqueous electrolyte solution.

A technical change at the time of development of the thirty second and thirty third embodiments will be described. In the $LiPF_6$-based acetonitrile electrolyte solution, an increase of the internal resistance during high-temperature heating and a decrease of the low-temperature characteristics are problems, so that there is no prior art capable of addressing both problems at the same time. In this regard, the inventors developed the invention in order to address each of the high temperature and low temperature problems at the same time by appropriately adjusting the type of the additive and the content in the $LiPF_6$-based acetonitrile electrolyte solution.

The non-aqueous electrolyte solutions according to the thirty second and thirty third embodiments preferably contain acetonitrile, $LiPF_6$, $LiPO_2F_2$, cyclic acid anhydride, and imide salt. Among them, $LiPO_2F_2$ and cyclic acid anhydride contribute to suppression of an increase of internal resistance during high-temperature heating. In addition, the imide salt contributes to improvement of the low-temperature characteristics. Here, the imide salt refers to lithium salt expressed as "$LiN(SO_2C_mF_{2m+1})_2$" (where "m" denotes an integer of 0 to 8).

Due to the composition of the non-aqueous electrolyte solution according to this embodiment, it is possible to suppress an increase of internal resistance during high-temperature heating and obtain excellent low-temperature characteristics.

Note that the low-temperature characteristics can be determined on the basis of the ionic conductivity at a low temperature (specifically, −10° C. or −30° C.).

According to the thirty third embodiment, the content of $PO_2F_2$ anions ($LiPO_2F_2$) has a range of 0.001 mass % or more and 1 mass % or less with respect to the non-aqueous electrolyte solution. In addition, the content of cyclic acid anhydride preferably has a range of 0.01 mass % or more and 1 mass % or less with respect to the non-aqueous electrolyte solution. Furthermore, the non-aqueous electrolyte solution contains imide salt with a molarity relationship of "$LiPF_6 \leq$ imide salt". Here, the contents of $LiPO_2F_2$ and the cyclic acid anhydride are expressed as mass ratios by assuming that a sum of all components of the non-aqueous electrolyte solution, including acetonitrile, $LiPF_6$, $LiPO_2F_2$, cyclic acid anhydride, and imide salt, is set to 100 mass/%. In addition, the molarities of $LiPF_6$ and imide salt are measured for the non-aqueous solvent of "1 L".

By defining the contents and the molarities as described above, $LiPO_2F_2$ and cyclic acid anhydride form a robust SEI on the negative electrode. In this manner, since a passive film called "SEI" is formed on the negative electrode, it is possible to effectively suppress an increase of resistance during high-temperature heating.

Since the imide salt is contained with a molarity relationship of "$LiPF_6 \leq$ imide salt", it is possible to suppress a decrease of the ionic conductivity at a low temperature and obtain excellent low-temperature characteristics.

The content of $LiPO_2F_2$ is more preferably 0.05 mass % or more and 1 mass % or less with respect to the non-aqueous electrolyte solution. In addition, the content of cyclic acid anhydride is more preferably 0.1 mass % or more and 0.5 mass % or less with respect to the non-aqueous electrolyte solution.

The content of imide salt is preferably 0.5 mol or more and 3 mol or less with respect to the non-aqueous solvent of "1 L".

As a result, it is possible to more effectively suppress an increase of resistance during high-temperature heating and obtain more excellent low-temperature characteristics.

According to this embodiment, as described in the fourteenth embodiment, the imide salt includes at least one selected from a group consisting of $LiN(SO_2F)_2$ and $LiN(SO_2CF_3)_2$. Therefore, it is possible to effectively suppress reduction of the ionic conductivity in a low temperature range such as $-10°$ C. or $-30°$ C. and obtain excellent low-temperature characteristics.

According to this embodiment, as described in the fourth embodiment, the cyclic acid anhydride includes at least one selected from a group consisting of succinic anhydride, maleic anhydride, and phthalic anhydride. Therefore, it is possible to form a robust SEI on the negative electrode and effectively suppress an increase of resistance during high-temperature heating.

According to this embodiment, it is possible to suppress a resistance increase rate to 400% or lower in a full-charge storage test for 720 hours at $60°$ C., but not limited thereto. In addition, preferably, it is possible to suppress the resistance increase rate to 300% or lower. More preferably, it is possible to suppress the resistance increase rate to 250% or lower.

According to this embodiment, the ionic conductivity at a temperature of $-10°$ C. is preferably 10 mS/cm or higher, but not limited thereto. More preferably, the ionic conductivity at a temperature of $-10°$ C. is 12 mS/cm or higher, and furthermore preferably, 12.5 mS/cm.

According to this embodiment, the ionic conductivity at a temperature of $-30°$ C. is 3 mS/cm or higher, and more preferably, 5 mS/cm or higher, but not limited thereto. Furthermore preferably, the ionic conductivity at a temperature of $-30°$ C. is 6 mS/cm or higher, and furthermore preferably, the ionic conductivity at a temperature of $-30°$ C. is 6.5 mS/cm or higher.

The non-aqueous secondary battery using the non-aqueous electrolyte solution according to this embodiment may function as a battery through initial charging. However, a part of the electrolyte solution is decomposed at the time of the initial charging for stabilization. In this case, since the content of $LiPO_2F_2$ or cyclic acid anhydride in the electrolyte solution is originally small, and they are incorporated into the SEI, or due to other reasons, it is difficult to detect a component after the initial charging in some cases.

For this reason, in the non-aqueous secondary battery using the $LiPF_6$-based acetonitrile electrolyte solution, if the aforementioned properties are provided after the initial charging, it can be inferred that the components of the non-aqueous electrolyte solution according to this embodiment are contained.

The non-aqueous secondary battery using the non-aqueous electrolyte solution according to the thirty second and thirty third embodiments may include a positive electrode, a negative electrode, and a non-aqueous electrolyte solution. In addition, the resistance increase rate may be 400% or lower in a full-charge storage test for 720 hours at $60°$ C., and the ionic conductivity at $-10°$ C. may be 10 mS/cm or higher.

The non-aqueous secondary battery using the non-aqueous electrolyte solution according to the thirty second and thirty third embodiments can suppress a resistance increase rate during high-temperature heating and obtain excellent low-temperature characteristics.

For this reason, the non-aqueous secondary battery according to this embodiment is applicable to a wide temperature range from approximately $60°$ C. to $-30°$ C. such as outdoor applications in summer and cold region use.

The non-aqueous electrolyte solution according to the thirty second and thirty third embodiments may contain acetonitrile, $LiPF_6$, $LiPO_2F_2$, at least one selected from a group consisting of $LiN(SO_2F)_2$ and $LiN(SO_2CF_3)_2$ as imide salt, and at least one selected from a group consisting of succinic anhydride, maleic anhydride, and phthalic anhydride as cyclic acid anhydride.

In this case, there is no particular limitation in the negative electrode. Meanwhile, although the positive electrode is not particularly limited, the positive electrode active material preferably includes a lithium-containing compound having layered rock salt type crystals.

There is no particular limitation in the separator and the battery casing.

The configuration described above has a remarkable effect of suppressing an increase of resistance during high-temperature heating and obtaining low-temperature characteristics.

Thirty Fourth Embodiment: Non-Aqueous Electrolyte Solution

According to the thirty fourth embodiment, in any one of the non-aqueous electrolyte solutions of the thirteenth, fourteenth, twenty eighth, thirtieth, and thirty first embodiments, the activation energy for ionic conduction is preferably 15 kJ/mol or lower at a temperature of $-20$ to $0°$ C.

A technical change at the time of development of the thirty fourth embodiment will be described. An electrolyte solution containing acetonitrile as a solvent and, for example, $LiPF_6$ as lithium salt exhibits a high ionic conductivity at the room temperature. However, in a low-temperature range equal to or lower than $0°$ C., a discontinuous change occurs in the ionic conductivity of the electrolyte solution, and the output power of the battery using this electrolyte solution is reduced disadvantageously. Such a phenomenon is a problem unique to the non-aqueous electrolyte solution having a high ionic conductivity, and such a problem has not been known until now. In this regard, the inventors developed the invention in order to stabilize the ionic conductivity even at a low temperature by preparing the type of the lithium salt and the content of the lithium salt in the electrolyte solution.

The non-aqueous electrolyte solution according to this embodiment has activation energy equal to or smaller than that of the existing electrolyte solution containing $LiPF_6$ and a carbonate solvent preferably at a low-temperature range of $0°$ C. or lower, and more preferably $-10°$ C. or lower. As a result, it is possible to stabilize the ionic conductivity by suppressing a discontinuous change of the ionic conductivity of the electrolyte solution in a low-temperature range of $0°$ C. or lower. For this reason, even in a case where the non-aqueous secondary battery using the non-aqueous electrolyte solution according to this embodiment is used at a low temperature equal to or lower than $0°$ C., and more preferably, $-10°$ C. or lower, it is possible to obtain the output power equal to or higher than that of the battery of the existing electrolyte solution at the room temperature. Therefore, it is possible to shift the operation limitation to the lower temperature range, compared to the prior art.

According to this embodiment, the activation energy for ionic conduction is preferably 14.5 kJ/mol or lower at a temperature of $-20$ to $0°$ C., and more preferably, 14.0 kJ/mol or lower at a temperature of $-20$ to $0°$ C. As a result, it is possible to shift the operation limitation to the lower temperature range and obtain stable low-temperature characteristic compared to the prior art.

As another embodiment, the activation energy for ionic conduction is 15 kJ/mol or lower at a temperature of 0 to 20° C. As a result, it is possible to reduce the activation energy of the electrolyte solution in a low temperature range of 0° C. or lower and maintain the activation energy equal to or lower than that of the existing electrolyte solution even in a temperature range higher than 0° C. Therefore, it is possible to suppress a discontinuous change of the ionic conductivity of the electrolyte solution and stabilize the ionic conductivity across a wide temperature range from the low temperature to the room temperature. For this reason, using the non-aqueous secondary battery using the non-aqueous electrolyte solution according to this embodiment, it is possible to obtain the same output power level even in use at a low temperature or in use at the room temperature range. In addition, the non-aqueous secondary battery can be used without being influenced by the temperature condition.

According to this embodiment, the activation energy for ionic conduction is preferably 14.5 kJ/mol or lower at a temperature of 0 to 20° C., and more preferably, 14.0 kJ/mol or lower at a temperature of 0 to 20° C. As a result, it is possible to shift the operation limitation to the wider temperature range, compared to the prior art.

The thirty fourth embodiment is effective in the electrolyte solution containing acetonitrile as a solvent and $LiPF_6$ as lithium salt.

According to the thirty fourth embodiment, $LiPO_2F_2$ and imide salt (such as LiFSI or LiTFSI) are included as the lithium salt. A more specific composition of this embodiment is a non-aqueous electrolyte solution containing acetonitrile (AcN) and $LiN(SO_2F)_2$(LiFSI) or $LiN(SO_2CF_3)_2$(LiTFSI). In addition, the non-aqueous electrolyte solution may contain $LiPF_6$ as lithium salt.

According to the thirty fourth embodiment, the activation energy for ionic conductivity is 15 kJ/mol or lower at a temperature of −20 to 0° C., and preferably 15 kJ/mol or lower at a temperature of 0 to 20° C. It is possible to suppress staining of an electrode by $LiPO_2F_2$ by activating the imide salt in a low-temperature range.

The non-aqueous secondary battery using the non-aqueous electrolyte solution according to the thirty fourth embodiment can be used in cold region applications.

<Whole Configuration of Non-Aqueous Secondary Battery>

The non-aqueous electrolyte solution according to this embodiment may be used in a non-aqueous secondary battery. In the non-aqueous secondary battery according to this embodiment, there is no particular limitation in the negative electrode, the positive electrode, the separator, and the battery casing.

The non-aqueous secondary battery according to this embodiment may include a lithium ion battery, but not limited thereto, having a positive electrode containing a positive electrode material capable of absorbing and discharging lithium ions as a positive-electrode active material, and a negative electrode containing a negative electrode material capable of absorbing and discharging lithium ions and a negative electrode material including at least one selected from a group consisting of metal lithium as a negative-electrode active material.

Figure 2:
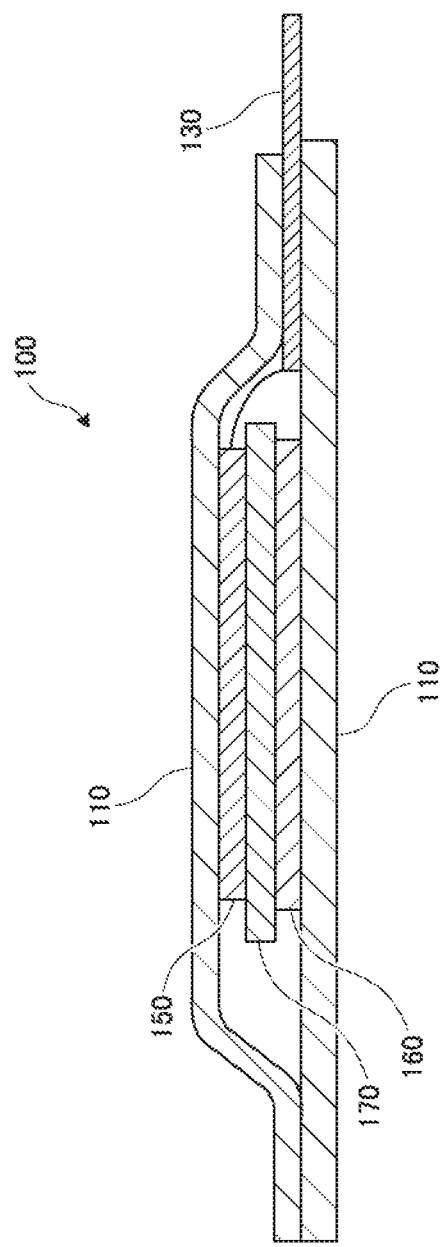
FIG. 2 is a cross-sectional view taken along the line A-A of the non-aqueous secondary battery of FIG. 1.

Specifically, the non-aqueous secondary battery according to this embodiment may be the non-aqueous secondary battery illustrated in FIGS. 1 and 2. Here, FIG. 1 is a plan view schematically illustrating the non-aqueous secondary battery, and FIG. 2 is a cross-sectional view taken along the line A-A of FIG. 1.

The non-aqueous secondary battery 100 of FIGS. 1 and 2 includes pouch type cells. The non-aqueous secondary battery 100 is configured by housing a laminated electrode structure formed by stacking a positive electrode 150 and a negative electrode 160 by interposing a separator 170 and a non-aqueous electrolyte solution (not shown) in a space 120 of a battery casing 110 having a pair of aluminum laminate films. The battery casing 110 is sealed by thermally fusing the upper and lower aluminum laminate films around their outer peripheries. The non-aqueous electrolyte solution is impregnated into the stacking component formed by sequentially stacking the positive electrode 150, the separator 170, and negative electrode 160.

The aluminum laminate film of the battery casing 110 is preferably formed by coating both sides of an aluminum foil with polyolefin-based resin.

The positive electrode 150 is connected to a positive electrode lead body 130 inside the non-aqueous secondary battery 100. Although not shown in the drawings, the negative electrode 160 is also connected to a negative electrode lead body 140 inside the non-aqueous secondary battery 100. In addition, in each of the positive electrode lead body 130 and the negative electrode lead body 140, one end side is exposed to the outside of the battery casing 110 in order to facilitate connection of external devices or the like. Such an ionomer portion is thermally fused together with one side of the battery casing 110.

In the non-aqueous secondary battery 100 illustrated in FIGS. 1 and 2, each of the positive electrode 150 and the negative electrode 160 has a single laminated electrode structure. However, the number of layers in the positive electrode 150 and the negative electrode 160 may appropriately increase depending on capacity design. In a case where each of the positive electrode 150 and the negative electrode 160 is a laminated electrode structure having a plurality of layers, taps of the same polarity are bonded through welding or the like, and they are bonded to one lead body through welding or the like, so that the lead may be extracted to the outside of the battery. As a tap of the same polarity, an exposed portion of the current collector or the like may be used. Alternatively, a metal piece may be welded to the exposed portion of the current collector, or any other type may be employed.

The positive electrode 150 includes a positive-electrode active material layer formed of a positive electrode mixture and a positive electrode current collector. The negative electrode 160 includes a negative-electrode active material layer formed of a negative electrode mixture and a negative electrode current collector. The positive electrode 150 and the negative electrode 160 are arranged such that the positive-electrode active material layer and the negative-electrode active material layer face each other by interposing the separator 170.

Each of these members may be formed by using materials of the lithium ion battery of the prior art, but not limited thereto. Each member of the non-aqueous secondary battery will now be described in details.

<Non-Aqueous Electrolyte Solution>

If the non-aqueous electrolyte solution has the characteristic parts described in each of the aforementioned embodiments, materials used in the non-aqueous electrolyte solution of the lithium ion battery of the prior art may be employed.

The "non-aqueous electrolyte solution" according to this embodiment refers to an electrolyte solution containing water of 1% or less. Preferably, the ratio of water is 300 ppm or less, and more preferably, 200 ppm or less as described in the twelfth embodiment.

The "non-aqueous solvent" has been described above, and will not be described repeatedly.

<Lithium Salt>

The lithium salt used in the non-aqueous electrolyte solution according to this embodiment is not particular limited unless specified otherwise in individual embodiments. For example, according to this embodiment, the lithium salt includes $LiPF_6$ or imide salt.

The imide salt is lithium salt expressed as "$LiN(SO_2C_mF_{2m+1})_2$" (where "m" denotes an integer of 0 to 8). Specifically, as described in the fourteenth embodiment, the imide salt preferably includes at least one selected from a group consisting of $LiN(SO_2F)_2$ and $LiN(SO_2CF_3)_2$.

The imide salt may include a fluorine-containing inorganic lithium salt other than $LiPF_6$. The imide salt may include a fluorine-containing inorganic lithium salt such as $LiBF_4$, $LiAsF_6$, $Li_2SiF_6$, $LiSbF_6$, and $Li_2B_{12}FbH_{12-b}$ (where "b" denotes an integer of 0 to 3). The "fluorine-containing inorganic lithium salt" refers to lithium salt that does not contain a carbon atom in the anion but contains a fluorine atom in the anion. The fluorine-containing inorganic lithium salt is excellent in that it forms a passive film on a surface of a metal foil as the positive electrode current collector and suppresses corrosion of the positive electrode current collector. Such a fluorine-containing inorganic lithium salt may be used alone or in combination of two or more. A representative fluorine-containing inorganic lithium salt is $LiPF_6$ which releases the $PF_6$ anions when dissolved.

The content of the fluorine-containing inorganic lithium salt in the non-aqueous electrolyte solution according to this embodiment is not particularly limited, but is preferably 0.1 mol or more, more preferably 0.2 mol or more, and further more preferably 0.25 mol or more with respect to the non-aqueous solvent of 1 L. If the content of the fluorine-containing inorganic lithium salt is within the aforementioned range, it is possible to increase the ionic conductivity and exhibit high output power characteristics.

The non-aqueous electrolyte solution according to this embodiment may further contain an organic lithium salt. The "organic lithium salt" refers a lithium salt containing a carbon atom in the anion.

The organic lithium salt may include an organic lithium salt having an oxalic acid group. Specific examples of the organic lithium salt having the oxalic acid group may include, for example, $LiB(C_2O_4)_2$, $LiBF_2(C_2O_4)$, $LiPF_4(C_2O_4)$, or $LiPF_2(C_2O_4)_2$. Among them, the lithium salt preferably includes at least one selected from a group consisting of $LiB(C_2O_4)_2$ and $LiBF_2(C_2O_4)$. In addition, it is more preferable to use one of the organic lithium salts or two or more of the organic lithium salts described above together with the fluorine-containing inorganic lithium salt.

The amount of the organic lithium salt having an oxalic acid group to be added to the non-aqueous electrolyte solution is preferably 0.005 mol or more, more preferably 0.02 mol or more, and further more preferably 0.05 mol or more per 1 L of the non-aqueous solvent of the non-aqueous electrolyte solution in order to more reliably guarantee its use effect. However, if the amount of the organic lithium salt having the oxalic acid group in the non-aqueous electrolyte solution described above is excessively large, the lithium salt may be precipitated. Therefore, the amount of the organic lithium salt having the oxalic acid group added to the non-aqueous electrolyte solution described above is preferably less than 1.0 mol, more preferably less than 0.5 mol, and further more preferably less than 0.2 mol per 1 L of the non-aqueous solvent of the non-aqueous electrolyte solution.

It is known that the organic lithium salt having the oxalic acid group described above is insoluble in an organic solvent having a low polarity, and particularly linear carbonate. The organic lithium salt having the oxalic acid group contains a small amount of lithium oxalate in some cases. In addition, even when it is mixed as a non-aqueous electrolyte solution, it reacts with a small amount water contained in other source materials, so that white sediments of lithium oxalate are generated initially in some cases. Therefore, the content of the lithium oxalate in the non-aqueous electrolyte solution according to this embodiment is preferably 0 to 500 ppm, but not particularly limited thereto.

As the lithium salt according to this embodiment, any lithium salt typically used in the non-aqueous secondary battery other than those described above may be added as a supplement. A specific example of the other lithium salts may include, for example, an inorganic lithium salt that does not contain a fluorine atom in the anion, such as $LiClO_4$, $LiAlO_4$, $LiACl_4$, $LiB_{10}Cl_{10}$, or chloroborane Li; an organic lithium salt such as $LiCF_3SO_3$, $LiCF_3CO_2$, $Li_2C_2F_4(SO_3)_2$, $LiC(CF_3SO_2)_3$, $LiC_nF_{2n+1}SO_3$ (n≥2), low fat carboxylic acid lithium, or tetraphenylboric acid lithium; an organic lithium salt expressed as "$LiPF_n(C_pF_{2p+1})_{6-n}$" (where "n" denotes an integer of 1 to 5, and "p" denotes an integer of 1 to 8), such as $LiPF_5(CF_3)$; an organic lithium salt expressed as "$LiBF_q(CsF_{2s+1})_{4-q}$" (where "q" denotes an integer of 1 to 3, and "s" denotes an integer of 1 to 8), such as $LiBF_3(CF_3)$; a lithium salt bonded to a polyvalent anion; or an organic lithium salt expressed as the following formulas (10a), (10b), and (10c):

$$LiC(SO_2R^6)(SO_2R^7)(SO_2R^8) \qquad (10a)$$

$$LiN(SO_2OR^9)(SO_2OR^{10}) \qquad (10b)$$

$$LiN(SO_2R^{11})(SO_2OR^{12}) \qquad (10c)$$

(where the factors $R^6$, $R^7$, $R^8$, $R^9$, $R^{10}$, $R^{11}$, and $R^{12}$ may be the same or different, and denote a perfluoroalkyl group having a carbon number of 1 to 8); and the like. One or more of these materials may be used together with $LiPF_6$.

(Other Optional Additives)

According to this embodiment, the non-aqueous electrolyte solution may appropriately contain an optional additive selected from a group consisting of acid anhydride, sulfonic ester, diphenyl disulfide, cyclohexylbenzene, biphenyl, fluorobenzene, tert-butylbenzene, phosphate ester (such as ethyl diethyl phosphono acetate (EDPA): $(C_2H_5O)_2(P=O)$—$CH_2(C=O)OC_2H_5$, tris(trifluoroethyl) phosphaste (TFEP): $(CF_3CH_2O)_3P=O$, triphenyl phosphate (TPP): $(C_6H_5O)_3P=O$, triaryl phosphate: $(CH_2=CHCH_2O)_3P=O$), and any derivative of these compounds. In particular, the aforementioned phosphate ester has an effect of suppressing a side reaction during storage, which is effective.

The non-aqueous electrolyte solution according to this embodiment may include a nitrogen-containing cyclic compound without steric hindrance around an unshared electron pair as described in the twenty seventh embodiment.

<Positive Electrode>

The positive electrode 150 includes a positive-electrode active material layer formed of a positive electrode mixture and a positive electrode current collector. Any electrode may be employed as the positive electrode 150 without a particular limitation, including those known in the art, as long as it can serve as a positive electrode of the non-aqueous secondary battery.

The positive-electrode active material layer contains a positive-electrode active material and optionally further contains a conductive aid and a binder.

The positive-electrode active material layer preferably contains a material capable of absorbing and releasing lithium ions as a positive-electrode active material. The positive-electrode active material layer preferably contains a conductive aid and a binder as necessary in addition to the positive-electrode active material. Using these materials, it is possible to obtain a high voltage and a high energy density, advantageously.

The positive-electrode active material may include a lithium-containing compound expressed as the following formulas (11a) and (11b) and any other lithium-containing compound,

$$Li_xMO_2 \tag{11a}$$

$$Li_yM_2O_4 \tag{11b}$$

(where "M" denotes one or more metal elements including at least one of transition metal elements, "x" denotes a number of 0 to 1.1, and "y" denotes a number of 0 to 2).

The lithium-containing compound expressed in the formulas (11a) and (11b) may include, for example, lithium cobalt oxide such as $LiCoO_2$, lithium manganese oxide such as $LiMnO_2$, $LiMn_2O_4$, and $Li_2Mn_2O_4$, lithium nickel oxide such as $LiNiO_2$, lithium-containing composite metal oxide such as $LizMO_2$ (where "M" contains at least one transition metal element selected from a group consisting of Ni, Mn, and Co, denotes two or more metal elements selected from a group consisting of Ni, Mn, Co, Al, and Mg, and "z" denotes a number greater than 0.9 and smaller than 1.2), or the like.

The lithium-containing compound other than those of the formulas (11a) and (11b) are not particularly limited as long as it contains lithium. Such a lithium-containing compound may include, for example, a composite oxide containing lithium and a transition metal element, metal chalcogenide having lithium, a phosphate metal compound containing lithium and a transition metal element, or a silicate metal compound containing lithium and a transition metal element (for example, $Li_tM_uSiO_4$ where "M" is defined in Formula (11a), "t" denotes a number of 0 to 1, and "u" denotes a number of 0 to 2). In order to obtain a higher voltage, the lithium-containing compound is preferably a phosphate metal compound or a composite oxide particularly containing lithium and a transition metal element including at least one selected from a group consisting of cobalt (Co), nickel (Ni), manganese (Mn), iron (Fe), copper (Cu), zinc (Zn), chromium (Cr), vanadium (V), and titanium (Ti).

More specifically, the lithium-containing compound preferably includes a composite oxide containing lithium and a transition metal element, metal chalcogenide containing lithium and a transition metal element, or a phosphate metal compound containing lithium. For example, the lithium-containing compound may be expressed by the following Formulas (12a) and (12b):

$$Li_vM^ID_2 \tag{12a}$$

$$Li_wM^{II}PO_4 \tag{12b}$$

(where "D" denotes an oxygen or charlcogen element, "$M^I$" and "$M^{II}$" denotes one or more transition metal elements, "v" and "w" values are defined by a charging/discharging state of the battery, "v" denotes a number of 0.05 to 1.10, and "w" denotes a number of 0.05 to 1.10).

The lithium-containing compound expressed in the aforementioned Formula (12a) has a layered structure, and the compound expressed in the aforementioned Formula (12b) has an olivine structure. For the purpose of stabilizing a structure or the like, such a lithium-containing compound may be obtained by substituting a part of the transition metal element with Al, Mg, or another transition metal element, inserting such a metal element into a crystalline interface, substituting a part of the oxygen atom with a fluorine atom or the like, coating another positive-electrode active material on at least a part of the surface of the positive-electrode active material, or the like.

The positive-electrode active material according to this embodiment may include only the lithium-containing compound described above, or may additionally include another positive-electrode active material together with the lithium-containing compound.

Such other positive-electrode active materials may include, for example, a metal oxide or metal chalcogenide having a tunnel structure or a layered structure, sulfur, a conductive polymer, or the like. The metal oxide or metal chalcogenide having a tunnel structure or a layered structure may include, for example, oxide, sulfide, selenide, or the like of metal other than lithium, such as $MnO_2$, $FeO_2$, $FeS_2$, $V_2O_5$, $V_6O_{13}$, $TiO_2$, $TiS_2$, $MoS_2$, and $NbSe_2$. The conductive polymer may include, for example, polyaniline, polythiophene, polyacetylene, or polypyrrole.

The other positive-electrode active materials described above may be used alone or in combination of two or more materials without a particular limitation. However, the aforementioned positive-electrode active material layer preferably contains at least one transition metal element selected from a group consisting of Ni, Mn, and Co because it is possible to reversibly and stably absorb and release lithium ions and achieve a high energy density.

In a case where the lithium-containing compound and another positive-electrode active material are used in combination as the positive-electrode active material, a ratio therebetween, that is, a ratio of the lithium-containing compound relative to the whole positive-electrode active material is preferably 80 mass % or more, and more preferably 85 mass % or more.

The conductive aid may include, for example, carbon black such as graphite, acetylene black, and ketjen black, or a carbon fiber. The content of the conductive aid is preferably 10 parts by mass or less, and more preferably 1 to 5 parts by mass with respect to 100 parts by mass of the positive-electrode active material.

The binder may include, for example, polyvinylidene fluoride (PVDF), polytetrafluoroethylene (PTFE), polyacrylic acid, styrene butadiene rubber, or fluororubber. The content of the binder is preferably 6 parts by mass or less, and more preferably 0.5 to 4 parts by mass with respect to 100 parts by mass of the positive-electrode active material.

The positive-electrode active material layer is formed by applying, to the positive electrode current collector, positive electrode mixture-containing slurry obtained by dispersing a positive electrode mixture obtained by mixing the positive-electrode active material, the conductive aid, and the binder as necessary into a solvent, drying it (to remove the solvent), and pressing it as necessary. Such a solvent may include those used in the prior art without a particular limitation. For example, the solvent may include N-methyl-2-pyrrolidone, dimethylformamide, dimethylacetamide, water, or the like.

The positive electrode current collector includes, for example, a metal foil such as an aluminum foil, a nickel foil, and a stainless foil. The positive electrode current collector may have a surface coated with carbon or may be meshed. The thickness of the positive electrode current collector is preferably 5 to 40 μm, more preferably 7 to 35 μm, and furthermore preferably 9 to 30 μm.

<Negative Electrode>

The negative electrode 160 includes a negative-electrode active material layer formed of a negative electrode mixture, and a negative electrode current collector. Any electrode may be employed as the negative electrode 160 without a particular limitation, including those known in the art, as long as it can serve as a negative electrode of a non-aqueous secondary battery.

The negative-electrode active material layer preferably contains a material capable of absorbing lithium ions as a negative-electrode active material at an electric potential lower than 0.4 V vs. Li/Li from the viewpoint of increasing the battery voltage. The negative-electrode active material layer preferably contains a conductive aid and a binder, as necessary, together with the negative-electrode active material.

The negative-electrode active material may include, for example, a carbon material such as amorphous carbon (hard carbon), artificial, natural graphite, graphite, pyrolytic carbon, coke, glassy carbon, a sintered product of an organic polymer compound, mesocarbon microbeads, a carbon fiber, activated carbon, graphite, carbon colloid, and carbon black, metal lithium, metal oxide, metal nitride, lithium alloy, tin alloy, silicon alloy, an intermetallic compound, an organic compound, an inorganic compound, a metal complex, an organic polymer compound, or the like.

The negative-electrode active material may be used alone or in combination of two or more materials.

The conductive aid may include, for example, carbon black such as graphite, acetylene black, and ketjen black, or a carbon fiber. The content of the conductive aid is preferably 20 parts by mass or less, and more preferably 0.1 to 10 parts by mass with respect to 100 parts by mass of the negative-electrode active material.

The binder may include, for example, PVDF, PTFE, polyacrylic acid, styrene butadiene rubber, or fluororubber. The content of the binder is preferably 10 parts by mass or less, and more preferably 0.5 to 6 parts by mass with respect to 100 parts by mass of the positive-electrode active material.

The negative-electrode active material layer is formed by applying, to the negative electrode current collector, negative electrode mixture-containing slurry obtained by dispersing a negative electrode mixture obtained by mixing the negative-electrode active material, the conductive aid, and the binder as necessary into a solvent, drying it (to remove the solvent), and pressing it as necessary. Such a solvent may include those used in the prior art without a particular limitation. For example, the solvent may include N-methyl-2-pyrrolidone, dimethylformamide, dimethylacetamide, water, or the like.

The negative electrode current collector includes, for example, a metal foil such as a copper foil, a nickel foil, and a stainless foil. The negative electrode current collector may have a surface coated with carbon or may be meshed. The thickness of the negative electrode current collector is preferably 5 to 40 μm, more preferably 6 to 35 μm, and furthermore preferably 7 to 30 μm.

<Separator>

The non-aqueous secondary battery 100 according to this embodiment preferably has a separator 170 between the positive electrode 150 and the negative electrode 160 in order to prevent short-circuiting between the positive electrode 150 and the negative electrode 160 or giving safety protection such as shutdown. The separator 170 may be those provided in a non-aqueous secondary battery known in the art without a limitation, and is preferably an insulating thin film having high ion permeability and a strong mechanical strength. The separator 170 may include, for example, a woven fabric, a non-woven fabric, a microporous membrane made from a synthetic resin, or the like. Among them, the microporous membrane made from a synthetic resin is preferable.

The microporous membrane made from a synthetic resin may include, for example, a microporous membrane containing polyethylene or polypropylene as a main component, or a polyolefin-based microporous membrane such as a microporous membrane containing both of these polyolefins. The nonwoven fabric may include, for example, a porous membrane formed of glass, ceramic, polyolefin, polyester, polyamide, liquid crystal polyester, and a heat-resistant resin such as aramid.

The separator 170 may be formed by stacking a single layer or a plurality of layers of one type of the microporous membrane or may be a stack of two or more microporous membranes. The separator 170 may be formed by stacking a mixed resin material obtained by melting and kneading two or more resin materials in a single layer or a plurality of layers.

<Battery Casing>

A configuration of the battery casing 110 of the non-aqueous secondary battery 100 according to this embodiment may include some battery casing components, such as a battery can and a laminate film package, but not limited thereto. The battery can may include a metal can such as a steel can or an aluminum can. The laminate film package may include, for example, a laminate film having a three-layered structure of hot-melting resin/metal film/resin.

The laminate film package may be used as a package by overlapping a pair of films while directing the hot-melting resin side inward or folding a pair of films to allow the hot-melting resin side to face inward, and thermally sealing both ends. In a case where the laminate film package is employed, the positive electrode lead body 130 (or a positive electrode terminal and a lead tap connected to the positive electrode terminal) may be connected to the positive electrode current collector, and the negative electrode lead body 140 (or a negative electrode terminal and a lead tap connected to the negative electrode terminal) may be connected to the negative electrode current collector. In this case, the laminate film package may be sealed while ends of the positive electrode lead body 130 and the negative electrode lead body 140 (or the positive electrode terminal and the lead tap connected to each negative electrode terminal) are exposed to the outside of the package.

<Method of Producing Non-Aqueous Electrolyte Solution>

The non-aqueous electrolyte solution according to this embodiment may be produced by mixing lithium salt, cyclic acid anhydride, and additives described in each embodiment with acetonitrile as a non-aqueous solvent using an arbitrary method. Note that the content of each additive is described in each embodiment.

<Method of Manufacturing Battery>

The non-aqueous secondary battery 100 according to this embodiment is manufactured by using the non-aqueous electrolyte solution described above, the positive electrode 150 having a positive-electrode active material layer formed on one side or both sides of the current collector, a negative electrode 160 having a negative-electrode active material layer formed on one side or both sides of the current collector, the battery casing 110, and the separator 170 as necessary on the basis of a method known in the art.

First, a stacking component including the positive electrode 150, the negative electrode 160, and the separator 170 as necessary is formed. For example, a winding structure stacking component may be formed by winding a stack of the long positive electrode 150 and the long negative electrode 160 while interposing a long separator between the positive electrode 150 and the negative electrode 160. A layered structure stacking component may be formed by alternately stacking positive electrode sheets and a negative electrode sheets obtained by cutting the positive electrode 150 and the negative electrode 160 to a plurality of sheets having constant areas and shapes while interposing separator sheets. A layered structure stacking component may be formed by folding a long separator in an overlapping manner and alternately inserting the positive electrode sheets and the negative electrode sheets between the separators.

Then, the stacking component described above is housed in the battery casing 110 (battery casing), and the electrolyte solution according to this embodiment is injected into the battery casing. In addition, the stacking component is impregnated into an electrolyte solution, and sealing is performed, so that the non-aqueous secondary battery according to this embodiment can be manufactured.

Alternatively, the non-aqueous secondary battery 100 may be manufactured in the following way. A gel type electrolyte membrane is prepared in advance by impregnating the electrolyte solution into a base material formed of polymer. A layered structure stacking component is formed using the sheet-like positive electrode 150, the sheet-like negative electrode 160, the electrolyte membrane, and the separator 170 as necessary. Then, the stacking component is housed in the battery casing 110.

The shape of the non-aqueous secondary battery 100 according to this embodiment may include, for example, a cylindrical shape, an elliptical shape, a square tube shape, a button shape, a coin shape, a flat shape, a laminate shape, or the like, without a particular limitation. In particular, according to this embodiment, the non-aqueous secondary battery 100 preferably has a laminate shape.

Note that, in a case where the electrode arrangement is designed such that an outer edge of the negative-electrode active material layer and an outer edge of the positive-electrode active material layer are overlapped with each other, or there is a portion where a width of the non-facing part of the negative-electrode active material layer is excessively small, a positional misalignment of the electrode may occur during assembly of the battery, so that the charging/discharging cycle characteristic of the non-aqueous secondary battery may be degraded. Therefore, in the electrode body used in the non-aqueous secondary battery, positions of the electrodes are preferably fixed in advance using a tape such as a polyimide tape, a polyphenylene sulfide tape, and a PP tape, an adhesive, or the like.

Although the non-aqueous secondary battery 100 according to this embodiment can function as a battery through initial charging, it is stabilized as a part of the electrolyte solution is decomposed during the initial charging. Although there is no particular limitation in the method of the initial charging, the initial charging is preferably performed to a capacity of 0.001 to 0.3 C, more preferably 0.002 to 0.25 C, and furthermore preferably 0.003 to 0.2 C. It is also preferable that the initial charging is performed at a constant voltage on the way. A constant current for discharging a design capacity within one hour is set to "1 C". By setting a voltage range in which lithium salt affects an electrochemical reaction to be long, it is possible to achieve an effect of suppressing an increase of internal resistance including the positive electrode 150 by forming the SEI on the electrode surface, and any type of excellent effects to the positive electrode 150, the separator 170, or the like other than the negative electrode 160, without strongly attaching a reaction product only to the negative electrode 160. For this reason, it is very effective to perform the initial charging in consideration of the electrochemical reaction of the lithium salt dissolved in the non-aqueous electrolyte solution.

The non-aqueous secondary battery 100 according to this embodiment may also be used as a cell pack by connecting a plurality of non-aqueous secondary batteries 100 in series or in parallel. From the viewpoint of management of the charging/discharging state of the cell pack, a working voltage range per non-aqueous secondary battery is preferably set to 2 to 5 V, more preferably 2.5 to 5 V, and furthermore preferably 2.75 to 5 V.

Next, preferable embodiments of the non-aqueous secondary battery will be described.

Thirty Fifth Embodiment: Non-Aqueous Secondary Battery

According to the thirty fifth embodiment, the non-aqueous secondary battery includes a positive electrode having a positive-electrode active material layer formed on one side or both sides of a current collector, a negative electrode having a negative-electrode active material layer formed on one side or both sides of a current collector, and a non-aqueous electrolyte solution. The non-aqueous secondary battery contains a compound containing at least one functional group selected from a group consisting of —N═, —NH$_4$, —N═O, —NH—NH—, and (NO$_3$)—. In addition, the non-aqueous secondary battery has a capacity retention rate of 70% or higher, where the capacity retention rate is calculated by dividing a 5 C discharge capacity by a 1 C discharge capacity after a storage test for 4 hours at 85° C.

According to the thirty fifth embodiment, as described above, the non-aqueous secondary battery contains a compound containing at least one functional group selected from a group consisting of —N═, —NH$_4$, —N═O, —NH—NH—, and (NO$_3$)—. As a result, it is possible to suppress an increase of internal resistance. Specifically, the non-aqueous secondary battery has a capacity retention rate of 70% or higher, where the capacity retention rate is calculated by dividing the 5 C discharge capacity by the 1 C discharge capacity. In this manner, using the non-aqueous secondary battery according to the thirty fifth embodiment, it is possible to obtain an excellent rate characteristic.

According to the thirty fifth embodiment, it is preferable that the non-aqueous electrolyte solution contains an N-containing compound, and the aging is performed at a voltage of 3.5 V or lower during initial charging. Before ionization of the transition metal derived from the positive-electrode active material, the compound containing at least one functional group selected from a group consisting of —N═, —NH$_4$, —N═O, —NH—NH—, and (NO$_3$)— protects the surface of the positive electrode. As a result, it is possible to suppress an increase of internal resistance over time caused by a thermal history.

According to the thirty fifth embodiment, the aging temperature is preferably set to 35° C. or higher and 60° C. or lower. By applying a thermal history at a temperature lower than 60° C., the protective film can inactivate the activation point of the positive electrode surface at an early stage and suppress an increase of internal resistance under a high temperature condition.

The non-aqueous secondary battery according to the thirty fifth embodiment includes a positive electrode having a positive-electrode active material layer formed on one side or both sides of a current collector, a negative electrode having a negative-electrode active material layer formed on one side or both sides of a current collector, and a non-aqueous electrolyte solution.

The non-aqueous electrolyte solution preferably contains acetonitrile, $LiPF_6$, or 1-methyl-1H-benzotriazole (MBTA). In addition, the non-aqueous secondary battery according to the thirty fifth embodiment is preferably formed by using the non-aqueous electrolyte solution according to any one of the first to thirty fourth embodiments. In this case, although there is no limitation in the negative electrode, the positive electrode, the separator, and the battery casing, the negative-electrode active material layer of the negative electrode preferably contains a material capable of absorbing lithium ions as a negative-electrode active material at an electric potential lower than 0.4 V vs. $Li/Li^+$. As a result, it is possible to increase the battery voltage, and this advantageously affects reinforcement of the negative electrode SEI.

The thirty fifth embodiment is preferably applicable to a power tool requiring a high rate characteristic with high performance and high output power.

Thirty Sixth Embodiment: Non-Aqueous Secondary Battery

According to the thirty sixth embodiment, the non-aqueous secondary battery includes a positive electrode having a positive-electrode active material layer formed on one side or both sides of a current collector, a negative electrode having a negative-electrode active material layer formed on one side or both sides of a current collector, and a non-aqueous electrolyte solution. The non-aqueous secondary battery contains at least one compound selected from a group consisting of organic acid, salt thereof, acid anhydride, and $Li_2O$. In this case, the organic acid includes at least one selected from a group consisting of acetic acid, oxalic acid, and formic acid. In addition, the non-aqueous secondary battery has a capacity retention rate of 70% or higher, where the capacity retention rate is calculated by dividing a 5 C discharge capacity by a 1 C discharge capacity after performing a storage test for 4 hours at a temperature of 85° C.

If the non-aqueous secondary battery is applied to a power tool requiring a high rate characteristic with high performance and high output power, the rate characteristic is reduced as a service time increases because a thermal history of the electrolyte solution is inevitable in this application. In view of such a problem, the invention of the thirty sixth embodiment has been achieved.

According to the thirty sixth embodiment, it is possible to suppress an increase of internal resistance and resist to the thermal history by controlling an aging condition during initial charging.

According to the thirty sixth embodiment, the non-aqueous electrolyte solution contains cyclic acid anhydride, and aging is performed at a voltage of 3.5 V or lower during initial charging. According to thirty sixth embodiment, the negative electrode SEI film contains at least one compound selected from a group consisting of organic acid (such as acetic acid, oxalic acid, and formic acid), salt thereof, acid anhydride, and $Li_2O$. Therefore, it is possible to suppress an increase of internal resistance over time caused by a thermal history.

According to the thirty sixth embodiment, the aging temperature is preferably set to 35° C. or higher and 60° C. or lower. As a result, it is possible to appropriately suppress thermal decomposition of $LiPF_6$ that may occur at a temperature of 60° C. or higher.

The non-aqueous electrolyte solution according to the thirty sixth embodiment preferably contains acetonitrile, $LiPF_6$, and phthalic anhydride. In addition, the non-aqueous secondary battery according to the thirty sixth embodiment is preferably formed by using the non-aqueous electrolyte solution according to any one of the first to thirty fourth embodiments. In this case, although there is no particular limitation in the negative electrode, the positive electrode, the separator, and the battery casing, the negative-electrode active material layer of the negative electrode preferably contains a material capable of absorbing lithium ions as a negative-electrode active material at an electric potential lower than 0.4 V vs. $Li/Li^+$. As a result, it is possible to increase the battery voltage, and this advantageously affects reinforcement of the negative electrode SEI.

The thirty sixth embodiment is preferably applicable to a power tool requiring a high rate characteristic with high performance and high output power.

Thirty Seventh Embodiment: Non-Aqueous Secondary Battery

According to the thirty seventh embodiment, the non-aqueous secondary battery includes a positive electrode having a positive-electrode active material layer formed on one side or both sides of a current collector, a negative-electrode having a negative-electrode active material layer formed on one side or both sides of a current collector, and a non-aqueous electrolyte solution. The non-aqueous secondary battery contains a compound containing at least one functional group selected from a group consisting of —N=, —$NH_4$, —N=O, —NH—NH—, and ($NO_3$)—.

A 0° C. ionic conductivity of the non-aqueous secondary battery after a storage test for 4 hours at 85° C. is 10 mS/cm or higher.

In this manner, in the non-aqueous secondary battery according to the thirty seventh embodiment, it is possible to increase the 0° C. ionic conductivity measured by exposing the battery to a heat of 85° C. while being charged with 4.2 V and then decreasing the temperature to 0° C., compared to the prior art. In this manner, it is possible to increase resistance to the thermal history. Therefore, it is possible to maintain a high ionic conductivity even when the battery is carried from a high-temperature environment to a low temperature environment. Therefore, even when the battery is used in an application where the thermal history is severe, it is possible to achieve excellent low-temperature characteristics. According to this embodiment, it is possible to operate the battery even at a temperature lower than a limitation temperature of the operation range of the existing electrolyte solution.

According to the thirty seventh embodiment, it is possible to suppress a decomposition product of the nitrogen-containing compound by defining a mixing sequence of the non-aqueous electrolyte solution. The non-aqueous electrolyte solution effectively functions as a protection film formation agent of the positive electrode.

According to the thirty seventh embodiment, a non-aqueous electrolyte solution containing acetonitrile and nitrogen-containing compound is employed. As a result, it is possible to appropriately form a positive electrode protection film and suppress generation HF that causes an increase of internal resistance.

According to the thirty seventh embodiment, a temperature increase at the time of adding the nitrogen-containing compound is preferably suppressed to 50° C. or lower. As a result, it is possible to appropriately suppress thermal decomposition of the nitrogen-containing compound that may be generated at a temperature of 60° C. or higher.

The non-aqueous electrolyte solution according to the thirty seventh embodiment preferably contains acetonitrile, $LiPF_6$, and 1-methyl-1H-benzotriazole (MBTA). In addition, the non-aqueous electrolyte solution according to any one of the first to thirty fourth embodiments is preferably used as the non-aqueous secondary battery according to the thirty seventh embodiment. In this case, there is no particular limitation in the negative electrode, the positive electrode, the separator, and the battery casing.

The non-aqueous secondary battery according to the thirty seventh embodiment is suitable for use as an in-vehicle storage battery compatible with a cold region.

Thirty Eighth Embodiment: Non-Aqueous Secondary Battery

According to the thirty eighth embodiment, the non-aqueous secondary battery includes a positive electrode having a positive-electrode active material layer formed on one side or both sides of a current collector, a negative electrode having a negative-electrode active material layer formed on one side or both sides of a current collector, and a non-aqueous electrolyte solution. The non-aqueous secondary battery contains at least one compound selected from a group consisting of organic acid, salt thereof, acid anhydride, and $Li_2O$. In addition, the organic acid includes at least one selected from a group consisting of acetic acid, oxalic acid, and formic acid. In addition, the non-aqueous secondary battery has a 0° C. ionic conductivity of 10 mS/cm or higher after performing a storage test for 4 hours at a temperature of 85° C.

The low-temperature characteristic of the non-aqueous secondary battery is disadvantageously degraded as a service time increases in an application where a thermal history of the non-aqueous electrolyte solution is inevitable.

According to the thirty eighth embodiment, it is preferable to determine a mixing sequence of the non-aqueous electrolyte solution. As a result, it is possible to suppress a decomposition product of $LiPF_6$ and improve resistance to the thermal history. According to the thirty eighth embodiment, it is preferable to obtain the non-aqueous electrolyte solution by adding acetonitrile and cyclic acid anhydride and then adding $LiPF_6$. As a result, it is possible to suppress an abrupt temperature increase when adding $LiPF_6$ and suppress generation of HF that may increase the internal resistance due to a sacrificial reaction of the cyclic acid anhydride.

According to the thirty eighth embodiment, it is preferable to suppress a temperature increase caused by adding $LiPF_6$ to 50° C. or lower. As a result, it is possible to suppress thermal decomposition of $LiPF_6$ that may occur at a temperature of 60° C. or higher.

The non-aqueous electrolyte solution according to the thirty eighth embodiment preferably contains acetonitrile, $LiPF_6$, and phthalic anhydride. In addition, the non-aqueous electrolyte solution according to any one of the first to thirty fourth embodiments is preferably employed in the non-aqueous secondary battery according to the thirty eighth embodiment. In this case, there is no particular limitation in the negative electrode, the positive electrode, the separator, and the battery casing.

The non-aqueous secondary battery according to the thirty eighth embodiment is preferably applicable to an in-vehicle battery.

Thirty Ninth Embodiment: Non-aqueous Secondary Battery

According to the thirty ninth embodiment, in the non-aqueous secondary battery of any one of the thirty fifth to thirty eighth embodiments, the positive-electrode active material preferably contains a lithium-containing composite metal oxide expressed as "$LiMO_2$" where "M" contains Ni and at least one metal element selected from a group consisting of Mn, Co, Al, and Mg, the content of Ni is more than 50%, and "z" denotes a number greater than 0.9 and less than 1.2, from the viewpoint of increasing the energy density of the non-aqueous secondary battery.

Fortieth Embodiment: Non-Aqueous Secondary Battery

According to the fortieth embodiment, in the non-aqueous secondary battery of any one of the thirty fifth to thirty ninth embodiments, an electric potential difference of the negative electrode around injection of the non-aqueous electrolyte solution is preferably 0.3 V or higher.

According to the fortieth embodiment, the invention has been made in view of a fact that a metal having a high standard electrode potential is eluted, and safety is degraded if the battery is stored for a long time without performing a charging/discharging test after injection of the electrolyte solution. Here, the standard electrodepotential is an electric potential expressed with respect to an electric potential (0 V) of a standard hydrogen electrode.

According to the fortieth embodiment, a non-aqueous electrolyte solution containing acetonitrile and lithium salt is employed as the non-aqueous electrolyte solution. According to the fortieth embodiment, the negative electrode electric potential of the battery after liquid injection can be lowered to the vicinity of 2.6 V vs. $Li/Li^+$. As a result, it is possible to avoid an electric potential at which the copper current collector is eluted. In the non-aqueous secondary battery known in the prior art, no electric potential difference is generated as long as electricity does not flow. However, in the non-aqueous secondary battery according to this embodiment, an electric potential difference is generated after liquid injection even before electricity conduction, which is very unique characteristics. This electric potential difference is presumed as a spontaneous lithium ion insertion reaction to the negative electrode caused by a high ionic conductivity, and is expected to contribute to formation of a dense SEI.

According to the fortieth embodiment, the negative electrode contains at least one of metals having a standard electrodepotential of 0 V or higher. Since the negative electrode using the existing carbonate electrolyte solution has an electric potential close to 3.1 V vs. $Li/Li^+$ after liquid injection, elution of a metal element having a high standard electrode potential gradually proceeds as it is stored for a long time. Meanwhile, the electrolyte solution using acetonitrile does not cause elution even when it is stored for a long time after liquid injection. Therefore, it is possible to extend a manufacturing control period including the impregnation time.

According to the fortieth embodiment, the negative electrode current collector is preferably formed of copper. As a result, it is possible to suppress elution of copper without generating a charging/discharging history.

In the non-aqueous secondary battery according to the fortieth embodiment, the non-aqueous electrolyte solution of any one of the first to thirty fourth embodiments is preferably employed.

Forty First Embodiment: Non-Aqueous Secondary Battery

According to the forty first embodiment, in the non-aqueous secondary battery of any one of the thirty fifth to fortieth embodiments, a gas generation amount in a storage test for 200 hours at 60° C. is preferably 0.008 ml or smaller per 1 mAh.

In the non-aqueous electrolyte solution containing acetonitrile and $LiPF_6$, acetonitrile and $LiPF_6$ react with each other at a high temperature and are violently decomposed, so that the internal resistance increase rate significantly increases. According to the forty first embodiment, it is preferable to contain acetonitrile, acetic acid, and cyclic acid anhydride. As a result, acetic acid and the cyclic acid anhydride function as reduction resistance, and acetonitrile is reductively decomposed, so that it is possible to suppress gas generation.

According to the forty first embodiment, the non-aqueous secondary battery is preferably a pouch type non-aqueous secondary battery containing acetonitrile, acetic acid, and cyclic acid anhydride. Due to the acetic acid and the cyclic acid anhydride, the SEI is formed on the surface of the negative electrode, and it is possible to appropriately suppress reduction of acetonitrile from being promoted at a high temperature.

According to the forty first embodiment, the content of acetic acid is preferably set to 0.1 ppm or more and 5 ppm or less with respect to the non-aqueous electrolyte solution. As a result, it is possible to more effectively set the gas generation amount in the storage test for 200 hours at 60° C. to 0.008 ml or less per 1 mAh.

The non-aqueous electrolyte solution according to the forty first embodiment preferably contains acetonitrile and phthalic anhydride. In addition, the non-aqueous electrolyte solution of any one of the first to thirty fourth embodiments is preferably employed in the non-aqueous secondary battery according to the forty first embodiment. In this case, there is no particular limitation in the negative electrode, the positive electrode, the separator, and the battery casing.

Forty Second Embodiment: Non-Aqueous Secondary Battery

According to the forty second embodiment, in the non-aqueous electrolyte battery of any one of the thirty fifth to forty first embodiments, a resistance increase rate in a full-charge storage test for 720 hours at 60° C. is preferably 400% or lower.

According to the forty second embodiment, the invention has been achieved in view of a problem that, in the non-aqueous electrolyte solution containing acetonitrile and $LiPF_6$, acetonitrile and $LiPF_6$ react and are violently decomposed at a high temperature, and a resistance increase rate of the internal resistance significantly increases.

The forty second embodiment is suitable for a storage battery using the non-aqueous secondary battery containing acetonitrile, compatible with a cold region. According to the forty second embodiment, it is possible to suppress an increase of internal resistance during high-temperature heating and obtain excellent low-temperature characteristics.

According to the forty second embodiment, imide salt is preferably contained in a molarity relationship of "$LiPF_6 \leq$ imide salt". Here, $LiPO_2F_2$ and cyclic acid anhydride suppresses an increase of internal resistance during high-temperature heating. In addition, the imide salt improves the low-temperature characteristics. According to the forty second embodiment, it is possible to suppress a decrease of the low-temperature ionic conductivity and obtain excellent low-temperature characteristics.

According to the forty second embodiment, a non-aqueous electrolyte solution containing acetonitrile and at least one selected from a group consisting of succinic anhydride, maleic anhydride, and phthalic anhydride is preferably employed. As a result, it is possible to suppress an increase of internal resistance during high-temperature heating and obtain excellent low-temperature characteristics.

The non-aqueous electrolyte solution according to the forty second embodiment preferably contains acetonitrile, $LiPF_6$, and succinic anhydride. In addition, the non-aqueous electrolyte solution of any one of the first to thirty fourth embodiments is preferably employed in the non-aqueous secondary battery according to the forty second embodiment. In this case, there is no particular limitation in the negative electrode, the positive electrode, the separator, and the battery casing.

Forty Third Embodiment: Cell Pack

A cell pack according to the forty third embodiment has the non-aqueous secondary battery of any one of the thirty fifth to forty second embodiments.

The non-aqueous secondary battery of any one of the thirty fifth to forty second embodiments has a positive-electrode active material layer containing a lithium-containing compound containing Fe. In addition, the negative-electrode active material layer contains graphite or at least one element selected from a group consisting of Ti, V, Sn, Cr, Mn, Fe, Co, Ni, Zn, Al, Si, and B.

The non-aqueous electrolyte solution contains cyclic carbonate without saturated secondary carbon, and the cyclic carbonate without saturated secondary carbon includes at least one selected from a group consisting of ethylene carbonate and vinylene carbonate.

According to the forty third embodiment, the non-aqueous secondary battery is configured by connecting one module or two or more modules, in which the module is obtained by connecting four cells in series, in parallel or the non-aqueous secondary battery is configured by connecting four modules, in which the module is obtained by connecting two or more cells in parallel, in series. In addition, an operation voltage range per cell is within a range of 1.8 to 3.7 V, and an average operation voltage is set to 2.5 to 3.5 V. In addition, each module is mounted with a battery management system (BMS) for diagnosing a battery charge state or an operation state. Here, the module is configured by connecting a plurality of cells, and the cell pack is configured by connecting a plurality of modules. However, the cell pack is a terminology including the module. Furthermore, the average operation voltage refers to a voltage when a percentage of the charged electricity amount relative to an electric capacity (state of charge: SOC) is at 50%.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. Li/Li$^+$) or higher has been used. However, according to the forty third embodiment, since the electrolyte solution containing ethylene carbonate or vinylene carbonate and the positive electrode of iron phosphate lithium (LiFePO$_4$:LFP) or the negative electrode of graphite are employed, it is possible to improve a cycle life at a high temperature. The LFP has excellent high-temperature characteristics, compared to other positive electrode materials such as lithium cobaltate (LiCoO$_2$: LCO) or a ternary system positive electrode material (Li(Ni/Co/Mn)O$_2$: NCM). In addition, in a case where an electrolyte solution containing acetonitrile as a main solvent is employed as the lithium ion battery, reductive decomposition proceeds at the negative electrode electric potential of graphite. Therefore, a negative electrode capable of absorbing lithium ions at 0.4 V (vs Li/Li$^+$) or higher is employed. In addition, ethylene carbonate or vinylene carbonate is reductively decomposed on the graphite negative electrode, so as to form a film having excellent high-temperature durability.

According to the forty third embodiment, since the operation voltage range per cell is set within the range of 1.8 to 3.7 V, it is possible to substitute an existing four-series 12V lead acid battery. Since a specification of an electric system is defined on the basis of the operation voltage range of the lead acid battery, it is very important to determine the operation voltage range per cell. For this reason, it is preferable to mount the BMS for appropriately managing the voltage.

According to the forty third embodiment, the cell preferably contains a non-aqueous electrolyte solution having an −30° C. ionic conductivity of 3 mS/cm or higher. As a result, it is possible to obtain both the high-temperature durability and the low-temperature performance.

The cell pack according to the forty third embodiment is suitable for a mobile entity application or a stationary application. The mobile entity application includes a hybrid electric vehicle (HEV), a fork lift, a golf cart, an e-motorcycle, an automated guided vehicle (AGV), a train, a ship, or the like. In addition, the stationary application includes an uninterruptible power supply (UPS) device, an emergency power system, or an energy storage system.

Forty Fourth Embodiment: Hybrid Power System

A hybrid power system according to the forty fourth embodiment includes the cell pack of the forty third embodiment, and a module having a secondary battery other than the lithium ion battery or a cell pack in combination.

A power system is configured by connecting a module and a second secondary battery in parallel, so that energy generated in braking of a traveling vehicle can be efficiently used as regenerative energy by supplementing a lithium ion battery (LIB) capable of receiving a large current with the current flowing through the battery that is not capable of receiving a large current in the event of charging caused by braking of vehicle deceleration or the like.

The second secondary battery may include, for example, a lead acid battery, a nickel hydrogen battery, a Ni—Cd battery, an electric double layer capacitor (EDLC), a lithium ion capacitor (LIC), or the like. In addition, the second secondary battery may include a next-generation battery or an innovation battery such as an all-solid battery, a lithium-sulfur battery, a lithium-air battery, a sodium ion battery, a multivalent ion battery based on magnesium ions or calcium ions, or the like. Note that the secondary battery other than the lithium ion battery according to this embodiment is not limited thereto.

This embodiment may also be applied to a power system combined with a generative energy device such as a fuel cell or a solar cell.

According to the forty fourth embodiment, the hybrid power system is preferably a combinational hybrid power system in which the LIB module of the forty third embodiment and the secondary battery other than the lead acid battery are combined. Here, the module is formed by connecting a plurality of cells, and the cell pack is formed by connecting a plurality of modules. However, the cell pack is a terminology including the module. In the LIB of the prior art, an organic solvent is used in the electrolyte solution. Therefore, viscosity of the electrolyte solution increases at a low temperature, and the internal resistance significantly increases. As a result, the low-temperature output power of the LIB is reduced, compared to the lead acid battery. Meanwhile, the lead acid battery has low output power at 25° C. but has high output power at −10° C.

In this regard, according to the forty fourth embodiment, a 12V vehicle power system is configured by connecting the LIB module to the secondary battery other than the lead acid battery in parallel, and a large current is supplemented to the LIB module of the forty third embodiment capable of receiving a large current in the event of charging caused by braking of vehicle deceleration or the like. As a result, it is possible to efficiently use energy generated in the event of braking of a traveling vehicle such as an automobile as regenerative energy.

According to the forty fourth embodiment, iron phosphate lithium (LiFePO$_4$) is used as the positive-electrode active material of the LIB, and graphite is used as the negative-electrode active material, so that the electrolyte solution preferably has a 20° C. ionic conductivity of 18 mS/cm or higher. Since iron phosphate lithium has a lower electron conductivity, compared to NCM or LCO, it has a problem in charging/discharging. For this reason, its advantage may be degraded when it is combined with a secondary battery other than the LIB. In this regard, by using an electrolyte solution having a high ionic conductivity, it is possible to cope with a wide temperature range from a low temperature to a high temperature in the large-current charging/discharging. Therefore, it is possible to extend a service life.

Forty Fifth Embodiment: Cell Pack

A cell pack according to the forty fifth embodiment has the non-aqueous secondary battery of any one of the thirty fifth to forty second embodiments.

The non-aqueous secondary battery of any one of the thirty fifth to forty second embodiments has a positive-electrode active material layer containing a lithium-containing compound containing Fe. In addition, the negative-electrode active material layer contains graphite or at least one element selected from a group consisting of Ti, V, Sn, Cr, Mn, Fe, Co, Ni, Zn, Al, Si, and B.

The non-aqueous electrolyte solution contains cyclic carbonate without saturated secondary carbon, and the cyclic carbonate without saturated secondary carbon includes at least one selected from a group consisting of ethylene carbonate and vinylene carbonate.

The non-aqueous secondary battery is configured by a single cell pack or by connecting two or more cell packs in parallel on the basis of the following formulas (2) and (3) that define the number of cells and the number of modules of the non-aqueous secondary battery. Alternatively, the cell pack is configured by connecting modules in which two or more cells are connected in parallel, on the basis of the following formulas (2) and (3).

Number of cells connected in series per module ($X$):
$X=2,4,8$, or 16    Formula (2)

Number of modules connected in series per cell pack ($Y$): $Y=16/X$    Formula (3)

The operation voltage range per cell is within a range of 1.8 to 3.7 V, the average operation voltage is 2.5 to 3.5 V, and the module is mounted with the BMS. Here, the average operation voltage refers to a voltage when a percentage of the charged electricity amount relative to an electric capacity (state of charge: SOC) is at 50%.

The LFP has a poor electron conductivity and low current emission and acceptance performance, compared to NCM or LCO. Since the in-vehicle battery has an electronic device requiring a large current, the LFP is difficult to apply disadvantageously. However, according to the forty fifth embodiment, since the electrolyte solution containing ethylene carbonate or vinylene carbonate, the LFP positive electrode, and/or the graphite negative electrode are employed, it is possible to improve a cycle life at a high temperature. The LFP has excellent high-temperature characteristics, compared to the positive electrode material such as NCM or LCO. In addition, ethylene carbonate or vinylene carbonate is reductively decomposed on the graphite negative electrode, so as to form a film having excellent high-temperature durability.

According to this embodiment, the operation voltage range per cell is preferably within a range of 1.8 to 3.7 V, and the average operation voltage is preferably 2.5 to 3.5 V. In addition, the cell pack is preferably configured by connecting one or more modules in parallel, in which the BMS is mounted on a module or a system and connected in series. Alternatively, in the non-aqueous secondary battery of any one of the thirty fifth to forty second embodiments, the cell pack is preferably configured by forming a single module by connecting two or more cells and connecting fourteen to sixteen modules in series. In this manner, by setting the operation voltage range per cell within the range of 1.8 to 3.7 V, the non-aqueous secondary battery can be connected to electric equipment complying with a 48V power standard LV148 (defined in 2011) by connecting sixteen modules in series.

According to the forty fifth embodiment, the cell preferably includes an electrolyte solution containing acetonitrile as a solvent, a separator having high porosity, a member obtained by coating a surface of the positive-electrode active material particle with carbon, a positive electrode mixture layer containing a conductive aid of 5 mass % or more, and a member obtained by coating a surface of a positive electrode charge collecting foil with carbon. In this manner, for the ionic conduction portion, acetonitrile having a high ionic conductivity is added to the electrolyte solution, and a nonwoven fabric having high porosity is used. In addition, for the electron movement portion, a conduction path from the charge collecting foil to a gap between particles is improved using each member. As a result, it is possible to achieve high output power performance.

The cell pack according to the forty fifth embodiment is suitable of a mobile entity application or a stationary application. The mobile entity application includes a hybrid electric vehicle (HEV), a fork lift, a golf cart, an e-motorcycle, an automated guided vehicle (AGV), a train, a ship, or the like. In addition, the stationary application includes an uninterruptible power supply (UPS) device, an emergency power system, or an energy storage system.

Forty Sixth Embodiment: Hybrid Power System

A hybrid power system according to the forty sixth embodiment includes the cell pack of the forty fifth embodiment, and a module or a cell pack having a secondary battery other than the lithium ion battery in combination.

As a result, a 48V power system and a 12V power system are provided in combination, so that, even when one of them is shut down, the other system can supplement it. For example, the 48V power system complies with the European battery standard, and the 12V power system complies with the worldwide common standard.

According to the forty sixth embodiment, it is preferable that the LIB module of the forty fifth embodiment and a lead acid battery are combined as a combinational system. As a result, the 48V power system corresponds to the LIB, and the 12V power system corresponds to the battery other than LIB, so that it is possible to obtain a power system having excellent balance between the energy density and the system cost.

According to the forty sixth embodiment, it is preferable that the positive-electrode active material of the LIB is iron phosphate lithium (LiFePO$_4$), the negative-electrode active material of the LIB is graphite, and the electrolyte solution has an 20° C. ionic conductivity of 15 mS/cm or higher. Since the iron phosphate lithium has a lower electron conductivity, compared to NCM or LCO, there may be a problem in charging/discharging, and advantages may be degraded when it is combined with the lead acid battery. Therefore, by using the electrolyte solution having a high ionic conductivity, it is possible to cope with large-current charging/discharging of the lead acid battery in the vicinity of the room temperature and extend the service life until replacement of the battery.

While embodiments of the invention have been described hereinbefore, the invention is not limited by the aforementioned embodiments. Various changes or modifications may be possible without departing from the spirit and scope of the invention.

EXAMPLES

Note that, in the following examples and comparative examples, Lithium Battery Grade produced by Kishida Chemical Co., Ltd. was employed as acetonitrile.

First, examples of the first to tenth embodiments will now be described.

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:−5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on one surface of a copper foil having a thickness of 10 μm and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, a polyethylene microporous membrane punched in a disk shape having a diameter of 19 mm was set thereon, and an electrolyte solution was injected by 100 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging post-treatment was performed in a respective sequence described in the examples and the comparative examples. Then, each battery was evaluated in the sequence of the chapters (2-1) and (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) 85° C. Full-Charge Storage Test for Coin Type Non-Aqueous Secondary Battery The battery subjected to the initial charging/discharging treatment (aging treatment of the initial discharging will be described in each example or comparative example) was charged with a constant current of 3 mA corresponding to "1 C" to a voltage of 4.2 V by setting the battery ambient temperature to 25° C., and was then charged with a constant voltage of 4.2 V for a total of 3 hours. Then, this non-aqueous secondary battery was stored in a thermostatic oven at a temperature of 85° C. for 4 hours. Then, the battery ambient temperature was recovered to 25° C.

(2-2) Output Power Test for Coin Type Non-Aqueous Secondary Battery

The battery subjected to the 85° C. full-charge storage test as described in the chapter (2-1) was charged with a constant current of 3 mA corresponding to "1 C" to a voltage of 4.2 V by setting the battery ambient temperature to 25° C., and was then charged with a constant voltage of 4.2 V for a total of 3 hours. Then, the battery was discharged with a current value of 3 mA corresponding to "1 C" to a voltage of 3.0 V. Then, the charging/discharging was performed as described above by changing the current value for the constant current discharging to 15 mA corresponding to "5 C", and the following capacity retention rate was calculated.

Capacity retention rate=(capacity for "5 C" discharge/capacity for "1 C" discharge)×100[%]

Example 1

Acetonitrile (AcN), diethyl carbonate (DEC), ethylene carbonate (EC), and vinylene carbonate (VC) were mixed under an inert atmosphere at a volume ratio of "45:35:16:4" to obtain a mixed solvent. In addition, succinic anhydride (cyclic acid anhydride) was dissolved in this mixed solvent finally up to 0.15 mass % as an electrolyte solution. Then, lithium hexafluorophosphate (LiPF$_6$) of 0.3 mol and lithium bis(fluorosulfonyl) imide (LiN(SO$_2$F)$_2$) of 1.3 mol were added per 1 L of the mixed solvent, so that an electrolyte solution of Example 1 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 2.8 V with a constant current of 0.3 mA corresponding to "0.1 C" by setting the battery ambient temperature to 25° C., and was then charged with a constant voltage of 2.8 V for 1.5 hours. Then, the battery was stored for 6 hours by setting the ambient temperature to 55° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 2

Acetonitrile (AcN), ethyl methyl carbonate (EMC), ethylene carbonate (EC), and vinylene carbonate (VC) were mixed under an inert atmosphere at a volume ratio of "45:35:16:4" to obtain a mixed solvent. In addition, succinic anhydride (cyclic acid anhydride) was dissolved in this mixed solvent finally up to 0.3 mass % as an electrolyte solution. Then, lithium hexafluorophosphate (LiPF$_6$) of 1.3 mol was added per 1 L of the mixed solvent, so that an electrolyte solution of Example 2 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 2.8 V with a constant current of 0.3 mA corresponding to "0.1 C" by setting the battery ambient temperature to 25° C. and was then charged with a constant voltage of 2.8 V for 1.5 hours. Then, the battery was stored for 72 hours by setting the ambient temperature to 45° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 3

Acetonitrile (AcN), ethyl methyl carbonate (EMC), ethylene carbonate (EC), and vinylene carbonate (VC) were mixed under an inert atmosphere at a volume ratio of "35:40:21:4" to obtain a mixed solvent. In addition, maleic anhydride (cyclic acid anhydride) was dissolved in this mixed solvent finally up to 0.15 mass % as an electrolyte solution. Then, lithium hexafluorophosphate (LiPF$_6$) of 1.2 mol was added per 1 L of the mixed solvent, so that an electrolyte solution of Example 3 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 3.0 V with a constant current of 0.3 mA corresponding to "0.1 C" by setting the battery ambient temperature to 25° C. and was then charged with a constant voltage of 3.0 V for 1.5 hours. Then, the battery was stored for 6 hours by setting the ambient temperature to 55° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 4

Acetonitrile (AcN), dimethyl carbonate (DMC), ethylene carbonate (EC), and vinylene carbonate (VC) were mixed under an inert atmosphere at a volume ratio of "57:14:22:7" to obtain a mixed solvent. In addition, phthalic anhydride (cyclic acid anhydride) was dissolved in this mixed solvent finally up to 0.5 mass % as an electrolyte solution. Then, lithium hexafluorophosphate (LiPF$_6$) of 0.6 mol and lithium bis (trifluoromethane sulfonyl) imide (LiN(SO$_2$CF$_3$)$_2$) of 0.6 mol were added per 1 L of the mixed solvent, so that an electrolyte solution of Example 4 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 3.0 V with a constant current of 0.3 mA corresponding to "0.1 C" by setting the battery ambient temperature to 25° C. and was then charged with a constant voltage of 3.0 V for 1.5 hours. Then, the battery was stored for 6 hours by setting the ambient temperature to 60° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Comparative Example 1

Acetonitrile (AcN), diethyl carbonate (DEC), and vinylene carbonate (VC) were mixed under an inert atmosphere at a volume ratio of "47:42:11". In addition, lithium hexafluorophosphate (LiPF$_6$) of 1.3 mol was added per 1 L of the mixed liquid so as to obtain an electrolyte solution of Comparative Example 1. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 4.2 V with a constant current of 0.3 mA corresponding to "0.1 C" by setting the battery ambient temperature to 25° C. and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2). In Comparative Example 1, the aging treatment of initial charging was not performed.

Comparative Example 2

Acetonitrile (AcN), diethyl carbonate (DEC), and vinylene carbonate (VC) were mixed under an inert atmosphere at a volume ratio of "47:49:4". In addition, lithium hexafluorophosphate (LiPF$_6$) of 0.3 mol and lithium bis (fluorosulfonyl) imide (LiN(SO$_2$F)$_2$) of 1.0 mol were added per 1 L of the mixed liquid so as to obtain an electrolyte solution of Comparative Example 2. For the obtained electrolyte solution, it was visually inspected that all of the lithium salts are dissolved. A battery was manufactured using this electrolyte solution on the basis of the method described above in the chapter (1-3), and the initial charging/discharging treatment was then performed. The battery was charged to a voltage of 2.8 V with a constant current of 0.3 mA corresponding to "0.1 C" by setting the battery ambient temperature to 25° C. and was then charged with a constant voltage of 2.8 V for 1.5 hours. Then, the battery was stored for 72 hours by setting the ambient temperature to 25° C. and was placed for 3 hours by setting battery ambient temperature to 25° C. as it is. Then, the battery was charged to a voltage of 4.2 V with a constant current of 0.3 mA corresponding to "0.1 C" and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Comparative Example 3

Acetonitrile (AcN), diethyl carbonate (DEC), and vinylene carbonate (VC) were mixed under an inert atmosphere at a volume ratio of "47:49:4" to obtain a mixed solvent. Then, lithium hexafluorophosphate (LiPF$_6$) of 0.3 mol and lithium bis (trifluoromethanesulfonyl) imide (LiN(SO$_2$CF$_3$)$_2$) of 1.0 mol were added per 1 L of the mixed liquid so as to obtain an electrolyte solution of Comparative Example 3. For the obtained electrolyte solution, it was visually inspected that all of the lithium salts are dissolved. A battery was manufactured using this electrolyte solution on the basis of the method described above in the chapter (1-3), and initial charging/discharging treatment was performed. The battery was charged to a voltage of 4.2 V with a constant current of 0.3 mA corresponding to "0.1 C" by setting the battery ambient temperature to 25° C. and was then charged with a constant voltage of 4.2 V for a total of 1.5 hours. Then, the battery was stored for 24 hours by setting the ambient temperature to 85° C. and was placed for 3 hours for cooling by setting battery ambient temperature to 25° C. Then, the battery was charged to a voltage of 4.2 V with a constant current of 0.3 mA corresponding to "0.1 C" and was then charged with a constant voltage of 4.2 V for 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

The following Table 1 shows compositions of each non-aqueous electrolyte solution of Examples 1 to 4 and Comparative Examples 1 to 3.

TABLE 1

| | Solvent | | | | | | Lithium salt | | | Additive | Linear carbonate/ |
|---|---|---|---|---|---|---|---|---|---|---|---|
| | AcN (vol %) | DEC (vol %) | DMC (vol %) | EMC (vol %) | EC (vol %) | VC (vol %) | LiPF$_6$ (mol/1 L solvent) | LiN(SO$_2$F)$_2$ (mol/1 L solvent) | LiN(SO$_2$CF$_3$)$_2$ (mol/1 L solvent) | Cyclic acid anhydride (mass %) | AcN (molar ratio) |
| Example 1 | 45 | 35 | 0 | 0 | 16 | 4 | 0.3 | 1.3 | — | SAH 0.15 | 0.34 |
| Example 2 | 45 | 0 | 0 | 35 | 16 | 4 | 1.3 | — | — | SAH 0.3 | 0.40 |
| Example 3 | 35 | 0 | 0 | 40 | 21 | 4 | 1.2 | — | — | MAH 0.15 | 0.58 |
| Example 4 | 57 | 0 | 14 | 0 | 22 | 7 | 0.6 | — | 0.6 | PAH 0.5 | 0.15 |
| Comparative Example 1 | 47 | 42 | 0 | 0 | 0 | 11 | 1.3 | — | — | — | 0.39 |
| Comparative Example 2 | 47 | 49 | 0 | 0 | 0 | 4 | 0.3 | 1.0 | — | — | 0.45 |
| Comparative Example 3 | 47 | 49 | 0 | 0 | 0 | 4 | 0.3 | — | 1.0 | — | 0.45 |

The following Table 2 shows aging conditions of Examples 1 to 4 and Comparative Examples 1 to 3.

TABLE 2

| | Aging voltage [V] | Aging temperature [° C.] | Aging time h |
|---|---|---|---|
| Example 1 | 2.8 | 55 | 6.0 |
| Example 2 | 2.8 | 45 | 72.0 |
| Example 3 | 3.0 | 55 | 6.0 |
| Example 4 | 3.0 | 60 | 6.0 |
| Comparative Example 1 | — | — | — |
| Comparative Example 2 | 2.8 | 25 | 72.0 |
| Comparative Example 3 | 4.2 | 85 | 24.0 |

The following Table 3 shows capacity retention rates after storing the battery for 4 hours at 85° C. in Examples 1 to 4 and Comparative Examples 1 to 3. The capacity retention rates are calculated by dividing the 5 C discharge capacity by the 1 C discharge capacity.

TABLE 3

| | Capacity retention rate in preservation/output power test at 85° C. for 4 h (%) |
|---|---|
| Example 1 | 78 |
| Example 2 | 75 |
| Example 3 | 74 |
| Example 4 | 76 |

TABLE 3-continued

| | Capacity retention rate in preservation/output power test at 85° C. for 4 h (%) |
|---|---|
| Comparative Example 1 | 0 (short-circuit) |
| Comparative Example 2 | 0 (short-circuit) |
| Comparative Example 3 | 0 (short-circuit) |

As shown in the aforementioned Table 3, it was recognized that the capacity retention rate is 70% or higher in all of Examples 1 to 4. In addition, in Examples 1 to 4, it was possible to obtain a capacity retention rate of 74% or higher.

On the basis of the aforementioned description, similar to the non-aqueous electrolyte solutions of Examples 1 to 4, it was recognized that the electrolyte solution preferably contains acetonitrile, lithium salt, and cyclic acid anhydride. In addition, as shown in Table 2, in all of Examples 1 to 4, heat treatment was performed by setting the aging voltage to 3.0 V or lower. Meanwhile, in Comparative Example 1, the aging treatment was not performed, and in Comparative Example 2, the heat treatment was not performed. In addition, in Comparative Example 3, the aging voltage was higher than 3 V.

It was preferable that the content of cyclic acid anhydride is controlled to 0.01 mass % or more and 1 mass % or less with respect to the non-aqueous electrolyte solution on the basis of Examples 1 to 4 and the comparative examples. In addition, on the basis of Examples 1 to 4, it was more preferable that the content of cyclic acid anhydride is 0.1 mass % or more and 1 mass % or less with respect to the non-aqueous electrolyte solution.

On the basis of Examples 1 to 4, it was preferable that the heat treatment temperature (aging temperature) is controlled to 35° C. or higher and 60° C. or lower.

On the basis of Examples 1 to 4, it was preferable that the lithium salt contains $PF_6$ anions.

Here, the $PF_6$ anions are obtained by dissociating $LiPF_6$.

On the basis of the examples, it was preferable that cyclic acid anhydride includes at least one selected from a group consisting of succinic anhydride, maleic anhydride, and phthalic anhydride.

On the basis of the examples, it was preferable that the content of cyclic acid anhydride is 0.01 mass % or more and 1 mass % or less with respect to the non-aqueous electrolyte solution.

On the basis of this example, it was preferable that linear carbonate is further contained.

On the basis of this example, it was preferable that the linear carbonate is at least one selected from a group consisting of diethyl carbonate, ethyl methyl carbonate, and dimethyl carbonate.

On the basis of this example, it was preferable that the molar mixing ratio of the linear carbonate relative to acetonitrile is 0.15 or higher and 2 or lower.

On the basis of this example, it was preferable that the molar mixing ratio of the linear carbonate relative to acetonitrile is 0.25 or higher and 2 or lower.

On the basis of Examples 2 to 4, it was preferable that the molar mixing ratio of the linear carbonate relative to acetonitrile is 0.4 or higher and 2 or lower.

Examples of the eleventh to twelfth embodiments will now be described.

<Manufacturing of Non-Aqueous Secondary Battery>

(1-1) Fabrication of Positive Electrode

A composite oxide ($LiNi_{1/3}Mn_{1/3}Co_{1/3}O_2$) of lithium, nickel, manganese, and cobalt as the positive-electrode active material, acetylene black powder as the conductive aid, and polyvinylidene fluoride (PVDF) as the binder were mixed at a mass ratio of "86:8:6" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on both surfaces of an aluminum foil, which will serve as a positive electrode current collector, while adjusting the basis weight of one surface to 11.5 mg/cm². When the positive electrode mixture-containing slurry was coated on the aluminum foil, an uncoated region was formed so as to expose a part of the aluminum foil. Then, roll pressing was performed using a roll press machine until the mixture layer has a density of 2.8 mg/cm³, so that a positive electrode having the positive-electrode active material layer and the positive electrode current collector was obtained.

Then, this positive electrode was cut such that the coat portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite as the negative-electrode active material, acetylene black as the conductive aid, and PVDF as the binder were mixed at a mass ratio of "86:7:7" to obtain a negative electrode mixture. An appropriate amount of water was added to the obtained negative electrode mixture, and they were mixed sufficiently to prepare negative electrode mixture-containing slurry. This negative electrode mixture-containing slurry was coated on both surfaces of a copper foil while adjusting the basis weight of one surface to 6.9 mg/cm². When the negative electrode mixture-containing slurry was coated on the copper foil, an uncoated region was formed so as to expose a part of the copper foil. Then, roll pressing was performed using a roll press machine until the mixture layer has a density of 1.3 mg/cm³, so that a negative electrode having the negative-electrode active material layer and the negative electrode current collector was obtained.

Then, this negative electrode was cut such that the coat portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Assembly of Multi-Layered Laminate-Type Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a layered laminate non-aqueous secondary battery (pouch type cell battery, hereinafter, simply referred to as "multi-layered laminate-type battery") was manufactured.

The multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Then, the capacity was measured, and a 2 C overcharge test was performed to measure a time (minutes) until 60° C.

Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current corresponding to 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) Capacity Measurement

The multi-layered laminate-type battery subjected to the initial charging/discharging treatment described above was charged with a constant current of 0.2 C to a voltage of 4.2 V at a temperature of 25° C. and was then charged with a constant voltage of 4.2 V for one hour. Then, the battery was discharged with a constant current corresponding to 0.2 C to a voltage of 2.7 V. Such an operation was performed a total of three times, and the battery was charged with a constant current of 0.2 C to a voltage of 4.2 V and was then charged with a constant voltage of 4.2 V for one hour. Then, the charged multi-layered laminate-type battery was stored at a temperature of 25° C. for 24 hours.

After storage of 24 hours, the battery was discharged with a constant current corresponding to 0.2 C to a voltage of 2.7 V and was then charged with a constant current of 0.2 C at a temperature of 25° C. to a voltage of 4.2 V. Then, the battery was charged with a constant voltage of 4.2 V for one hour and was then discharged with a constant current corresponding to 0.2 C to a voltage of 2.7 V. Then, the capacity was measured.

(2-3) 2 C Overcharge Test

The multi-layered laminate-type battery subjected to the capacity measurement was charged with a constant current of 0.2 C at a temperature of 25° C. to a voltage of 4.2 V and was then charged with a constant voltage of 4.2 V for one hour. The charged multi-layered laminate-type battery was installed in a metal test container of approximately 350 mm square while a current load wire and a voltage measurement wire was attached to the electrode terminal, and a thermocouple was attached to the battery surface. The test was performed by changing the inner atmosphere of the container to an argon gas atmosphere.

For the test, the charged multi-layered laminate-type battery was charged with a constant current of 2 C, and the time (minute) elapsing until a temperature of 60° C. in the course of gradual heating was measured.

Example 5

An electrolyte solution was prepared by mixing a predetermined amount of various solvents and additives as shown in the following Table 4. That is, acetonitrile (AcN), diethyl carbonate (DEC), ethylene carbonate (EC), and vinylene carbonate (VC) were added and mixed at a volume ratio of "47:38:11:4". In addition, lithium hexafluorophosphate (LiPF$_6$) of 0.3 mol and LiN(SO$_2$F)$_2$(LiFSI) of 1.1 mol were added per 1 L of this mixed liquid. Furthermore, water of 50 ppm and succinic anhydride (SAH) as cyclic acid anhydride of 0.2 mass % were added to obtain an electrolyte solution of Example 5. A battery was manufactured using this electrolyte solution on the basis of the method described above in the chapter (1-3), and evaluation of the multi-layered laminate-type battery was performed in the sequence described in the chapters (2-1) to (2-3).

Example 6

An electrolyte solution was prepared by mixing a predetermined amount of various solvents and additives as shown in the following Table 4. That is, acetonitrile (AcN), diethyl carbonate (DEC), ethylene carbonate (EC), and vinylene carbonate (VC) were added and mixed at a volume ratio of "39:35:21:5". In addition, lithium hexafluorophosphate (LiPF$_6$) of 1.3 mol was added per 1 L of this mixed liquid. Furthermore, water of 100 ppm and maleic anhydride (MAH) as cyclic acid anhydride of 0.15 mass % were added to obtain an electrolyte solution of Example 6. A battery was manufactured using this electrolyte solution on the basis of the method described above in the chapter (1-3), and evaluation of the multi-layered laminate-type battery was performed in the sequence described in the chapters (2-1) to (2-3).

Example 7

An electrolyte solution was prepared by mixing a predetermined amount of various solvents and additives as shown in the following Table 4. That is, acetonitrile (AcN), dimethyl carbonate (DMC), ethylene carbonate (EC), and vinylene carbonate (VC) were added and mixed at a volume ratio of "65:8:22:5". In addition, lithium hexafluorophosphate (LiPF$_6$) of 0.6 mol, lithium bis(oxalate) borate (LiB(C$_2$O$_4$)$_2$) (LiBOB) of 0.05 mol, and lithium bis(fluorosulfonyl) imide (LiN(SO$_2$F)$_2$) (LiFSI) of 0.6 mol were added per 1 L of this mixed liquid. Furthermore, water of 75 ppm and phthalic anhydride (PAH) as cyclic acid anhydride of 0.5 mass % were added to obtain an electrolyte solution of Example 7. A battery was manufactured using this electrolyte solution on the basis of the method described above in the chapter (1-3), and evaluation of the multi-layered laminate-type battery was performed in the sequence described in the chapters (2-1) to (2-3).

Comparative Example 4

An electrolyte solution was prepared by mixing a predetermined amount of various solvents and additives as shown in the following Table 4. That is, acetonitrile (AcN), diethyl carbonate (DEC), vinylene carbonate (VC), and ethylene sulfite (ES) were added and mixed at a volume ratio of "47:38:11:4". In addition, lithium hexafluorophosphate (LiPF$_6$) of 1.3 mol and lithium bis(oxalate) borate (LiB(C$_2$O$_4$)$_2$) (LiBOB) of 0.05 mol were added per 1 L of this mixed liquid. Furthermore, succinic anhydride (SAH) as cyclic acid anhydride of 0.05 mass % was added to obtain an electrolyte solution of Comparative Example 4. Note that water is not added in Comparative Example 4. A battery was manufactured using this electrolyte solution on the basis of the method described above in the chapter (1-3), and evaluation of the multi-layered laminate-type battery was performed in the sequence described in the chapters (2-1) to (2-3).

Comparative Example 5

An electrolyte solution was prepared by mixing a predetermined amount of various solvents and additives as shown in the following Table 4. That is, acetonitrile (AcN), diethyl carbonate (DEC), and vinylene carbonate (VC) were added and mixed at a volume ratio of "47:42:11". In addition, lithium hexafluorophosphate (LiPF$_6$) of 1.3 mol was added per 1 L of this mixed liquid, and water of 200 ppm was added to obtain an electrolyte solution of Comparative Example 5. A battery was manufactured using this electrolyte solution on the basis of the method described above in the chapter (1-3), and evaluation of the multi-layered laminate-type battery was performed in the sequence described in the chapters (2-1) to (2-3).

The following table shows compositions of each non-aqueous electrolyte solution of Examples 5 to 7 and Comparative Examples 4 and 5.

TABLE 4

| | Solvent | | | | | | Lithium salt | | | Additive | | Linear carbonate/ |
|---|---|---|---|---|---|---|---|---|---|---|---|---|
| | AcN (vol %) | DEC (vol %) | DMC (vol %) | EC (vol %) | VC (vol %) | ES (vol %) | LiPF$_6$ (mol/1 L solvent) | LiBOB (mol/1 L solvent) | Lin(SO$_2$F)$_2$ (mol/1 L solvent) | Cyclic acid anhydride (mass %) | H$_2$O (ppm) | AcN (molar ratio) |
| Example 5 | 47 | 38 | 0 | 11 | 4 | 0 | 0.3 | — | 1.1 | SAH 0.2 | 50 | 0.35 |
| Example 6 | 39 | 35 | 0 | 21 | 5 | 0 | 1.3 | — | — | MAH 0.15 | 100 | 0.39 |
| Example 7 | 65 | 0 | 8 | 22 | 5 | 0 | 0.6 | 0.05 | 0.6 | PAH 0.5 | 75 | 0.08 |
| Comparative Example 4 | 47 | 38 | 0 | 0 | 11 | 4 | 1.3 | 0.05 | — | SAH 0.05 | — | 0.35 |
| Comparative Example 5 | 47 | 42 | 0 | 0 | 11 | 0 | 1.3 | — | — | — | 200 | 0.39 |

The following Table 5 shows arrival times to 60° C. in the 2 C overcharge test for the batteries obtained by using the non-aqueous electrolyte solutions of Examples 5 to 7 and Comparative Examples 4 and 5.

TABLE 5

| | 60° C. arrival time (minute) |
|---|---|
| Example 5 | 25 |
| Example 6 | 20 |
| Example 7 | 23 |
| Comparative Example 4 | 17 |
| Comparative Example 5 | 15 |

As shown in Table 5 described above, it was recognized that all of the 60° C. arrival times are 20 minutes or longer in all of Examples 5 to 7. In addition, it was recognized that, in Examples 5 and 7, the 60° C. arrival time can be 22 minutes or longer. In this manner, the 60° C. arrival times of the examples are longer than those of the comparative examples. This is because the electrolyte solution decomposition reaction in the event of overcharge is suppressed in the examples, compared to the comparative examples. In addition, it is possible to suppress swelling of the pouch type cell battery in the event of overcharge, that may be generated abruptly over 60° C.

From the aforementioned description, similar to the non-aqueous electrolyte solutions of Examples 5 to 7, it was recognized that the electrolyte solution contains acetonitrile, lithium salt, and preferably contains water of 1 ppm or more and 200 ppm or less, and cyclic acid anhydride. Meanwhile, in Comparative Examples 4 and 5, any one of water and cyclic acid anhydride is not contained.

The cyclic acid anhydride is contained in Examples 5 to 7, but is not contained in Comparative Example 5. In addition, the content of cyclic acid anhydride is preferably 0.01 mass % or more and 1 mass % or less with respect to the non-aqueous electrolyte solution.

As described in Examples 5 to 7, the non-aqueous electrolyte solution preferably contains PF$_6$ anions.

As described in Examples 5 and 7, it was preferable that the molar mixing ratio of PF$_6$ anions relative to acetonitrile is 0.01 or more and less than 0.08.

From the experimental results of the examples and the comparative examples, it was recognized that it is possible to form a robust negative electrode SEI using the electrolyte solution containing PF$_6$ anions, acetonitrile, cyclic acid anhydride, and water of 1 to 200 ppm.

From the experimental results of the examples 6 and 7, it was recognized that the non-aqueous secondary battery preferably includes the aforementioned electrolyte solution and the negative electrode capable of receiving or releasing lithium ions at an electric potential lower than "0.4 V vs. Li/Li$^+$". Since the negative electrode has an electric potential lower than "0.4 V vs. Li/Li$^+$", it is possible to promote the cyclic acid anhydride reaction in which decomposition occurs at a voltage of 1.0 to 0.4 V.

From the examples, it was preferable that the cyclic acid anhydride composition includes at least one selected from a group consisting of succinic anhydride, maleic anhydride, and phthalic anhydride.

Examples of the thirteenth and fourteenth embodiments will now be described.

<Preparation of Electrolyte Solution>

Under an inert atmosphere, various imide salts were dissolved to acetonitrile of 1 L with the contents (molar quantity) of Table 6. Then, acetonitrile and other solvents of the obtained mixed liquid were mixed with the compositions of Table 6. Furthermore, lithium hexafluorophosphate (LiPF$_6$), water (H$_2$O), and various cyclic acid anhydrides were added and dissolved to the obtained mixed liquid with the contents of Table 6, to obtain the electrolyte solutions of Examples 8 to 11 and Comparative Examples 6 to 8. Note that, in Table 6, "AcN" denotes acetonitrile, "DEC" denotes diethyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, "LiN(SO$_2$CF$_3$)$_2$" denotes lithium bis(trifluoromethane sulfonyl) imide, "SAH" denotes succinic anhydride, "MAH" denotes maleic anhydride, and "PAH" denotes phthalic anhydride.

The content of LiPF$_6$ refers to a molar quantity with respect to 1 L of non-aqueous solvent. The content of water is calculated as a mass ppm with respect to a total weight of all components of the non-aqueous electrolyte solution. The content of cyclic acid anhydride is expressed as a mass ratio by assuming that a sum of all components of the non-aqueous electrolyte solution is set to 100 mass %.

For the obtained electrolyte solution, a molar mixing ratio of $PF_6$ anions relative to acetonitrile ($PF_6$/AcN, (molar ratio)) was obtained in the following manner.

$PF_6$/AcN (molar ratio)=molar quantity of $LiPF_6$/ molar quantity of AcN

%) as the binder, and (d) diene-based rubber (glass transition temperature:−5° C., number average particle diameter when dried: 120 nm, density: 1.00 g/cm³, dispersion medium: water, solid content concentration: 40 mass %) were mixed at a solid content mass ratio of "87.2:9.7:1.4:1.7" to obtain a negative electrode mixture.

Water as a solvent was added to the obtained negative electrode mixture until a solid content of 45 mass %, and they were further mixed to prepare negative electrode mix-

TABLE 6

| | Solvent | | | | | LiPF$_6$ | Lithium salt Imide salt | | Additive | | Linear carbonate/ AcN |
|---|---|---|---|---|---|---|---|---|---|---|---|
| | AcN (vol %) | DEC (vol %) | DMC (vol %) | EC (vol %) | VC (vol %) | (mol/1 L solvent) | Type | Content (mol/1 L solvent) | Cyclic acid anhydride (mass %) | H$_2$O (ppm) | (molar ratio) |
| Example 8 | 50 | 25 | 0 | 20 | 5 | 0.5 | Lin(SO$_2$F)$_2$ | 1.0 | SAH 0.2 | 10 | 0.22 |
| Example 9 | 25 | 35 | 0 | 30 | 10 | 0.3 | Lin(SO$_2$F)$_2$ | 2.0 | MAH 0.15 | 30 | 0.61 |
| Example 10 | 45 | 13 | 0 | 25 | 17 | 0.5 | Lin(SO$_2$CF$_3$)$_2$ | 1.5 | PAH 0.5 | 15 | 0.13 |
| Example 11 | 45 | 19 | 25 | 0 | 11 | 0.5 | Lin(SO$_2$F)$_2$ | 0.5 | SAH 0.2 | 5 | 0.53 |
| Comparative Example 6 | 65 | 15 | 0 | 10 | 10 | 0.2 | Lin(SO$_2$F)$_2$ | 1.5 | SAH 0.05 | — | 0.10 |
| Comparative Example 7 | 47 | 28 | 0 | 20 | 5 | 0.1 | Lin(SO$_2$F)$_2$ | 1.3 | MAH 0.15 | — | 0.26 |
| Comparative Example 8 | 40 | 0 | 35 | 20 | 5 | 0 | Lin(SO$_2$F)$_2$ | 1.5 | SAH 0.5 | — | 0.55 |

<Evaluation>

A battery was manufactured using the electrolyte solutions of Examples 8 to 11 and Comparative Examples 6 to 8 in the following manner. Then, evaluation of the coin type non-aqueous secondary battery was performed in the following sequence. The result is shown in Tables 7 and 8.

(1) Manufacturing of Battery (1-1) Fabrication of Positive Electrode (A) A composite oxide of lithium having a number average particle diameter of 11 μm, nickel, manganese and cobalt (Ni/Mn/Co=1/1/1 (element ratio), density: 4.70 g/cm³) as the positive-electrode active material, (B) graphite carbon powder (density: 2.26 g/cm³) having a number average particle diameter of 6.5 μm as the conductive aid, (C) acetylene black powder (density: 1.95 g/cm³) having a number average particle diameter of 48 nm, and (D) polyvinylidene fluoride (PVdF, density: 1.75 g/cm³) as the binder were mixed at a mass ratio of "100:4.2:1.8:4.6" to obtain a positive electrode mixture.

N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 24.0 mg/cm², and the solvent was dried and removed. Then, roll pressing was performed using a roll press machine to an actual electrode density of 2.90 g/cm³, and a positive electrode having the positive-electrode active material layer and the positive electrode current collector was obtained.

(1-2) Fabrication of Negative Electrode (a) Graphite carbon powder (density: 2.23 g/cm³) having a number average particle diameter of 12.7 μm as the negative-electrode active material, (b) graphite carbon powder (density 2.27 g/cm³) having a number average particle diameter of 6.5 μm, (c) a carboxymethyl cellulose (density: 1.60 g/cm³) solution (solid content concentration: 1.83 mass ture-containing slurry. This negative electrode mixture-containing slurry was coated on one surface of a copper foil having a thickness of 10 μm and a width of 200 mm, which will serve as a negative electrode current collector, using a doctor blade method while adjusting the basis weight to 10.6 mg/cm², and the solvent was dried and removed. Then, roll pressing was performed using a roll press machine to an actual electrode density of 1.50 g/cm³, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, glass fiber filter paper (glass fiber filtering sheet, GA-100 produced by Advantech Co., Ltd.) punched in a disk shape having a diameter of 16 mm was set thereon, and an electrolyte solution was injected by 150 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

(2)<Evaluation of Coin Type Non-Aqueous Secondary Battery>

For the battery for evaluation obtained as described above, initial charging treatment was performed in the sequence of the following chapter (2-1). Then, each battery was evaluated in the sequence of the chapter (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) Initial Charging/Discharging Treatment for Coin Type Non-Aqueous Secondary Battery The battery was charged with a constant current of 0.6 mA corresponding to "0.1 C" to a voltage of 4.2 V by setting the battery ambient temperature to 25° C., and was then charged with a constant voltage of 4.2 V for a total of 1.5 hours. Then, the battery was discharged to a voltage of 3.0 V with a constant current of 1.8 mA corresponding to "0.3 C". Initial efficiency was calculated by dividing the discharge capacity at this time by the charge capacity. The result is shown in Table 7.

(2-2) Output Power Test for Coin Type Non-Aqueous Secondary Battery

For the battery subjected to the initial charging/discharging treatment as described in the chapter (2-1), the battery was charged with a constant current of 6 mA corresponding to "1 C" to a voltage of 4.2 V by setting the battery ambient temperature to 25° C., and was then charged with a constant voltage of 4.2 V for a total of 3 hours. Then, the battery was discharged with a current value of 6 mA corresponding to "1 C" to a voltage of 3.0 V. Then, the charging/discharging was performed similarly as described above by changing the current value for the constant current discharging to 30 mA corresponding to "5 C". After the output power test, a discharge curve for a current value of 30 mA corresponding to "5 C" was checked. The discharge curve was plotted by setting the abscissa as time and setting the ordinate as a battery voltage.

If there is no abnormality in the transition of the battery voltage plotted on the ordinate of the discharge curve, a mark "o" (Al foil has no corrosion) was determined. If there is an abnormality up and down in the transition of the battery voltage, a mark "x" (Al foil has corrosion) was determined. The result is shown in Table 7.

TABLE 7

| | Initial efficiency % | Output power test (Al foil corrosion) |
|---|---|---|
| Example 8 | 85 | o |
| Example 9 | 85 | o |
| Example 10 | 84 | o |
| Example 11 | 85 | o |
| Comparative Example 6 | 83 | x |
| Comparative Example 7 | 84 | x |
| Comparative Example 8 | 83 | x |

(2-3) 60° C. Storage Test

For the battery for evaluation obtained as described above, the battery was charged with a constant current of 6 mA corresponding to "1 C" to a voltage of 4.2 V by setting the battery ambient temperature to 25° C., and was then charged with a constant voltage of 4.2 V for a total of 3 hours. Then, the battery was stored at a temperature of 60° C. for 100 hours, and the elution amount (unit: ppm) of aluminum (Al) in the electrolyte solution was measured.

The aluminum elution amount was calculated through ICP/MS measurement. The result is shown in Table 8.

TABLE 8

| | 60° C. storage test Al elution amount ppm |
|---|---|
| Example 8 | 4 |
| Example 9 | 9 |
| Example 10 | 5 |
| Example 11 | 2 |
| Comparative Example 6 | 112 |
| Comparative Example 7 | 289 |
| Comparative Example 8 | 599 |

As shown in Table 7, the output power test of the comparative examples was an evaluation result of "x (Al foil has corrosion)".

In comparison, in all of the examples, the evaluation result of the output power test was "o (Al foil has no corrosion)".

As shown in Table 8, in all of the comparative examples, the aluminum elution amount after storage of 60° C. was over 10 ppm.

In comparison, in all of the examples, the aluminum elution amount after storage of 60° C. was 10 ppm or less.

From the aforementioned results, it was recognized that it is possible to prevent corrosion of the aluminum foil and suppress the aluminum elution to 10 ppm or less because acetonitrile, lithium salt, water, and $PF_6$ anions are contained even when imide salt is contained. That is, since hydrogen is released from the α-position of acetonitrile, generation of HF from $PF_6$ is promoted. Therefore, it is possible to promote passivation of aluminum even when the imide salt is used.

From the experimental results of the examples and the comparative examples, it was recognized that, since hydrogen is released from the α-position of acetonitrile, generation of HF from $PF_6$ is promoted, and an appropriate amount of water contributes to formation of aluminum passivation.

On the basis of the experimental results of the examples, it is possible to provide a configuration in which aluminum does not elute even when charging/discharging is performed.

Next, examples of the fifteenth and sixteenth embodiments will now be described.

<Preparation of Electrolyte Solution>

An electrolyte solution was prepared by mixing various solvents and electrolyte at a predetermined volume ratio. The compositions of each electrolyte solution used in the examples and the comparative examples are shown in Table 9. Note that, in Table 9, "AcN" denotes acetonitrile, "DEC" denotes diethyl carbonate, "EMC" denotes ethyl methyl carbonate, "EC" denotes ethylene carbonate, "VC" denotes vinylene carbonate, "PC" denotes propylene carbonate, "$LiPF_6$" denotes lithium hexafluorophosphate, "$LiN(SO_2F)_2$" denotes lithium bis(fluorosulfonyl) imide, "SAH" denotes succinic anhydride, and "MAH" denotes maleic anhydride.

Preparation was performed such that each component other than electrolyte is a non-aqueous solvent, and a total amount of each non-aqueous solvent becomes "1 L". The content of lithium salt is a molar quantity with respect to the non-aqueous solvent of 1 L.

TABLE 9

| | Solvent | | | | | | Lithium salt | | | Cyclic acid anhydride (mass %) | HF generation amount (ppm) | | |
| --- | --- | --- | --- | --- | --- | --- | --- | --- | --- | --- | --- | --- | --- |
| | AcN (vol %) | DEC (vol %) | EMC (vol %) | EC (vol %) | VC (vol %) | PC (vol %) | LiPF$_6$ (mol/1 L solvent) | Imide salt Type | Content (mol/1 L solvent) | | 25° C. | 60° C. | 85° C. |
| Example 12 | 49 | 0 | 49 | 0 | 2 | 0 | 1.5 | — | — | MAH 0.2 | 26 | 39 | 81 |
| Example 13 | 55 | 13 | 0 | 22 | 10 | 0 | 0.3 | LiN(SO$_2$F)$_2$ | 1.0 | SAH 0.2 | 30 | 42 | 82 |
| Comparative Example 9 | 60 | 0 | 0 | 0 | 10 | 30 | 1 | — | — | — | 28 | 216 | 360 |
| Comparative Example 10 | 46 | 0 | 0 | 0 | 4 | 50 | 1 | — | — | — | 24 | 235 | 352 |
| Comparative Example 11 | 38 | 0 | 0 | 30 | 2 | 30 | 1 | — | — | — | 25 | 182 | 298 |

<Heated NMR Measurement for Electrolyte Solution>

Inside an argon box, the electrolyte solutions of the examples and the comparative examples were collected in an inner tube of an NMR tube (having a diameter of 3 mm), were capped, and were sealed with a parafilm. The inner tube of the NMR tube was taken out of the argon box, and was inserted into an outer tube containing a DMSO-d6 solution added with $C_6H_2F_4$, so that NMR measurement based on a dual tube method was performed. As the NMR measurement device, ECS400 produced by JEOL RESONANCE, Ltd. was employed. As the measurement condition, a pulse width was set to 45° C., the number of integrations was set to 256, a standby time for a temperature rise to 25° C. was set to 5 seconds, a standby time to 60° C. was set to 7 seconds, and a standby time to 85° C. was set to 10 seconds. The test result is shown in Table 9.

As shown in Table 9, in all of the comparative examples, the HF generation amount significantly increases at 60° C. and 85° C., compared to 25° C.

In comparison, the HF generation amount is not significant at 60° C. and 85° C., compared to 25° C. in the examples, and is smaller than those of the comparison examples.

An increase rate of the hydrogen fluoride generation amount at 60° C. relative to the hydrogen fluoride generation amount at 25° C. (hereinafter, referred to as "HF generation amount increase rate") was researched. The HF generation amount increase rate was 150% in Example 12 and 140% in Example 13. In comparison, the HF generation amount increase rate was 771% in Comparative Example 9, 979% in Comparative Example 10, and 728% in Comparative Example 11.

From the results described above, it was recognized that the HF generation amount at 50° C. to 60° C. can be reduced in the electrolyte solutions of Examples 12 and 13 that do not contain propylene carbonate having saturated secondary carbon.

Using the electrolyte solution of Example 12, the HF generation amount was reduced at 60° C. and 85° C., compared to the electrolyte solution of Example 13. From this result, it was recognized that, in a case where the cyclic carbonate that does not have saturated secondary carbon is contained at a volume ratio larger than that of acetonitrile, an effect of suppressing HF generation at 50° C. to 60° C. is remarkable.

On the basis of the experimental results of the examples and the comparative examples, it is preferable that the LiPF$_6$-based acetonitrile electrolyte solution is diluted with a non-aqueous solvent that does not have saturated tertiary carbon. Since a proton can be easily released from carbonate having saturated secondary carbon (for example, propylene carbonate), it tends to promote generation of HF at a temperature of 50 to 60° C. However, if it is diluted with a non-aqueous solvent that does not have saturated tertiary carbon, it is possible to effectively suppress generation of HF.

Next, an example of the seventeenth embodiment will be described.

<Preparation of Electrolyte Solution>

An electrolyte solution was prepared by mixing various solvents and additives at a predetermined volume ratio. The compositions of each electrolyte solution used in the examples and the comparative examples are shown in Table 10. Note that, in Table 10, "AcN" denotes acetonitrile, "DEC" denotes diethyl carbonate, "DMC" denotes dimethyl carbonate, "EMC" denotes ethyl methyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, and "SAH" denotes succinic anhydride.

Preparation was performed such that each component other than lithium salt and additives is a non-aqueous solvent, and a total amount of each non-aqueous solvent becomes "1 L". The content of lithium salt is a molar quantity with respect to the non-aqueous solvent of 1 L.

TABLE 10

| | Solvent | | | | | | Lithium salt | | | Additive |
| | | | | | | | LiPF$_6$ | imide salt | | Cyclic acid |
| | AcN (vol %) | DEC (vol %) | DMC (vol %) | EMC (vol %) | EC (vol %) | VC (vol %) | (mol/1 L solvent) | Type | Content (mol/1 L solvent) | anhydride (mass %) |
|---|---|---|---|---|---|---|---|---|---|---|
| Example 14 | 50 | 0 | 0 | 28 | 20 | 2 | 0.3 | LiN(SO$_2$F)$_2$ | 1.0 | SAH 0.2 |
| Example 15 | 70 | 0 | 0 | 13 | 15 | 2 | 0.4 | LiN(SO$_2$F)$_2$ | 0.9 | SAH 0.2 |
| Example 16 | 50 | 28.5 | 0 | 0 | 20 | 1.5 | 0.4 | LiN(SO$_2$F)$_2$ | 0.9 | SAH 0.4 |
| Comparative Example 12 | 41 | 30 | 0 | 0 | 22 | 7 | 1.5 | — | — | SAH 1.2 |
| Comparative Example 13 | 0 | 41 | 20 | 0 | 33 | 6 | 0.1 | LiN(SO$_2$F)$_2$ | 1.2 | — |
| Comparative Example 14 | 0 | 30 | 12 | 17 | 36 | 5 | 1.2 | — | — | — |

\<Manufacturing of Battery\>
\<Fabrication of Positive Electrode\>

A composite oxide (LiNi$_{0.5}$Mn$_{0.3}$Co$_{0.2}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 95.0 mg/cm$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.74 mg/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

\<Fabrication of Negative Electrode\>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 61.0 mg/cm$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.20 mg/cm$^3$, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

\<Assembly of Single-Layered Laminate-Type Battery\>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 23 mAh and a rated voltage value of 4.2 V.

\<Evaluation of Single-Layered Laminate-Type Battery\>

For the battery for evaluation obtained as described above, initial charging treatment was performed in the sequence of the following chapter (1-1). Then, each battery was evaluated in the sequence of the chapter (1-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 2.5 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for a total of 1.5 hours. Then, the battery was discharged with a constant current of 6.9 mA corresponding to "0.3 C" to a voltage of 2.5 V. Initial efficiency was calculated by dividing the discharge capacity at this time by the charge capacity.

(1-2) −10° C. Charging/Discharging Cycle Test for Single-Layered Laminate-Type Battery A cycle test was performed for the battery subjected to the initial charging/discharging treatment using the method described in the aforementioned chapter (1-1). The cycle test was initiated 3 hours later after the battery ambient temperature is set to −10° C. First, the battery was charged with a constant current of 4.6 mA corresponding to "0.2 C" to a voltage of 4.2 V, and was then charged with a constant voltage of 4.2 V for a total of 3 hours. Then, the battery was discharged with a constant current of 4.6 mA to a voltage of 2.5 V. By setting one charge operation and one discharge operation as a single cycle, the charging/discharging was performed for 20 cycles. The discharge capacity of the twentieth cycle was set as a capacity retention rate by assuming that the discharge capacity of the first cycle is 100%.

<Measurement of Electrochemical Impedance Spectroscopy>

Measurement of electrochemical impedance spectroscopy was performed for the battery subjected to the initial charging/discharging treatment using the method described above in the chapter (1-1). The measurement of electrochemical impedance spectroscopy was performed using a frequency response analyzer 1400 (model name) produced by AMETEK, Inc. and potentio-galvanostat 1470E (model name) produced by AMETEK, Inc. Impedance was measured from a voltage/current response signal by applying an AC signal while changing the frequency to 1000 kHz to 0.01 Hz. A value intersecting with an abscissa of a complex impedance plot (cole-cole) was obtained as a bulk resistance, and a width of an arc of the high frequency side was obtained as an interface resistance. In addition, all the resistance values were obtained using a value of a real part (abscissa). In addition, an amplitude of the applied AC voltage was set to "±5 mV". Furthermore, the battery ambient temperature at the time of measurement of electrochemical impedance spectroscopy was set to 25° C., and the measurements started after 1.5 hours from each temperature setting. The following values were calculated from such results.

In the experiment, the measurement of electrochemical impedance spectroscopy at 25° C. was performed. The experimental result is shown in the following Table 11. In addition, in the following Table 11, the capacity retention rate in the charging/discharging cycle test (after 20 cycles) at a temperature of −10° C. are shown for Examples 14 to 16 and Comparative Examples 12 to 14.

TABLE 11

|  | Measurement of electrochemical impedance spectroscopy | | −10° C. cycle test capacity retention rate [%] |
|---|---|---|---|
|  | Bulk resistance ($\Omega$) | Interface resistance ($\Omega$) |  |
| Example 14 | 0.2 | 0.9 | 96 |
| Example 15 | 0.2 | 0.7 | 97 |
| Example 16 | 0.2 | 1.3 | 96 |
| Comparative Example 12 | 0.2 | 1.9 | 75 |
| Comparative Example 13 | 0.3 | 1.8 | 20 |
| Comparative Example 14 | 0.3 | 1.6 | 28 |

As shown in Table 11, it was recognized that, in all of Examples 14 to 16, the capacity retention rate is 90% or higher. Meanwhile, it was recognized that, in all of Comparative Examples 12 to 14, the capacity retention rate is 80% or lower.

From the aforementioned description, it was recognized that, similar to the non-aqueous electrolyte solutions of Examples 14 to 16, the non-aqueous electrolyte solution preferably contains vinylene carbonate (VC) by 0.5 volume % or more and 4 volume % or less.

Next, an example of the eighteenth embodiment will now be described.

<Manufacturing of Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:−5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on one surface of a copper foil having a thickness of 10 μm and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, glass fiber filter paper (glass fiber filtering sheet, GA-100 produced by Advantech Co., Ltd.) punched in a disk shape having a diameter of 16 mm was set thereon, and an electrolyte solution was injected by 150 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging treatment was performed in the sequence of the following chapter (2-1). Then, each battery was evaluated in the sequence of the chapter (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) Initial Charging/Discharging Treatment for Coin Type Non-Aqueous Secondary Battery The battery was charged with a constant current of 0.3 mA corresponding to "0.1 C" to a voltage of 4.2 V by setting the battery ambient temperature to 25° C., and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity.

(2-2) 50° C. Charging/Discharging Cycle Test for Coin Type Non-Aqueous Secondary Battery For the battery subjected to the initial charging/discharging treatment as described in the chapter (2-1), the battery ambient temperature was set to 50° C., and the battery was charged with a constant current of 3 mA corresponding to "1 C" to a voltage of 4.2 V, and was then charged with a constant voltage of 4.2 V for a total of 3 hours. Then, the battery was discharged with a constant current of 3 mA to a voltage of 3 V. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%.

Example 17

Acetonitrile (AcN), diethyl carbonate (DEC), ethylene carbonate (EC), and vinylene carbonate (VC) were mixed under an inert atmosphere at a volume ratio of "60:25:11:4". In addition, lithium hexafluorophosphate (LiPF$_6$) of 0.35 mol and lithium bis (fluorosulfonyl) imide (LiN(SO$_2$F)$_2$) of 1.8 mol were dissolved per 1 L of this mixed liquid, and an organic chlorine compound of 5 ppm expressed in the following Formula (4) and succinic anhydride as cyclic acid anhydride of 0.2 mass % were added and mixed so as to obtain an electrolyte solution of Example 17. For the obtained electrolyte solution, it was visually inspected that all of the lithium salts, chloride, and cyclic acid anhydride are dissolved. A battery was manufactured using this electrolyte solution on the basis of the method described above in the chapter (1-3), and measurement was performed in the sequence described above in the chapters (2-1) and (2-2).

[Chemical Formula 9]

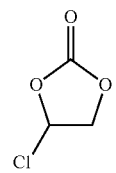

(4)

Example 18

Acetonitrile (AcN), diethyl carbonate (DEC), ethyl methyl carbonate (EMC), ethylene carbonate (EC), and vinylene carbonate (VC) were mixed under an inert atmosphere at a volume ratio of "38:18:18:20:6". In addition, lithium hexafluorophosphate (LiPF$_6$) of 1.2 mol and lithium bis (fluorosulfonyl) imide (LiN(SO$_2$F)$_2$) of 0.3 mol were dissolved per 1 L of this mixed liquid, and an organic chlorine compound of 0.5 ppm expressed in the following Formula (5) and maleic anhydride as cyclic acid anhydride of 0.15 mass % were added and mixed so as to obtain an electrolyte solution of Example 18. For the obtained electrolyte solution, it was visually inspected that all of the lithium salts, chloride, and cyclic acid anhydride are dissolved. A battery was manufactured using this electrolyte solution on the basis of the method described above in the chapter (1-3), and measurement was performed in the sequence described above in the chapters (2-1) and (2-2).

[Chemical Formula 10]

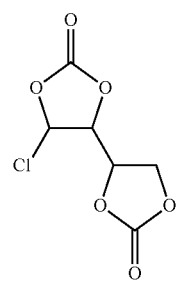

(5)

Example 19

Acetonitrile (AcN), diethyl carbonate (DEC), ethyl methyl carbonate (EMC), ethylene carbonate (EC), and vinylene carbonate (VC) were mixed under an inert atmosphere at a volume ratio of "38:18:18:20:6". In addition, lithium hexafluorophosphate (LiPF$_6$) of 1.2 mol was dissolved per 1 L of this mixed liquid, and an organic chlorine compound of 25 ppm expressed in the following Formula (5) and succinic anhydride as cyclic acid anhydride of 0.15 mass % were added and mixed so as to obtain an electrolyte solution of Example 19. For the obtained electrolyte solution, it was visually inspected that all of the lithium salts, chloride, and cyclic acid anhydride are dissolved. A battery was manufactured using this electrolyte solution on the basis of the method described above in the chapter (1-3), and measurement was performed in the sequence described above in the chapters (2-1) and (2-2).

[Chemical Formula 11]

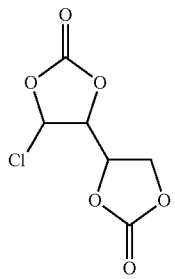

(5)

Example 20

Acetonitrile (AcN), dimethyl carbonate (DMC), ethylene carbonate (EC), and vinylene carbonate (VC) were mixed under an inert atmosphere at a volume ratio of "30:11:52:7". In addition, lithium hexafluorophosphate (LiPF$_6$) of 0.6 mol and lithium bis (trifluoromethane sulfonyl) imide (LiN(SO$_2$CF$_3$)$_2$) of 0.6 mol were dissolved per 1 L of this mixed liquid, and an organic chlorine compound of 300 ppm expressed in the following Formula (6) and maleic anhydride as cyclic acid anhydride of 0.5 mass % were added and mixed so as to obtain an electrolyte solution of Example 20. For the obtained electrolyte solution, it was visually inspected that all of the lithium salts, chloride, and cyclic acid anhydride are dissolved. A battery was manufactured using this electrolyte solution on the basis of the method described above in the chapter (1-3), and measurement was performed in the sequence described above in the chapters (2-1) and (2-2).

[Chemical Formula 12]

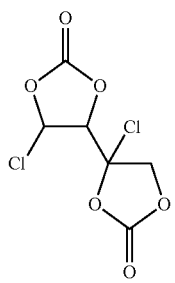

(6)

Example 21

Acetonitrile (AcN), diethyl carbonate (DEC), ethylene carbonate (EC), and vinylene carbonate (VC) were mixed under an inert atmosphere at a volume ratio of "65:4:20:11". In addition, lithium hexafluorophosphate (LiPF$_6$) of 0.5 mol and lithium bis (fluorosulfonyl) imide (LiN(SO$_2$F)$_2$) of 1.0 mol were dissolved per 1 L of this mixed liquid, and an organic chlorine compound of 4 ppm expressed in the following Formula (7) and phthalic anhydride as cyclic acid anhydride of 0.8 mass % were added and mixed so as to obtain an electrolyte solution of Example 21. For the obtained electrolyte solution, it was visually inspected that all of the lithium salts, chloride, and cyclic acid anhydride are dissolved. A battery was manufactured using this electrolyte solution on the basis of the method described above in the chapter (1-3), and measurement was performed in the sequence described above in the chapters (2-1) and (2-2).

[Chemical Formula 13]

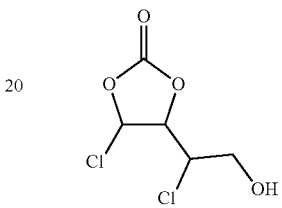

(7)

Comparative Example 15

Acetonitrile (AcN), diethyl carbonate (DEC), and vinylene carbonate (VC) were mixed under an inert atmosphere at a volume ratio of "47:49:4". In addition, lithium hexafluorophosphate (LiPF$_6$) of 0.2 mol and lithium bis (fluorosulfonyl) imide (LiN(SO$_2$F)$_2$) of 1.0 mol were dissolved per 1 L of this mixed liquid, and succinic anhydride as cyclic acid anhydride of 0.05 mass % was added and mixed so as to obtain an electrolyte solution of Example 15. Note that, in Comparative Example 15, an organic chlorine compound is not added. For the obtained electrolyte solution, it was visually inspected that all of the lithium salts and cyclic acid anhydride are dissolved. A battery was manufactured using this electrolyte solution on the basis of the method described above in the chapter (1-3), and measurement was performed in the sequence described above in the chapters (2-1) and (2-2).

Comparative Example 16

Acetonitrile (AcN), diethyl carbonate (DEC), ethylene carbonate (EC), and vinylene carbonate (VC) were mixed under an inert atmosphere at a volume ratio of "60:25:11:4". In addition, lithium hexafluorophosphate (LiPF$_6$) of 0.35 mol and lithium bis (fluorosulfonyl) imide (LiN(SO$_2$F)$_2$) of 1.8 mol were dissolved per 1 L of this mixed liquid, and an organic chlorine compound of 5 ppm expressed in the following Formula (5) was added and mixed so as to obtain an electrolyte solution of Comparative Example 16. Note that, in Comparative Example 16, cyclic acid anhydride is not added. For the obtained electrolyte solution, it was visually inspected that all of the lithium salts and chloride are dissolved. A battery was manufactured using this electrolyte solution on the basis of the method described above in the chapter (1-3), and measurement was performed in the sequence described above in the chapters (2-1) and (2-2).

[Chemical Formula 14]

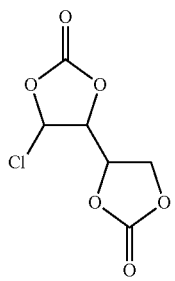

(5)

In the following description, compositions of each non-aqueous electrolyte solution of Examples 17 to 21 and Comparative Examples 15 and 16 will be described.

TABLE 12

| | Solvent | | | | | | Lithium salt | | |
| --- | --- | --- | --- | --- | --- | --- | --- | --- | --- |
| | | | | | | | LiPF$_6$ | Imide salt | |
| | | | | | | | (mol/ | | Content (mol/ |
| | AcN (vol %) | DEC (vol %) | DMC (vol %) | EMC (vol %) | EC (vol %) | VC (vol %) | 1 L solvent) | Type | 1 L solvent) |
| Example 17 | 60 | 25 | 0 | 0 | 11 | 4 | 0.35 | LiN(SO$_2$F)$_2$ | 1.8 |
| Example 18 | 38 | 18 | 0 | 18 | 20 | 6 | 1.2 | LiN(SO$_2$F)$_2$ | 0.3 |
| Example 19 | 38 | 18 | 0 | 18 | 20 | 6 | 1.2 | — | — |
| Example 20 | 30 | 0 | 11 | 0 | 52 | 7 | 0.6 | LiN(SO$_2$CF$_3$)$_2$ | 0.6 |
| Example 21 | 65 | 4 | 0 | 0 | 20 | 11 | 0.5 | LiN(SO$_2$F)$_2$ | 1.0 |
| Comparative Example 15 | 47 | 49 | 0 | 0 | 0 | 4 | 0.2 | LiN(SO$_2$F)$_2$ | 1 |
| Comparative Example 16 | 60 | 25 | 0 | 0 | 11 | 4 | 0.35 | LiN(SO$_2$F)$_2$ | 1.8 |

| | Additive | | | | |
| --- | --- | --- | --- | --- | --- |
| | Cyclic acid anhydride (mass %) | Organic chlorine compound Formula (4) (ppm) | Organic chlorine compound Formula (5) (ppm) | Organic chlorine compound Formula (6) (ppm) | Organic chlorine compound Formula (7) (ppm) |
| Example 17 | SAM 0.2 | 5 | 0 | 0 | 0 |
| Example 18 | MAH 0.15 | 0 | 0.5 | 0 | 0 |
| Example 19 | SAH 0.15 | 0 | 25 | 0 | 0 |
| Example 20 | MAH 0.5 | 0 | 0 | 300 | 0 |
| Example 21 | PAH 0.8 | 0 | 0 | 0 | 4 |
| Comparative Example 15 | SAH 0.05 | 0 | 0 | 0 | 0 |
| Comparative Example 16 | — | 0 | 5 | 0 | 0 |

The following Table 13 shows the capacity retention rate in the charging/discharging cycle test at 50° C. in Examples 17 to 21 and Comparative Examples 15 and 16.

TABLE 13

| | Initial charge/discharge initial efficiency [%] | 50° C. cycle test capacity retention rate [%] |
| --- | --- | --- |
| Example 17 | 86 | 85 |
| Example 18 | 85 | 84 |
| Example 19 | 85 | 74 |
| Example 20 | 85 | 75 |
| Example 21 | 84 | 77 |
| Comparative Example 15 | 85 | 59 |
| Comparative Example 16 | 84 | 56 |

As shown in Table 13, it was recognized that, in all of Comparative Examples 15 and 16, the capacity retention rate is less than 60%. Meanwhile, it was recognized that it is possible to obtain a capacity retention rate of 70% or higher in Examples 17 to 21, and obtain a capacity retention rate of 80% or higher in Examples 17 and 18.

From the aforementioned description, it was recognized that, similar to the non-aqueous electrolyte solutions of Examples 17 to 21, the non-aqueous electrolyte solution preferably contains acetonitrile, lithium salt, organic chlorine compound, and cyclic acid anhydride. Meanwhile, in Comparative Examples 15 and 16, any one of organic chlorine compound and cyclic acid anhydride is not contained. The organic chlorine compound is preferably chloride derived from VC.

From all of Examples 17 to 21, it was recognized that the organic chlorine compound is a chloride adduct of cyclic carbonate, and the chloride adduct of cyclic carbonate is preferably at least one selected from a group consisting of the compounds expressed in the following Formulas (4) to (7).

[Chemical Formula 15]

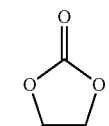

(4)

[Chemical Formula 16]

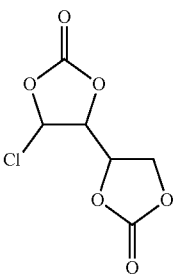

(5)

[Chemical Formula 17]

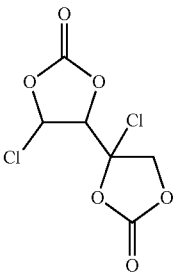

(6)

[Chemical Formula 18]

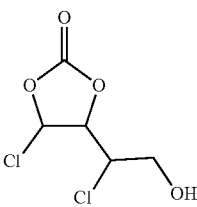

(7)

The organic chlorine compound was not contained in Comparative Example 15, and was contained by 0.1 ppm or more and 500 ppm or less with respect to the non-aqueous electrolyte solution. In addition, the cyclic acid anhydride was not contained in Comparative Example 16, and was contained by 0.01 mass % or more and 1 mass % or less with respect to the non-aqueous electrolyte solution.

On the basis of Examples 17 and 18, it was preferable that the content of the organic chlorine compound was 0.5 ppm or more and 10 ppm or less with respect to the non-aqueous electrolyte solution, and the content of cyclic acid anhydride was 0.1 mass % or more and 0.5 mass % or less with respect to the non-aqueous electrolyte solution. As a result, it was recognized that the capacity retention rate of 80% or higher can be obtained.

On the basis of the examples, the cyclic acid anhydride is preferably at least one selected from a group consisting of succinic anhydride, maleic anhydride, and phthalic anhydride.

Next, an example of the nineteenth embodiment will be described.

<Adjustment of Electrolyte Solution>

An electrolyte solution was prepared by mixing various solvents and additives at a predetermined volume ratio. The compositions of each electrolyte solution used in the examples and the comparative examples are shown in Table 14. Note that, in Table 14, "AcN" denotes acetonitrile, "DEC" denotes diethyl carbonate, "DMC" denotes dimethyl carbonate, "EMC" denotes ethyl methyl carbonate, "EC" denotes ethylene carbonate, "VC" denotes vinylene carbonate, "LiPF$_6$" denotes lithium hexafluorophosphate, "LiBOB" denotes lithium bis (oxalate) borate (LiB(C$_2$O$_4$)$_2$), "LiN(SO$_2$F)$_2$" denotes lithium bis (fluorosulfonyl) imide, "SAH" denotes succinic anhydride, "MAH" denotes maleic anhydride, and "PAH" denotes phthalic anhydride.

Adjustment was performed such that each component other than lithium salt is a non-aqueous solvent, and a total amount of each non-aqueous solvent becomes "1 L". The content of lithium salt is a molar quantity with respect to the non-aqueous solvent of 1 L.

TABLE 14

| | Solvent | | | | | | Lithium salt | | | |
| | | | | | | | LiPF$_6$ | LiBOB | Imide salt | |
| | | | | | | | | | | Content |
| | AcN (vol %) | DEC (vol %) | DMC (vol %) | EMC (vol %) | EC (vol %) | VC (vol %) | (mol/1 L solvent) | (mol/1 L solvent) | Type | (mol/1 L solvent) |
|---|---|---|---|---|---|---|---|---|---|---|
| Example 22 | 50 | 40 | 0 | 0 | 0 | 10 | 1.3 | 0 | — | — |
| Example 23 | 20 | 30 | 20 | 20 | 0 | 10 | 1.4 | 0 | LiN(SO$_2$F)$_2$ | 0.1 |
| Example 24 | 30 | 20 | 0 | 40 | 0 | 10 | 0.9 | 0 | — | — |
| Example 25 | 55 | 0 | 36 | 0 | 5 | 4 | 1.1 | 0.05 | — | — |
| Comparative Example 17 | 100 | 0 | 0 | 0 | 0 | 0 | 1.5 | 0 | — | — |
| Comparative Example 18 | 10 | 90 | 0 | 0 | 0 | 0 | 1.3 | 0 | — | — |
| Comparative Example 19 | 30 | 0 | 10 | 0 | 50 | 10 | 1 | 0 | — | — |
| Comparative Example 20 | 70 | 10 | 0 | 0 | 10 | 10 | 1.5 | 0 | — | — |

TABLE 14-continued

|  | Additive Cyclic acid anhydride (mass %) | LiPF$_6$/AcN (molar ratio) | Linear carbondate/ AcN (molar ratio) |
|---|---|---|---|
| Example 22 | MAH 0.1 | 0.14 | 0.35 |
| Example 23 | SAH 0.1 | 0.37 | 1.79 |
| Example 24 | PAH 0.1 | 0.16 | 0.98 |
| Example 25 | MAH 0.2 | 0.11 | 0.41 |
| Comparative Example 17 | — | 0.08 | — |
| Comparative Example 18 | — | 0.68 | 4.64 |
| Comparative Example 19 | — | 0.18 | 0.21 |
| Comparative Example 20 | — | 0.11 | 0.06 |

<Measurement of Electrochemical Impedance Spectroscopy>

The electrolyte solution prepared as described above was put into a sealed cell (cell size: 24 mm diameter, by 0.35 mm thickness produced by TOYO Corporation, was sealed, and was inserted into a holder (SH1-Z), and wiring was performed.

The cell was put into the thermostatic oven, and measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to −30° C., and the measurement was initiated after 1.5 hours from the temperature setting. As the measurement data, data at the time point that a change of the data measured repeatedly at every 5 minutes is lower than 0.1% was employed.

<Ion Conductivity>

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm$^2$).

An electrolyte solution having the composition of Table 14 was prepared at a temperature of 25° C., and the cell was assembled using the aforementioned method, so that measurement of electrochemical impedance spectroscopy was performed. A Nyquist diagram was created from the obtained data, and the Z' value was read. From the aforementioned formulas, the ionic conductivity was calculated for Examples 22 to 25 and Comparative Examples 17 to 20. The result is shown in the following Table 15.

TABLE 15

|  | Ionic conductivity [mS/cm] −30° C. |
|---|---|
| Example 22 | 3.5 |
| Example 23 | 3.6 |
| Example 24 | 4.6 |
| Example 25 | 4.2 |
| Comparative Example 17 | Measurement is not allowable |
| Comparative Example 18 | 1.6 |
| Comparative Example 19 | 1.0 |
| Comparative Example 20 | 2.3 |

As shown in Table 15, it was recognized that the −30° C. ionic conductivity is much lower than 3.0 mS/cm in all the comparative examples. In addition, in Comparative Example 17, since white sediments were precipitated before putting into the thermostatic oven, the ionic conductivity measurement was interrupted.

In comparison, in all of the examples, it was recognized that the −30° C. ionic conductivity is 3.0 mS/cm or higher.

In Examples 22 to 25, the content of LiPF$_6$ was 1.5 mol or less with respect to 1 L of the non-aqueous solvent. In addition, it was recognized that the molar mixing ratio of LiPF$_6$/AcN is 0.08 or higher and 0.4 or lower.

As a range that does not include the results of Comparative Examples 17 to 20, the molar mixing ratio of linear carbonate/AcN was 0.25 or higher and 4.0 or lower.

In Examples 22 to 25, it was recognized that the molar mixing ratio of linear carbonate/AcN is 0.3 or higher and 2.0 or lower.

On the basis of the experimental results of this example, it is preferable that the battery contains LiPF$_6$ and a non-aqueous solvent, the content of LiPF$_6$ is 1.5 mol or less with respect to the non-aqueous solvent of 1 L, the non-aqueous solvent contains acetonitrile and linear carbonate, the molar mixing ratio of LiPF$_6$ relative to acetonitrile is 0.08 or higher and 0.4 or lower, and the molar mixing ratio of linear carbonate relative to acetonitrile is 0.3 or higher and 2 or lower.

An example of the twentieth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 16. Note that, in Table 16, "AcN" denotes acetonitrile, "DEC" denotes diethyl carbonate, "EMC" denotes ethyl methyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "SAH" denotes succinic anhydride, "PAH" denotes phthalic anhydride.

Preparation was performed such that each component other than lithium salt and additives is a non-aqueous solvent, and a total amount of each non-aqueous solvent becomes "1 L". The content of lithium salt is a molar quantity with respect to the non-aqueous solvent of 1 L.

TABLE 16

| | Solvent | | | | | Lithium salt | | | Additive | Linear carbonate/ | |
|---|---|---|---|---|---|---|---|---|---|---|---|
| | | | | | | LiPF$_6$ | Imide salt | | Cyclic acid | LiPF$_6$/AcN | AcN |
| | AcN (vol %) | DEC (vol %) | EMC (vol %) | EC (vol %) | VC (vol %) | (mol/1 L solvent) | Type | Content (mol/1 L solvent) | anhydride (mass %) | (molar ratio) | (molar ratio) |
| Example 26 | 25 | 0 | 40 | 25 | 10 | 0.3 | LiN(SO$_2$F)$_2$ | 1.5 | SAH 0.2 | 0.06 | 0.81 |
| Comparative Example 21 | 47 | 49 | 0 | 0 | 4 | 1.3 | — | — | PAH 3.0 | 0.15 | 0.45 |
| Comparative Example 22 | 20 | 0 | 0 | 70 | 10 | 0.6 | — | — | SAH 0.02 | 0.16 | 0.00 |

<Ionic Conductivity Measurement>

The electrolyte solution was put into a sealed cell (cell size: 24 mm diameter, by 0.35 mm thickness) produced by TOYO Corporation, was sealed, and was inserted into a holder (SH1-Z), and wiring was performed. In addition, the cell was put into the thermostatic oven, and measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was −10° C., and the measurement was initiated after 1.5 hours from the temperature setting. As the measurement data, data at the time point that a change of the data measured repeatedly at every 5 minutes is lower than 0.1% was employed.

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm$^2$).

The experimental result thereof is shown in Table 17.

TABLE 17

| | Ionic conductivity [mS/cm] −10° C. |
|---|---|
| Example 26 | 12.2 |
| Comparative Example 21 | 8.8 |
| Comparative Example 22 | 8.2 |

In the examples, it was recognized that the −10° C. ionic conductivity is 10 mS/cm. In addition, it was recognized that the −10° C. ionic conductivity is much lower than 10 mS/cm in all the comparative examples.

An example of the twenty first embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 18. Note that, in Table 18, "AcN" denotes acetonitrile, "DEC" denotes diethyl carbonate, "DMC" denotes dimethyl carbonate, "EMC" denotes ethyl methyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, and "SAH" denotes succinic anhydride.

Preparation was performed such that each component other than lithium salt and additives is a non-aqueous solvent, and a total amount of each non-aqueous solvent becomes "1 L". The content of lithium salt is a molar quantity with respect to the non-aqueous solvent of 1 L.

TABLE 18

| | Solvent | | | | | | Lithium salt | | | Additive |
|---|---|---|---|---|---|---|---|---|---|---|
| | | | | | | | LiPF$_6$ | imide salt | | Cyclic acid |
| | AcN (vol %) | DEC (vol %) | DMC (vol %) | EMC (vol %) | EC (vol %) | VC (vol %) | (mol/1 L solvent) | Type | Content (molar/1 L solvent) | anhydride (mass %) |
| Example 27 | 50 | 0 | 0 | 28 | 20 | 2 | 0.3 | LiN(SO$_2$F)$_2$ | 1.0 | SAH 0.2 |
| Example 28 | 70 | 0 | 0 | 13 | 15 | 2 | 0.4 | LiN(SO$_2$F)$_2$ | 0.9 | SAH 0.2 |
| Example 29 | 50 | 28.5 | 0 | 0 | 20 | 1.5 | 0.4 | LiN(SO$_2$F)$_2$ | 0.9 | SAH 0.4 |
| Comparative Example 23 | 0 | 41 | 20 | 0 | 33 | 6 | 0.1 | LiN(SO$_2$F)$_2$ | 1.2 | — |
| Comparative Example 24 | 0 | 30 | 12 | 17 | 36 | 5 | 1.2 | — | — | — |

<Manufacturing of Battery>
<Fabrication of Positive Electrode>

A composite oxide ($LiNi_{0.5}Mn_{0.3}Co_{0.2}O_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to about 95.0 mg/cm$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.74 mg/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to about 61.0 mg/cm$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.20 mg/cm$^3$, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, initial charging treatment was performed in the following sequence of the chapter (1-1). Then, each battery was evaluated in the sequence of the chapters (1-2) and (1-3). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 2.5 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for a total of 1.5 hours. Then, the battery was discharged with a constant current of 6.9 mA corresponding to "0.3 C" to a voltage of 2.5 V. Initial efficiency was calculated by dividing the discharge capacity at this time by the charge capacity.

(1-2) Measurement of Electrochemical Impedance Spectroscopy for Single-Layered Laminate-Type Battery The measurement of electrochemical impedance spectroscopy was performed for the battery subjected to the initial charging/discharging treatment using the method described above in the chapter (1-1). The measurement of electrochemical impedance spectroscopy was performed using a frequency response analyzer 1400 model (model name) produced by AMETEK, Inc. and potentio-galvanostat 1470E (model name) produced by AMETEK, Inc. Impedance was measured from a voltage/current response signal by applying an AC signal while changing frequencies 1000 kHz to 0.01 Hz. A value intersecting with an abscissa of a complex impedance plot (cole-cole plot) was obtained as a bulk resistance, and a value obtained by adding the bulk resistance to a width of an arc of the high frequency side of a straight line length of the arc intersecting with the abscissa was obtained as an interface resistance. In addition, all the resistance values were obtained using a value of a real part (abscissa). In addition, an amplitude of the applied AC voltage was set to "±5 mV". Furthermore, the battery ambient temperature at the time of measurement of electrochemical impedance spectroscopy was set to 25° C. From such results, the values shown in the following Table 19 were calculated.

(1-3) −10° C. Charging/Discharging Cycle Test for Single-Layered Laminate-Type Battery A cycle test was performed for the battery subjected to the initial charging/discharging treatment using the method described in the chapter (1-1). First, the battery was charged with a constant current of 4.6 mA corresponding to "0.2 C" by setting the battery ambient temperature to −10° C. to a voltage of 4.2 V, and was then charged with a constant voltage of 4.2 V for a total of 3 hours. Then, the battery was discharged with a constant current of 4.6 mA to a voltage of 2.5 V. By setting one charge operation and one discharge operation as a single cycle, the charging/discharging was performed for 20 cycles. The discharge capacity of the twentieth cycle was set as a capacity retention rate by assuming that the discharge capacity of the first cycle is 100%

In the experiment, the measurement of electrochemical impedance spectroscopy was performed for the battery not subjected to the charging/discharging cycle test at a temperature of −10° C. The experimental result is shown in the following Table 19. In addition, in the following Table 19, the capacity retention rate in the charging/discharging cycle test (after 20 cycles) at a temperature of −10° C. are shown for Examples 27 to 29 and Comparative Examples 23 and 24.

TABLE 19

| | Measurement of electrochemical impedance spectroscopy | | −10° C. cycle test capacity retention rate [%] |
|---|---|---|---|
| | Bulk resistance ($\Omega$) | Interface resistance ($\Omega$) | |
| Example 27 | 0.2 | 0.9 | 96 |
| Example 28 | 0.2 | 0.7 | 97 |
| Example 29 | 0.2 | 1.3 | 96 |
| Comparative Example 23 | 0.3 | 1.8 | 20 |
| Comparative Example 24 | 0.3 | 1.6 | 28 |

(Ionic Conductivity Measurement)

The electrolyte solution was put into a sealed cell (cell size: 24 mm diameter, 24 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to 20° C., and the measurement was initiated after 1.5 hours from the temperature setting. As the measurement data, data at the time point that a change of the data measured repeatedly at every 5 minutes is lower than 0.1% was employed.

The obtained data was plotted on a Nyquist diagram including real parts Z' and imaginary parts Z" of impedance. In addition, a Z' value (R) at Z"-0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm²).

The experimental result thereof is shown in Table 20.

TABLE 20

| | Ionic conductivity [mS/cm] |
|---|---|
| | 20° C. |
| Example 27 | 22.0 |
| Example 28 | 23.4 |
| Example 29 | 21.9 |
| Comparative Example 23 | 8.3 |
| Comparative Example 24 | 12.6 |

As shown in Table 19, in the examples, it was recognized that the interface (film) resistance can be suppressed to be low. As a result, it was recognized that it is possible to suppress low-temperature cycle degradation and low-temperature ionic conductivity degradation.

As shown in Table 20, in the examples, it was recognized that the 20° C. ionic conductivity is 15 mS/cm or higher. Preferably, the 20° ionic conductivity may be 20 mS/cm or higher.

An example of the twenty second embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 21. Note that, in Table 21, "AcN" denotes acetonitrile, "DEC" denotes diethyl carbonate, "EMC" denotes ethyl methyl carbonate, "EC" denotes ethylene carbonate, "VC" denotes vinylene carbonate, "LiPF$_6$" denotes lithium hexafluorophosphate, "LiBOB" denotes lithium bis (oxalate) borate, "LiN(SO$_2$F)$_2$" denotes lithium bis (fluorosulfonyl) imide, "LiN(SO$_2$CF$_3$)$_2$" denotes lithium bis (trifluoromethane sulfonyl) imide, "SAH" denotes succinic anhydride, "MAH" denotes maleic anhydride, and "PAH" denotes phthalic anhydride.

Preparation was performed such that each component other than lithium salt and additives is a non-aqueous solvent, and a total amount of each non-aqueous solvent becomes "1 L". The content of lithium salt is a molar quantity with respect to the non-aqueous solvent of 1 L.

TABLE 21

| | Solvent | | | | | Lithium salt | | | | Additive | |
|---|---|---|---|---|---|---|---|---|---|---|---|
| | | | | | | LiPF$_6$ | LiBOB | Imide salt | | Cyclic acid anhydride | Acetic acid |
| | AcN (vol %) | DEC (vol %) | EMC (vol %) | EC (vol %) | VC (vol %) | (mol/1 L solvent) | (mol/1 L solvent) | Type | Content (mol/1 L solvent) | (mass %) | (ppm) |
| Example 30 | 50 | 35 | 0 | 11 | 4 | 0.3 | 0 | LiN(SO$_2$F)$_2$ | 1.50 | SAH 0.2 | 0.1 |
| Example 31 | 35 | 0 | 40 | 21 | 4 | 1.2 | 0 | — | — | MAH 0.15 | 1 |
| Example 32 | 65 | 25 | 0 | 6 | 4 | 0.3 | 0 | LiN(SO$_2$CF$_3$)$_2$ | 1.20 | PAH 0.5 | 5 |

TABLE 21-continued

| | Solvent | | | | | Lithium salt | | | | Additive | |
| | | | | | | | | Imide salt | | Cyclic | |
| | AcN (vol %) | DEC (vol %) | EMC (vol %) | EC (vol %) | VC (vol %) | LiPF$_6$ (mol/1 L solvent) | LiBOB (mol/1 L solvent) | Type | Content (mol/1 L solvent) | acid anhydride (mass %) | Acetic acid (ppm) |
|---|---|---|---|---|---|---|---|---|---|---|---|
| Comparative Example 25 | 47 | 42 | 0 | 0 | 11 | 1.3 | 0.1 | — | — | MAH 0.1 | — |
| Comparative Example 26 | 85 | 11 | 0 | 0 | 4 | 1 | 0 | — | — | — | 5 |

<Manufacturing of Battery>
<Fabrication of Positive Electrode>

A composite oxide (LiNi$_{0.5}$Mn$_{0.3}$Co$_{0.2}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 95.0 mg/cm$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.50 mg/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 61.0 mg/cm$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.35 mg/cm$^3$, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the single-layered laminate-type battery obtained as described above, initial charging/discharging treatment was performed in the following sequence. Subsequently, the 4.2 V storage characteristic was evaluated at a temperature of 60° C. The charging/discharging was performed using a charging/discharging device ACD-01 (model name) produced by Asuka Electronics Co., Ltd. and a thermostatic oven PLM-73S (model name) produced by Futaba Kagaku Co., Ltd.

Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 3.0 V at a constant current.

<Initial Charging/Discharging Treatment of Single-Layered Laminate-Type Battery>

The single-layered laminate-type battery was charged with a constant current of 1.15 mA corresponding to "0.05 C" to a voltage of 4.2 V by setting the ambient temperature to 25° C. and was then charged with a constant voltage of 4.2 V for 3 hours. Then, the battery was discharged with a constant current of 6.9 mA corresponding to "0.3 C" to a voltage of 3.0 V.

<Storage Characteristics at 60° C.>

The single-layered laminate-type battery subjected to the initial charging/discharging treatment described above was charged with a constant current of 0.3 C to a voltage of 4.2 V at a temperature of 25° C. and was then charged with a constant voltage of 4.2 V for one hour. In addition, this charged single-layered laminate-type battery was stored in the thermostatic oven at a temperature of 60° C. After 200 hours, the single-layered laminate-type battery was removed from the thermostatic oven and was recovered to the room temperature. Then, the 4.2 V storage characteristics of the single-layered laminate-type battery were evaluated using the technique of measuring a gas generation amount and a voltage of each laminated cell. The gas generation amount was measured using the Archimedes method, in which the single-layered laminate-type battery is put into the container filled with hyper pure water, and the volume of the single-layered laminate-type battery is measured from a weight change around that time. As a device for measuring the volume from the weight change, a gravimeter MDS-300 produced by Alfa Mirage Co., Ltd. was employed.

Examples and Comparative Examples

For the examples and the comparative examples, an electrolyte solution was produced using the composition of Table 21, and the positive electrode and the negative electrode were fabricated using the aforementioned method. Then, a single-layered laminate-type battery was assembled and evaluated. The result is shown in Table 22.

TABLE 22

| | Gas generation amount in 60° C. storage test (ml) | Equivalent per 1 mAh (ml) |
|---|---|---|
| Example 30 | 0.12 | 0.0052 |
| Example 31 | 0.16 | 0.0070 |
| Example 32 | 0.14 | 0.0061 |
| Comparative Example 25 | 0.38 | 0.0165 |
| Comparative Example 26 | Evaluation is interrupted | Evaluation is interrupted |

The gas generation amount from the laminate cell stored at 60° C. for 200 hours was 0.0165 ml per 1 mAh in Comparative Example 25. In Comparative Example 26, the gas generation amount after 24 hours was 1.56 ml, which was extremely large, so that the evaluation was interrupted. In Examples 30 to 32, the gas generation amount was 0.008 ml or less per 1 mAh. In this manner, in Examples 30 to 32, the gas generation amount was small, compared to Comparative Examples 25 and 26. In Examples 30 to 32, it was recognized that acetonitrile, acetic acid, and cyclic acid anhydride are contained in the non-aqueous electrolyte solution. Meanwhile, in the comparative examples, any one of acetic acid and cyclic acid anhydride is not contained.

From this result, it was recognized that acetic acid and cyclic acid anhydride of the non-aqueous electrolyte solution containing acetonitrile act on reduction resistance. That is, it is recognized that the SEI is formed on the surface of the negative electrode due to acetic acid and cyclic acid anhydride. For this reason, it is possible to suppress reduction of acetonitrile from being promoted at a high temperature and suppress acetonitrile from being reductively decomposed to generate gas.

Therefore, the lower limit of acetic acid was set to 0.1 ppm or more on the basis of Example 30, and the upper limit was set to 10 ppm or less on the basis of Example 32. In addition, the lower limit of the cyclic acid anhydride was set to 0.01 mass % or more on the basis of Example 31 and Comparative Example 25, and the upper limit was set to 1 mass % or less on the basis of Example 32. By adjusting the contents of acetic acid and cyclic anhydride, the SEI is further reinforced.

On the basis of the examples, the content of acetic acid was defined as 0.1 ppm or more and 5 ppm or less with respect to the non-aqueous electrolyte solution. In addition, the lower limit of cyclic acid anhydride was set to 0.11 mass % or more to avoid the case of Comparative Example 25, and the content of cyclic acid anhydride was defined as 0.11 mass % or more and 0.5 mass % or less with respect to the non-aqueous electrolyte solution. The SEI is further reinforced by further adjusting the contents of acetic acid and cyclic acid anhydride.

On the basis of the examples, it was preferable that the composition of the cyclic acid anhydride includes at least one selected from a group consisting of succinic anhydride (SAH), maleic anhydride (MAH), and phthalic anhydride (PAH). As a result, the SEI is appropriately formed.

Next, an example of the twenty third embodiment will be described.

<Manufacturing of Non-Aqueous Battery>

(1-1) Fabrication of Positive Electrode

A composite oxide ($LiNi_{1/3}Mn_{1/3}Co_{1/3}O_2$) of lithium, nickel, manganese, and cobalt as the positive-electrode active material, acetylene black powder as the conductive aid, and polyvinylidene fluoride (PVDF) as the binder were mixed at a mass ratio of "86:8:6" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on both surfaces of an aluminum foil, which will serve as a positive electrode current collector, while adjusting the basis weight of one surface to 11.5 mg/cm$^2$. When the positive electrode mixture-containing slurry was coated on the aluminum foil, an uncoated region was formed so as to expose a part of the aluminum foil. Then, roll pressing was performed using a roll press machine until the mixture layer has a density of 2.8 mg/cm$^3$, so that a positive electrode having the positive-electrode active material layer and the positive electrode current collector was obtained.

Then, this positive electrode was cut such that the coat portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite as the negative-electrode active material, acetylene black as the conductive aid, and PVDF as the binder were mixed at a mass ratio of "86:7:7" to obtain a negative electrode mixture. An appropriate amount of water was added to the obtained negative electrode mixture, and they were mixed sufficiently to prepare negative electrode mixture-containing slurry. This negative electrode mixture-containing slurry was coated on both surfaces of a copper foil while adjusting the basis weight of one surface to 6.9 mg/cm$^2$. When the negative electrode mixture-containing slurry was coated on the copper foil, an uncoated region was formed so as to expose a part of the copper foil. Then, roll pressing was performed using a roll press machine until the mixture layer has a density of 1.3 mg/cm$^3$, so that a negative electrode having the negative-electrode active material layer and the negative electrode current collector was obtained.

Then, this negative electrode was cut such that the coat portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Assembly of Multi-Layered Laminate-Type Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a multi-layered laminate-type non-aqueous secondary battery (pouch type cell battery, hereinafter, simply referred to as "multi-layered laminate-type battery") was manufactured. A hole serving as a safety valve mechanism was formed in the welding side having no positive electrode terminal and no negative electrode terminal. The periphery of the hole was heat-sealed in a concentric shape.

The multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Subsequently, the 2 C overcharge test was performed. Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 3.0 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) Overcharge Test

The multi-layered laminate-type battery subjected to the initial charging/discharging treatment described above was charged with a constant current of 0.2 C at a temperature of 25° C. to a voltage of 4.2 V and was then charged with a constant voltage of 4.2 V for one hour. An overcharge test was performed as described below for the battery charged to a full-charge state. A DC power source PAT60-133T produced by Kikusui Electronics Co., Ltd. was used as a power source, and was set at the room temperature (25±+5 C), a constant current corresponding to "2 C", and a constant voltage of 60 V. The current, voltage, and temperature of each part and the atmospheric temperature during the test were recorded every 100 ms by using Memory High Logger LR8400 produced by Hioki Denki Co. Ltd. At the same time, the battery appearance was also observed and recorded by video.

In order to measure the amount of HF gas released in the event of the battery explosion caused by overcharging, the overcharge test was performed under an Ar atmosphere by placing the battery in a metal test container (approximately 350 mm in height and width). When the battery is exploded, an Ar gas having a volume three times that of the container was injected into the container while stopping supply of electricity, and the generated gas was collected in a gas bag. The generated HF in the recovered gas was quantitatively analyzed on the basis of the liquid collection IC method. Specifically, the recovered gas was introduced into an absorbent solution of "$NaHCO_3$ (1.7 mM)+$Na_2CO_3$ (1.8 mM)" to dissolve the HF component, and the F-concentration of the solution was quantified by ion chromatography, and was converted into the HF generation amount.

Example 33

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate ($LiPF_6$) of 0.3 mol and lithium bis (fluorosulfonyl) imide ($LiN(SO_2F)_2$) of 1.0 mol were added per 1 L of the non-aqueous solvent of this mixed liquid. Furthermore, succinic anhydride (SAH) of 1 mass %, propionitrile (PrN) of 11 ppm (mass ratio), and acetic acid (AA) of 0.2 ppm (mass ratio) were added to the non-aqueous electrolyte solution so as to obtain an electrolyte solution of Example 33. A battery was manufactured using this electrolyte solution on the basis of the method described above in the chapter (1-3), and evaluation of the multi-layered laminate-type battery was performed in the sequence described in the chapters (2-1) and (2-2).

Example 34

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate ($LiPF_6$) of 0.3 mol and lithium bis (fluorosulfonyl) imide ($LiN(SO_2F)_2$) of 1.0 mol were added per 1 L of the non-aqueous solvent of this mixed liquid. Furthermore, succinic anhydride (SAH) of 1 mass %, propionitrile (PrN) of 125 ppm (mass ratio), and acetic acid (AA) of 1.0 ppm (mass ratio) were added to the non-aqueous electrolyte solution so as to obtain an electrolyte solution of Example 34. A battery was manufactured using this electrolyte solution on the basis of the method described above in the chapter (1-3), and evaluation of the multi-layered laminate-type battery was performed in the sequence described in the chapters (2-1) and (2-2).

Example 35

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate ($LiPF_6$) of 1.3 mol was added per 1 L of the non-aqueous solvent of this mixed liquid. Furthermore, succinic anhydride (SAH) of 1 mass %, propionitrile (PrN) of 10 ppm (mass ratio), and acetic acid (AA) of 0.4 ppm (mass ratio)

were added to the non-aqueous electrolyte solution so as to obtain an electrolyte solution of Example 35. A battery was manufactured using this electrolyte solution on the basis of the method described above in the chapter (1-3), and evaluation of the multi-layered laminate-type battery was performed in the sequence described in the chapters (2-1) and (2-2).

Example 36

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol was added per 1 L of the non-aqueous solvent of this mixed liquid. Furthermore, succinic anhydride (SAH) of 1 mass %, propionitrile (PrN) of 90 ppm (mass ratio), and acetic acid (AA) of 2.5 ppm (mass ratio) were added to the non-aqueous electrolyte solution so as to obtain an electrolyte solution of Example 36. A battery was manufactured using this electrolyte solution on the basis of the method described above in the chapter (1-3), and evaluation of the multi-layered laminate-type battery was performed in the sequence described in the chapters (2-1) and (2-2).

Comparative Example 27

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol was added per 1 L of the non-aqueous solvent of this mixed liquid. In addition, succinic anhydride (SAH) of 1 mass % was added to the non-aqueous electrolyte solution to obtain an electrolyte solution of Comparative Example 27. Note that acetic acid and propionitrile are not added in Comparative Example 27. A battery was manufactured using this electrolyte solution on the basis of the method described above in the chapter (1-3), and evaluation of the multi-layered laminate-type battery was performed in the sequence described in the chapters (2-1) and (2-2).

Comparative Example 28

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 0.3 mol and lithium bis (fluorosulfonyl) imide (LiN(SO$_2$F)$_2$) of 1.0 mol were added per 1 L of the non-aqueous solvent of this mixed liquid. Furthermore, succinic anhydride (SAH) of 1 mass % and propionitrile of 105 ppm were added to the non-aqueous electrolyte solution so as to obtain an electrolyte solution of Comparative Example 28. Note that acetic acid is not added in Comparative Example 28. A battery was manufactured using this electrolyte solution on the basis of the method described above in the chapter (1-3), and evaluation of the multi-layered laminate-type battery was performed in the sequence described in the chapters (2-1) and (2-2).

Comparative Example 29

An electrolyte solution was prepared by mixing a predetermined amount of various solvents and additives as shown in the following Table 23. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol was added per 1 L of the non-aqueous solvent of this mixed liquid. Furthermore, succinic anhydride (SAH) of 1 mass %, propionitrile (PrN) of 500 ppm (mass ratio), and acetic acid (AA) of 100 ppm (mass ratio) were added to the non-aqueous electrolyte solution so as to obtain an electrolyte solution of Comparative Example 29. A battery was manufactured using this electrolyte solution on the basis of the method described above in the chapter (1-3), and evaluation of the multi-layered laminate-type battery was performed in the sequence described in the chapters (2-1) and (2-2).

TABLE 23

| | Solvent | | | | Lithium salt | |
| --- | --- | --- | --- | --- | --- | --- |
| | AcN (vol %) | DEC (vol %) | EC (vol %) | VC (vol %) | LiPF$_6$ (mol/1 L solvent) | Imide salt Type |
| Example 33 | 47 | 28 | 21 | 4 | 0.3 | LiN(SO$_2$F)$_2$ |
| Example 34 | 47 | 28 | 21 | 4 | 0.3 | LiN(SO$_2$F)$_2$ |
| Example 35 | 47 | 28 | 21 | 4 | 1.3 | — |
| Example 36 | 47 | 28 | 21 | 4 | 1.3 | — |
| Comparative Example 27 | 47 | 28 | 21 | 4 | 1.3 | — |
| Comparative Example 28 | 47 | 28 | 21 | 4 | 0.3 | LiN(SO$_2$F)$_2$ |
| Comparative Example 29 | 47 | 28 | 21 | 4 | 1.3 | — |

TABLE 23-continued

|  | Lithium salt | Additive | | | Safety valve opereation before explosion | HF generation amount (mg) |
|---|---|---|---|---|---|---|
|  | Imide salt Content (mol/1 L solvent) | Cyclic acid anhydride (mass %) | Propionitrile (ppm) | Acetic acid (ppm) | | |
| Example 33 | 1.0 | SAH 1.0 | 11 | 0.2 | ○ | 0.32 |
| Example 34 | 1.0 | SAH 1.0 | 125 | 1 | ○ | 0.35 |
| Example 35 | — | SAH 1.0 | 10 | 0.4 | ○ | 0.28 |
| Example 36 | — | SAH 1.0 | 90 | 2.5 | ○ | 0.4 |
| Comparative Example 27 | — | SAH 1.0 | 0 | 0 | x | 18 |
| Comparative Example 28 | 1.0 | SAH 1.0 | 105 | 0 | x | 14 |
| Comparative Example 29 | — | SAH 1.0 | 500 | 100 | Safety valve operation before overcharge test | |

In the experiment, that the safety valve has been operated before explosion caused by gas generation was examined for Examples 33 to 36 and Comparative Examples 27 to 29, and the HF generation amount was measured. The experimental result is shown in the aforementioned Table 23.

As shown in Table 23, if the safety valve is operated before explosion caused by gas generation, the mark "o" was given. If the safety valve is not operated, the mark "x" was given.

That is, the battery appearance was observed until explosion. In the batteries of Examples 33 to 36, cell expansion abruptly occurs immediately before explosion, and the safety valve is operated to release the internal gas. The explosion occurred after releasing the gas. In comparison, in the batteries of Comparative Examples 27 to 29, explosion occurred before the gas is released from the safety valve.

In Comparative Example 29, propionitrile and acetic acid were excessively added, so that the battery was significantly expanded in the full-charge state, and the safety valve was operated before the overcharge test. Since a normal state is not established in a typical voltage range, the subsequent overcharge test was interrupted.

In the aforementioned description, similar to the non-aqueous electrolyte solutions of Examples 33 to 36, it was recognized that the electrolyte solution preferably contains acetonitrile, lithium salt, propionitrile, and acetic acid. As a result, it is possible to appropriately activate a function of reducing the HF gas generation amount caused by combustion by operating the safety valve due to the gas generated before the battery cell is combusted. Meanwhile, similar to the comparative example, the gas generation amount is small if both propionitrile and acetic acid are not contained. Therefore, the safety valve is not operated, and the fluorine compound serving as a HF source in the cell remains. As a result, a high concentration of HF is generated due to the explosion.

On the basis of the experimental results of Examples 33 to 36 and Comparative Examples 27 to 29, it was preferable that the content of acetic acid is set to 0.1 ppm or more and 10 ppm or less with respect to the non-aqueous electrolyte solution, and the content of propionitrile is set to 1 ppm or more and 300 ppm or less with respect to the non-aqueous electrolyte solution.

On the basis of the experimental results of Examples 33 to 36, it was preferable that the content of acetic acid is set to 0.1 ppm or more and 5 ppm or less with respect to the non-aqueous electrolyte solution, and the content of propionitrile is set to 1 ppm or more and 200 ppm or less with respect to the non-aqueous electrolyte solution.

On the basis of Examples 33 to 36, it was preferable that the HF gas generation amount in the overcharge test is set to 0.5 mg or less per 1 Ah. Preferably, the HF gas generation amount per 1 Ah is 0.1 mg or less, and more preferably 0.05 mg or less. Note that, since the design capacity value of the multi-layered laminate-type battery in this experiment is approximately 10 Ah, a value obtained by dividing the HF gas generation amount of Table 23 by "10" becomes the HF gas generation amount per 1 Ah.

Next, an example of the twenty fourth embodiment will now be described.

<Manufacturing of Non-Aqueous Secondary Battery>

(1-1) Fabrication of Positive Electrode

A composite oxide ($LiNi_{1/3}Mn_{1/3}Co_{1/3}O_2$) of lithium, nickel, manganese, and cobalt as the positive-electrode active material, acetylene black powder as the conductive aid, and polyvinylidene fluoride (PVDF) as the binder were mixed at a mass ratio of "86:8:6" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on both surfaces of an aluminum foil, which will serve as a positive electrode current collector, while adjusting the basis weight of one surface to 11.5 mg/cm². When the positive electrode mixture-containing slurry was coated on the aluminum foil, an uncoated region was formed so as to expose a part of the aluminum foil. Then, roll pressing was performed using a roll press machine until the mixture layer has a density of 2.8 mg/cm³, so that a positive electrode having the positive-electrode active material layer and the positive electrode current collector was obtained.

Then, this positive electrode was cut such that the coat portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite as the negative-electrode active material, acetylene black as the conductive aid, and PVDF as the binder were mixed at a mass ratio of "86:7:7" to obtain a negative electrode mixture. An appropriate amount of water was added to the obtained negative electrode mixture, and they were mixed sufficiently to prepare negative electrode mixture-containing slurry. This negative electrode mixture-containing slurry was coated on both surfaces of a copper foil while adjusting the basis weight of one surface to 6.9 mg/cm². When the negative electrode mixture-containing slurry was coated on the copper foil, an uncoated region was formed so as to expose a part of the copper foil. Then, roll pressing was performed using a roll press machine until the mixture layer has a density of 1.3 mg/cm³, so that a negative electrode having the negative-electrode active material layer and the negative electrode current collector was obtained.

Then, this negative electrode was cut such that the coat portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Assembly of Multi-Layered Laminate-Type Battery

The lead-attached positive electrode and the lead-attached negative electrode were overlapped by interposing a polyethylene resin film while the mixture coat surfaces of each electrode face each other, so that a laminated electrode structure was obtained. This laminated electrode structure was housed in an aluminum laminated sheet package, and vacuum drying was performed for 5 h at 80° C. in order to remove moisture. Subsequently, an electrolyte solution was injected into the package, and the package was sealed, so that a multi-layered laminate non-aqueous secondary battery (pouch type cell battery, hereinafter, simply referred to as "multi-layered laminate-type battery") was manufactured. A hole serving as a safety valve mechanism was formed in the welding side having no positive electrode terminal and no negative electrode terminal. The periphery of the hole was heat-sealed in a concentric shape.

The multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, initial charging/discharging treatment was performed in the following sequence. Subsequently, the 2 C overcharge test was performed. Here, "1 C" refers to a current value at which a fully charged battery is expected to be discharged in one hour at a constant current to terminate the discharge. In the following description, "1 C" refers to a current value at which the discharge operation is expected to be terminated in one hour by discharging the battery from a full-charge state of 4.2 V to a voltage of 3.0 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) Overcharge Test

The multi-layered laminate-type battery subjected to the initial charging/discharging treatment described above was charged with a constant current of 0.2 C at a temperature of 25° C. to a voltage of 4.2 V and was then charged with a constant voltage of 4.2 V for one hour. An overcharge test was performed as described below for the battery charged to a full-charge state. A DC power source PAT60-133T produced by Kikusui Electronics Co., Ltd. was used as a power source, and was set at the room temperature (25±+5 C), a constant current corresponding to "2 C", and a constant voltage of 60 V. The current, voltage, and temperature of each part and the atmospheric temperature during the test were recorded every 100 ms by using Memory High Logger LR8400 produced by Hioki Denki Co. Ltd. At the same time, the battery appearance was also observed and recorded by video.

In order to measure the amount of CO caused by overcharging, the overcharge test was performed under an Ar atmosphere by placing the battery in a metal test container (approximately 350 mm in height and width). After explosion, an Ar gas having a volume three times that of the container was injected into the container, and the generated gas was collected in a gas bag. The collected gas (CO) was quantitatively analyzed on the basis of the GC-TCD method.

Example 37

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate ($LiPF_6$) of 0.3 mol and lithium bis (fluorosulfonyl) imide ($LiN(SO_2F)_2$) of 1.0 mol were added per 1 L of the non-aqueous solvent of this mixed liquid. Furthermore, succinic anhydride (SAH) of 0.7 mass %, acetaldehyde (AcA) of 52 ppm, and a transition metal nitrile complex (MC) of 4008 ppm were added to the non-aqueous electrolyte solution. The addition amounts of acetaldehyde and the nitrile complex of the transition metal as additives were expressed as a weight ratio (ppm) with respect to the electrolyte solution dissolved with the electrolyte.

The added transition metal nitrile complex was set as follows. Specifically, an aluminum laminated bag was fabricated in a size of 2.7 cm by 6 cm, and the positive electrode fabricated as described above was punched with a hole of 23 mm by 17 mm, so that an acetonitrile solution of lithium hexafluorophosphate ($LiPF_6$) of 1.3 mol/L was injected, and the electrode was immersed. After the injection, the aluminum laminated bag was sealed and was stored at a temperature of 60° C. for 10 days while being vertically erected. After the storage, the aluminum laminated bag was opened, and the gel-like transition metal nitrile complex produced inside was recovered and dried. The dried solid contained Ni of 5.6 mass %, Co of 5.5 mass %, and Mn of 0.48 mass %, and the metal content ratio was 11.6 mass/%. The other components were acetonitrile, water, and $PF_6$ anions. Note that this transition metal nitrile complex was also used in Examples 38 to 40 and Comparative Example 34.

For the multi-layered laminate-type battery containing the electrolyte solution of Example 37 obtained as described above, evaluation of the multi-layered laminate-type battery was performed in the sequence described in the chapters (2-1) and (2-2).

Example 38

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 0.3 mol and lithium bis (fluorosulfonyl) imide (LiN(SO$_2$F)$_2$) of 1.0 mol were added per 1 L of the non-aqueous solvent of this mixed liquid. Furthermore, succinic anhydride (SAH) of 0.7 mass %, acetaldehyde (AcA) of 1595 ppm, and a transition metal nitrile complex (MC) of 2190 ppm were added to the non-aqueous electrolyte solution. For the multi-layered laminate-type battery containing the electrolyte solution of Example 38 obtained as described above, evaluation of the multi-layered laminate-type battery was performed in the sequence described in the chapters (2-1) and (2-2).

Example 39

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol was added per 1 L of the non-aqueous solvent of this mixed liquid. Furthermore, succinic anhydride (SAH) of 0.7 mass %, acetaldehyde (AcA) of 93 ppm, and a transition metal nitrile complex (MC) of 2922 ppm were added to the non-aqueous electrolyte solution. For the multi-layered laminate-type battery containing the electrolyte solution of Example 39 obtained as described above, evaluation of the multi-layered laminate-type battery was performed in the sequence described in the chapters (2-1) and (2-2).

Example 40

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol was added per 1 L of the non-aqueous solvent of this mixed liquid. Furthermore, succinic anhydride (SAH) of 0.7 mass %, acetaldehyde (AcA) of 1610 ppm, and a transition metal nitrile complex (MC) of 1822 ppm were added to the non-aqueous electrolyte solution. For the multi-layered laminate-type battery containing the electrolyte solution of Example 40 obtained as described above, evaluation of the multi-layered laminate-type battery was performed in the sequence described in the chapters (2-1) and (2-2).

Comparative Example 30

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 0.3 mol and lithium bis (fluorosulfonyl) imide (LiN(SO$_2$F)$_2$) of 1.0 mol were added per 1 L of the non-aqueous solvent of this mixed liquid. In Comparative Example 30, succinic anhydride (SAH), acetaldehyde (AcA), and transition metal nitrile complex (MC) were not added. For the multi-layered laminate-type battery containing the electrolyte solution of Comparative Example 30 obtained as described above, evaluation of the multi-layered laminate-type battery was performed in the sequence described in the chapters (2-1) and (2-2).

Comparative Example 31

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol and lithium bis (fluorosulfonyl) imide (LiN(SO$_2$F)$_2$) of 1.0 mol were added per 1 L of the non-aqueous solvent of this mixed liquid. Furthermore, succinic anhydride (SAH) of 0.7 mass % was added to the non-aqueous electrolyte solution. In Comparative Example 31, acetaldehyde (AcA) and transition metal nitrile complex (MC) were not added. For the multi-layered laminate-type battery containing the electrolyte solution of Comparative Example 31 obtained as described above, evaluation of the multi-layered laminate-type battery was performed in the sequence described in the chapters (2-1) and (2-2).

Comparative Example 32

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 0.3 mol and lithium bis (fluorosulfonyl) imide (LiN(SO$_2$F)$_2$) of 1.0 mol were added per 1 L of the non-aqueous solvent of this mixed liquid. Furthermore, succinic anhydride (SAH) of 0.7 mass % was added to the non-aqueous electrolyte solution. In Comparative Example 32, acetaldehyde (AcA) was not added. For the multi-layered laminate-type battery containing the electrolyte solution of Comparative Example 32 obtained as described above, evaluation of the multi-layered laminate-type battery was performed in the sequence described in the chapters (2-1) and (2-2).

Comparative Example 33

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate (LiPF$_6$) of 1.3 mol was added per 1 L of the non-aqueous solvent of this mixed liquid. Furthermore, succinic anhydride (SAH) of 0.7 mass % and acetaldehyde (AcA) of 75 ppm were added to the non-aqueous electrolyte solution. In Comparative Example 33, the transition metal nitrile complex (MC) was not added. For the multi-layered laminate-type battery containing the electrolyte solution of Comparative Example 33 obtained as described above, evaluation of the multi-layered laminate-type battery was performed in the sequence described in the chapters (2-1) and (2-2).

Comparative Example 34

An electrolyte solution was prepared by mixing a predetermined amount of various solvents and additives as shown in the following Table 24. That is, acetonitrile (AcN), diethyl carbonate (DEC), vinylene carbonate (VC), and ethylene carbonate (EC) were added and mixed at a volume ratio of "47:28:4:21". In addition, lithium hexafluorophosphate ($LiPF_6$) of 1.3 mol was added per 1 L of the non-aqueous solvent of this mixed liquid. Furthermore, acetaldehyde (AcA) of 82 ppm and a transition metal nitrile complex (MC) of 3003 ppm were added to the non-aqueous electrolyte solution. In Comparative Example 34, succinic anhydride (SAH) was not added. For the multi-layered laminate-type battery containing the electrolyte solution of Comparative Example 34 obtained as described above, evaluation of the multi-layered laminate-type battery was performed in the sequence described in the chapters (2-1) and (2-2).

ing the gas. In comparison, in the non-aqueous secondary batteries of Comparative Examples 31 to 33, explosion was generated before the gas is discharged from the safety valve.

From this fact, it was recognized that, since acetaldehyde, a cyclic acid anhydride and a transition metal nitrile complex exist in the electrolyte solution, gas is generated, and the safety valve is operated before the battery cell is combusted, so that it is possible to reduce the CO generation amount caused by combustion.

Meanwhile, in a case where every component of acetaldehyde, the cyclic acid anhydride and the transition metal nitrile complex is not provided as in the comparative examples, the gas generation amount before explosion is small, and thus, the safety valve is not operated. For this reason, it was recognized that a compound serving as a CO

TABLE 24

| | Solvent | | | | Lithium salt | |
|---|---|---|---|---|---|---|
| | | | | | $LiPF_6$ | |
| | AcN (vol %) | DEC (vol % | EC (vol %) | VC (vol %) | (mol/1 L solvent) | Imide salt Type |
| Example 37 | 47 | 28 | 21 | 4 | 0.3 | $LiN(SO_2F)_2$ |
| Example 38 | 47 | 28 | 21 | 4 | 0.3 | $LiN(SO_2F)_2$ |
| Example 39 | 47 | 28 | 21 | 4 | 1.3 | — |
| Example 40 | 47 | 28 | 21 | 4 | 1.3 | — |
| Comparative Example 30 | 47 | 28 | 21 | 4 | 0.3 | $LiN(SO_2F)_2$ |
| Comparative Example 31 | 47 | 28 | 21 | 4 | 1.3 | $LiN(SO_2F)_2$ |
| Comparative Example 32 | 47 | 28 | 21 | 4 | 1.3 | $LiN(SO_2F)_2$ |
| Comparative Example 33 | 47 | 28 | 21 | 4 | 1.3 | — |
| Comparative Example 34 | 47 | 28 | 21 | 4 | 1.3 | — |

| | Lithium salt Imide salt Content (mol/1 L solvent) | Additive | | | Safety valve opereation before explosion | CO generation amount (mg) |
|---|---|---|---|---|---|---|
| | | Cyclic acid anhydride (mass %) | Acetaldehyde (ppm) | Transition metal nitrile complex (ppm) | | |
| Example 37 | 1.0 | SAH 0.7 | 52 | 4008 | o | 5.7 |
| Example 38 | 1.0 | SAH 0.7 | 1595 | 2190 | o | 6.5 |
| Example 39 | — | SAH 0.7 | 93 | 2922 | o | 4.9 |
| Example 40 | — | SAH 0.7 | 1610 | 1822 | o | 5.6 |
| Comparative Example 30 | 1.0 | — | — | — | Overcharge test is not allowable | |
| Comparative Example 31 | 1.0 | SAH 0.7 | — | — | x | 13.3 |
| Comparative Example 32 | 1.0 | SAH 0.7 | — | — | x | 15.1 |
| Comparative Example 33 | — | SAH 0.7 | 75 | — | x | 11.2 |
| Comparative Example 34 | — | — | 82 | 3003 | Overcharge test is not allowable | |

As shown in Table 24, whether or not the safety valve has been operated before explosion caused by gas generation was examined for the examples and the comparative examples. If the safety valve has been operated before explosion, the mark "o" was given. If the safety valve has not been operated before explosion, the mark "x" was given. In addition, the CO generation amount caused by the overcharging is shown in Table 24.

In the non-aqueous secondary batteries of Examples 37 to 40, the battery cell expanded due to the gas generated before explosion, the safety valve was operated, and the internal gas was discharged. Explosion was generated after dischargsource remains in the battery cell, so that a high concentration of CO gas is generated by explosion. Note that, since deterioration violently proceeded in the initial charging/discharging treatment step, and the swelling occurred in the batteries of Comparative Examples 30 and 34, it was difficult to perform the overcharge test.

On the basis of Examples 37 to 40 and Comparative Examples 30 to 34, it was preferable that the content of acetaldehyde is 1 ppm or more and 3000 ppm or less with respect to the non-aqueous electrolyte solution. In addition, it was preferable that the content of acetaldehyde is 10 ppm or more and 2500 ppm or less, and more preferably, 30 ppm or more and 2000 ppm or less with respect to the non-aqueous electrolyte solution.

On the basis of Examples 37 to 40 and Comparative Examples 30 to 34, it was preferable that the content of cyclic acid anhydride is 0.01 mass % or more and 1 mass % or less with respect to the non-aqueous electrolyte solution. In addition, it was more preferable that the content of cyclic acid anhydride is 0.1 mass % or more and 1 mass % or less with respect to the non-aqueous electrolyte solution.

It was recognized that the nitrile complex in the electrolyte solution is a nitrile complex obtained by reaction between the non-aqueous electrolyte solution and the positive-electrode active material containing at least one transition metal element selected from a group consisting of Ni, Mn, and Co.

On the basis of Examples 37 to 40 and Comparative Examples 30 to 34, it was preferable that the content of the nitrile complex as a transition metal is 0.01 ppm or more and 500 ppm or less with respect to the non-aqueous electrolyte solution. In addition, on the basis of Examples 37 to 40, it was preferable that the content of the nitrile complex as a transition metal is 100 ppm or more and 500 ppm or less, and more preferably, 200 ppm or more and 500 ppm or less with respect to the non-aqueous electrolyte solution.

On the basis of Examples 37 to 40, it was preferable that the CO gas generation amount caused by the overcharge test is 1 g or less per 1 Ah. The CO gas generation amount is more preferably 0.7 g or less. Note that, since the design capacity value of the multi-layered laminate-type battery in this experiment is approximately 10 Ah, a value obtained by dividing the CO gas generation of Table 24 by "10" is the CO gas generation amount per 1 Ah.

Next, an example of the twenty fifth embodiment will be described.

<Manufacturing of Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:–5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on one surface of a copper foil having a thickness of 10 μm and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, glass fiber filter paper (glass fiber filtering sheet, GA-100 produced by Advantech Co., Ltd.) punched in a disk shape having a diameter of 16 mm was set thereon, and an electrolyte solution was injected by 150 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging treatment was performed in the sequence of the following chapter (2-1). Then, each battery was evaluated in the sequence of the chapter (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) Initial Charging/Discharging Treatment for Coin Type Non-Aqueous Secondary Battery The battery was charged with a constant current of 0.3 mA corresponding to "0.1 C" to a voltage of 4.2 V by setting the battery ambient temperature to 25° C., and was then charged with a constant voltage of 4.2 V for a total of 1.5 hours. Then, the battery was discharged to a voltage of 3.0 V with a constant current of 0.9 mA corresponding to "0.3 C".

Initial efficiency was calculated by dividing the discharge capacity at this time by the charge capacity.

(2-2) Charging/Discharging Cycle Test for Coin Type Non-Aqueous Secondary Battery A cycle test was performed for the battery subjected to the initial charging/discharging treatment as described in the chapter (2-1). First, the battery was charged with a constant current of 3 mA corresponding to "1 C" by setting the battery ambient temperature to 25° C., and was then charged with a constant voltage of 4.2 V for a total of 3 hours. Then, the battery was discharged with a constant current of 3 mA to a voltage of 4.2 V. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%.

(2-3) Measurement of Electrochemical Impedance Spectroscopy

The measurement of electrochemical impedance spectroscopy was performed using a frequency response analyzer 1400 (model name) produced by AMETEK, Inc. and potentio-galvanostat 1470E (model name) produced by AMETEK, Inc. An A.C. impedance value at 1 kHz was obtained by measuring impedance from a voltage/current response signal by applying an AC signal while changing frequencies 1000 kHz to 0.01 Hz. An amplitude of the applied AC voltage was set to "±5 mV". Furthermore, the battery ambient temperature at the time of measurement of electrochemical impedance spectroscopy was set to 25° C. In addition, the following values were calculated from such results.

As a non-aqueous secondary battery to be measured, a coin type non-aqueous secondary batteries charged in the first, fiftieth, and hundredth cycles were used, assuming that the charging/discharging cycle measurement is performed using the method described in the chapter (2-2) described above. The measurement was performed after the predetermined number of cycles. Then, the charging/discharging cycle measurement was continuously performed for the next measurement.

Example 41

Acetonitrile (AcN), diethyl carbonate (DEC), ethylene carbonate (EC), and vinylene carbonate (VC) were mixed under an inert atmosphere at a volume ratio of "44:25:26:5". In addition, lithium hexafluorophosphate (LiPF$_6$) of 0.25 mol and lithium bis (fluorosulfonyl) imide (LiN(SO$_2$F)$_2$) of 1.25 mol were dissolved per 1 L of this mixed liquid, and 2,6-di-tert-butyl-p-cresol (BHT) of 4 ppm and succinic anhydride of 0.2 mass % as the cyclic acid anhydride were added and mixed so as to obtain an electrolyte solution of Example 41. For the obtained electrolyte solution, it was visually inspected whether or not all of the lithium salts, BHT, and cyclic acid anhydride are dissolved. A battery was manufactured using this electrolyte solution on the basis of the method described above in the chapter (1-3), and measurement was performed in the sequence described above in the chapters (2-1) to (2-3).

Example 42

Acetonitrile (AcN), ethyl methyl carbonate (EMC), ethylene carbonate (EC), and vinylene carbonate (VC) were mixed under an inert atmosphere at a volume ratio of "35:40:21:4". In addition, lithium hexafluorophosphate (LiPF$_6$) of 0.6 mol and lithium bis (fluorosulfonyl) imide (LiN(SO$_2$F)$_2$) of 0.6 mol were dissolved per 1 L of this mixed liquid, and 2,6-di-tert-butyl-p-cresol (BHT) of 1 ppm and maleic anhydride of 0.15 mass % as the cyclic acid anhydride were added and mixed so as to obtain an electrolyte solution of Example 42. For the obtained electrolyte solution, it was visually inspected that all of the lithium salts, BHT, and cyclic acid anhydride are dissolved. A battery was manufactured using this electrolyte solution on the basis of the method described above in the chapter (1-3), and measurement was performed in the sequence described above in the chapters (2-1) to (2-3).

Example 43

Acetonitrile (AcN), diethyl carbonate (DEC), ethylene carbonate (EC), and vinylene carbonate (VC) were mixed under an inert atmosphere at a volume ratio of "45:13:25:17". In addition, lithium hexafluorophosphate (LiPF$_6$) of 0.5 mol and lithium bis(trifluoromethane sulfonyl) imide (LiN(SO$_2$CF$_3$)$_2$) of 1.5 mol were dissolved per 1 L of this mixed liquid, and 2,6-di-tert-butyl-p-cresol (BHT) of 15 ppm and phthalic anhydride of 0.5 mass % as the cyclic acid anhydride were added and mixed so as to obtain an electrolyte solution of Example 43. For the obtained electrolyte solution, it was visually inspected that all of the lithium salts, BHT, and cyclic acid anhydride are dissolved. A battery was manufactured using this electrolyte solution on the basis of the method described above in the chapter (1-3), and then measurement was performed in the sequence described above in the chapters (2-1) to (2-3).

Comparative Example 35

Acetonitrile (AcN), propylene carbonate (PC), and vinylene carbonate (VC) were mixed under an inert atmosphere at a volume ratio of "60:32:8". In addition, lithium hexafluorophosphate (LiPF$_6$) of 1.0 mol and lithium bis (fluorosulfonyl) imide (LiN(SO$_2$F)$_2$) of 0.1 mol were dissolved per 1 L of this mixed liquid, and maleic anhydride of 0.07 mass % as the cyclic acid anhydride was added and mixed so as to obtain an electrolyte solution of Comparative Example 35. The BHT is not added to this electrolyte solution. For the obtained electrolyte solution, it was visually inspected that all of the lithium salts and cyclic acid anhydride are dissolved. A battery was manufactured using this electrolyte solution on the basis of the method described above in the chapter (1-3), and then measurement was performed in the sequence described above in the chapters (2-1) to (2-3).

Comparative Example 36

Acetonitrile (AcN), diethyl carbonate (DEC), and vinylene carbonate (VC) were mixed under an inert atmosphere at a volume ratio of "85:11:4". In addition, lithium hexafluorophosphate (LiPF$_6$) of 1.1 mol was dissolved per 1 L of this mixed liquid, and 2,6-di-tert-butyl-p-cresol (BHT) of 5 ppm was added and mixed so as to obtain an electrolyte solution of Comparative Example 36. Note that cyclic acid anhydride is not added to this electrolyte solution. For the obtained electrolyte solution, it was visually inspected that all of the lithium salts and BHT are dissolved. A battery was manufactured using this electrolyte solution on the basis of the method described above in the chapter (1-3), and then measurement was performed in the sequence described above in the chapters (2-1) to (2-3).

In the following description, compositions of each non-aqueous electrolyte solution of Examples 41 to 43 and Comparative Examples 35 and 36 will be described.

TABLE 25

| | Solvent | | | | | | Lithium salt | | Additive | |
| | | | | | | | LiPF$_6$ | Imide salt | | Cyclic | 2,6-di- |
| | AcN (vol %) | DEC (vol %) | EMC (vol %) | EC (vol %) | VC (vol %) | PC (vol %) | (mol/1 L solvent) | Type | (mol/1 L solvent) | acid anhydride (mass %) | tert-butyl-p-cresol (ppm) |
|---|---|---|---|---|---|---|---|---|---|---|---|
| Example 41 | 44 | 25 | 0 | 26 | 5 | 0 | 0.25 | LiN(SO$_2$F)$_2$ | 1.25 | SAH 0.2 | 4 |
| Example 42 | 35 | 0 | 40 | 21 | 4 | 0 | 0.6 | LiN(SO$_2$F)$_2$ | 0.6 | MAH 0.15 | 1 |
| Example 43 | 45 | 13 | 0 | 25 | 17 | 0 | 0.5 | LiN(SO$_2$CF$_3$)$_2$ | 1.5 | PAH 0.5 | 15 |
| Comparative Example 35 | 60 | 0 | 0 | 0 | 8 | 32 | 1.0 | LiN(SO$_2$F)$_2$ | 0.1 | MAH 0.07 | — |
| Comparative Example 36 | 85 | 11 | 0 | 0 | 4 | 0 | 1.1 | — | — | — | 5 |

The following Table 26 shows the capacity retention rate and the A.C. impedance value when the cycle test is performed by 100 cycles at 25° C. in Examples 41 to 43 and Comparative Examples 35 and 36.

TABLE 26

| | Initial charge/discharge initial efficiency [%] | 25° C. cycle test capacity retention rate [%] | A.C. impedance value at 1 kHz [Ω] | | |
| | | | 1 cycle | 50 cycle | 100 cycle |
|---|---|---|---|---|---|
| Example 41 | 86 | 90 | 2.6 | 3.1 | 3.6 |
| Example 42 | 85 | 87 | 2.8 | 3.3 | 3.7 |
| Example 43 | 85 | 85 | 3.0 | 3.4 | 3.9 |
| Comparative Example 35 | 85 | 69 | 3.1 | 5.3 | 6.8 |
| Comparative Example 36 | 84 | 66 | 3.0 | 5.8 | 8.2 |

As shown in Table 26, it was recognized that, in all of Examples 41 to 43, the capacity retention rate in the cycle test performed by 100 cycles at 25° C. is 80% or higher. In addition, it was recognized that a capacity retention rate higher than 85% can be obtained in Examples 41 and 42.

From the aforementioned description, it was recognized that, similar to the non-aqueous electrolyte solutions of Examples 41 to 43, the non-aqueous electrolyte solution preferably contains acetonitrile, and farther, 2,6-di-tert-butyl-p-cresol, and cyclic acid anhydride. Meanwhile, in Comparative Examples 35 and 36, any one of 2,6-di-tert-butyl-p-cresol and cyclic acid anhydride was not contained.

The content of 2,6-di-tert-butyl-p-cresol was set to 0.1 ppm or more and 100 ppm or less with respect to the non-aqueous electrolyte solution, so as to be contained in Examples 41 to 43, but not to be contained in Comparative Example 35. In addition, the content of cyclic acid anhydride was set to 0.01 mass % or more and 1 mass % or less with respect to the non-aqueous electrolyte solution, so as to be contained in Examples 41 to 43, but not to be contained in Comparative Example 36.

On the basis of Examples 41 to 42, preferably, the content of 2,6-di-tert-butyl-p-cresol was set to 0.5 ppm or more and 10 ppm or less with respect to the non-aqueous electrolyte solution, and the content of cyclic acid anhydride was set to 0.1 mass % or more and 0.5 mass % or less with respect to the non-aqueous electrolyte solution. As a result, it was recognized that the capacity retention rate in the cycle test of 100 cycles at 25° C. can be higher than 85%, the A.C. impedance of 50 cycles in the electrochemical impedance spectroscopy test can be smaller than 3.4 ohms, and the A.C. impedance in 100 cycles can be suppressed to 3.8 ohms or smaller.

On the basis of the examples, it was preferable that cyclic acid anhydride includes at least one selected from a group consisting of succinic anhydride, maleic anhydride, and phthalic anhydride.

Examples of the twenty sixth and twenty seventh embodiments will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 27. Note that, in Table 27, "AcN" denotes acetonitrile, "DEC" denotes diethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, "MBTA" denotes 1-methyl-1H-benzotriazole, and "SAH" denotes succinic anhydride.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L.

TABLE 27

| | Solvent | | | | LiPF₆ | Imide salt | | Additive | |
| | AcN (vol %) | DEC (vol %) | EC (vol %) | VC (vol %) | (mol/1 L solvent) | Type | Content (mol/1 L solvent) | Cyclic acid anhydride (mass %) | Nitrogen-containing compound (mass %) |
|---|---|---|---|---|---|---|---|---|---|
| Example 44 | 47 | 28 | 21 | 4 | 0.3 | LiN(SO₂F)₂ | 1.0 | SAH 0.14 | MBTA 0.5 |
| Example 45 | 47 | 28 | 21 | 4 | 1.3 | — | — | SAH 0.14 | MBTA 0.5 |
| Comparative Example 37 | 47 | 28 | 21 | 4 | 0.3 | LiN(SO₂F)₂ | 1.0 | SAH 0.14 | — |
| Comparative Example 38 | 47 | 28 | 21 | 4 | 1.3 | — | — | SAH 0.14 | — |

<Manufacturing of Battery>
<Fabrication of Positive Electrode>

A composite oxide ($LiNi_{0.5}Mn_{0.3}Co_{0.2}O_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to approximately 95.0 g/m². When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.50 g/cm³, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 61.0 g/m². When the negative electrode mixture-containing slurry was coated on the copper foil, an uncoated region was formed so as to expose a part of the copper foil. Then, roll pressing was performed using a roll press machine until the negative-electrode active material layer has a density of 1.35 mg/cm³, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, initial charging treatment was performed in the sequence of the following chapter (1-1). Then, each battery was evaluated in the sequence of the chapter (1-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge to terminate the discharge. That is, "1 C" refers to a current value at which the discharge operation is expected to be terminated in one hour by discharging the battery from a full-charge state of 4.2 V to a voltage of 3.0 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for 1.5 hours. Then, the battery was discharged with a constant current of 6.9 mA corresponding to "0.3 C" to a voltage of 3.0 V. Initial efficiency was calculated by dividing the discharge capacity at this time by the charge capacity.

(1-2) 50° C. Charging/Discharging Cycle Test for Single-Layered Laminate-Type Battery A cycle test was performed for the battery subjected to the initial charging/discharging treatment using the method described in the aforementioned chapter (1-1). The cycle test was initiated 3 hours later after the battery ambient temperature is set to 50° C. First, the battery was charged with a constant current of 46 mA corresponding to "2 C" to a voltage of 4.2 V, and was then charged with a constant voltage of 4.2 V for a total of 3 hours. Then, the battery was discharged with a constant current of 46 mA to a voltage of 3.0 V. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%.

(2) Measurement of Transition Metal Elution Amount

An X-ray photoelectron spectroscopy (XPS) analysis was performed to measure the transition metal elution amount. As an XPS analyzer, Versa ProbeII produced by ULVAC-PHI, Inc. was employed. As an analysis condition, an excitation source was set to mono. AlKα 15 kV×3.3 mA, an analysis size was set to approximately 200 μmφ, and a photoelectron emission angle was set to 45°. In addition, the measurement sample was disassembled from the battery before the test, and the obtained negative electrode was immersed in acetonitrile for approximately 1 minute to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box having a dew point controlled to −60° C. or lower. The sample was delivered to the XPS device without exposure to the atmosphere using a dedicated tool. A relative element concentration of each element was obtained using the area intensity of each peak (C1S, O1s, F1s, P2p, N1s, S2p, Li1s, Mn3p, Ni3p, and Co3p) and a relative sensitivity coefficient of the device. Here, peak splitting was performed on the Ni3p, Co3p, and Mn3p spectra observed at approximately 40 to 80 eV to derive the area intensity, so that a Ni-concentration, a Co-concentration, and a Mn-concentration were obtained.

TABLE 28

| | 50° C. cycle test capacity retention rate [%] | Transition metal elution amount [ppm] | | |
|---|---|---|---|---|
| | | Mn | Ni | Co |
| Example 44 | 87 | 0.4 | 0.2 | 0.2 |
| Example 45 | 85 | 0.4 | 0.3 | 0.3 |
| Comparative Example 37 | 72 | 1.2 | 1.1 | 0.3 |
| Comparative Example 38 | 66 | 1.5 | 1.3 | 0.5 |

As described in conjunction with Examples 44 and 45, it was possible to obtain a capacity retention rate of 75% or higher. In addition, in the examples, it was possible to suppress the transition metal elution amount of Mn, Ni, and Co to be smaller than that of the comparative examples.

Next, examples of the twenty eighth to thirty first embodiments will now be described.

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture.

N-methyl-2-pyrrolidone as a solvent was added to the obtained positive electrode mixture until a solid content of 68 mass %, and they were further mixed to prepare positive electrode mixture-containing slurry.

This positive electrode mixture-containing slurry was coated on one surface of an aluminum foil having a thickness of 20 μm and a width of 200 mm, which will serve as a positive electrode current collector, using a doctor blade method while adjusting the basis weight to 24.0 mg/cm$^2$, and the solvent was dried and removed. Then, roll pressing was performed using a roll press machine to an actual electrode density of 2.90 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:−5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture.

Water as a solvent was added to the obtained negative electrode mixture until a solid content of 45 mass %, and they were further mixed to prepare negative electrode mixture-containing slurry.

This negative electrode mixture-containing slurry was coated on one surface of a copper foil having a thickness of 10 μm and a width of 200 mm, which will serve as a negative electrode current collector, using a doctor blade method while adjusting the basis weight to 10.6 mg/cm$^2$, and the solvent was dried and removed. Then, roll pressing was performed using a roll press machine to an actual electrode density of 1.50 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, glass fiber filter paper (glass fiber filtering sheet, GA-100 produced by Advantech Co., Ltd.) punched in a disk shape having a diameter of 16 mm was set thereon, and an electrolyte solution was injected by 150 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation on High-Temperature Characteristic of Coin Type Non-Aqueous Secondary Battery>

For the battery for evaluation obtained as described above, initial charging treatment was performed in the sequence of the following chapter (2-1). Then, each battery was evaluated in the sequence of the chapter (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) Initial Charging/Discharging Treatment for Coin Type Non-Aqueous Secondary Battery The battery was charged with a constant current of 0.6 mA corresponding to "0.1 C" to a voltage of 4.2 V by setting the battery ambient temperature to 25° C., and was then charged with a constant voltage of 4.2 V for a total of 15 hours. Then, the battery was discharged to a voltage of 3.0 V with a constant current of 1.8 mA corresponding to "0.3 C". Initial efficiency was calculated by dividing the discharge capacity at this time by the charge capacity.

(2-2) 60° C. Full-Charge Storage Test for Coin Type Non-Aqueous Secondary Battery For the battery subjected to the initial charging/discharging treatment as described above in the chapter (2-1), the battery was charged with a constant current of 6 mA corresponding to "1 C" to a voltage of 4.2 V by setting the battery ambient temperature to 25° C., and the battery was then charged with a constant voltage of 4.2 V for a total of 3 hours. Then, this non-aqueous secondary battery was stored in a thermostatic oven for 720 hours at 60° C. Then, the battery ambient temperature was recovered to 25° C.

(2-3) Measurement of Electrochemical Impedance Spectroscopy

The measurement of electrochemical impedance spectroscopy was performed using a frequency response analyzer 1400 (model name) produced by AMETEK, Inc. and potentio-galvanostat 1470E (model name) produced by AMETEK, Inc. An A.C. impedance value at 1 kHz was obtained by measuring impedance from a voltage/current response signal by applying an AC signal while changing frequencies 1000 kHz to 0.01 Hz. An amplitude of the applied AC voltage was set to "±5 mV". Furthermore, the battery ambient temperature at the time of measurement of electrochemical impedance spectroscopy was set to 25° C.

As a non-aqueous secondary battery to be measured, a coin type non-aqueous secondary battery not subjected to the 60° C. full-charge storage test and a non-aqueous secondary battery subjected to the 60° C. full-charge storage test were employed using the method described above in the chapter (2-2).

A resistance increase rate was calculated from such results as follows.

Resistance increase rate=(resistance value after 60° C. full-charge storage test/resistance value before 60° C. full-charge storage test)×100[%]

<Evaluation of Low-temperature Characteristic of Non-aqueous Electrolyte Solution>

(3-1) Cell Assembly and Measurement of Electrochemical Impedance Spectroscopy

The electrolyte solution prepared as described above was put into a sealed cell (cell size: 24 mm diameter, by 0.35 mm thickness) produced by TOYO Corporation, was sealed, and was inserted into a holder (SH1-Z), and wiring was performed. The cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature was set to four levels, that is, −30° C., −10° C., 0° C., and 20° C., and the measurement was initiated after 1.5 hours from each temperature setting. As the measurement data, data at the time point that a change of the data measured repeatedly at every 5 minutes is lower than 0.1% was employed.

(3-2) Ionic Conductivity

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm$^2$).

Example 46

Acetonitrile (AcN), ethyl methyl carbonate (EMC), ethylene carbonate (EC), and vinylene carbonate (VC) were mixed under an inert atmosphere at a volume ratio of "45:35:16:4". In addition, lithium hexafluorophosphate (LiPF$_6$) of 0.3 mol and lithium bis (fluorosulfonyl) imide (LiN(SO$_2$F)$_2$) of 1.3 mol were added per 1 L of the mixed solvent, and lithium difluorophosphate (LiPO$_2$F$_2$) of 0.1 mass % (1000 ppm) and succinic anhydride (SAH) of 0.5 mass % were dissolved, so as to obtain an electrolyte solution of Example 46. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

Example 47

Acetonitrile (AcN), diethyl carbonate (DEC), ethylene carbonate (EC), and vinylene carbonate (VC) were mixed under an inert atmosphere at a volume ratio of "50:35:10:5". In addition, lithium hexafluorophosphate (LiPF$_6$) of 0.3 mol and lithium bis(fluorosulfonyl) imide (LiN(SO$_2$F)$_2$) of 2.7 mol were added per 1 L of this mixed liquid, and lithium difluorophosphate (LiPO$_2$F$_2$) of 0.8 mass % (8000 ppm) and maleic anhydride (MAH) of 0.2 mass % were dissolved, so as to obtain an electrolyte solution of Example 47. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

Example 48

Acetonitrile (AcN), dimethyl carbonate (DMC), ethylene carbonate (EC), and vinylene carbonate (VC) were mixed under an inert atmosphere at a volume ratio of "65:6:22:7". In addition, lithium hexafluorophosphate ($LiPF_6$) of 0.6 mol and lithium bis (trifluoromethane sulfonyl) imide ($LiN(SO_2CF_3)_2$) of 0.6 mol were added per 1 L of this mixed liquid, and lithium difluorophosphate ($LiPO_2F_2$) of 0.005 mass % (50 ppm) and phthalic anhydride (PAH) of 0.5 mass % were dissolved, so as to obtain an electrolyte solution of Example 48. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

Comparative Example 39

Acetonitrile (AcN), diethyl carbonate (DEC), and vinylene carbonate (VC) were mixed under an inert atmosphere at a volume ratio of "47:42:11". In addition, lithium hexafluorophosphate ($LiPF_6$) of 1.3 mol and lithium bis (fluorosulfonyl) imide ($LiN(SO_2F)_2$) of 0.3 mol were added per 1 L of this mixed liquid, and maleic anhydride (MAH) of 0.05 mass % were dissolved, so as to obtain an electrolyte solution of Comparative Example 39. In Comparative Example 39, $LiPO_2F_2$ is not added. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

Comparative Example 40

Acetonitrile (AcN), dimethyl carbonate (DMC), ethylene carbonate (EC), and vinylene carbonate (VC) were mixed under an inert atmosphere at a volume ratio of "20:42:21:17". In addition, lithium hexafluorophosphate ($LiPF_6$) of 0.5 mol and lithium bis (fluorosulfonyl) imide ($LiN(SO_2F)_2$) of 0.5 mol were added per 1 L of this mixed liquid, and $LiPO_2F_2$ of 5 ppm was dissolved, so as to obtain an electrolyte solution of Comparative Example 40. In Comparative Example 40, cyclic acid anhydride is not added. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

Comparative Example 41

Acetonitrile (AcN), diethyl carbonate (DEC), ethylene carbonate (EC), and vinylene carbonate (VC) were mixed under an inert atmosphere at a volume ratio of "42:30:15:13". In addition, lithium hexafluorophosphate ($LiPF_6$) of 1.2 mol was added per 1 L of this mixed liquid, and lithium difluorophosphate ($LiPO_2F_2$) of 0.5 mass % (5000 ppm) and maleic anhydride (MAH) of 0.4 mass % were dissolved, so as to obtain an electrolyte solution of Comparative Example 41. In Comparative Example 41, imide salt is not added. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

Comparative Example 42

Lithium bis(fluorosulfonyl) imide ($LiN(SO_2F)_2$) of 4.2 mol was dissolved in acetonitrile (AcN) of 1 L under an inert atmosphere to obtain an electrolyte solution of Comparative Example 42. In Comparative Example 42, all of $LiPF_6$, $LiPO_2F_2$, and cyclic acid anhydride are not added. For the obtained electrolyte solution, it was visually inspected that all of the lithium salts are dissolved. A battery was manufactured using this electrolyte solution on the basis of the method described above in the chapter (1-3), evaluation of the coin type non-aqueous secondary battery was performed in the sequence described in the chapters (2-1) to (2-3), and the ionic conductivity at each temperature was calculated in the sequence described in the chapters (3-1) and (3-2).

The following table shows compositions of each non-aqueous electrolyte solution in Examples 46 to 48 and Comparative Examples 39 to 42.

TABLE 29

| | Solvent | | | | | | Lithium salt | | | Additive | | |
| | | | | | | | $LiPF_6$ | Imide salt | | | Cyclic acid | | |
| | AcN (vol %) | DEC (vol %) | EMC (vol %) | DMC (vol %) | EC (vol %) | VC (vol %) | (mol/1 L solvent) | Type | Content (mol/1 L solvent) | anhydride (mass %) | $LiPO_2F_2$ (ppm) | $LiPF_6$/AcN (molar ratio) |
|---|---|---|---|---|---|---|---|---|---|---|---|---|
| Example 46 | 45 | 0 | 0 | 35 | 16 | 4 | 0.3 | $LiN(SO_2F)_2$ | 1.3 | SAH 0.5 | 1000 | 0.03 |
| Example 47 | 50 | 35 | 0 | 0 | 10 | 5 | 0.3 | $LiN(SO_2F)_2$ | 2.7 | MAH 0.2 | 8000 | 0.03 |
| Example 48 | 65 | 0 | 6 | 0 | 22 | 7 | 0.6 | $LiN(SO_2CF_3)_2$ | 0.6 | PAH 0.5 | 50 | 0.05 |

TABLE 29-continued

| | Solvent | | | | | | LiPF$_6$ | Lithium salt Imide salt | | Additive | | |
| | AcN (vol %) | DEC (vol %) | EMC (vol %) | DMC (vol %) | EC (vol %) | VC (vol %) | (mol/1 L solvent) | Type | Content (mol/1 L solvent) | Cyclic acid anhydride (mass %) | LiPO$_2$F$_2$ (ppm) | LiPF$_6$/AcN (molar ratio) |
|---|---|---|---|---|---|---|---|---|---|---|---|---|
| Comparative Example 39 | 47 | 42 | 0 | 0 | 0 | 11 | 1.3 | LiN(SO$_2$F)$_2$ | 0.3 | MAH 0.05 | — | 0.15 |
| Comparative Example 40 | 20 | 0 | 0 | 42 | 21 | 17 | 0.5 | LiN(SO$_2$F)$_2$ | 0.5 | — | 5 | 0.13 |
| Comparative Example 41 | 42 | 30 | 0 | 0 | 15 | 13 | 1.2 | — | — | MAH 0.4 | 5000 | 0.15 |
| Comparative Example 42 | 100 | 0 | 0 | 0 | 0 | 0 | 0 | LiN(SO$_2$F)$_2$ | 4.2 | — | — | 0.00 |

The following Table 30 shows a resistance increase rate in the 60° C. full-charge storage test in Examples 46 to 48 and Comparative Examples 39 to 42.

TABLE 30

| | A.C. impedance value at 1 kHz [Ω] | | Resistance increase rate [%] | Determination |
| | Before storage test | After storage test | | |
|---|---|---|---|---|
| Example 46 | 2.5 | 5.7 | 228 | ○ |
| Example 47 | 3.1 | 6.3 | 203 | ○ |
| Example 48 | 3.0 | 7.2 | 240 | ○ |
| Comparative Example 39 | 3.0 | 15.2 | 507 | x |
| Comparative Example 40 | 3.3 | 18.2 | 552 | x |
| Comparative Example 41 | 3.1 | 7.0 | 226 | x |
| Comparative Example 42 | 3.9 | 20.1 | 515 | x |

The following Table 31 shows the ionic conductivity in Examples 46 to 48 and Comparative Examples 39 to 42.

TABLE 31

| | Iionic conductivity [mS/cm] | | | |
| | 20° C. | 0° C. | −10° C. | −30° C. |
|---|---|---|---|---|
| Example 46 | 21.0 | 16.0 | 13.5 | 7.1 |
| Example 47 | 19.0 | 15.5 | 12.5 | 6.6 |
| Example 48 | 20.0 | 15.5 | 12.0 | 6.2 |
| Comparative Example 39 | 20.5 | 15.0 | 8.2 | 2.9 |
| Comparative Example 40 | 16.5 | 13.5 | 11.9 | 5.8 |
| Comparative Example 41 | 19.6 | 12.9 | 6.2 | 2.0 |
| Comparative Example 42 | 11.9 | 6.9 | 5.4 | 1.2 |

As shown in Table 30 described above, it was recognized that the resistance increase rate is below 400% in all of Examples 46 to 48 and Comparative Example 41. In addition, it was recognized that the resistance increase rate is below 300% in all of Examples 46 to 48 and Comparative Example 41. In addition, it was recognized that the resistance increase rate is below 250% in all of Examples 46 to 48 and Comparative Example 41.

As shown in Table 31 described above, it was recognized that the −10° C. ionic conductivity is 10 mS/cm or higher in Examples 46 to 48 and Comparative Example 40. In addition, it was recognized that the −10° C. ionic conductivity is 12 mS/cm or higher in Examples 46 to 48. In addition, it was recognized that the −10° C. ionic conductivity is 12.5 mS/cm or higher in Examples 46 and 47.

As shown in Table 31 described above, it was recognized that the −30° C. ionic conductivity is 5 mS/cm or higher in Examples 46 to 48 and Comparative Example 40. In addition, it was recognized that the −30° C. ionic conductivity is 6 mS/cm or higher in Examples 46 to 48. In addition, it was recognized that the −30° C. ionic conductivity is 6.5 mS/cm or higher in Examples 46 and 47.

In the aforementioned description, it was recognized that, similar to the non-aqueous electrolyte solution of Examples 46 to 48, the non-aqueous electrolyte solution preferably contains acetonitrile, LiPF$_6$, LiPO$_2$F$_2$, cyclic acid anhydride, and imide salt. Meanwhile, in the comparative examples, any one of LiPF$_6$, LiPO$_2$F$_2$, cyclic acid anhydride, and imide salt is not contained.

LiPO$_2$F$_2$ contributes to reduction of the resistance increase rate during high-temperature heating. Therefore, a lower limit of LiPO$_2$F$_2$ is set to 0.001 mass % or more except for Comparative Example 40, and an upper limit of LiPO$_2$F$_2$ is set to 1 mass % or less on the basis of Example 47.

Cyclic acid anhydride contributes to reduction of the resistance increase rate during high-temperature heating. Therefore, a lower limit of cyclic acid anhydride is set to 0.01 mass % or more except for Comparative Example 39, and an upper limit of cyclic acid anhydride is set to 1 mass % or less on the basis of Examples 46 and 48.

In the electrolyte solutions of Examples 46 to 48, it was recognized that a percentage of the molar quantity of imide salt relative to a total molar quantity of the lithium salts contained in the electrolyte solution is 50% or higher. That is, it was recognized that the main component of the lithium salt of the electrolyte solutions of Examples 46 to 48 is imide salt.

In all of Examples 46 to 48, it was recognized that the imide salt is contained in a molarity relationship of "LiPF$_6$≤imide salt".

On the basis of the examples, it was preferable that the content of imide salt is 0.5 mol or more and 3.0 mol or less with respect to the non-aqueous solvent of 1 L.

On the basis of the examples, it was preferable that the mixed molar ratio of PF$_6$ anion is 0.01 or more and less than 0.08 with respect to acetonitrile.

On the basis of the examples, the content of LiPO$_2$F$_2$ was defined as 0.05 mass % or more and 1.0 mass % or less with respect to the non-aqueous electrolyte solution.

On the basis of the examples, the content of cyclic acid anhydride was defined as 0.1 mass % or more and 0.5 mass % or less with respect to the non-aqueous electrolyte solution.

On the basis of the examples, it was preferable that the imide salt includes at least one selected from a group consisting of lithium bis (fluorosulfonyl) imide ($LiN(SO_2F)_2$) and lithium bis(trifluoromethane sulfonyl) imide ($LiN(SO_2CF_3)_2$).

On the basis of the examples, it was preferable that cyclic acid anhydride includes at least one selected from a group consisting of succinic anhydride, maleic anhydride, and phthalic anhydride.

Examples of thirty second to thirty fourth embodiments will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 32. Note that, in Table 32, "AcN" denotes acetonitrile, "DEC" denotes diethyl carbonate, "EMC" denotes ethyl methyl carbonate, "EC" denotes ethylene carbonate, "VC" denotes vinylene carbonate, "$LiPF_6$" denotes lithium hexafluorophosphate, "$LiN(SO_2F)_2$" denotes lithium bis (fluorosulfonyl) imide, "$LiN(SO_2CF_3)_2$" denotes lithium bis(trifluoromethane sulfonyl) imide, "$LiPO_2F_2$" denotes lithium difluorophosphate, and "SAH" denotes succinic anhydride.

Preparation was performed such that each component other than lithium salt is a non-aqueous solvent, and a total amount of each non-aqueous solvent becomes "1 L". The content of lithium salt is a molar quantity with respect to the non-aqueous solvent of 1 L.

perature setting. As the measurement data, data at the time point that a change of the data measured repeatedly at every 5 minutes is lower than 0.1% was employed.

<Ionic Conductivity>

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm$^2$).

<Arrhenius Plot of Ionic Conductivity>

Using the Li ionic conductivities at each temperature obtained from the aforementioned formulas, the inclinations of the Arrhenius plot at −20 to 0° C. and at 0 to 20° C. were obtained on the basis of the Arrhenius equation ($\sigma$=Aexp(−Ea/kT), where "$\sigma$" denotes an ionic conductivity, "A" denotes a frequency factor, "k" denotes the Boltzmann constant, and "T" denotes the absolute temperature).

An electrolyte solution having the composition of Table 32 was prepared at a temperature of 25° C., and the cell was assembled using the aforementioned method, so that the measurement of electrochemical impedance spectroscopy was performed. A Nyquist diagram was created from the obtained data, and the Z' value was read. From the aforementioned formulas, the ionic conductivity was calculated for Examples 49 and 50 and Comparative Example 43. The inclinations of the Arrhenius plot at −20 to 0° C. and at 0 to 20° C. were obtained by using the calculated ionic conductivity, and activation energy Ea was obtained from the inclinations of the Arrhenius plot. The result is shown in the following Table 33.

TABLE 32

| | Solvent | | | | | LiPF$_6$ | Lithium salt Imide salt | | Additive | |
|---|---|---|---|---|---|---|---|---|---|---|
| | AcN (vol %) | DEC (vol %) | EMC (vol %) | EC (vol %) | VC (vol %) | (mol/1 L solvent) | Type | Content (mol/1 L solvent) | Cyclic acid anhydride (mass %) | LiPO$_2$F$_2$ (mass %) |
| Example 49 | 47 | 28 | 0 | 21 | 4 | 0.3 | LiN(SO$_2$F)$_2$ | 1.0 | SAH 0.3 | 0.1 |
| Example 50 | 65 | 0 | 16 | 8 | 11 | 0.2 | LiN(SO$_2$CF$_3$)$_2$ | 0.8 | SAH 0.3 | 0.05 |
| Comparative Example 43 | 47 | 28 | 0 | 21 | 4 | 1.3 | — | — | — | — |

<Measurement of Electrochemical Impedance Spectroscopy>

The electrolyte solution prepared as described above was put into a sealed cell (cell size: 24 mm diameter, by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to five levels, that is, −20° C., −10° C., 0° C., 10° C. and 20° C., and the measurement was initiated after 1.5 hours from each tem-

TABLE 33

| | Activation energy (kJ/mol) | | |
|---|---|---|---|
| | Ea$_1$ (−20-0° C.) | Ea$_2$ (0-20° C.) | Ea$_2$/Ea$_1$ |
| Example 49 | 13.5 | 11.5 | 0.852 |
| Example 50 | 12.9 | 11.0 | 0.853 |
| Comparative Example 43 | 16.0 | 16.0 | 0.516 |

As shown in Table 33, in the comparative examples, it was recognized that the activation energies Ea$_1$ and Ea$_2$ at −20 to 0° C. and at 0 to 20° C. are much higher than 15 kJ/mol. In comparison, in all the examples, it was recognized that the activation energy Ea$_1$ at −20 to 0° C. is equal to or lower than 15 kJ/mol. In addition, in the examples, it was recognized that the activation energy Ea$_2$ at 0 to 20° C. is also equal to lower than 15 kJ/mol. Furthermore, the value obtained by dividing the activation energy $Ea_2$ at 0 to 20° C. by the activation energy $Ea_1$ at −20 to 0° C. was much smaller than "1" in the comparative examples, compared to the examples. That is, in the comparative examples, the activation energies $Ea_1$ and $Ea_2$ are remarkably different. As a result, in the comparative examples, the electrolyte solution is not stabilized energetically, and the ionic conductivity suffers from a discontinuous change, compared to the examples. In comparison, in the examples, it was recognized that the ratio $Ea_2/Ea_1$ is stabilized energetically in the vicinity of "1", and the ionic conductivity is stabilized even in a low-temperature range equal to or lower than 0° C.

In Example 49, the electrolyte solution contains acetonitrile, and $LiPO_2F_2$ and LiFSI (imide salt) as the lithium salt. In addition, in Example 50, the electrolyte solution contains acetonitrile, and $LiPO_2F_2$ and LiTFSI (imide salt) as the lithium salt.

In Examples 49 and 50, the content of $LiPO_2F_2$ was 0.01 mass % or more and 1 mass % or less with respect to the electrolyte solution. In addition, in the electrolyte solutions of Examples 49 and 50, it was recognized that a percentage of the molar quantity of imide salts relative to a total molar quantity of lithium salts contained in the electrolyte solution is 50% or higher. That is, it was recognized that the main component of the lithium salts of the electrolyte solutions of Examples 49 and 50 is imide salt.

An example of the thirty fifth embodiment will be described.

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 pn and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:−5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on one surface of a copper foil having a thickness of 10 μm and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, a polyethylene microporous membrane punched in a disk shape having a diameter of 19 mm was set thereon, and an electrolyte solution was injected by 100 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging post-treatment was performed in a respective sequence described in the examples and the comparative examples. Then, each battery was evaluated in the sequence of the chapters (2-1) and (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) 85° C. Full-Charge Storage Test for Coin Type Non-Aqueous Secondary Battery The battery subjected to the initial charging/discharging treatment (aging treatment of the initial discharging will be described in each example or comparative example) was charged with a constant current of 3 mA corresponding to "1 C" to a voltage of 4.2 V by setting the battery ambient temperature to 25° C., and was then charged with a constant voltage of 4.2 V for a total of 3 hours. Then, this non-aqueous secondary battery was stored in a thermostatic oven at a temperature of 85° C. for 4 hours. Then, the battery ambient temperature was recovered to 25° C.

(2-2) Output Power Test for Coin Type Non-Aqueous Secondary Battery

The battery subjected to the 85° C. full-charge storage test as described above in the chapter (2-1) was charged with a constant current of 3 mA corresponding to "1 C" to a voltage of 4.2 V by setting the battery ambient temperature to 25° C., and was then charged with a constant voltage of 4.2 V for a total of 3 hours. Then, the battery was discharged with a current value of 3 mA corresponding to "1 C" to a voltage of 3.0 V. Then, the charging/discharging was performed as described above by changing the current value for the constant current discharging to 15 mA corresponding to "5 C", and the following capacity retention rate was calculated.

Capacity Retention Rate=(capacity for "5 C" discharge/capacity for "1 C" discharge)×100[%]

Example 100

Acetonitrile (AcN), diethyl carbonate (DEC), ethylene carbonate (EC), and vinylene carbonate (VC) were mixed under an inert atmosphere at a volume ratio of "45:35:16:4" to obtain a mixed solvent. In addition, succinic anhydride (SAH) was dissolved in this mixed solvent finally up to 0.15 mass % as an electrolyte solution. Then, lithium hexafluorophosphate ($LiPF_6$) of 0.3 mol and lithium bis (fluorosulfonyl) imide ($LiN(SO_2F)_2$) of 1.3 mol were added per 1 L of the mixed solvent, so that an electrolyte solution of Example 100 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 2.8 V with a constant current of 0.3 mA corresponding to "0.1 C" by setting the battery ambient temperature to 25° C., and was then charged with a constant voltage of 2.8 V for 1.5 hours. Then, the battery was stored for 6 hours by setting the ambient temperature to 55° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 101

Acetonitrile (AcN), ethyl methyl carbonate (EMC), ethylene carbonate (EC), and vinylene carbonate (VC) were mixed under an inert atmosphere at a volume ratio of "45:35:16:4" to obtain a mixed solvent. In addition, succinic anhydride (SAH) was dissolved in this mixed solvent finally up to 0.3 mass % as an electrolyte solution. Furthermore, 1-methyl-1H-benzotriazole (MBTA) was dissolved in this mixed solvent finally up to 0.2 mass % as an electrolyte solution. Then, lithium hexafluorophosphate ($LiPF_6$) of 1.3 mol was added per 1 L of the mixed solvent, so that an electrolyte solution of Example 101 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 2.8 V with a constant current of 0.3 mA corresponding to "0.1 C" by setting the battery ambient temperature to 25° C. and was then charged with a constant voltage of 2.8 V for 1.5 hours. Then, the battery was stored for 72 hours by setting the ambient temperature to 45° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 102

Acetonitrile (AcN), ethyl methyl carbonate (EMC), ethylene carbonate (EC), and vinylene carbonate (VC) were mixed under an inert atmosphere at a volume ratio of "35:40:21:4" to obtain a mixed solvent. In addition, maleic anhydride (MAH) was dissolved in this mixed solvent finally up to 0.15 mass % as an electrolyte solution. Furthermore, 1-methyl-1H-benzotriazole (MBTA) was dissolved in this mixed solvent finally up to 0.1 mass % as an electrolyte solution. Then, lithium hexafluorophosphate ($LiPF_6$) of 1.2 mol was added per 1 L of the mixed solvent, so that an electrolyte solution of Example 102 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 3.0 V with a constant current of 0.3 mA corresponding to "0.1 C" by setting the battery ambient temperature to 25° C. and was then charged with a constant voltage of 3.0 V for 1.5 hours. Then, the battery was stored for 6 hours by setting the ambient temperature to 55° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 103

Acetonitrile (AcN), dimethyl carbonate (DMC), ethylene carbonate (EC), and vinylene carbonate (VC) were mixed under an inert atmosphere at a volume ratio of "65:6:22:7" to obtain a mixed solvent. In addition, succinic anhydride (SAH) was dissolved in this mixed solvent finally up to 0.2 mass % as an electrolyte solution. Furthermore, methyl succinonitrile was dissolved in this mixed solvent finally up to 0.2 mass % as an electrolyte solution. Then, lithium hexafluorophosphate ($LiPF_6$) of 0.6 mol and lithium bis (trifluoromethane sulfonyl) imide (LiN(SO$_2$CF$_3$)$_2$) of 0.6 mol were added per 1 L of the mixed solvent, so that an electrolyte solution of Example 103 was obtained. For the obtained electrolyte solution, it was visually inspected that all of the lithium salts are dissolved. A battery was manufactured using this electrolyte solution on the basis of the method described above in the chapter (1-3), and initial charging/discharging treatment was performed. The battery was charged to a voltage of 3.0 V with a constant current of 0.3 mA corresponding to "0.1 C" by setting the battery ambient temperature to 25° C. and was then charged with a constant voltage of 3.0 V for 1.5 hours. Then, the battery was stored for 6 hours by setting the ambient temperature to 60° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 104

Acetonitrile (AcN), diethyl carbonate (DEC), ethylene carbonate (EC), and vinylene carbonate (VC) were mixed under an inert atmosphere at a volume ratio of "45:30:23:2" to obtain a mixed solvent. In addition, succinic anhydride (SAH) was dissolved in this mixed solvent finally up to 0.2 mass % as an electrolyte solution. Furthermore, 1-methyl-1H-benzotriazole (MBTA) was dissolved in this mixed solvent finally up to 0.3 mass % as an electrolyte solution. Then, lithium hexafluorophosphate (LiPF$_6$) of 1.0 mol was added per 1 L of the mixed solvent, so that an electrolyte solution of Example 104 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 3.3 V with a constant current of 0.3 mA corresponding to "0.1 C" by setting the battery ambient temperature to 25° C. and was then charged with a constant voltage of 3.3 V for a total of 1.5 hours. Then, the battery was stored for 24 hours by setting the ambient temperature to 55° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Example 105

Acetonitrile (AcN), ethyl methyl carbonate (EMC), ethylene carbonate (EC), and vinylene carbonate (VC) were mixed under an inert atmosphere at a volume ratio of "50:30:18:2" to obtain a mixed solvent. In addition, succinic anhydride (SAH) was dissolved in this mixed solvent finally up to 0.2 mass % as an electrolyte solution. Then, lithium hexafluorophosphate (LiPF$_6$) of 0.3 mol and lithium bis (fluorosulfonyl) imide (LiN(SO$_2$F)$_2$) of 1.0 mol were added per 1 L of the mixed solvent, so that an electrolyte solution of Example 105 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 3.2 V with a constant current of 0.3 mA corresponding to "0.1 C" by setting the battery ambient temperature to 25° C. and was then charged with a constant voltage of 3.2 V for 1.5 hours. Then, the battery was stored for 48 hours by setting the ambient temperature to 50° C., and was placed for 3 hours for cooling by setting the battery ambient temperature to 25° C. again. Then, the battery was charged with a constant current of 0.3 mA corresponding to "0.1 C" to a voltage of 4.2 V, and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Comparative Example 100

Acetonitrile (AcN), diethyl carbonate (DEC), and vinylene carbonate (VC) were mixed under an inert atmosphere at a volume ratio of "47:42:11". In addition, maleic anhydride (cyclic acid anhydride) was dissolved in this mixed solvent finally up to 0.14 mass % as an electrolyte solution. Then, lithium hexafluorophosphate (LiPF$_6$) of 1.3 mol and lithium bis (fluorosulfonyl) imide (LiN(SO$_2$F)$_2$) of 0.01 mol were added per 1 L of the mixed solvent, so that an electrolyte solution of Comparative Example 100 was obtained. For the obtained electrolyte solution, it was visually inspected that all of the lithium salts are dissolved. A battery was manufactured using this electrolyte solution on the basis of the method described above in the chapter (1-3), and the initial charging/discharging treatment was performed. The battery was charged to a voltage of 4.2 V with a constant current of 0.3 mA corresponding to "0.1 C" by setting the battery ambient temperature to 25° C. and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2). In Comparative Example 100, aging treatment of initial charging was not performed.

Comparative Example 101

Acetonitrile (AcN), diethyl carbonate (DEC), and vinylene carbonate (VC) were mixed under an inert atmosphere at a volume ratio of "47:49:4". In addition, lithium hexafluorophosphate (LiPF$_6$) of 1.3 mol and lithium bis (trifluoromethane sulfonyl) imide (LiN(SO$_2$CF$_3$)$_2$) of 0.05 mol were added per 1 L of the mixed liquid, and succinic anhydride (SAH) of 0.05 mass % was dissolved, so as to obtain an electrolyte solution of Comparative Example 101. For the obtained electrolyte solution, it was visually inspected that all of the lithium salts are dissolved. A battery was manufactured using this electrolyte solution on the basis of the method described above in the chapter (1-3), and the initial charging/discharging treatment was then performed. The battery was charged to a voltage of 2.8 V with a constant current of 0.3 mA corresponding to "0.1 C" by setting the battery ambient temperature to 25° C. and was then charged with a constant voltage of 2.8 V for 1.5 hours. Then, the battery was stored for 72 hours by setting the ambient temperature to 25° C. and was placed for 3 hours by setting the battery ambient temperature to 25° C. as it is. Then, the battery was charged to a voltage of 4.2 V with a constant current of 0.3 mA corresponding to "0.1 C" and was then charged with a constant voltage of 4.2 V for a total of 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

Comparative Example 102

Acetonitrile (AcN), diethyl carbonate (DEC), and vinylene carbonate (VC) were mixed under an inert atmosphere at a volume ratio of "47:49:4" to obtain a mixed solvent. In addition, succinic anhydride (SAH) was dissolved in this mixed solvent finally up to 0.05 mass % as an electrolyte solution. Furthermore, 1-methyl-1H-benzotriazole (MBTA) was dissolved in this mixed solvent finally up to 2.5 mass % as an electrolyte solution. Then, lithium hexafluorophosphate ($LiPF_6$) of 0.3 mol and lithium bis (trifluoromethane sulfonyl) imide ($LiN(SO_2CF_3)_2$) of 1 mol were added per 1 L of the mixed liquid, so as to obtain an electrolyte solution of Comparative Example 102. For the obtained electrolyte solution, it was visually inspected that all of the lithium salts are dissolved. A battery was manufactured using this electrolyte solution on the basis of the method described above in the chapter (1-3), and the initial charging/discharging treatment was then performed. The battery was charged to a voltage of 4.2 V with a constant current of 0.3 mA corresponding to "0.1 C" by setting the battery ambient temperature to 25° C. and was then charged with a constant voltage of 4.2 V for 1.5 hours. Then, the battery was stored for 24 hours by setting the ambient temperature to 85° C. and was then placed for 3 hours for cooling by setting battery ambient temperature to 25° C. as it is. Then, the battery was charged to a voltage of 4.2 V with a constant current of 0.3 mA corresponding to "0.1 C" and was then charged with a constant voltage of 4.2 V for 1.5 hours. Then, the battery was discharged to a voltage of 3.0 V with a constant current of 0.9 mA corresponding to "0.3 C". Initial efficiency was calculated by dividing the discharge capacity at this time by the charge capacity. Then, evaluation of the coin type non-aqueous secondary battery was performed in the sequence described above in the chapters (2-1) and (2-2).

The following Table 34 shows compositions of each non-aqueous electrolyte solution of Examples 100 to 105 and Comparative Examples 100 to 102.

TABLE 34

| | Solvent | | | | | | Lithium salt | | Additive | |
|---|---|---|---|---|---|---|---|---|---|---|
| | | | | | | | | Imide salt | Cyclic acid anhydride | Nitrogen-containing compound |
| | AcN (vol %) | DEC (vol %) | EMC (vol %) | DMC (vol %) | EC (vol %) | VC (vol %) | $LiPF_6$ (mol/1 L solvent) | Type | Content (mol/1 L solvent) | (mass %) | (mass %) |
| Example 100 | 45 | 35 | 0 | 0 | 16 | 4 | 0.3 | $LiN(SO_2F)_2$ | 1.3 | SAH 0.15 | — |
| Example 101 | 45 | 0 | 35 | 0 | 16 | 4 | 1.3 | — | — | SAH 0.3 | MBTA 0.2 |
| Example 102 | 35 | 0 | 40 | 0 | 21 | 4 | 1.2 | — | — | MAH 0.15 | MBTA 0.1 |
| Example 103 | 65 | 0 | 0 | 6 | 22 | 7 | 0.6 | $LiN(SO_2CF_3)_2$ | 0.6 | SAH 0.2 | Methyl succinonitrile 0.2 |
| Example 104 | 45 | 30 | 0 | 0 | 23 | 2 | 1.0 | — | — | SAH 0.2 | MBTA 0.3 |
| Example 105 | 50 | 0 | 30 | 0 | 18 | 2 | 0.3 | $LiN(SO_2F)_2$ | 1.0 | SAH 0.2 | — |
| Comparative Example 100 | 47 | 42 | 0 | 0 | 0 | 11 | 1.3 | $LiN(SO_2F)_2$ | 0.01 | MAH 0.14 | — |
| Comparative Example 101 | 47 | 49 | 0 | 0 | 0 | 4 | 1.3 | $LiN(SO_2CF_3)_2$ | 0.05 | SAH 0.05 | — |
| Comparative Example 102 | 47 | 49 | 0 | 0 | 0 | 4 | 0.3 | $LiN(SO_2CF_3)_2$ | 1 | SAH 0.05 | MBTA 2.5 |

| | Battery type | Positive-electrode active material | Positive-electrode current collector | Negative-electrode active material | Negative-electrode current collector | Separator |
|---|---|---|---|---|---|---|
| Example 100 | Coin (CR2032) | $LiNi_{1/3}Co_{1/3}Mn_{1/3}O_2$ | Aluminum foil | Graphite | Copper foil | Polyethylene microporous membrane |
| Example 101 | Coin (CR2032) | $LiNi_{1/3}Co_{1/3}Mn_{1/3}O_2$ | Aluminum foil | Graphite | Copper foil | Polyethylene microporous membrane |
| Example 102 | Coin (CR2032) | $LiNi_{1/3}Co_{1/3}Mn_{1/3}O_2$ | Aluminum foil | Graphite | Copper foil | Polyethylene microporous membrane |
| Example 103 | Coin (CR2032) | $LiNi_{1/3}Co_{1/3}Mn_{1/3}O_2$ | Aluminum foil | Graphite | Copper foil | Polyethylene microporous membrane |

TABLE 34-continued

| | | | | | | |
|---|---|---|---|---|---|---|
| Example 104 | Coin (CR2032) | LiNi$_{1/3}$Co$_{1/3}$Mn$_{1/3}$O$_2$ | Aluminum foil | Graphite | Copper foil | Polyethylene microporous membrane |
| Example 105 | Coin (CR2032) | LiNi$_{1/3}$Co$_{1/3}$Mn$_{1/3}$O$_2$ | Aluminum foil | Graphite | Copper foil | Polyethylene microporous membrane |
| Comparative Example 100 | Coin (CR2032) | LiNi$_{1/3}$Co$_{1/3}$Mn$_{1/3}$O$_2$ | Aluminum foil | Graphite | Copper foil | Polyethylene microporous membrane |
| Comparative Example 101 | Coin (CR2032) | LiNi$_{1/3}$Co$_{1/3}$Mn$_{1/3}$O$_2$ | Aluminum foil | Graphite | Copper foil | Polyethylene microporous membrane |
| Comparative Example 102 | Coin (CR2032) | LiNi$_{1/3}$Co$_{1/3}$Mn$_{1/3}$O$_2$ | Aluminum foil | Graphite | Copper foil | Polyethylene microporous membrane |

The following Table 35 shows aging conditions of Examples 100 to 105 and Comparative Examples 100 to 102.

TABLE 35

| | Aging voltage [V] | Aging temperature [° C.] | Aging time [h] |
|---|---|---|---|
| Example 100 | 2.8 | 55.0 | 6 |
| Example 101 | 2.8 | 45.0 | 72 |
| Example 102 | 3.0 | 55.0 | 6 |
| Example 103 | 3.0 | 60.0 | 6 |
| Example 104 | 3.3 | 55.0 | 24 |
| Example 105 | 3.2 | 50.0 | 48 |
| Comparative Example 100 | — | — | — |
| Comparative Example 101 | 2.8 | 25.0 | 72 |
| Comparative Example 102 | 4.2 | 85.0 | 24 |

The following Table 36 shows capacity retention rates after storing the battery for 4 hours at 85° C. in Examples 100 to 105 and Comparative Examples 100 to 102. The capacity retention rates are calculated by dividing the 5 C discharge capacity by the 1 C discharge capacity.

TABLE 36

| | —N=, —NH$_4$, —N=O, C—N—N—C, —(NO$_3$) [atomic %] | After storage test at 85° C. for 4 h output power test capacity retention rate [%] |
|---|---|---|
| Example 100 | 5.3 | 78 |
| Example 101 | 9.8 | 75 |
| Example 102 | 6.5 | 74 |
| Example 103 | 4.9 | 76 |
| Example 104 | 10.4 | 77 |
| Example 105 | 5.1 | 76 |
| Comparative Example 100 | 0.3 | 61 |
| Comparative Example 101 | 0.4 | 63 |
| Comparative Example 102 | 21.9 | 59 |

As shown in the aforementioned Table 36, in all of Examples 100 to 105, it was recognized that the capacity retention rate is 70% or higher. In addition, in Examples 100 to 105, it was possible to obtain a capacity retention rate of 74% or higher.

Note that, in this example, an X-ray photoelectron spectroscopy (XPS) analysis was performed for a surface portion of the positive electrode in the battery. As an XPS analyzer, Versa Probell produced by ULVAC-PHI, Inc. was employed. As an analysis condition, an excitation source was set to mono. AlKα 15 kV×3.3 mA, an analysis size was set to approximately 200 μmφ, and a photoelectron emission angle was set to 45°±20°. In addition, the measurement sample was disassembled from the battery before the test, and the obtained electrode was immersed in acetonitrile three times to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box (a dew point of −60° C. or lower). Here, depending on the result of XPS analysis, it is preferable that the nitrogen concentration in the case of performing peak splitting of the photoelectron spectrum includes 0.5 to 20 atomic % within a range of 394 eV to 408 eV based on a nitrogen element. This is based on the result of the output power test after the storage test at 85° C. for 4 hours in Examples 100 to 105 and Comparative Examples 100 to 102. In addition, within the aforementioned peak range, the peaks observed at 399 eV to 400 eV have —NH$_4$, —NH—NH—, and (NO$_3$)-bonds, and the peak observed around 402 eV has the —N=O bond. The "atomic %" shown in Table 36 refers to a nitrogen concentration in atomic % when peak splitting of the photoelectron spectrum is performed.

From the aforementioned description, it was preferable that the non-aqueous electrolyte solution of Examples 100 to 105 preferably contains a compound having at least one functional group selected from a group consisting of —N=, —NH$_4$, —N=O, —NH—NH—, and (NO$_3$)—. In addition, the non-aqueous secondary battery has a capacity retention rate of 70% or higher, as an initial characteristic evaluation, where the capacity retention rate is calculated by dividing the 5 C discharge capacity by the 1 C discharge capacity after performing a storage test for 4 hours at a temperature of 85° C.

From the examples and the comparative examples, it was preferable that the non-aqueous electrolyte solution contains the N-containing compound, and aging is performed at a voltage of 3.5 V or lower during initial charging. As a result, before ionization of the transition metal derived from the positive-electrode active material, the compound containing at least one functional group selected from a group consisting of —N=, —NH$_4$, —N=O, —NH—NH—, and (NO$_3$)— protects the surface of the positive electrode. As a result, it is possible to suppress an increase of internal resistance over time caused by a thermal history.

In Examples 101 to 105, it was preferable that the aging temperature is set to 35° C. or higher and 60° C. or lower.

By applying a thermal history at a temperature of 60° C. or lower, the protective film can inactivate the activation point of the positive electrode surface at an early stage and suppress an increase of internal resistance under a high temperature condition.

An example of the thirty sixth embodiment will now be described.

ole, "SAH" denotes succinic anhydride, "MAH" denotes maleic anhydride, and "PAH" denotes phthalic anhydride.

Preparation was performed such that each component other than lithium salt and additives is a non-aqueous solvent, and a total amount of each non-aqueous solvent becomes "1 L". The content of lithium salt is a molar quantity with respect to the non-aqueous solvent of 1 L.

TABLE 37

| | Solvent | | | | | | Lithium salt | | Additive | |
| | | | | | | | | Imide salt | Cyclic | Nitrogen- |
| | | | | | | | LiPF$_6$ | | acid | containing |
| | AcN (vol %) | DEC (vol %) | EMC (vol %) | DMC (vol %) | EC (vol %) | VC (vol %) | (mol/1 L solvent) | Type | Content (mol/1 L solvent) | anhydride (mass %) | compound (mass %) |
|---|---|---|---|---|---|---|---|---|---|---|---|
| Example 106 | 41 | 37 | 0 | 0 | 19 | 3 | 0.5 | LiN(SO$_2$F)$_2$ | 1.0 | SAH 0.15 | — |
| Example 107 | 45 | 5 | 30 | 0 | 15 | 5 | 1.1 | — | — | SAH 0.15 | MBTA 0.2 |
| Example 108 | 29 | 0 | 35 | 11 | 21 | 4 | 1.3 | — | — | MAH 0.15 | — |
| Example 109 | 65 | 0 | 0 | 9 | 20 | 6 | 0.5 | LiN(SO$_2$CF$_3$)$_2$ | 0.5 | PAH 0.5 | — |
| Example 110 | 43 | 28 | 0 | 0 | 27 | 2 | 1.1 | — | — | SAH 0.2 | — |
| Example 111 | 51 | 0 | 27 | 0 | 19 | 3 | 0.4 | LiN(SO$_2$F)$_2$ | 0.7 | MAH 0.2 | — |
| Comparative Example 103 | 47 | 41 | 0 | 0 | 0 | 12 | 1.2 | — | — | MAH 3.0 | — |
| Comparative Example 104 | 47 | 45 | 0 | 0 | 0 | 8 | 1.2 | — | — | SAH 4.9 | — |
| Comparative Example 105 | 47 | 43 | 0 | 0 | 0 | 10 | 0.5 | LiN(SO$_2$CF$_3$)$_2$ | 0.3 | SAH 2.5 | — |

| | Battery type | Positive-electrode active material | Positive-electrode current collector | Negative-electrode active material | Negative-electrode current collector | Separator |
|---|---|---|---|---|---|---|
| Example 106 | Coin (CR2032) | LiNi$_{1/3}$Mn$_{1/3}$Co$_{1/3}$O$_2$ | Aluminum foil | Graphite | Copper foil | Polyethylene microporous membrane |
| Example 107 | Coin (CR2032) | LiNi$_{1/3}$Mn$_{1/3}$Co$_{1/3}$O$_2$ | Aluminum foil | Graphite | Copper foil | Polyethylene microporous membrane |
| Example 108 | Coin (CR2032) | LiNi$_{1/3}$Mn$_{1/3}$Co$_{1/3}$O$_2$ | Aluminum foil | Graphite | Copper foil | Polyethylene microporous membrane |
| Example 109 | Coin (CR2032) | LiNi$_{1/3}$Mn$_{1/3}$Co$_{1/3}$O$_2$ | Aluminum foil | Graphite | Copper foil | Polyethylene microporous membrane |
| Example 110 | Coin (CR2032) | LiNi$_{1/3}$Mn$_{1/3}$Co$_{1/3}$O$_2$ | Aluminum foil | Graphite | Copper foil | Polyethylene microporous membrane |
| Example 111 | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 103 | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 104 | Coin (CR2032) | LiNi$_{1/3}$Mn$_{1/3}$Co$_{1/3}$O$_2$ | Aluminum foil | Graphite | Copper foil | Polyethylene microporous membrane |
| Comparative Example 105 | Coin (CR2032) | LiNi$_{1/3}$Mn$_{1/3}$Co$_{1/3}$O$_2$ | Aluminum foil | Graphite | Copper foil | Polyethylene microporous membrane |

<Preparation of Electrolyte Solution>

An electrolyte solution was prepared by mixing various solvents and additives at a predetermined volume ratio. The compositions of each electrolyte solution used in the examples and the comparative examples are shown in Table 37. Note that, in Table 37, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, "LiN(SO$_2$CF$_3$)$_2$" denotes lithium bis (trifluoromethane sulfonyl) imide, "MBTA" denotes 1-methyl-1H-benzotriaz- <Manufacturing of Non-aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on one surface of an aluminum foil having a thickness of 20 μm and a width of 200 mm, which will serve as a positive electrode current collector, using a doctor blade method while adjusting the basis weight to 12.0 mg/cm$^2$, and the solvent was dried and removed. Then, roll pressing was performed using a roll press machine to an actual electrode density of 2.80 g/cm$^3$, and a positive electrode having the positive-electrode active material layer and the positive electrode current collector was obtained.

(1-2) Fabrication of Negative Electrode

Graphite carbon powder (density: 2.23 g/cm$^3$) having a number average particle diameter of 12.7 μm and graphite carbon powder (density 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:-5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on one surface of a copper foil having a thickness of 10 pin and a width of 200 mm, which will serve as a negative electrode current collector, using a doctor blade method while adjusting the basis weight to 5.3 mg/cm$^2$, and the solvent was dried and removed. Then, roll pressing was performed using a roll press machine to an actual electrode density of 1.30 g/cm$^3$, and a negative electrode having the negative-electrode active material layer and the negative electrode current collector was obtained.

(1-3) Fabrication of Coin Type Non-Aqueous Secondary Battery

A polypropylene gasket was set on a CR2032 type battery casing (SUS304/Al-cladding), and the positive electrode obtained as described above was punched in a disk shape having a diameter of 16 mm and was set on a center of the gasket while the positive-electrode active material layer faces upward. In addition, a polyethylene microporous membrane punched in a disk shape having a diameter of 19 mm was set thereon, and an electrolyte solution was injected by 100 μL. Then, the negative electrode obtained as described above and punched in a disk shape having a diameter of 16 mm was set thereon while the negative-electrode active material layer faces downward. In addition, a spacer and a spring were set, and a battery cap was fitted and crimped with a caulking machine. The overflowing electrolyte solution was wiped out with a waste cloth. The assembly was maintained at a temperature of 25° C. for 24 hours to fully adapt the electrolyte solution to the stacking component, so that a coin type non-aqueous secondary battery was obtained.

<Evaluation of Coin Type Non-Aqueous Secondary Battery>

For the battery for evaluation obtained as described above, initial charging post-treatment was performed in a respective sequence described in the examples and the comparative examples. Then, each battery was evaluated in the sequence of the chapters (2-1) and (2-2). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(2-1) 85° C. Full-Charge Storage Test for Coin Type Non-Aqueous Secondary Battery The battery subjected to the initial charging/discharging treatment (aging treatment of the initial discharging will be described in each example or comparative example) was charged with a constant current of 3 mA corresponding to "1 C" to a voltage of 4.2 V by setting the battery ambient temperature to 25° C., and was then charged with a constant voltage of 4.2 V for a total of 3 hours. Then, this non-aqueous secondary battery was stored in a thermostatic oven at a temperature of 85° C. for 4 hours. Then, the battery ambient temperature was recovered to 25° C.

(2-2) Output Power Test for Coin Type Non-Aqueous Secondary Battery

The battery subjected to the 85° C. full-charge storage test as described above in the chapter (2-1) was charged with a constant current of 3 mA corresponding to "1 C" to a voltage of 4.2 V by setting the battery ambient temperature to 25° C., was then charged with a constant voltage of 4.2 V for a total of 3 hours. Then, the battery was discharged with a current value of 3 mA corresponding to "1 C" to a voltage of 3.0 V. Then, the charging/discharging was performed as described above by changing the current value for the constant current discharging to 15 mA corresponding to "5 C", and the following capacity retention rate was calculated.

Capacity retention rate=(capacity for "5 C" discharge/capacity for "1 C" discharge)×100[%]

The following Table 38 shows aging conditions in Examples 106 to 111 and Comparative Examples 103 to 105.

TABLE 38

|  | Aging voltage [V] | Aging temperature [° C.] | Aging time [h] |
| --- | --- | --- | --- |
| Example 106 | 2.8 | 55.0 | 6 |
| Example 107 | 2.8 | 45.0 | 72 |
| Example 108 | 3.0 | 55.0 | 6 |
| Example 109 | 3.0 | 60.0 | 6 |
| Example 110 | 3.3 | 55.0 | 24 |
| Example 111 | 3.2 | 50.0 | 48 |
| Comparative Example 103 | — | — | — |
| Comparative Example 104 | 2.8 | 25.0 | 72 |
| Comparative Example 105 | 4.2 | 85.0 | 24 |

The following Table 39 shows capacity retention rates after storing the battery for 4 hours at 85° C. in Examples 106 to 111 and Comparative Examples 103 to 105. The capacity retention rates are calculated by dividing the 5 C discharge capacity by the 1 C discharge capacity.

TABLE 39

| | Organic acid or salt thereof, Li$_2$O [atomoic %] | After storage test at 85° C. for 4 h output power test capacity retention rate [%] |
|---|---|---|
| Example 106 | 15.9 | 79 |
| Example 107 | 24.5 | 73 |
| Example 108 | 22.8 | 72 |
| Example 109 | 26.1 | 79 |
| Example 110 | 18.1 | 75 |
| Example 111 | 17.3 | 74 |
| Comparative Example 103 | 38.5 | 59 |
| Comparative Example 104 | 39.1 | 41 |
| Comparative Example 105 | 45.1 | 39 |

From the experimental results, the non-aqueous secondary battery contains at least one compound selected from a group consisting of organic acid, salt thereof, acid anhydride, and Li$_2$O. In addition, the organic acid includes at least one selected from a group consisting of acetic acid, oxalic acid, and formic acid. In addition, the non-aqueous secondary battery has a capacity retention rate of 70% or higher, as an initial characteristic evaluation, where the capacity retention rate is calculated by dividing the 5 C discharge capacity by the 1 C discharge capacity after performing a storage test for 4 hours at a temperature of 85° C.

Note that, in this example, an X-ray photoelectron spectroscopy (XPS) analysis was performed for a surface portion of the negative electrode in the battery. As an XPS analyzer, Versa ProbeII produced by ULVAC-PHI, Inc. was employed. As an analysis condition, an excitation source was set to mono. AlKα 15 kV×3.3 mA, an analysis size was set to approximately 200 μmφ, and a photoelectron emission angle was set to 45°+20°. In addition, the measurement sample was disassembled from the battery before the test, and the obtained electrode was immersed in acetonitrile three times to wash the electrolyte solution adhering to the sample. Then, the sample was air-dried for 12 hours. The dried sample was cut into small pieces of 3 mm square and was used as an XPS analysis sample. Note that a series of operations for sample fabrication was carried out in an argon glove box (a dew point of −60° C. or lower). Here, depending on the result of XPS analysis, it is preferable that the nitrogen concentration in the case of performing peak splitting of the photoelectron spectrum includes 10 to 30 atomic % within a range of 524 eV to 540 eV based on an oxygen element. This is based on the result of the output power test after the storage test at 85° C. for 4 hours in Examples 106 to 111 and Comparative Examples 103 to 105. In addition, within the aforementioned peak range, the peak observed at 527 eV has Li$_2$O, and the peak observed at 530 to 535 eV has an organic element and salt thereof. The "atomic %" shown in Table 39 refers to an oxygen concentration in atomic % when peak splitting of the photoelectron spectrum is performed.

On the basis of the examples and the comparative examples, it was preferable that the non-aqueous electrolyte solution contains the cyclic acid anhydride, and aging is performed at a voltage of 3.5 V or lower during initial charging. Since the negative electrode SEI contains at least one compound selected from a group consisting of organic acid (such as acetic acid, oxalic acid, and formic acid), salt thereof, acid anhydride, and Li$_2$O, it is possible to suppress an increase of internal resistance over time caused by a thermal history.

On the basis of Examples 106 to 111, the aging temperature is preferably set to 35° C. or higher and 60° C. or lower. As a result, it is possible to suppress thermal decomposition of LiPF$_6$ that may occur at a temperature of 60° C. or higher.

An example of the thirty seventh embodiment will now be described.

<Fabrication of Non-Aqueous Secondary Battery>

(1-1) Fabrication of Positive Electrode A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using the doctor blade method while adjusting the basis weight of one surface to 11.5 mg/cm$^2$. Then, the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 mg/cm$^3$, so that a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:−5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 pin and a width of 200 mm, which will serve as a negative electrode current collector, using a doctor blade method while adjusting the basis weight of one surface to 6.9 mg/cm$^2$, and the solvent was dried and removed. When the negative electrode mixture-containing slurry was coated on the copper foil, an uncoated region was formed in order to expose a part of the copper foil. Then, roll pressing was performed using a roll press machine to an actual electrode density of 1.30 g/cm³, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Multi-Layered Laminate-Type Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained.

This laminated electrode structure was housed in an aluminum laminated sheet package, and vacuum drying was performed for 5 h at 80° C. in order to remove moisture. Subsequently, an electrolyte solution was injected into the package, and the package was sealed, so that a multi-layered laminate-type non-aqueous secondary battery (pouch type cell battery, hereinafter, simply also referred to as "multi-layered laminate-type battery") was manufactured.

The multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, initial charging/discharging treatment was performed in the sequence of the chapter (2-1). Subsequently, the battery was evaluated in the sequence of the chapters (2-2) and (2-3). In addition, the electrolyte solution was evaluated in the sequence of the chapter (2-4).

Here, "1 C" refers to a current value at which a fully charged battery is expected to be discharged in one hour at a constant current to terminate the discharge. That is, in the following, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current of 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) 85° C. Full-Charge Storage Test for Multi-Layered Laminate-Type Battery

For the battery subjected to the initial charging/discharging treatment as described above in the chapter (2-1), the battery was charged with a constant current of "1 C" to a voltage of 4.2 V by setting the battery ambient temperature was 25° C., and the battery was then charged with a constant voltage of 4.2 V for a total of 3 hours. Then, this non-aqueous secondary battery was stored in a thermostatic oven for 4 hours at 85° C. Then, the battery ambient temperature was recovered to 25° C.

(2-3) Ionic Conductivity Measurement

The electrolyte solution was put into a sealed cell (cell size: 24 mm diameter, by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to 20° C. and 0° C., and the measurement was initiated after 1.5 hours from the temperature setting. As the measurement data, data at the time point that a change of the data measured repeatedly at every 5 minutes is lower than 0.1% was employed.

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm²).

As the ionic conductivity, an initial ionic conductivity of the electrolyte solution and an ionic conductivity of the electrolyte solution collected in the glove box having a dew point controlled to −60° C. or lower after the 85° C. storage test were obtained at 20° C. and 0° C., respectively.

Example 112

Acetonitrile (AcN), ethyl methyl carbonate (EMC), ethylene carbonate (EC), and vinylene carbonate (VC) were mixed under an inert atmosphere at a volume ratio of "45:36:16:3" to obtain a mixed solvent. In addition, succinic anhydride (SAH) was dissolved in this mixed solvent finally up to 0.18 mass % as an electrolyte solution. Furthermore, 1-methyl-1H-benzotriazole (MBTA) was dissolved in this mixed solvent finally up to 0.1 mass % as an electrolyte solution. In this case, the temperature of the mixed liquid was 30° C. Then, lithium hexafluorophosphate (LiPF$_6$) of 0.5 mol and lithium bis (fluorosulfonyl) imide (LiN(SO$_2$F)$_2$) of 1.0 mol were sequentially added per 1 L of the mixed solvent, so that an electrolyte solution of Example 112 was obtained. In this case, the temperature of the electrolyte solution was 40° C., and the electrolyte solution was produced by receiving only a thermal history of 50° C. or lower. For the obtained electrolyte solution, it was visually inspected that all of the lithium salts are dissolved. A battery was manufactured using this electrolyte solution on the basis of the method described above in the chapter (1-3), and evaluation was performed in the sequence described in the chapters (2-1) to (2-3), so that, finally, the ionic conductivities at each temperature were calculated.

Example 113

Acetonitrile (AcN), ethyl methyl carbonate (EMC), ethylene carbonate (EC), and vinylene carbonate (VC) were mixed under an inert atmosphere at a volume ratio of "55:25:16:4" to obtain a mixed solvent. In addition, succinic anhydride (SAH) was dissolved in this mixed solvent finally up to 0.12 mass % as an electrolyte solution. Furthermore, 1-methyl-1H-benzotriazole (MBTA) was dissolved in this mixed solvent finally up to 0.25 mass % as an electrolyte solution. In this case, the temperature of the mixed liquid was 30° C. Then, lithium hexafluorophosphate (LiPF$_6$) of 1.1 mol was added per 1 L of the mixed solvent, so that an electrolyte solution of Example 113 was obtained. In this case, the temperature of the electrolyte solution was 43° C., and the electrolyte solution was produced by receiving only a thermal history of 50° C. or lower. For the obtained electrolyte solution, it was visually inspected that all of the lithium salts are dissolved. A battery was manufactured using this electrolyte solution on the basis of the method described above in the chapter (1-3), and evaluation was performed in the sequence described in the chapters (2-1) to (2-3), so that, finally, the ionic conductivities at each temperature were calculated.

Example 114

Acetonitrile (AcN), ethyl methyl carbonate (EMC), ethylene carbonate (EC), and vinylene carbonate (VC) were mixed under an inert atmosphere at a volume ratio of "31:45:21:3" to obtain a mixed solvent. In addition, maleic anhydride (MAH) was dissolved in this mixed solvent finally up to 0.1 mass % as an electrolyte solution. Furthermore, adiponitrile was dissolved in this mixed solvent finally up to 0.1 mass % as an electrolyte solution. In this case, the temperature of the mixed liquid was 31° C. Then, lithium hexafluorophosphate (LiPF$_6$) of 1.3 mol was added per 1 L of the mixed solvent, so that an electrolyte solution of Example 114 was obtained. In this case, the temperature of the electrolyte solution was 42° C., and the electrolyte solution was produced by receiving only a thermal history of 50° C. or lower. For the obtained electrolyte solution, it was visually inspected that all of the lithium salts are dissolved. A battery was manufactured using this electrolyte solution on the basis of the method described above in the chapter (1-3), and evaluation was performed in the sequence described in the chapters (2-1) to (2-3), so that, finally, the ionic conductivities at each temperature were calculated.

Example 115

Acetonitrile (AcN), dimethyl carbonate (DMC), ethylene carbonate (EC), and vinylene carbonate (VC) were mixed under an inert atmosphere at a volume ratio of "65:10:22:3" to obtain a mixed solvent. In addition, phthalic anhydride (PAH) was dissolved in this mixed solvent finally up to 0.45 mass % as an electrolyte solution. Furthermore, adiponitrile was dissolved in this mixed solvent finally up to 0.4 mass % as an electrolyte solution. In this case, the temperature of the mixed liquid was 29° C. Then, lithium hexafluorophosphate (LiPF$_6$) of 0.6 mol and lithium bis (trifluoromethane sulfonyl) imide (LiN(SO$_2$CF$_3$)$_2$) of 0.6 mol were sequentially added per 1 L of the mixed solvent, so that an electrolyte solution of Example 115 was obtained. In this case, the temperature of the electrolyte solution was 41° C., and the electrolyte solution was produced by receiving only a thermal history of 50° C. or lower. For the obtained electrolyte solution, it was visually inspected that all of the lithium salts are dissolved. A battery was manufactured using this electrolyte solution on the basis of the method described above in the chapter (1-3), and evaluation was performed in the sequence described in the chapters (2-1) to (2-3), so that, finally, the ionic conductivities at each temperature were calculated.

Comparative Example 106

Acetonitrile (AcN), ethyl methyl carbonate (EMC), ethylene carbonate (EC), and vinylene carbonate (VC) were mixed under an inert atmosphere at a volume ratio of "45:35:17:3" to obtain a mixed solvent. In this case, the temperature of the mixed solvent was 30° C. Then, lithium hexafluorophosphate (LiPF$_6$) of 1.3 mol per 1 L of this mixed solvent was put into a container, and the mixed solvent was poured thereon. Furthermore, succinic anhydride (SAH) of 0.02 mass % and 1-methyl-1H-benzotriazole (MBTA) of 0.02 mass % were dissolved, so that an electrolyte solution of Comparative Example 106 was obtained. In this case, the temperature of the electrolyte solution was 63° C., and the electrolyte solution was produced by receiving a thermal history of 50° C. or higher. For the obtained electrolyte solution, it was visually inspected that all of the lithium salts are dissolved. A battery was manufactured using this electrolyte solution on the basis of the method described above in the chapter (1-3), and evaluation was performed in the sequence described in the chapters (2-1) to (2-3), so that, finally, the ionic conductivities at each temperature were calculated.

Comparative Example 107

Acetonitrile (AcN), diethyl carbonate (DEC), and vinylene carbonate (VC) were mixed under an inert atmosphere at a volume ratio of "41:48:11" to obtain a mixed solvent. In addition, adiponitrile was dissolved in this mixed solvent finally up to 2 mass % as an electrolyte solution. In this case, the temperature of the mixed solvent was 30° C. Furthermore, lithium hexafluorophosphate (LiPF$_6$) of 2.0 mol per 1 L of this mixed solvent was put into a container, and the mixed solvent was poured thereon, so that an electrolyte solution of Comparative Example 107 was obtained. In this case, the temperature of the electrolyte solution was 68° C., and the electrolyte solution was produced by receiving a thermal history of 50° C. or higher. For the obtained electrolyte solution, it was visually inspected that all of the lithium salts are dissolved. Note that cyclic acid anhydride is not added in Comparative Example 107. A battery was manufactured using this electrolyte solution on the basis of the method described above in the chapter (1-3), and evaluation was performed in the sequence described in the chapters (2-1) to (2-3), so that, finally, the ionic conductivities at each temperature were calculated.

The following shows compositions of each non-aqueous electrolyte solution in Examples 112 to 115 and Comparative Examples 106 and 107.

TABLE 40

| | Solvent | | | | | | Lithium salt | | | Additive | | |
| --- | --- | --- | --- | --- | --- | --- | --- | --- | --- | --- | --- | --- |
| | | | | | | | LiPF$_6$ | Imide salt | | Cyclic acid anhydride | Nitrogen-containing compound | |
| | AcN (vol %) | DEC (vol %) | EMC (vol %) | DMC (vol %) | EC (vol %) | VC (vol %) | (mol/1 L solvent) | Type | Content (mol/1 L solvent) | (mass %) | (mass %) | Thermal history |
| Example 112 | 45 | 0 | 36 | 0 | 16 | 3 | 0.5 | LiN(SO$_2$F)$_2$ | 1.0 | SAH 0.18 | MBTA 0.1 | ≤50° C. |
| Example 113 | 55 | 0 | 25 | 0 | 16 | 4 | 1.1 | — | — | SAH 0.12 | MBTA 0.25 | ≤50° C. |

TABLE 40-continued

| | | | | | | | | | | | | |
|---|---|---|---|---|---|---|---|---|---|---|---|---|
| Example 114 | 31 | 0 | 45 | 0 | 21 | 3 | 1.3 | — | — | MAH 0.1 | Adiponitrile 0.1 | ≤50° C. |
| Example 115 | 65 | 0 | 0 | 10 | 22 | 3 | 0.6 | LiN(SO$_2$CF$_3$)$_2$ | 0.6 | PAH 0.45 | Adiponitrile 0.4 | ≤50° C. |
| Comparative Example 106 | 45 | 0 | 35 | 0 | 17 | 3 | 1.3 | — | — | SAH 0.02 | MBTA 0.02 | >60° C. |
| Comparative Example 107 | 41 | 48 | 0 | 0 | 0 | 11 | 2.0 | — | — | — | Adiponitrile 2.0 | >60° C. |

| | Battery type | Positive-electrode active material | Positive-electrode current collector | Negative-electrode active material | Negative-electrode current collector | Separator |
|---|---|---|---|---|---|---|
| Example 112 | Layered laminate cell | LiNi$_{1/3}$Mn$_{1/3}$Co$_{1/3}$O$_2$ | Aluminum foil | Graphite | Copper foil | Polyethylene microporous membrane |
| Example 113 | Layered laminate cell | LiNi$_{1/3}$Mn$_{1/3}$Co$_{1/3}$O$_2$ | Aluminum foil | Graphite | Copper foil | Polyethylene microporous membrane |
| Example 114 | Layered laminate cell | LiNi$_{1/3}$Mn$_{1/3}$Co$_{1/3}$O$_2$ | Aluminum foil | Graphite | Copper foil | Polyethylene microporous membrane |
| Example 115 | Layered laminate cell | LiNi$_{1/3}$Mn$_{1/3}$Co$_{1/3}$O$_2$ | Aluminum foil | Graphite | Copper foil | Polyethylene microporous membrane |
| Comparative Example 106 | Layered laminate cell | LiNi$_{1/3}$Mn$_{1/3}$Co$_{1/3}$O$_2$ | Aluminum foil | Graphite | Copper foil | Polyethylene microporous membrane |
| Comparative Example 107 | Layered laminate cell | LiNi$_{1/3}$Mn$_{1/3}$Co$_{1/3}$O$_2$ | Aluminum foil | Graphite | Copper foil | Polyethylene microporous membrane |

The following Table 41 shows the ionic conductivities in Examples 112 to 115 and Comparative Examples 106 and 107.

TABLE 41

| | —N=, —NH$_4$, —N=O, C—N=N—C, —(NO$_3$) | Initial ionic conductivity [mS/cm] | | Ionic conductivity after 85° C. storage test [mS/cm] | |
|---|---|---|---|---|---|
| | [atomic %] | 20° C. | 0° C. | 20° C. | 0° C. |
| Example 112 | 6.1 | 21.4 | 16.0 | 20.1 | 14.7 |
| Example 113 | 10.2 | 19.5 | 15.5 | 18.2 | 14.4 |
| Example 114 | 7.5 | 19.0 | 15.5 | 17.9 | 14.0 |
| Example 115 | 9.5 | 20.7 | 15.4 | 19.3 | 13.9 |
| Comparative Example 106 | 0.2 | 19.5 | 15.5 | 18.2 | 9.8 |
| Comparative Example 107 | 0.4 | 17.8 | 14.8 | 16.3 | 9.4 |

As shown in Table 41 described above, it was recognized that the initial ionic conductivity does not significantly change even when the temperature changes from 20° C. to 0° C. in Examples 112 to 115 and Comparative Examples 106 and 107, and the 0° C. ionic conductivity is equal to or higher than approximately 15 mS/cm in all of the examples and the comparative examples.

Meanwhile, for the ionic conductivity after the storage test for 4 hours at 85° C., there was a significant difference between Examples 112 to 115 and Comparative Examples 106 and 107. That is, in the examples, the 0° C. ionic conductivity after the storage test for 4 hours at 85° C. was 10 mS/cm or higher. In comparison, in the comparative examples, the 0° C. ionic conductivity after the storage test for 4 hours at 85° C. was lower than 10 mS/cm. In the examples, the 0° C. ionic conductivity after the storage test for 4 hours at 85° C. may be set to preferably 12 mS/cm or higher, more preferably 13 mS/cm or higher, furthermore preferably 13.5 mS/cm or higher.

As shown in Table 40, the non-aqueous electrolyte solutions of Examples 112 to 115 contain acetonitrile, lithium salts, and cyclic acid anhydride, and are produced with a thermal history of 50° C. or lower.

On the basis of the experimental results of the examples and the comparative examples, it was preferable that the electrolyte solution contains acetonitrile and an N-containing compound. Since a protection film can be formed on the positive electrode, it is possible to suppress generation of HF that may cause an increase of internal resistance.

On the basis of Examples 112 to 115, it was preferable that a temperature increase at the time of adding the N-containing compound is suppressed to 50° C. or lower. As a result, it is possible to suppress thermal decomposition of LiPF$_6$ generated at 60° C. or higher.

An example of the thirty eighth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 42. Note that, in Table 42, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis (fluorosulfonyl) imide, "LiN(SO$_2$CF$_3$)$_2$" denotes lithium bis(trifluoromethane sulfonyl) imide, "MBTA" denotes 1-methyl-1H-benzotriazole, "SAH" denotes succinic anhydride, "MAH" denotes maleic anhydride, and "PAH" denotes phthalic anhydride.

In the example, LiPF$_6$ was added after acetonitrile and cyclic acid anhydride are added.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L.

TABLE 42

| | Solvent | | | | | | Lithium salt | | Additive | | |
| | | | | | | | LiPF$_6$ | Imide salt | | Cyclic acid anhydride | Nitrogen-containing compound | |
| | AcN (vol %) | DEC (vol %) | EMC (vol %) | DMC (vol %) | EC (vol %) | VC (vol %) | (mol/1 L solvent) | Type | Content (mol/1 L solvent) | (mass %) | (mass %) | Thermal history |
|---|---|---|---|---|---|---|---|---|---|---|---|---|
| Example 116 | 47 | 0 | 35 | 0 | 16 | 2 | 0.3 | LiN(SO$_2$F)$_2$ | 1.3 | SAH 0.15 | — | ≤50° C. |
| Example 117 | 45 | 0 | 36 | 0 | 16 | 3 | 1.3 | — | — | SAH 0.35 | — | ≤50° C. |
| Example 118 | 36 | 0 | 40 | 0 | 20 | 4 | 1.2 | — | — | MAH 0.15 | MBTA 0.35 | ≤50° C. |
| Example 119 | 63 | 0 | 0 | 10 | 22 | 5 | 0.6 | LiN(SO$_2$CF$_3$)$_2$ | 0.6 | PAH 0.4 | — | ≤50° C. |
| Comparative Example 118 | 45 | 0 | 35 | 0 | 16 | 4 | 1.3 | — | — | SAH 2.0 | — | >60° C. |
| Comparative Example 109 | 47 | 42 | 0 | 0 | 0 | 11 | 2.0 | — | — | — | — | >60° C. |

| | Battery type | Positive-electrode active material | Positive-electrode current collector | Negative-electrode active material | Negative-electrode current collector | Separator |
|---|---|---|---|---|---|---|
| Example 116 | Layered laminate cell | LiNi$_{1/3}$Co$_{1/3}$Mn$_{1/3}$O$_2$ | Aluminum foil | Graphite | Copper foil | Polyethylene microporous membrane |
| Example 117 | Layered laminate cell | LiNi$_{1/3}$Co$_{1/3}$Mn$_{1/3}$O$_2$ | Aluminum foil | Graphite | Copper foil | Polyethylene microporous membrane |
| Example 118 | Layered laminate cell | LiNi$_{1/3}$Co$_{1/3}$Mn$_{1/3}$O$_2$ | Aluminum foil | Graphite | Copper foil | Polyethylene microporous membrane |
| Example 119 | Layered laminate cell | LiNi$_{1/3}$Co$_{1/3}$Mn$_{1/3}$O$_2$ | Aluminum foil | Graphite | Copper foil | Polyethylene microporous membrane |
| Comparative Example 118 | Layered laminate cell | LiNi$_{1/3}$Co$_{1/3}$Mn$_{1/3}$O$_2$ | Aluminum foil | Graphite | Copper foil | Polyethylene microporous membrane |
| Comparative Example 109 | Layered laminate cell | LiNi$_{1/3}$Co$_{1/3}$Mn$_{1/3}$O$_2$ | Aluminum foil | Graphite | Copper foil | Polyethylene microporous membrane |

<Manufacturing of Non-Aqueous Secondary Battery>

(1-1) Fabrication of Positive Electrode

A composite oxide of lithium having a number average particle diameter of 11 μm, nickel, manganese and cobalt (Ni/Mn/Co=1/1/1 (element ratio), density: 4.70 g/cm$^3$) as the positive-electrode active material, graphite carbon powder (density: 2.26 g/cm$^3$) having a number average particle diameter of 6.5 μm and acetylene black powder (density: 1.95 g/cm$^3$) having a number average particle diameter of 48 nm as the conductive aid, and polyvinylidene fluoride (PVdF, density: 1.75 g/cm$^3$) as the binder were mixed at a mass ratio of "100:4.2:1.8:4.6" to obtain a positive electrode mixture. N-methyl-2-pyrrolidone as a solvent was added to the obtained positive electrode mixture until a solid content of 68 mass %, and they were further mixed to prepare positive electrode mixture-containing slurry. This positive electrode mixture-containing slurry was coated on both surfaces of an aluminum foil having a thickness of 20 μm and a width of 200 mm, which will serve as a positive electrode current collector, using a doctor blade method while adjusting the basis weight of one surface to 11.5 mg/cm$^2$, and the solvent was dried and removed. When the positive electrode mixture-containing slurry was coated on the aluminum foil, an uncoated region was formed so as to expose a part of the aluminum foil. Then, roll pressing was performed using a roll press machine to an actual electrode density of 2.80 g/cm$^3$, and a positive electrode having the positive-electrode active material layer and the positive electrode current collector was obtained.

Then, this positive electrode was cut such that the coated portion has an area of 150 mm by 150 mm. In addition, a lead piece formed of aluminum for extracting a current was welded to the exposed portion of the aluminum foil, and vacuum drying was performed for 12 h at 120° C., so that a lead-attached positive electrode was obtained.

(1-2) Fabrication of Negative Electrode

Graphite carbon powder (density: 2.23 g/cm$^3$) having a number average particle diameter of 12.7 μm and graphite carbon powder (density: 2.27 g/cm$^3$) having a number average particle diameter of 6.5 μm as the negative-electrode active material, a carboxymethyl cellulose (density: 1.60 g/cm$^3$) solution (solid content concentration: 1.83 mass %) as the binder, and diene-based rubber (glass transition temperature:−5° C., number average particle diameter when dried: 120 nm, density: 1.00 g/cm$^3$, dispersion medium: water, solid content concentration: 40 mass %) were mixed at a solid content mass ratio of "87.2:9.7:1.4:1.7" to obtain a negative electrode mixture. Water as a solvent was added to the obtained negative electrode mixture until a solid content of 45 mass %, and they were further mixed to prepare negative electrode mixture-containing slurry. This negative electrode mixture-containing slurry was coated on both surfaces of a copper foil having a thickness of 10 μm and a width of 200 mm, which will serve as a negative electrode current collector, using a doctor blade method while adjusting the basis weight of one surface to 6.9 mg/cm$^2$, and the solvent was dried and removed. When the negative electrode mixture-containing slurry was coated on the copper foil, an uncoated region was formed so as to expose a part of the copper foil. Then, roll pressing was performed using a roll press machine to an actual electrode density of 1.30 g/cm$^3$, and a negative electrode having the negative-electrode active material layer and the negative electrode current collector was obtained.

Then, this negative electrode was cut such that the coated portion has an area of 152 mm by 152 mm. In addition, a lead piece formed of nickel for extracting a current was welded to the exposed portion of the copper foil, and vacuum drying was performed for 12 h at 80° C., so that a lead-attached negative electrode was obtained.

(1-3) Fabrication of Multi-Layered Laminate-Type Non-Aqueous Secondary Battery

The lead-attached positive electrode and the lead-attached negative electrode were overlapped by interposing a polyethylene resin film while the mixture coat surfaces of each electrode face each other, so that a laminated electrode structure was obtained.

This laminated electrode structure was housed in an aluminum laminated sheet package, and vacuum drying was performed for 5 h at 80° C. in order to remove moisture. Subsequently, an electrolyte solution was injected into the package, and the package was sealed, so that a multi-layered laminate-type non-aqueous secondary battery (pouch type cell battery, hereinafter, simply also referred to as "multi-layered laminate-type battery") was manufactured.

The multi-layered laminate-type battery has a design capacity value of approximately 10 Ah and a rated voltage value of 4.2 V.

<Evaluation of Multi-Layered Laminate-Type Battery>

For the multi-layered laminate-type battery obtained as described above, initial charging/discharging treatment was performed in the sequence of the chapter (2-1). Subsequently, the battery was evaluated in the sequence of the chapters (2-2) and (2-3). In addition, the electrolyte solution was evaluated in the sequence of the chapter (2-4).

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 2.7 V at a constant current.

(2-1) Initial Charging/Discharging Treatment of Multi-Layered Laminate-Type Battery As a charging device, a battery tester PFX2011 produced by Kikusui Electronics Co., Ltd. was employed. The multi-layered laminate-type battery was charged with a constant current of 0.2 C to a voltage of 4.2 V by setting the ambient temperature to 25° C. and was then charged with a constant voltage of 4.2 V for one hour. Then, the battery was discharged with a constant current corresponding to 0.2 C to a voltage of 2.7 V. Then, a sealing portion of the battery was opened, and degassing was performed inside a glove box having a dew point controlled to −60° C. or lower. After the degassing, vacuum sealing was performed under the same environment.

(2-2) 85° C. Full-Charge Storage Test for Multi-Layered Laminate-Type Battery

For the battery subjected to the initial charging/discharging treatment as described above in the chapter (2-1), the battery was charged with a constant current of "1 C" to a voltage of 4.2 V by setting the battery ambient temperature to 25° C., and the battery was then charged with a constant voltage of 4.2 V for a total of 3 hours. Then, this non-aqueous secondary battery was stored in a thermostatic oven for 4 hours at 85° C. Then, the battery ambient temperature was recovered to 25° C.

(2-3) Ionic Conductivity Measurement

The electrolyte solution was put into a sealed cell (cell size: 24 mm diameter, by 0.35 mm thickness) produced by TOYO Corporation, was sealed, and was inserted into a holder (SH1-Z), and wiring was performed. In addition, the cell was put into the thermostatic oven, and the measurement of electrochemical impedance spectroscopy was performed. Gold was used in the electrode. An argon glove box was used until the electrolyte solution is collected, is filled to the sealed cell, and is sealed.

The measurement of electrochemical impedance spectroscopy was performed using FRA1255 produced by AMETEK Inc. Measurement was performed at an amplitude voltage of 5 mV and a frequency of 10 kHz to 1 MHz. The temperature of the thermostatic oven was set to 20° C. and 0° C., and the measurement was initiated after 1.5 hours from the temperature setting. As the measurement data, data at the time point that a change of the data measured repeatedly at every 5 minutes is lower than 0.1% was employed.

The obtained data was plotted on a Nyquist diagram including real parts Z' and imaginary parts Z" of impedance. In addition, a Z' value (R) at Z"=0 was read, and the Li ionic conductivity was obtained using the following formula.

Li ionic conductivity (mS/cm)=$d/(R \cdot S)$

Here, "d" denotes a distance between electrodes (0.35 cm), and "S" denotes an area of the electrode (4.522 cm$^2$).

As the ionic conductivity, an initial ionic conductivity of the electrolyte solution and an ionic conductivity of the electrolyte solution collected in the glove box having a dew point controlled to −60° C. or lower after the 85° C. storage test were obtained at 20° C. and 0° C., respectively.

The following Table 43 shows the ionic conductivities in Examples 116 to 119 and Comparative Examples 108 and 109.

TABLE 43

| | Organic acid or salt thereof, Li$_2$O | Initial ionic conductivity [mS/cm] | | Ionic conductivity after 85° C. storage test [mS/cm] | |
|---|---|---|---|---|---|
| | [atomic %] | 20° C. | 0° C. | 20° C. | 0° C. |
| Example 116 | 12.6 | 21.6 | 16.2 | 20.3 | 14.8 |
| Example 117 | 18.7 | 19.7 | 15.7 | 18.3 | 14.6 |
| Example 118 | 11.4 | 19.1 | 15.5 | 18.0 | 14.0 |
| Example 119 | 15.9 | 20.1 | 15.0 | 19.0 | 13.8 |
| Comparative Example 108 | 36.9 | 18.9 | 14.8 | 17.9 | 9.1 |
| Comparative Example 109 | 41.4 | 17.1 | 14.1 | 15.1 | 8.7 |

As shown in Table 43 described above, it was recognized that the initial ionic conductivity does not significantly change even when the temperature changes from 20° C. to 0° C. in Examples 116 to 119 and Comparative Examples 108 and 109, and the 0° C. ionic conductivity is equal to or higher than 14 mS/cm in all of the examples and the comparative examples.

Meanwhile, for the ionic conductivity after the storage test for 4 hours at 85° C., there was a significant difference between Examples 116 to 119 and Comparative Examples 108 and 109. That is, in the examples, the 0° C. ionic conductivity after the storage test for 4 hours at 85° C. was 10 mS/cm or higher. In comparison, in the comparative examples, the 0° C. ionic conductivity after the storage test for 4 hours at 85° C. was lower than 10 mS/cm. In the examples, the 0° C. ionic conductivity after the storage test for 4 hours at 85° C. may be set to preferably 12 mS/cm or higher, more preferably 13 mS/cm or higher, furthermore preferably 13.5 mS/cm or higher.

As shown in Table 42, the non-aqueous electrolyte solutions of Examples 116 to 119 contain acetonitrile, lithium salts, and cyclic acid anhydride, and are produced with a thermal history of 50° C. or lower.

On the basis of the experimental results of the examples and the comparative examples, it was preferable that the electrolyte solution obtained by adding acetonitrile and cyclic acid anhydride and then adding $LiPF_6$ is used. Since an abrupt temperature increase at the time of adding $LiPF_6$ is suppressed, and the cyclic acid anhydride reacts sacrificially, it is possible to suppress generation of HF that may cause an increase of internal resistance.

On the basis of the experimental results of Examples 116 to 119, it was preferable that a temperature increase at the time of adding $LiPF_6$ is suppressed to 50° C. or lower. As a result, it is possible to suppress thermal decomposition of $LiPF_6$ generated at 60° C. or higher.

An example of the thirty ninth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 44. Note that, in Table 44, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis(fluorosulfonyl) imide, "$LiN(SO_2CF_3)_2$" denotes lithium bis(trifluoromethane sulfonyl) imide, "MBTA" denotes 1-methyl-1H-benzotriazole, and "SAH" denotes succinic anhydride.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L.

A non-aqueous secondary battery was manufactured using the positive-electrode active material, the negative-electrode active material, and the electrolyte solution described in Table 44.

<Fabrication of Positive Electrode>

A composite oxide ($LiNi_{0.8}Mn_{0.1}Co_{0.1}O_2$) of lithium, nickel, manganese, and cobalt as the positive-electrode active material, acetylene black powder as the conductive aid, and polyvinylidene fluoride (PVDF) as the binder were mixed at a mass ratio of "100:4.3:4.3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 180 mg/m². When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.80 mg/cm³, so that a positive electrode having the positive-electrode active material layer and the positive electrode current collector was obtained.

Then, this positive electrode was cut such that the positive electrode mixture layer has an area of 14 mm by 20 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, acetylene black powder as the conductive aid, polyvinylidene fluoride (PVDF) as the binder were mixed at a mass ratio of "100:2.2:5.4" to obtain a negative electrode mixture. N-methyl-2-pyrrolidone as a solvent was added to the obtained negative electrode mixture, and they were further mixed to prepare negative electrode mixture-containing slurry. This slurry was coated on one surface of a copper foil having a thickness of 10 pun to a constant thickness while adjusting the basis weight to approximately 110.0 g/m². When the negative electrode mixture-containing slurry was coated on the copper foil, an uncoated region was formed so as to expose a part of the copper foil. Then, roll pressing was performed using a roll press machine until the negative-electrode active material layer has a density of 1.5 g/cm³, so that a negative electrode having the negative-electrode active material layer and the negative electrode current collector was obtained.

Then, this negative electrode was cut such that the negative electrode mixture layer has an area of 15 mm by 21 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply also referred to as "single-layered laminate-type battery") was manufactured. This single-layered laminate-type battery has a design capacity value of 7.5 mAh and a rated voltage value of 4.2 V.

TABLE 44

| | Solvent | | | | | | Lithium salt | | | Additive | |
| | | | | | | | LiPF$_6$ | Imide salt | | Cyclic acid anhydride | Nitrogen-containing compound |
| | AcN (vol %) | DEC (vol %) | EMC (vol %) | DMC (vol %) | EC (vol %) | VC (vol %) | (mol/1 L solvent) | Type | Content (mol/1 L solvent) | (mass %) | (mass %) |
|---|---|---|---|---|---|---|---|---|---|---|---|
| Example 120 | 51 | 24 | 0 | 0 | 21 | 4 | 1.2 | — | — | SAH 0.2 | MBTA 0.3 |
| Example 121 | 25 | 23 | 28 | 0 | 21 | 3 | 0.3 | LiN(SO$_2$F)$_2$ | 1.0 | SAH 0.1 | MBTA 0.4 |
| Example 122 | 60 | 0 | 0 | 18 | 18 | 4 | 0.5 | LiN(SO$_2$CF$_3$)$_2$ | 0.7 | SAH 0.2 | MBTA 0.2 |
| Comparative Example 110 | 0 | 47 | 16 | 0 | 34 | 3 | 1.2 | — | — | SAH 0.15 | — |
| Comparative Example 111 | 0 | 0 | 20 | 45 | 33 | 2 | 0.3 | LiN(SO$_2$F)$_2$ | 0.9 | — | — |

| | Battery type | Positive-electrode active material | Positive-electrode current collector | Negative-electrode active material | Negative-electrode current collector | Separator |
|---|---|---|---|---|---|---|
| Example 120 | Single-layered laminate | LiNi$_{0.3}$Mn$_{0.1}$Co$_{0.1}$O$_2$ | Aluminum foil | Black lead | Copper foil | Polyethylene microporous membrane |
| Example 121 | Single-layered laminate | LiNi$_{0.3}$Mn$_{0.1}$Co$_{0.1}$O$_2$ | Aluminum foil | Black lead | Copper foil | Polyethylene microporous membrane |
| Example 122 | Single-layered laminate | LiNi$_{0.3}$Mn$_{0.1}$Co$_{0.1}$O$_2$ | Aluminum foil | Black lead | Copper foil | Polyethylene microporous membrane |
| Comparative Example 110 | Single-layered laminate | LiNi$_{0.3}$Mn$_{0.1}$Co$_{0.1}$O$_2$ | Aluminum foil | Black lead | Copper foil | Polyethylene microporous membrane |
| Comparative Example 111 | Single-layered laminate | LiNi$_{0.3}$Mn$_{0.1}$Co$_{0.1}$O$_2$ | Aluminum foil | Black lead | Copper foil | Polyethylene microporous membrane |

<Evaluation of Single-Layered Laminate-Type Battery>

Each battery for evaluation obtained as described above was evaluated in the following sequence.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 2.5 V at a constant current.

<4.2V Cycle Test for Single-Layered Laminate-Type Battery>

The battery was charged to a voltage of 4.2 V with a constant current of 7.5 mA corresponding to "1 C" by setting the battery ambient temperature to 25° C., and was then discharged with a constant current of 7.5 mA to a voltage of 2.7 V. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%.

<4.3V Cycle Test for Single-Layered Laminate-Type Battery>

The battery was charged to a voltage of 4.3 V with a constant current of 7.5 mA corresponding to "1 C" by setting the battery ambient temperature to 25° C., and was then discharged to a voltage of 2.7 V with a constant current of 7.5 mA. By setting one charge operation and one discharge operation as a single cycle, the charging/discharging was performed for 100 cycles. The discharge capacity of the hundredth cycle was set as a capacity retention rate by assuming that the discharge capacity of the first cycle is 100%. The experimental results thereof are shown in Table 45.

TABLE 45

| | 4.2 V cycle test capacity retention rate [%] | 4.3 V cycle test capacity retention rate [%] |
|---|---|---|
| Example 120 | 98 | 93 |
| Example 121 | 99 | 93 |
| Example 122 | 98 | 92 |
| Comparative Example 110 | 38 | 55 |
| Comparative Example 111 | 39 | 57 |

In the examples, it was recognized that the capacity retention rate of the hundredth cycle is 70% or higher, and a high capacity retention rate is maintained.

On the basis of these examples and comparative examples, it is preferable that the content of the Ni element in the positive-electrode active material is more than 50%. In the cycle test requiring charging to 4.3 V, the capacity retention rate after 100 cycles can be effectively set to 75% or higher.

On the basis of Examples 120 to 122, in the non-aqueous secondary battery obtained by using the high nickel positive electrode as the positive-electrode active material, a design capacity per unit volume can be set to 150 Ah/L or larger by setting the charging voltage to 4.3 V or higher.

Next, an example of the fortieth embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 46. Note that, in Table 46, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiN(SO$_2$F)$_2$" denotes lithium bis(fluorosulfonyl) imide, "LiN(SO$_2$CF$_3$)$_2$" denotes lithium bis(trifluoromethane sulfonyl) imide, "SAH" denotes succinic anhydride, and "MAH" denotes maleic anhydride.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L. A non-aqueous secondary battery was manufactured using the positive-electrode active material, the negative-electrode active material, the separator, and the electrolyte solution described in Table 46.

TABLE 46

| | Solvent | | | | | | Lithium salt | | Additive |
|---|---|---|---|---|---|---|---|---|---|
| | | | | | | | LiPF$_6$ | Imide salt | Cyclic acid |
| | AcN (vol %) | DEC (vol %) | EMC (vol %) | DMC (vol %) | EC (vol %) | VC (vol %) | (mol/1 L solvent) | Type | Content (mol/1 L solvent) | anhydride (mass %) |
| Example 123 | 45 | 30 | 0 | 0 | 21 | 4 | 1.3 | — | — | SAH 0.2 |
| Example 124 | 47 | 28 | 0 | 0 | 21 | 4 | 0.3 | LiN(SO$_2$F)$_2$ | 1.0 | SAH 0.2 |
| Example 125 | 65 | 0 | 0 | 13 | 18 | 4 | 0.6 | LiN(SO$_2$CF$_3$)$_2$ | 0.6 | MAH 0.2 |
| Example 126 | 47 | 0 | 30 | 0 | 20 | 3 | 0.6 | LiN(SO$_2$F)$_2$ | 0.6 | SAH 0.2 |
| Comparative Example 112 | 0 | 72 | 0 | 0 | 24 | 4 | 1.2 | — | — | — |
| Comparative Example 113 | 0 | 0 | 66 | 0 | 32 | 2 | 1.0 | — | — | — |
| Comparative Example 114 | 0 | 25 | 0 | 48 | 25 | 2 | 0.7 | LiN(SO$_2$F)$_2$ | 0.5 | — |

| | Battery type | Positive-electrode active material | Positive-electrode current collector | Negative-electrode active material | Negative-electrode current collector | Separator |
|---|---|---|---|---|---|---|
| Example 123 | Single-layered laminate | LiNi$_{0.5}$Mn$_{0.3}$Co$_{0.2}$O$_2$ | Aluminum foil | Black lead | Copper | Polyethylene microporous membrane |
| Example 124 | Single-layered laminate | LiNi$_{0.5}$Mn$_{0.3}$Co$_{0.2}$O$_2$ | Aluminum foil | Black lead | Copper | Polyethylene microporous membrane |
| Example 125 | Single-layered laminate | LiNi$_{0.5}$Mn$_{0.3}$Co$_{0.2}$O$_2$ | Aluminum foil | Black lead | Copper | Polyethylene microporous membrane |
| Example 126 | Single-layered laminate | LiNi$_{1/3}$Mn$_{1/3}$Co$_{1/3}$O$_2$ | Aluminum foil | Black lead | Copper | Polyethylene microporous membrane |
| Comparative Example 112 | Single-layered laminate | LiNi$_{0.5}$Mn$_{0.3}$Co$_{0.2}$O$_2$ | Aluminum foil | Black lead | Copper | Polyethylene microporous membrane |
| Comparative Example 113 | Single-layered laminate | LiNi$_{0.5}$Mn$_{0.3}$Co$_{0.2}$O$_2$ | Aluminum foil | Black lead | Copper | Polyethylene microporous membrane |
| Comparative Example 114 | Single-layered laminate | LiNi$_{0.5}$Mn$_{0.3}$Co$_{0.2}$O$_2$ | Aluminum foil | Black lead | Copper | Polyethylene microporous membrane |

In the experiment, the battery voltage was measured after one hour from injection of the solution. The experimental result thereof is shown in the following Table 47.

TABLE 47

| | Electric potential of positive electrode [V vs. Li/Li$^+$] | Electric potential of negative electrode [V vs. Li/Li$^+$] | Electric potential of battery [V] |
|---|---|---|---|
| Example 123 | 3.2 | 2.60 | 0.60 |
| Example 124 | 3.2 | 2.57 | 0.63 |
| Example 125 | 3.2 | 2.57 | 0.63 |
| Example 126 | 3.2 | 2.61 | 0.59 |
| Comparative Example 112 | 3.2 | 3.13 | 0.07 |
| Comparative Example 113 | 3.2 | 3.14 | 0.06 |
| Comparative Example 114 | 3.2 | 3.12 | 0.08 |

As shown in Table 47, in all of the examples, a difference of the negative electrode electric potential around the injection of the non-aqueous electrolyte solution was 0.3 V or higher.

On the basis of the experiments, it was preferable that the negative electrode contains at least one of metals having a standard electrode potential of 0 V or higher. Since the negative electrode of the non-aqueous secondary battery using the existing carbonate electrolyte solution has an electric potential close to 3.1 V vs. Li/Li$^+$ after liquid injection, elution of a metal element having a high standard electrode potential gradually proceeds as it is stored for a long time. Meanwhile, the electrolyte solution using acetonitrile does not cause elution even when it is stored for a long time after liquid injection. Therefore, it is possible to extend a manufacturing control period including an impregnation time.

On the basis of the experimental results of Examples 123 to 126, the negative electrode current collector is preferably formed of copper. As a result, it is possible to suppress elution of copper without generating a charging/discharging history.

Next, an example of the forty first embodiment will now be described.

<Preparation of Electrolyte Solution>

An electrolyte solution was prepared by mixing various solvents and additives at a predetermined volume ratio. The compositions of each electrolyte solution used in the examples and the comparative examples are shown in Table 48. Note that, in Table 48, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "LiPF$_6$" denotes lithium hexafluorophosphate, "LiBOB" denotes lithium bis(oxalate) borate, "LiN(SO$_2$F)$_2$" denotes lithium bis(fluorosulfonyl) imide, "LiN(SO$_2$CF$_3$)$_2$" denotes lithium bis(trifluoromethane sulfonyl) imide, "SAH" denotes succinic anhydride, "MAH" denotes maleic anhydride, and "PAH" denotes phthalic anhydride.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L.

TABLE 48

| | Solvent | | | | | Lithium salt | | Additive | | |
| | | | | | | | | Imide salt | | Cyclic | |
| | AcN (vol %) | DEC (vol %) | EMC (vol %) | EC (vol %) | VC (vol %) | LiPF$_6$ (mol/1 L solvent) | LiBOB (mol/1 L solvent) | Type | Content (mol/1 L solvent) | acid anhydride (mass %) | Acetic acid (ppm) |
|---|---|---|---|---|---|---|---|---|---|---|---|
| Example 127 | 50 | 35 | 0 | 11 | 4 | 0.3 | 0 | LiN(SO$_2$F)$_2$ | 1.5 | SAH 0.2 | 0.1 |
| Example 128 | 35 | 0 | 40 | 21 | 4 | 1.2 | 0 | — | — | MAH 0.15 | 1 |
| Example 129 | 65 | 25 | 0 | 6 | 4 | 0.3 | 0 | LiN(SO$_2$CF$_3$)$_2$ | 1.2 | PAH 0.5 | 5 |
| Comparative Example 115 | 47 | 42 | 0 | 0 | 11 | 1.3 | 0.1 | — | — | MAH 0.1 | — |
| Comparative Example 116 | 85 | 11 | 0 | 0 | 4 | 1 | 0 | — | — | — | 5 |

| | Battery type | Positive-electrode active material | Positive-electrode current collector | Negative-electrode active material | Negative-electrode current collector | Separator |
|---|---|---|---|---|---|---|
| Example 127 | Layered laminate | LiNi$_{1/3}$Co$_{1/3}$Mn$_{1/3}$O$_2$ | Aluminum foil | Graphite | Copper foil | Polyethylene microporous membrane |
| Example 128 | Layered laminate | LiNi$_{1/3}$Co$_{1/3}$Mn$_{1/3}$O$_2$ | Aluminum foil | Graphite | Copper foil | Polyethylene microporous membrane |
| Example 129 Comparative Example 115 | Layered laminate | LiNi$_{1/3}$Co$_{1/3}$Mn$_{1/3}$O$_2$ | Aluminum foil | Graphite | Copper foil | Polyethylene microporous membrane |
| Comparative Example 116 | Layered laminate | LiNi$_{1/3}$Co$_{1/3}$Mn$_{1/3}$O$_2$ | Aluminum foil | Graphite | Copper foil | Polyethylene microporous |

<Manufacturing of Battery>

<Fabrication of Positive Electrode>

A composite oxide (LiNi$_{0.5}$Mn$_{0.3}$Co$_{0.2}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 95.0 g/m$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.74 g/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex also as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 61.0 g/m². When the negative electrode mixture-containing slurry was coated on the copper foil, an uncoated region was formed so as to expose a part of the copper foil. Then, roll pressing was performed using a roll press machine until the negative-electrode active material layer has a density of 1.20 g/cm³, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply also referred to as "single-layered laminate-type battery") was manufactured. This single-layered laminate-type battery has a design capacity value of 23 mAh and a rated voltage value of 4.2 V.

In the experiment, the single-layered laminate-type battery was charged to a voltage of 4.2 V with a constant current of 0.05 C at a temperature of 25° C., and was then charged with a constant voltage of 4.2 V for 1.5 hours. In addition, this charged single-layered laminate-type battery was stored in a thermostatic oven of 60° C. After 200 hours, the single-layered laminate-type battery was removed from the thermostatic oven, and was recovered to the room temperature. Then, the 4.2 V storage characteristics of the single-layered laminate-type battery were evaluated using the technique of measuring a gas generation amount and a voltage of each laminated cell. The gas generation amount was measured using the Archimedes method, in which the single-layered laminate-type battery is put into the container filled with hyper-pure water, and the volume of the single-layered laminate-type battery is measured from a weight change around that time. As a device for measuring the volume from the weight change, a gravimeter MDS-300 produced by Alfa Mirage Co., Ltd. was employed.

TABLE 49

| | Gas generation amount in 60° C. storage test (ml) | Equivalent per 1 mAh (ml) | Determination |
|---|---|---|---|
| Example 127 | 0.12 | 0.0052 | ○ |
| Example 128 | 0.16 | 0.0070 | ○ |
| Example 129 | 0.14 | 0.0061 | ○ |
| Comparative Example 115 | 0.38 | 0.0165 | x |
| Comparative Example 116 | Evaluation is interrupted | Evaluation is interrupted | x |

As shown in Table 49, in the examples, it was recognized that the gas generation amount in the storage test for 200 hours at 60° C. is 0.008 ml or less per 1 mAh. Preferably, the gas generation amount is 0.007 ml or less per 1 mAh.

In this example, the non-aqueous electrolyte solution contains acetonitrile, acetic acid, and cyclic acid anhydride. In addition, when $LiPF_6$ is added, the temperature is preferably set to 50° C. or lower. Since acetic acid and cyclic acid anhydride act on reduction resistance, it is possible to suppress generation of gas caused by reductive decomposition of acetonitrile.

This example is applicable to a pouch type non-aqueous secondary battery containing acetonitrile, acetic acid, and cyclic acid anhydride. Since the SEI is formed on the surface of the negative electrode due to acetic acid and cyclic acid anhydride, it is possible to suppress reduction of acetonitrile from being promoted at a high temperature.

On the basis of the experimental results of Examples 127 to 129, it is preferable that the content of acetic acid is set to 0.1 ppm or more and 5 ppm or less with respect to the non-aqueous electrolyte solution. The gas generation amount in the storage test for 200 hours at 60° C. can be more effectively set to 0.008 ml or less per 1 mAh.

Next, an example of the forty second embodiment will be described.

<Preparation of Electrolyte Solution>

An electrolyte solution was prepared by mixing various solvents and additives at a predetermined volume ratio. The compositions of each electrolyte solution used in the examples and the comparative examples are shown in Table 50. Note that, in Table 50, "AcN" denotes acetonitrile, "DEC" denotes diethyl carbonate, "EMC" denotes ethyl methyl carbonate, "DMC" denotes dimethyl carbonate, "EC" denotes ethylene carbonate, "VC" denotes vinylene carbonate, "$LiPF_6$" denotes lithium hexafluorophosphate, "$LiN(SO_2F)_2$" denotes lithium bis(fluorosulfonyl) imide, "$LiN(SO_2CF_3)_2$" denotes lithium bis(trifluoromethane sulfonyl) imide, "SAH" denotes succinic anhydride, "MAH" denotes maleic anhydride, and "PAH" denotes phthalic anhydride.

Preparation was performed such that each component other than lithium salts and additives is a non-aqueous solvent, and a total amount of each non-aqueous solvent becomes "1 L". The content of lithium salt is a molar quantity with respect to the non-aqueous solvent of 1 L.

TABLE 50

| | Solvent | | | | | | Lithium salt | | Additive |
| | | | | | | | LiPF$_6$ | Imide salt | |
| | AcN (vol %) | DEC (vol %) | EMC (vol %) | DMC (vol %) | EC (vol %) | VC (vol %) | (mol/1 L solvent) | Type | Content (mol/1 L solvent) | Cyclic acid anhydride (mass %) |
|---|---|---|---|---|---|---|---|---|---|---|
| Example 130 | 45 | 0 | 35 | 0 | 16 | 4 | 0.3 | LiN(SO$_2$F)$_2$ | 1.3 | SAH 0.5 |
| Example 131 | 50 | 35 | 0 | 0 | 10 | 5 | 0.3 | LiN(SO$_2$F)$_2$ | 2.7 | MAH 0.2 |
| Example 132 | 65 | 0 | 0 | 6 | 22 | 7 | 0.6 | LiN(SO$_2$CF$_3$)$_2$ | 0.6 | PAH 0.5 |
| Comparative Example 117 | 47 | 42 | 0 | 0 | 0 | 11 | 1.3 | LiN(SO$_2$F)$_2$ | 1.3 | MAH 0.05 |
| Comparative Example 118 | 20 | 0 | 42 | 0 | 21 | 17 | 0.5 | LiN(SO$_2$CF$_3$)$_2$ | 0.5 | — |
| Comparative Example 119 | 100 | 0 | 0 | 0 | 0 | 0 | 0.0 | LiN(SO$_2$CF$_3$)$_2$ | 4.2 | — |

| | Battery type | Positive-electrode active material | Positive-electrode current collector | Negative-electrode active material | Negative-electrode current collector | Separator |
|---|---|---|---|---|---|---|
| Example 130 | Coin (CR2032) | LiNi$_{1/3}$Co$_{1/3}$Mn$_{1/3}$O$_2$ | Aluminum foil | Graphite | Copper foil | Polyethylene microporous membrane |
| Example 131 | Coin (CR2032) | LiNi$_{1/3}$Co$_{1/3}$Mn$_{1/3}$O$_2$ | Aluminum foil | Graphite | Copper foil | Polyethylene microporous membrane |
| Example 132 | Coin (CR2032) | LiNi$_{1/3}$Co$_{1/3}$Mn$_{1/3}$O$_2$ | Aluminum foil | Graphite | Copper foil | Polyethylene microporous membrane |
| Comparative Example 117 | Coin (CR2032) | LiNi$_{1/3}$Co$_{1/3}$Mn$_{1/3}$O$_2$ | Aluminum foil | Graphite | Copper foil | Polyethylene microporous membrane |
| Comparative Example 118 | Coin (CR2032) | LiNi$_{1/3}$Co$_{1/3}$Mn$_{1/3}$O$_2$ | Aluminum foil | Graphite | Copper foil | Polyethylene microporous membrane |
| Comparative Example 119 | Coin (CR2032) | LiNi$_{1/3}$Co$_{1/3}$Mn$_{1/3}$O$_2$ | Aluminum foil | Graphite | Copper foil | Polyethylene microporous membrane |

<Manufacturing of Battery>
<Fabrication of Positive Electrode>

A composite oxide (LiNi$_{0.5}$Mn$_{0.3}$Co$_{0.2}$O$_2$) of lithium, nickel, manganese, and cobalt as the positive-electrode active material, acetylene black powder as the conductive aid, and polyvinylidene fluoride (PVDF) as the binder were mixed at a mass ratio of "100:3.5:3" to obtain a positive electrode mixture. N-methyl-2-pyrrolidone as a solvent was added to the obtained positive electrode mixture, and they were further mixed to prepare positive electrode mixture-containing slurry. This positive electrode mixture-containing slurry was coated on one surface of an aluminum foil having a thickness of 15 μm, which will serve as a positive electrode current collector, while adjusting the basis weight to 95.0 g/m$^2$. When the positive electrode mixture-containing slurry was coated on the aluminum foil, an uncoated region was formed so as to expose a part of the aluminum foil. Then, roll pressing was performed using a roll press machine until the positive-electrode active material layer has a density of 2.74 g/cm$^3$, so that a positive electrode having the positive-electrode active material layer and the positive electrode current collector was obtained.

Then, this positive electrode was cut such that the positive electrode mixture layer has an area of 30 mm by 50 mm, and an exposed portion of the aluminum foil is included. In addition, a lead piece formed of aluminum for extracting a current was welded to the exposed portion of the aluminum foil, and vacuum drying was performed for 12 hours at 120° C., so that a lead-attached positive electrode was obtained.

<Fabrication of Negative Electrode>

Graphite as the negative-electrode active material, carboxymethyl cellulose as the binder, and styrene-butadiene latex also as the binder were mixed at a mass ratio of "100:1.1:1.5" to obtain a negative electrode mixture. An appropriate amount of water was added to the obtained negative electrode mixture, and they were mixed sufficiently to prepare negative electrode mixture-containing slurry. This slurry was coated on one surface of a copper foil having a thickness of 10 μm to a constant thickness while adjusting the basis weight to 61.0 g/m$^2$. When the negative electrode mixture-containing slurry was coated on the copper foil, an uncoated region was formed so as to expose a part of the copper foil. Then, roll pressing was performed using a roll press machine until the negative-electrode active material layer has a density of 1.20 g/cm$^3$, so that a negative electrode having the negative-electrode active material layer and the negative electrode current collector was obtained.

Then, this negative electrode was cut such that the negative electrode mixture layer has an area of 32 mm by 52 mm, and the exposed portion of the copper foil is included. In addition, a lead piece formed of nickel for extracting a current was welded to the exposed portion of the copper foil, and vacuum drying was performed for 12 hours at 80° C., so that a lead-attached negative electrode was obtained.

<Assembly of Single-Layered Laminate-Type Battery>

The lead-attached positive electrode and the lead-attached negative electrode were overlapped by interposing a polyethylene microporous membrane separator (having a thickness of 21 μm) while the mixture coat surfaces of each electrode face each other, so that a laminated electrode structure was obtained. This laminated electrode structure was housed in an aluminum laminated sheet package having a size of 90 mm by 80 mm, and vacuum drying was performed for 5 hours at 80° C. in order to remove moisture. Subsequently, each of the electrolyte solutions described above was injected into the package, and the package was sealed, so that a single-layered laminate type (pouch type) non-aqueous secondary battery (hereinafter, simply also referred to as "single-layered laminate-type battery") was manufactured. This single-layered laminate-type battery has a design capacity value of 23 mAh and a rated voltage value of 4.2 V.

<Evaluation of Single-Layered Laminate-Type Battery>

For the battery for evaluation obtained as described above, initial charging treatment was performed in the sequence of the following chapter (1-1). Then, each battery was evaluated in the sequence of the chapters (1-2) and (1-3). Note that the charging/discharging was performed using a charging/discharging device ACD-01 (model name) produced by Asuka Electronics Co., Ltd. and a thermostatic oven PLM-63S (model name) produced by Futaba Kagaku Co., Ltd.

Here, "1 C" refers to a current value at which a fully charged battery is expected to be discharged in one hour at a constant current to terminate the discharge. That is, "1 C" refers to a current value at which the discharge operation is expected to be terminated in one hour by discharging the battery from a full-charge state of 4.2 V to a voltage of 3.0 V at a constant current.

(1-1) Initial Charging/Discharging Treatment of Single-Layered Laminate-Type Battery The battery was charged with a constant current of 2.3 mA corresponding to "0.1 C" to a voltage of 4.2 V by setting the battery ambient temperature to 25° C. and was then charged with a constant voltage of 4.2 V for 1.5 hours. Then, the battery was discharged with a constant current of 6.9 mA corresponding to "0.3 C" to a voltage of 3.0 V. Initial efficiency was calculated by dividing the discharge capacity at this time by the charge capacity.

(1-2) 60° C. Full-Charge Storage Test of Single-Layered Laminate-Type Battery

In the experiment, the single-layered laminate-type battery was charged with a constant current of 0.05 C to a voltage of 4.2 V at a temperature of 25° C. and was then charged with a constant voltage of 4.2 V for 1.5 hours. In addition, this charged single-layered laminate-type battery was stored in the thermostatic oven at a temperature of 60° C. After 720 hours, the single-layered laminate-type battery was removed from the thermostatic oven and was recovered to the room temperature.

(1-3) Measurement of Electrochemical Impedance Spectroscopy

The measurement of electrochemical impedance spectroscopy was performed using a frequency response analyzer 1400 (model name) produced by AMETEK, Inc. and potentio-galvanostat 1470E (model name) produced by AMETEK, Inc. An A.C. impedance value at 1 kHz was obtained as a resistance value by measuring impedance from a voltage/current response signal by applying an AC signal while changing the frequency to 1000 kHz to 0.01 Hz. An amplitude of the applied AC voltage was set to "±5 mV". Furthermore, the battery ambient temperature at the time of measurement of electrochemical impedance spectroscopy was set to 25° C. In addition, the following values were calculated from such results.

Resistance increase rate=(resistance value after 60° C. full-charge storage test/resistance value before 60° C. full-charge storage test)×100[%]

As a non-aqueous secondary battery to be measured, a multi-layered laminate-type battery not subjected to the 60° C. full-charge storage test and a multi-layered laminate-type battery subjected to the 60° C. full-charge storage test were employed using the method described above in the chapter (1-2).

In the experiment, the measurement of electrochemical impedance spectroscopy around the storage at 60° for 720 hours was performed. The experimental result thereof is shown in the following Table 51.

TABLE 51

|  | A.C. impedance value at 1 kHz [Ω] | | Resistance | |
| --- | --- | --- | --- | --- |
|  | Before storage test | After storage test | increase rate [%] | Determination |
| Example 130 | 2.5 | 5.7 | 228 | ○ |
| Example 131 | 3.1 | 6.3 | 203 | ○ |
| Example 132 | 3.0 | 7.2 | 240 | ○ |
| Comparative Example 117 | 3.0 | 15.2 | 507 | x |
| Comparative Example 118 | 3.3 | 18.2 | 552 | x |
| Comparative Example 119 | 3.9 | 20.1 | 515 | x |

As shown in Table 51, in the examples, it was recognized that the resistance increase rate in the full-charge storage test for 720 hours at 60° C. is 400% or lower. Preferably, the resistance increase rate is 350%/o or lower, more preferably 300% or lower, and furthermore preferably 250% or lower.

On the basis of the experimental results of the examples and the comparative examples, it was recognized that, if the imide salt is contained in a molarity relationship of "$LiPF_6 \leq$imide salt", it is possible to suppress reduction of the ionic conductivity at a low temperature and obtain an excellent low-temperature characteristic.

On the basis of the experimental results of Example 130 to 132, it was preferable that an electrolyte solution containing acetonitrile and at least one selected from succinic anhydride, maleic anhydride, and phthalic anhydride is employed. As a result, it is possible to suppress an increase of internal resistance during high-temperature heating and obtain an excellent low-temperature characteristic. Therefore, using the non-aqueous secondary battery containing acetonitrile, it is possible to cope with a storage battery compatible with a cold region.

An example of the specific configuration of the forty third embodiment will now be described. FIGS. 3(a) and (b) are a schematic explanatory diagram illustrating a cell pack according to the forty third embodiment.

In the cell pack (without parallel) of this example illustrated in FIG. 3(a), the reference numeral 1 refers to "non-aqueous secondary battery (LIB)", the reference numeral 2 refers to "voltage monitoring circuit (BMS)", and the reference numeral 3a refers to "cell pack (without parallel)". The cell pack 3a can be repeatedly charged and discharged, and a plurality of cell packs 3a may be connected in parallel.

Specifically, as illustrated in FIG. 3(a), this cell pack 3a includes non-aqueous secondary batteries (LIB) 1 in which four cells are connected in series and a voltage monitoring circuit (BMS) 2 that individually monitors terminal voltages for each of the plurality of non-aqueous secondary batteries.

In the cell pack (with parallel) of this example illustrated in FIG. 3(*b*), the reference numeral 1 refers to "non-aqueous secondary battery (LIB)", the reference numeral 2 refers to "voltage monitoring circuit (BMS)", and the reference numeral 3*b* refers to "cell pack (with parallel)". The cell pack 3*b* can be repeatedly charged and discharged, and a plurality of cell packs 3*b* may be connected in parallel.

Specifically, as illustrated in FIG. 3(*b*), this cell pack 3*b* includes four non-aqueous secondary batteries (LIB) 1 connected in series in which a plurality of cells are connected in parallel, and a voltage monitoring circuit (BMS) 2 that individually monitors terminal voltages for each of the plurality of non-aqueous secondary batteries.

Here, in FIGS. 3(*a*) and 3(*b*), the non-aqueous secondary battery (LIB) 1 includes a positive electrode having a positive-electrode active material layer provided on one surface or both surfaces of the current collector, a negative electrode having a negative-electrode active material layer provided on one surface or both surfaces of the current collector, and a non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes within a range of 1.8 to 3.7 V, and the average operation voltage becomes 2.5 to 3.5 V, so that a 12V cell pack is obtained. As a result, it is possible to substitute an existing 12V lead acid battery. Since a specification of an electric system is defined on the basis of the operation voltage range of the lead acid battery, it is very important to determine the operation voltage range per cell. For this reason, the BMS 2 for appropriately managing the voltage is mounted.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. $Li/Li^+$) or higher has been used. However, since the electrolyte solution containing ethylene carbonate or vinylene carbonate and the positive electrode of iron phosphate lithium ($LiFePO_4$: LFP) or the negative electrode of graphite are employed, it is possible to obtain a 12V cell pack capable of improving a cycle life at a high temperature. Furthermore, this 12V cell pack has a high input/output characteristic over a wide temperature range.

Figure 4:
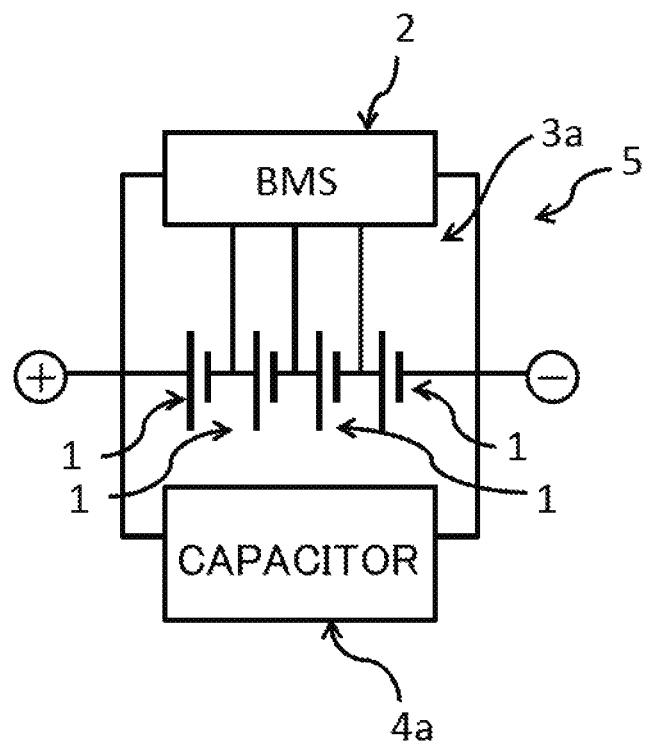
FIG. 4 is a schematic explanatory diagram illustrating a hybrid power system according to a forty fourth embodiment.

An example of a specific configuration of the forty fourth embodiment will now be described. FIG. 4 is a schematic explanatory diagram illustrating a hybrid power system according to the present invention. Here, the reference numeral 1 refers to a "non-aqueous secondary battery (LIB) ", the reference numeral 2 refers to a "voltage monitoring circuit (BMS)", the reference numeral 4*a* refers to a "capacitor (secondary battery other than the LIB)", and the reference numeral 5 refers to a small-sized hybrid power system. This small-sized hybrid power system 5 can be repeatedly charged and discharged.

Specifically, as illustrated in FIG. 4, this small-sized hybrid power system 5 includes non-aqueous secondary batteries (LIB) 1 in which four cells are connected in series, and a voltage monitoring circuit (BMS) 2 that individually monitors terminal voltages of each of the plurality of non-aqueous secondary batteries. In addition, a capacitor 4*a* (secondary battery other than the LIB) is connected in parallel to the LIB 1. The capacitor preferably includes an electric double layer capacitor or a lithium ion capacitor.

Here, the non-aqueous secondary battery (LIB) 1 includes a positive electrode having a positive-electrode active material layer provided on one surface or both surfaces of the current collector, a negative electrode having a negative-electrode active material layer provided on one surface or both surfaces of the current collector, and a non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes within a range of 1.8 to 3.7 V, and the average operation voltage becomes 2.5 to 3.5 V, so that a 12V hybrid power system is obtained. As a result, it is possible to substitute an existing 12V lead acid battery. Since a specification of an electric system is defined on the basis of the operation voltage range of the lead acid battery, it is very important to determine the operation voltage range per cell. For this reason, the BMS for appropriately managing the voltage is mounted.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. $Li/Li^+$) or higher has been used. However, since the electrolyte solution containing ethylene carbonate or vinylene carbonate and the positive electrode of iron phosphate lithium ($LiFePO_4$: LFP) or the negative electrode of graphite are employed, it is possible to obtain a 12V hybrid power system capable of improving a cycle life at a high temperature. Furthermore, this 12V hybrid power system has a high input/output characteristic over a wide temperature range.

According to the forty fourth embodiment, the hybrid power system is especially preferably a combinational hybrid power system in which the LIB module of the forty third embodiment and the secondary battery other than the lead acid battery are combined. Here, the module is formed by connecting a plurality of cells, and the cell pack is formed by connecting a plurality of modules. However, the cell pack is a terminology including the module. In the LIB of the prior art, an organic solvent is used in the electrolyte solution. Therefore, viscosity of the electrolyte solution increases at a low temperature, and the internal resistance significantly increases. As a result, the low-temperature output power of the LIB is reduced, compared to the lead acid battery. Meanwhile, the lead acid battery has low output power at 25° C. but has high output power at −10° C.

In this regard, according to the forty fourth embodiment, a 12V vehicle power supply system is configured by connecting the LIB module of the forty third embodiment to the secondary battery other than the lead acid battery in parallel, and a large current is supplemented to the LIB module of the forty third embodiment capable of receiving a large current in the event of a charge operation caused by braking of vehicle deceleration or the like. As a result, it is possible to efficiently use energy generated in the event of braking of a traveling vehicle such as an automobile as regenerative energy.

According to the forty fourth embodiment, iron phosphate lithium ($LiFePO_4$) is used as the positive-electrode active material of the LIB, and graphite is used as the negative-electrode active material, so that the electrolyte solution preferably has a 20° C. ionic conductivity of 18 mS/cm or higher. Since iron phosphate lithium has lower electron conductivity, compared to NCM or LCO, it has a problem in charging/discharging. For this reason, its advantage may be degraded when it is combined with a secondary battery other than the LIB. In this regard, by using an electrolyte solution having high ionic conductivity, it is possible to cope with a wide temperature range from a low temperature to a high temperature in a large-current charging/discharging. Therefore, it is possible to extend a service life.

Figure 5:
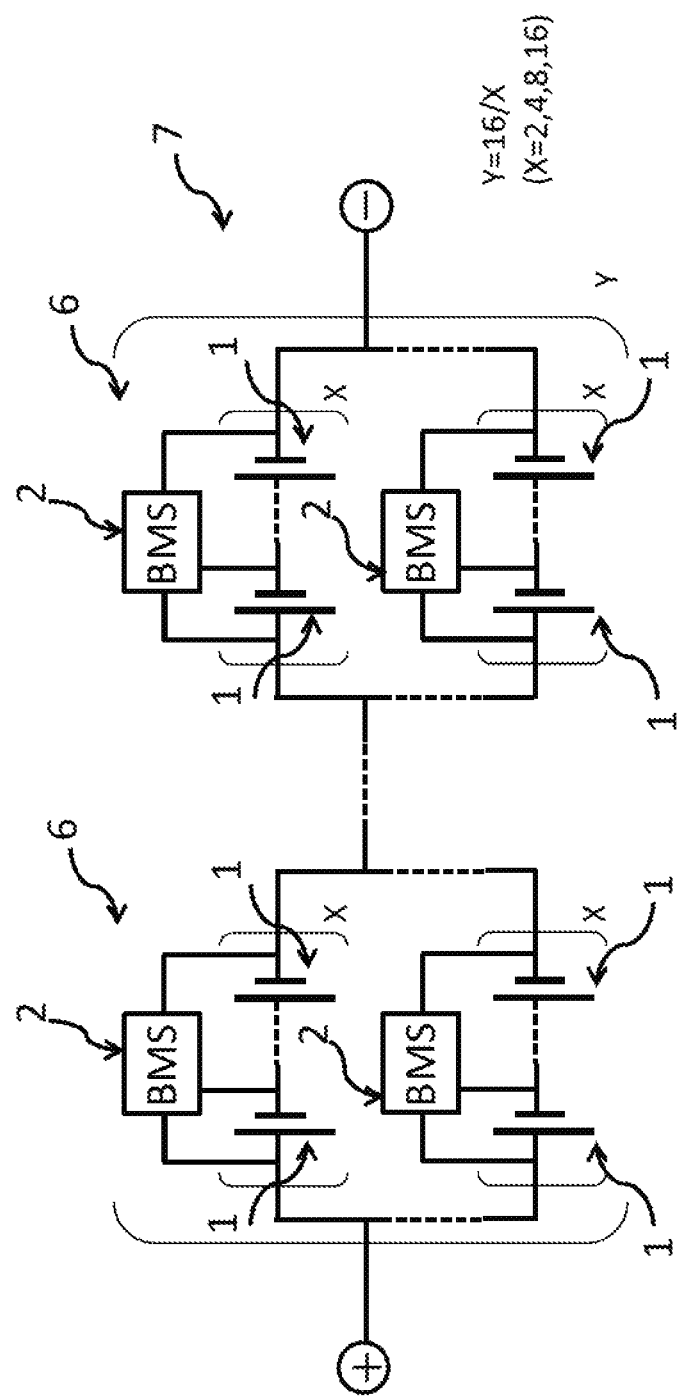
FIG. 5 is a schematic explanatory diagram illustrating a cell pack according to a forty fifth embodiment.

An example of the specific configuration of the forty fifth embodiment will now be described. FIG. 5 is a schematic explanatory diagram illustrating the cell pack according to the forty fifth embodiment. Here, the reference numeral 1 refers to a "non-aqueous secondary battery (LIB)", the reference numeral 2 refers to a "voltage monitoring circuit (BMS)", the reference numeral 6 refers to a "module", and the reference numeral 7 refers to a "cell pack". This cell pack 7 can be repeatedly charged and discharged, and a plurality of cell packs 7 may be connected in parallel.

This cell pack 7 is configured by connecting, in series, the modules 6 formed by connecting one or more cell packs in parallel on the basis of Formula (3), in which the number of cells in the non-aqueous secondary battery (LIB) 1 is defined on the basis of the following Formula (2). Note that the non-aqueous secondary battery 1 may be configured by connecting two or more cells in parallel.

Number of cells connected in series per module (X):
$X=2,4,8$, or 16     Formula (2)

Number of modules connected in series per cell pack (Y): $Y=16/X$     Formula (3)

Furthermore, the hybrid power system has the connected non-aqueous secondary batteries (LIB) 1 and a voltage monitoring circuit (BMS) 2 that individually monitors terminal voltages of each of the plurality of non-aqueous secondary batteries.

Here, the non-aqueous secondary battery (LIB) 1 includes a positive electrode having a positive-electrode active material layer provided on one surface or both surfaces of the current collector, a negative electrode having a negative-electrode active material layer provided on one surface or both surfaces of the current collector, and a non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes within a range of 1.8 to 3.7 V, and the average operation voltage becomes 2.5 to 3.5 V, so that a 48V cell pack is configured.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. $Li/Li^+$) or higher has been used. However, since the electrolyte solution containing ethylene carbonate or vinylene carbonate and the positive electrode of iron phosphate lithium ($LiFePO_4$: LFP) or the negative electrode of graphite are employed, it is possible to obtain a 48V cell pack capable of improving a cycle life at a high temperature. Furthermore, this 48V cell pack has a high input/output characteristic over a wide temperature range.

Figure 6:
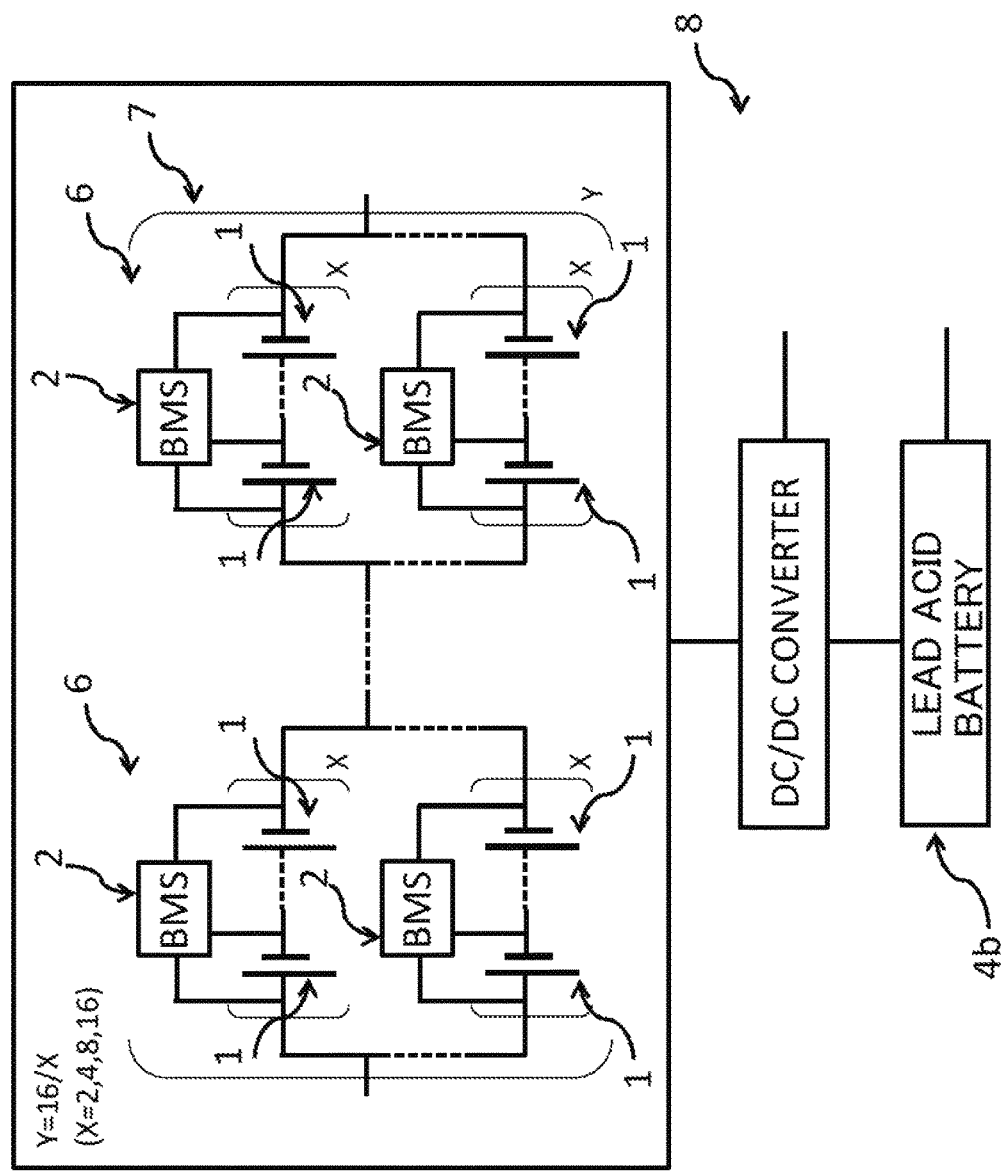
FIG. 6 is a schematic explanatory diagram illustrating a hybrid power system according to forty sixth embodiment.

An example of the specific configuration of the forty sixth embodiment will now be described. FIG. 6 is a schematic explanatory diagram illustrating the hybrid power system according to the forty sixth embodiment. Here, the reference numeral 1 refers to a "non-aqueous secondary battery (LIB)", the reference numeral 2 refers to a "voltage monitoring circuit (BMS)", the reference numeral 4b refers to a lead acid battery (second battery other than LIB), the reference numeral 6 refers to a "module", the reference numeral 7 refers to a "cell pack", and the reference numeral 8 refers to a "large-sized hybrid power system". This large-sized hybrid power system 8 can be repeatedly charged and discharged. In addition, a plurality of cell packs 7 may be connected in parallel.

This cell pack 7 is configured by connecting, in series, the modules 6 formed by connecting one or more cell packs in parallel on the basis of Formula (3), in which the number of cells in the non-aqueous secondary battery (LIB) 1 is defined on the basis of the following Formula (2). Note that the non-aqueous secondary battery 1 may be configured by connecting two or more cells in parallel.

Number of cells connected in series per module (X):
$X=2,4,8$, or 16     Formula (2)

Number of modules connected in series per cell pack (Y): $Y=16/X$     Formula (3)

Furthermore, the hybrid power system has the connected non-aqueous secondary batteries (LIB) 1 and a voltage monitoring circuit (BMS) 2 that individually monitors terminal voltages of each of the plurality of non-aqueous secondary batteries.

This large-sized hybrid power system 8 includes lead acid batteries 4b (secondary batteries other than the LIB) connected to the cell pack 7 via a DC/DC converter.

According to the forty sixth embodiment, it is preferable that the positive-electrode active material of the LIB is iron phosphate lithium ($LiFePO_4$), the negative-electrode active material of the LIB is graphite, and the electrolyte solution has an 20° C. ionic conductivity of 15 mS/cm or higher. Since the iron phosphate lithium has a lower electron conductivity, compared to NCM or LCO, there may be a problem in charging/discharging, and advantages may be degraded when it is combined with the lead acid battery. Therefore, by using the electrolyte solution having a high ionic conductivity, it is possible to cope with large-current charging/discharging of the lead acid battery in the vicinity of the room temperature and extend the service life until replacement of the battery.

Here, the non-aqueous secondary battery (LIB) 1 includes a positive electrode having a positive-electrode active material layer provided on one surface or both surfaces of the current collector, a negative electrode having a negative-electrode active material layer provided on one surface or both surfaces of the current collector, and a non-aqueous electrolyte solution. If the positive-electrode active material layer contains iron phosphate lithium ($LiFePO_4$) including Fe, and the negative-electrode active material layer contains graphite or at least one element selected from a group consisting of Ti, V, Sn, Cr, Mn, Fe, Co, Ni, Zn, Al, Si, and B, the operation voltage range per cell becomes 1.8 to 3.7 V, and the average operation voltage becomes 2.5 to 3.5 V, so that a 48V hybrid power system is configured. As a result, it is possible to easily use the 48V hybrid power system in combination with an existing 12V lead acid battery. Since a specification of an electric system is defined on the basis of the operation voltage range of the lead acid battery, it is very important to determine the operation voltage range per cell. For this reason, the BMS 2 for appropriately managing the voltage is mounted.

In a case where an electrolyte solution containing acetonitrile as a main solvent is used as the lithium ion battery, reductive decomposition proceeds at a negative electrode electric potential of graphite. Therefore, a negative electrode capable of absorbing lithium ions at 0.4 V (vs. Li/Li$^+$) or higher has been used. However, since the electrolyte solution containing ethylene carbonate or vinylene carbonate and the positive electrode of iron phosphate lithium (LiFePO$_4$: LFP) or the negative electrode of graphite are employed, it is possible to obtain a 48V hybrid power system capable of improving a cycle life at a high temperature. Furthermore, this 48V hybrid power system has a high input/output characteristic over a wide temperature range.

The non-aqueous secondary battery of the present invention is not particularly limited. For example, the non-aqueous secondary battery according to the present invention is applicable to a portable device such as a mobile phone, a portable audio device, a personal computer, and an integrated circuit (IC) tag, a rechargeable battery for vehicles such as a hybrid vehicle, a plug-in hybrid vehicle, and an electric vehicle, a storage system for home, IT equipment, or the like. For example, the non-aqueous secondary battery according to the present invention can be preferably applicable to a non-aqueous secondary battery having a pouch type cell structure. Moreover, when applied to a vehicle-mounted rechargeable battery, it is possible to improve the safety, compared to the prior art.

The non-aqueous secondary battery according to the present invention can be applicable to cold region applications, outdoor applications in summer, or the like.

This application is based upon Japanese Patent Application Nos. 2017-052257, 2017-052086, 2017-052398, 2017-052256, 2017-052254, 2017-052396, 2017-052258, 2017-052085, 2017-052088, 2017-052397, 2017-052399, 2017-052259, 2017-052260, 2017-052400, and 2017-052255, filed on Mar. 17, 2017, the entire contents of which are incorporated herein by reference.

The invention claimed is:

1. A non-aqueous secondary battery comprising:
a positive electrode having a positive-electrode active material layer formed on one surface or both surfaces of a current collector;
a negative electrode having a negative-electrode active material layer formed on one surface or both surfaces of a current collector; and
a non-aqueous electrolyte solution,
wherein the non-aqueous electrolyte solution contains acetonitrile, lithium salts, cyclic acid anhydride, and cyclic carbonate without saturated secondary carbon,
wherein the non-aqueous secondary battery contains a compound having at least one functional group selected from a group consisting of —N═, —NH$_4$, —N═O, —NH—NH—, and (NO$_3$)-dissolved in the non-aqueous electrolyte solution in an amount of up to 0.3 mass % of the non-aqueous electrolyte solution,
wherein the non-aqueous secondary battery has a capacity retention rate of 70% or higher, the capacity retention rate being calculated by dividing a 5 C discharge capacity by a 1 C discharge capacity after a storage test for 4 hours at 85° C.,
wherein the compound having at least one functional group selected from a group consisting of —N═, —NH$_4$, —N═O, —NH—NH—, and (NO$_3$)— protects a surface of the positive electrode exposed to the non-aqueous electrolyte solution.

2. The non-aqueous secondary battery according to claim 1, wherein the positive-electrode active material is a lithium-containing composite metal oxide expressed as Li$_z$MO$_2$, wherein M contains Ni and one or more metal elements selected from a group consisting of Mn, Co, Al, and Mg, a content of the Ni element is more than 50%, and z is a number greater than 0.9 and smaller than 1.2.

3. The non-aqueous secondary battery according to claim 1, wherein a gas generation amount in a storage test at 60° C. for 200 hours is 0.008 ml or less per 1 mAh.

4. The non-aqueous secondary battery according to claim 1, wherein a resistance increase rate in a full-charge storage test at 60° C. for 720 hours is 400% or lower.

5. A cell pack comprising the non-aqueous secondary battery according to claim 1, wherein the positive-electrode active material layer contains a lithium-containing compound including Fe,
wherein the negative-electrode active material layer contains graphite or at least one or more elements selected from a group consisting of Ti, V, Sn, Cr, Mn, Fe, Co, Ni, Zn, Al, Si, and B,
wherein the non-aqueous electrolyte solution contains cyclic carbonate without saturated secondary carbon,
wherein the cyclic carbonate without saturated secondary carbon includes at least one selected from a group consisting of ethylene carbonate and vinylene carbonate,
wherein the non-aqueous secondary battery is configured by connecting one module or two or more modules, in which the module is obtained by connecting four cells in series, in parallel or the non-aqueous secondary battery is configured by connecting four modules, in which the module is obtained by connecting two or more cells in parallel, in series,
wherein an operation voltage range per cell is within a range of 1.8 to 3.7 V,
wherein an average operation voltage is within a range of 2.5 to 3.5 V, and
wherein the module is mounted with a battery management system (BMS).

6. A hybrid power system obtained by combining the cell pack according to claim 5, and a module or cell pack having a secondary battery other than a lithium ion battery.

7. A cell pack comprising the non-aqueous secondary battery according to claim 1, wherein the positive-electrode active material layer contains a lithium-containing compound including Fe,
wherein the negative-electrode active material layer contains graphite or at least one or more elements selected from a group consisting of Ti, V, Sn, Cr, Mn, Fe, Co, Ni, Zn, Al, Si, and B,
wherein the non-aqueous electrolyte solution contains cyclic carbonate without saturated secondary carbon,
wherein the cyclic carbonate without saturated secondary carbon is at least one selected from a group consisting of ethylene carbonate and vinylene carbonate,
wherein the cell pack is configured by connecting one or more cell packs in parallel on the basis of Formula (2) and Formula (3), in which the number of cells and the number of modules of the non-aqueous secondary battery are defined, or the non-aqueous secondary battery is configured by connecting modules on the basis of Formula (2) and Formula (3), the module being obtained by connecting two or more cells in parallel,
wherein an operation voltage range per cell is within a range of 1.8 to 3.7 V,
wherein an average operation voltage is within a range of 2.5 to 3.5 V, and wherein the module is mounted with a battery management system (BMS), Formula (2): Number of cells connected in series per module (X): X=2, 4, 8, or 16, and Formula (3): Number of modules connected in series per cell pack (Y): Y=16/X.

8. A hybrid power system comprising the cell pack according to claim 7, and a module or cell pack having a secondary battery other than a lithium ion battery in combination.

9. The non-aqueous secondary battery according to claim 1, wherein the non-aqueous electrolyte solution does not contain propylene carbonate.

10. The non-aqueous secondary battery according to claim 1, wherein a nitrogen concentration of the compound includes 0.5 to 20 atomic %.

\* \* \* \* \*